US011316941B1

(12) United States Patent
Jain et al.

(10) Patent No.: US 11,316,941 B1
(45) Date of Patent: Apr. 26, 2022

(54) REMOTELY MANAGING AND ADAPTING MONITORING PROGRAMS USING MACHINE LEARNING PREDICTIONS

(71) Applicant: VigNet Inc., Fairfax, VA (US)

(72) Inventors: Praduman Jain, Fairfax, VA (US); Josh Schilling, Salem, OR (US); Dave Klein, Oakton, VA (US)

(73) Assignee: VigNet Incorporated, Fairfax, VA (US)

( * ) Notice: Subject to any disclaimer, the term of this patent is extended or adjusted under 35 U.S.C. 154(b) by 0 days.

(21) Appl. No.: 17/324,098

(22) Filed: May 18, 2021

Related U.S. Application Data

(63) Continuation-in-part of application No. 17/166,899, filed on Feb. 3, 2021, now Pat. No. 11,196,656, and
(Continued)

(51) Int. Cl.
*H04L 29/02* (2006.01)
*H04L 67/50* (2022.01)
(Continued)

(52) U.S. Cl.
CPC .......... *H04L 67/22* (2013.01); *H04L 41/0816* (2013.01); *H04L 41/16* (2013.01)

(58) Field of Classification Search
CPC ...................................................... H04L 67/22
See application file for complete search history.

(56) References Cited

U.S. PATENT DOCUMENTS

| 5,547,878 A | 8/1996 | Kell |
| 5,832,474 A | 11/1998 | Lopresti et al. |

(Continued)

FOREIGN PATENT DOCUMENTS

| WO | WO1995012812 | 5/1995 |
| WO | WO2013144769 | 10/2013 |
| WO | WO2016110804 | 7/2016 |

OTHER PUBLICATIONS

Cancer.gov [online], "NCI Dictionary of Cancer Terms," Jan. 9, 2020, retrieved on Mar. 13, 2020, retrieved from URL<https://www.cancer.gov/publications/dictionaries/cancer-terms/def/research-study>, 1 page.

(Continued)

*Primary Examiner* — Adnan M Mirza
(74) *Attorney, Agent, or Firm* — Fish & Richardson P.C.

(57) ABSTRACT

Methods, systems, and apparatus, including computer programs encoded on a computer storage medium, for remotely managing and adapting monitoring programs using machine learning predictions. In some implementations, data describing a monitoring program that involves collecting data over a period of time from geographically distributed devices is accessed. Composition characteristics of the monitoring pro group for the monitoring program are determined. Predicted composition characteristics are generated for a portion of the monitoring group predicted to comply with the monitoring program requirements for the period of time. It is determined whether the predicted composition characteristics indicate at least a minimum level of diversity among the portion of the monitoring group. One or more devices associated with the monitoring program are communicated with.

20 Claims, 27 Drawing Sheets

Related U.S. Application Data a continuation-in-part of application No. 17/166,777, filed on Feb. 3, 2021, and a continuation-in-part of application No. 17/177,153, filed on Feb. 16, 2021.

(51) Int. Cl.
  *H04L 41/0816* (2022.01)
  *H04L 41/16* (2022.01)

(56) References Cited

U.S. PATENT DOCUMENTS

| | | | |
|---|---|---|---|
| 6,029,144 A | 2/2000 | Barrett et al. | |
| 6,514,200 B1 | 2/2003 | Khouri | |
| 6,574,622 B1 | 6/2003 | Miyauchi et al. | |
| 6,663,846 B1 | 12/2003 | McCombs et al. | |
| 6,879,970 B2 | 4/2005 | Shiffman et al. | |
| 7,054,782 B2 | 5/2006 | Hartlaub | |
| 7,113,917 B2 | 9/2006 | Jacobi et al. | |
| 7,251,609 B1 | 7/2007 | McAlindon et al. | |
| 7,415,447 B2 | 8/2008 | Shiffman et al. | |
| 7,752,059 B2 | 7/2010 | Sweeney et al. | |
| 7,809,601 B2 | 10/2010 | Shaya et al. | |
| 7,809,660 B2 | 10/2010 | Friedlander et al. | |
| 7,930,262 B2 | 4/2011 | Friedlander et al. | |
| 7,937,275 B2 | 5/2011 | Schoenberg | |
| 8,032,545 B2 | 10/2011 | Setimi | |
| 8,065,180 B2 | 11/2011 | Hufford et al. | |
| 8,157,730 B2 | 4/2012 | LeBouef et al. | |
| 8,316,020 B1 | 11/2012 | Kleinmann | |
| 8,380,531 B2 | 2/2013 | Paty et al. | |
| 8,433,605 B2 | 4/2013 | Hufford et al. | |
| 8,527,486 B2 | 9/2013 | Wittig et al. | |
| 8,533,029 B2 | 9/2013 | Hufford et al. | |
| 8,583,453 B2 | 11/2013 | Plummer et al. | |
| 8,606,595 B2 | 12/2013 | Udani | |
| 8,684,922 B2 | 4/2014 | Tran | |
| 8,707,392 B2 | 4/2014 | Birtwhistle et al. | |
| 8,966,548 B2 | 2/2015 | Busse et al. | |
| 8,990,250 B1 | 3/2015 | Chowdry et al. | |
| 9,020,971 B2 | 4/2015 | Bayliss et al. | |
| 9,286,442 B2 | 3/2016 | Csoma et al. | |
| 9,495,651 B2 | 11/2016 | O'Sullivan et al. | |
| 9,514,655 B1 | 12/2016 | Nusbaum et al. | |
| 9,659,254 B2 | 5/2017 | Achin et al. | |
| 9,753,618 B1 | 9/2017 | Jain et al. | |
| 9,813,318 B2 | 11/2017 | Iyoob et al. | |
| 9,848,061 B1 | 12/2017 | Jain et al. | |
| 9,858,063 B2 | 1/2018 | Jain et al. | |
| 9,928,230 B1 | 3/2018 | Jain et al. | |
| 9,983,775 B2 | 5/2018 | Jain et al. | |
| 10,069,934 B2 | 9/2018 | Jain et al. | |
| 10,095,688 B1 | 10/2018 | Jain et al. | |
| 10,231,622 B2 | 3/2019 | Soyao et al. | |
| 10,255,274 B1 | 4/2019 | Schilling | |
| 10,304,000 B2 | 5/2019 | Birnbaum et al. | |
| 10,452,816 B2 | 10/2019 | Kidd et al. | |
| 10,455,262 B2 | 10/2019 | Rieger et al. | |
| 10,510,438 B2 | 12/2019 | Frazier et al. | |
| 10,521,557 B2 | 12/2019 | Jain et al. | |
| 10,546,339 B2 | 1/2020 | Jiao et al. | |
| 10,565,894 B1 | 2/2020 | Jain et al. | |
| 10,580,531 B2 | 3/2020 | Jiao et al. | |
| 10,628,553 B1 | 4/2020 | Murrish et al. | |
| 10,636,525 B2 | 4/2020 | Jiao et al. | |
| 10,650,474 B2 | 5/2020 | Jiao et al. | |
| 10,672,519 B2 | 6/2020 | Jiao et al. | |
| 10,756,957 B2 | 8/2020 | Jain et al. | |
| 10,762,990 B1 | 9/2020 | Jain et al. | |
| 10,775,974 B2 | 9/2020 | Jain et al. | |
| 10,938,634 B1 * | 3/2021 | Cruise | H04L 41/0686 |
| 10,938,651 B2 | 3/2021 | Jain et al. | |
| 11,056,242 B1 | 7/2021 | Jain et al. | |
| 11,061,798 B1 | 7/2021 | Jain et al. | |
| 11,082,487 B1 | 8/2021 | Jain et al. | |
| 11,102,304 B1 | 8/2021 | Jain et al. | |
| 2002/0099570 A1 | 7/2002 | Knight |
| 2002/0143595 A1 | 10/2002 | Frank et al. |
| 2003/0065669 A1 | 4/2003 | Kahn et al. |
| 2003/0130871 A1 | 7/2003 | Rao et al. |
| 2004/0059697 A1 | 3/2004 | Forman |
| 2004/0172447 A1 | 9/2004 | Miller |
| 2004/0175700 A1 | 9/2004 | Geesaman |
| 2004/0210457 A1 | 10/2004 | Sameh |
| 2005/0165626 A1 | 7/2005 | Karpf |
| 2005/0182664 A1 | 8/2005 | Abraham-Fuchs |
| 2006/0184493 A1 | 8/2006 | Shiffman et al. |
| 2007/0179361 A1 | 8/2007 | Brown et al. |
| 2007/0250429 A1 | 10/2007 | Walser et al. |
| 2007/0294110 A1 | 12/2007 | Settimi |
| 2008/0010945 A1 | 1/2008 | McKenna et al. |
| 2008/0109455 A1 | 5/2008 | Katz |
| 2008/0140444 A1 | 6/2008 | Karkanias |
| 2008/0294459 A1 | 11/2008 | Angell et al. |
| 2009/0163183 A1 | 6/2009 | O'Donoghue et al. |
| 2009/0299766 A1 | 12/2009 | Friedlander et al. |
| 2010/0088245 A1 | 4/2010 | Harrison et al. |
| 2010/0218132 A1 | 8/2010 | Soni et al. |
| 2010/0250285 A1 | 9/2010 | Shelton |
| 2012/0035954 A1 | 2/2012 | Yeskel |
| 2012/0059735 A1 | 3/2012 | Su et al. |
| 2012/0065987 A1 | 3/2012 | Farooq et al. |
| 2012/0310670 A1 | 12/2012 | Pruitt |
| 2013/0030836 A1 | 1/2013 | Ackerson |
| 2013/0262140 A1 | 10/2013 | Friedlander et al. |
| 2014/0067596 A1 | 3/2014 | McGovern et al. |
| 2014/0195297 A1 | 7/2014 | Abuelsaad et al. |
| 2014/0278474 A1 | 9/2014 | McClure et al. |
| 2014/0297311 A1 | 10/2014 | Jackson |
| 2014/0316793 A1 | 10/2014 | Pruit |
| 2014/0350954 A1 | 11/2014 | Ellis et al. |
| 2015/0073830 A1 | 3/2015 | Hill et al. |
| 2015/0178473 A1 | 6/2015 | Hufford et al. |
| 2015/0178474 A1 | 6/2015 | Hufford et al. |
| 2015/0193588 A1 | 7/2015 | Nemoto et al. |
| 2015/0228041 A1 | 8/2015 | Naley et al. |
| 2015/0294090 A1 | 10/2015 | Kodiyan |
| 2015/0347682 A1 | 12/2015 | Chen et al. |
| 2015/0356582 A1 | 12/2015 | Turner, Jr. |
| 2016/0086505 A1 | 3/2016 | Hanlon |
| 2016/0098541 A1 | 4/2016 | Haskell et al. |
| 2016/0140322 A1 | 5/2016 | Menon et al. |
| 2016/0180053 A1 | 6/2016 | Fuertinger et al. |
| 2016/0267238 A1 | 9/2016 | Nag |
| 2016/0314257 A1 | 10/2016 | Nolan et al. |
| 2016/0357944 A1 | 12/2016 | Iyer et al. |
| 2016/0378950 A1 | 12/2016 | Reiner |
| 2017/0020444 A1 | 1/2017 | Lurie |
| 2017/0039324 A1 | 2/2017 | Francois et al. |
| 2017/0039341 A1 | 2/2017 | Shklarski et al. |
| 2017/0071671 A1 | 3/2017 | Neumann |
| 2017/0076049 A1 | 3/2017 | Miller |
| 2017/0235912 A1 | 8/2017 | Moturu et al. |
| 2017/0293538 A1 | 10/2017 | Seenappa |
| 2017/0372348 A1 | 12/2017 | Baluja |
| 2018/0025125 A1 | 1/2018 | Crane et al. |
| 2018/0036591 A1 | 2/2018 | King |
| 2018/0039726 A1 | 2/2018 | Boissel |
| 2018/0056130 A1 | 3/2018 | Bitran et al. |
| 2018/0068083 A1 | 3/2018 | Cohen et al. |
| 2018/0089159 A1 | 3/2018 | Jain et al. |
| 2018/0089376 A1 | 3/2018 | Tucker et al. |
| 2018/0121605 A1 | 5/2018 | Allen |
| 2018/0150523 A1 | 5/2018 | Shiffman et al. |
| 2018/0176331 A1 | 6/2018 | Jain et al. |
| 2018/0242860 A1 | 8/2018 | LeBouef et al. |
| 2018/0359281 A1 | 12/2018 | Ng |
| 2019/0006025 A1 | 1/2019 | Li |
| 2019/0012434 A1 | 1/2019 | Frazier |
| 2019/0080785 A1 | 3/2019 | Li |
| 2019/0122266 A1 | 4/2019 | Ramer et al. |
| 2019/0138656 A1 | 5/2019 | Yang et al. |
| 2019/0140892 A1 | 5/2019 | Jain et al. |
| 2019/0206521 A1 | 7/2019 | Walpole et al. |
| 2019/0227528 A1 | 7/2019 | Abbott et al. |

(56) References Cited

U.S. PATENT DOCUMENTS

| | | |
|---|---|---|
| 2019/0272925 A1 | 9/2019 | Barrett |
| 2020/0058382 A1 | 2/2020 | Birnbaum et al. |
| 2020/0065879 A1 | 2/2020 | Hu et al. |
| 2020/0131581 A1 | 4/2020 | Jain et al. |
| 2020/0211679 A1 | 7/2020 | Pellini et al. |
| 2020/0211680 A1 | 7/2020 | Sablinski et al. |
| 2020/0243167 A1 | 7/2020 | Will |
| 2020/0319877 A1* | 10/2020 | Glazer ............... G06F 21/6254 |
| 2020/0321116 A1 | 10/2020 | Neumann |
| 2020/0342352 A1 | 10/2020 | Neumann |
| 2020/0350041 A1 | 11/2020 | Li |
| 2020/0357490 A1 | 11/2020 | Kartoun et al. |
| 2020/0387810 A1 | 12/2020 | Hodgson |
| 2020/0410090 A1 | 12/2020 | Baker |
| 2020/0411199 A1 | 12/2020 | Shrager et al. |
| 2021/0004537 A1 | 1/2021 | Sapugay |

OTHER PUBLICATIONS

Coravos et al., "Modernizing and designing evaluation frameworks for connected sensor technologies in medicine", Digital Medicine 3, Mar. 2020.

Ctti-clinicaltrials.org [online], "Clinical Trials Transformation Initiative (CTTI) Recommendations: Advancing the Use of Mobile Technologies for Data Capture and Improved Clinical Trials", published in Jul. 2018, [retrieved on Jan. 7, 2021], retrieved from URL<https://www.ctti-clinicaltrials.org/sites/www.ctti-clinicaltrials.org/files/mobile-devices-recommendations.pdf#Pg2Ln13>.

DeAngelis, "Patient Monitoring, Big Data, and the Future of Healthcare," Wired.com, Aug. 6, 2014, retrieved at URL<https://www.wired.com/insights/2014/08/patient-monitoring-big-data-future-healthcare/>, 6 pages.

Dias et al., "Wearable Health Devices—Vigtal Sign Monitoring, Systems and Technologies," Sensors, Jul. 25, 2018, 18(8):2414.

Ekonomou et al., "An Integrated Cloud-based Healthcare Infrastructure", IEEE Third International Conference on Cloud Computing Technology and Science, 2011, pp. 532-536.

FDA.gov [online], "FDA Offers Guidance to Enhance Diversity in Clinical Trials, Encourage Inclusivity in Medical Product Development", published on Nov. 9, 2020, retrieved on Mar. 11, 2021, retrieved from URL<https://www.fda.gov/news-events/press-announcements/fda-offers-guidance-enhance-diversity-clinical-trials-encourage-inclusivity-medical-product>, 3 pages.

Flatiron.com [online], "OncoTrials," May 14, 2018, retrieved on Mar. 13, 2020, retrieved from URL <https://flatiron.com/oncology/clinical-trials/>, 4 pages.

Flatiron.com [online], "Press Release: Flatiron Health Announces Three Publications Studying a Feasible, Reliable, Scalable and Meaningful Real-World Progression Endpoint for Oncology Research," Aug. 22, 2019, retrieved on Mar. 13, 2020, retrieved from URL<https://flatiron.com/press/press-release/real-world-progression-2019/>, 4 pages.

Foxnews.com [online], "FDA Issues Final Guidance to Improve Diversity in Clinical Trials", published on Nov. 9, 2020, retrieved on Mar. 11, 2021, retrieved from URL<https://www.foxnews.com/health/fda-issues-final-guidance-improve-diversity-clinical-trials>, 7 pages.

Goldsack et al., "Verification, analytical validation and clinical validation (V3): the foundation of determining fit-for-purpose for Biometric Monitoring Technologies (BioMeTs)", NPJ Digital Medicine, Apr. 14, 2020, 3(55):1-15.

Grilo et al. "Pretreatment Patient Factors Predicting Attrition From a Multicenter Randomized Controlled Treatment Study for Panic Disorder," Comprehensive Psychiatry, Nov./Dec. 1998, 39(6):323-332.

Hammond et al., "Connecting Information to Improve Health", Health Affairs, Feb. 2010, 7 pages.

Hayhurst, "How Network Monitoring Keeps Healthcare Devices and Patients Safe," HealthTech, May 7, 2020, retrieved at URL<https://healthtechmagazine.net/article/2020/05/how-network-monitoring-keeps-healthcare-devices-and-patients-safe>, 8 pages.

Kakria, "A Real-Time Health Monitoring System for Remote Cardiac Patients Using Smartphone and Wearable Sensors," International Journal of Telemedicine and Applications, Nov. 12, 2015, vol. 2015, Article ID 373474, 11 pages.

Komen.org [online], "Types of Research Studies," Mar. 11, 2015, retrieved on Mar. 13, 2020, retrieved from URL<https://ww5.komen.org/BreastCancer/DifferentTypesofResearchStudies.html>, 5 pages.

Lenane, "Continuous Heart Monitoring Key to Identifying Cause of Cryptogenic Stroke," Diagnostic and Interventional Cardiology, Nov. 16, 2015, retrieved at URL<https://www.dicardiology.com/article/continuous-heart-monitoring-key-identifying-cause-cryptogenic-stroke>, 4 pages.

Med.Standford.edu [online], "Cohort Discovery," retrieved on Mar. 13, 2020, retrieved from URL <https://med.stanford.edu/starr-tools/cohort-discovery.html>, 3 pages.

Michaeljfox.org [online], "Fox Trial Finder," retrieved on Mar. 13, 2020, retrieved from URL<https://www.michaeljfox.org/trial-finder>, 4 pages.

Miksad et al., "Small But Might: The Use of Real-World Evidence to Inform Precision Medicine," Clinical Pharmacology & Therapeutics, Jul. 2019, 106(1):87-90.

Mixpanel.com [online], "What is cohort analysis?," retrieved on Mar. 13, 2020, retrieved from URL <https://mixpanel.com/topics/cohort-analysis/>, 11 pages.

Murphy et al., "Visual Query Tool for Finding Patient Cohorts from a Clinical Data Warehouse of the Partners HealthCare System," Presented at Proceedings of AMIA Symposium, 2000:1174.

Nickelled.com [online], "Chapter 5: Top cohort analysis tools and resources," Dec. 12, 2018, retrieved on Mar. 13, 2020, retrieved from URL<https://www.nickelled.com/cohort-analysis/tools/>, 17 pages.

Obgyn.com [online], "Neural Networks", published in 2002, retrieved on Jan. 19, 2021, 34 pages.

Opb.org [online], "OHSU's COVID-19 Study Accused of Racial Bias", Published on Jun. 6, 2020, retrieved on Mar. 11, 2021, retrieved from URL<https://www.opb.org/news/article/key-to-oregon-ohsu-covid-19-study-accused-of-racial-bias/>, 8 pages.

Oregonlive.com [online], "OHSU ends massive coronavirus study because it underrepresented minorities, university says", published on Aug. 27, 2020, retrieved on Mar. 11, 2021, retrieved from URL<https://www.oregonlive.com/coronavirus/2020/08/ohsu-drops-massive-coronavirus-study-because-minorities-didnt-sign-up-university-says.html>, 4 pages.

PaloAltoNetworks.com, "Monitor Device Health," Panorama Administrator's Guide Version 8.1, last updated Jun. 17, 2020, retrieved at URL<https://docs.paloaltonetworks.com/panorama/8-1/panorama-admin/manage-firewalls/device-monitoring-on-panorama/monitor-device-health.html>, 3 pages.

Pennic, "Life Image, Medel.ai Integrates to Support AI-Driven Clinical Trials," Nov. 6, 2018, retrieved from URL<https://hitconsultant.net/2018/11/06/life-image-medel-ai-partner-ai-driven-clinical-trials/#.Xmr7yqhKhZc>, 4 pages.

Phaneuf, "Latest Trends in Medical Monitoring Devices and Wearable Health Technology," BusinessInsider.com, Jan. 31, 2020, retrieved at URL<https://www.businessinsider.com/wearable-technology-healthcare-medical-devices>, 8 pages.

Rogers et al., "Composer: Visual Cohort Analysis of Patient Outcomes," Applied Clinical Informatics, Mar. 2019, 10(2):278-285.

Smith et al., "Performance Measurement for Health System Improvement: Experiences, Challenges and Prospects," Proceedings of WHO European Ministerial Conference on Health Systems, Jun. 25-27, 2008, Tallinn, Estonia, 28 pages.

Statsoft, "Neural Networks", published in 2002, retrieved on Apr. 14, 2004, retrieved from URL<http://www.obgyn.cam.ac.uk/cam-only/statsbook/stneunet.html>.

Tucker, "Five of the Best Health Monitoring Devices," TheGuardian.com, Aug. 21, 2016, retrieved at URL<https://www.theguardian.com/technology/2016/aug/21/five-best-cardio-health-monitoring-devices>, 9 pages.

U.S. Office Action in U.S. Appl. No. 17/166,777, dated Apr. 27, 2021, 26 pages.

(56) References Cited

OTHER PUBLICATIONS

U.S. Office Action in U.S. Appl. No. 17/166,899, dated Apr. 19, 2021, 25 pages.
U.S. Office Action in U.S. Appl. No. 17/177,153, dated May 27, 2021, 41 pages.
Wikipedia.org [online], "Clinical trial," Feb. 17, 2020, retrieved on Mar. 13, 2020, retrieved from URL<https://en.wikipedia.org/wiki/Clinical_trial>, 18 pages.
Wikipedia.org [online], "Observational study," Feb. 17, 2020, retrieved on Mar. 13, 2020, retrieved from URL<https://en.wikipedia.org/wiki/Observational_study>, 4 pages.
Wikipedia.org [online], "Research," Mar. 7, 2020, retrieved on Mar. 13, 2020, retrieved from URL<https://en.wikipedia.org/wiki/Research>, 17 pages.
U.S. Patent Application as Filed for U.S. Appl. No. 17/166,777, filed Feb. 3, 2021, 132 pages.
U.S. Patent Application as Filed for U.S. Appl. No. 17/166,899, filed Feb. 3, 2021, 149 pages.
U.S. Patent Application as Filed for U.S. Appl. No. 17/177,153, filed Feb. 16, 2021, 187 pages.
U.S. Patent Application as Filed for U.S. Appl. No. 17/378,643, filed Jul. 16, 2021, 276 pages.
U.S. Final Office Action in U.S. Appl. No. 17/177,153 dated Oct. 11, 2021, 15 pages.

\* cited by examiner

| Study Criteria | 510a |
|---|---|
| | |

- Cohort Size: 100  *511*
- Study Length: 45 days  *512*
- Study Region: Virginia  *513*
- Requirements:  *514*
  (1) Must make 3 Medical Office Visits per Month
  (2) Must have a Smartphone
- Inclusion Criteria:  *515a*
  (1) Must be between 30 and 50 years old
  (2) Must be Diagnosed with High Blood Pressure
- Exclusion Criteria:  *516*
  (1) Can't have Diabetes
  (2) Can't be Pregnant
- Target Date: April, 2024  *517*
- ...

Diversity Analysis Results (Cohort Selection/Invitation)  *520a*

- Reference Population: *521* VA (2024 Estimated) – 49% (Group 1) / 24% (Group 2) / 24% (Group 3)
- Target Group Composition for Cohort: *522* 50% (Group 1) / 25% (Group 2) / 25% (Group 3)
- Previous Participants: *523* 915 (Group 1); 220 (Group 2); 200 (Group 3)
  - No Warning. Required Invitation Acceptance Rate is < 15%

Recommended Actions – Selecting Cohort  *530a*

Option 1 – (1) Send invitations to all previous study participants in
*532*    Groups 1-3; (2) remove Inclusion Criteria 1
- Diversity Score: 0.91
- Target Group Composition:              50% / 25% / 25%
- Predicted Group Composition at Enrollment:      43% / 30% / 27%
- Predicted Group Composition at Study Completion:  51% / 23% / 26%

Option 2 - (1) Send invitations to all previous study participants; and
*534*    (2) invite 20% more participants from Group 2 than Group 3
- Diversity Score: 0.85
- Target Group Composition:              50% / 25% / 25%
- Predicted Group Composition at Enrollment:      43% / 30% / 24%
- Predicted Group Composition at Study Completion:  54% / 23% / 23%

Study Criteria _510b_

- Cohort Size: 100 _511_
- Study Length: 45 days _512_
- Study Region: Virginia _513_
- Requirements: _514_
  (1) Must make 3 Medical Office Visits per Month
  (2) Must have a Smartphone
- Inclusion Criteria: _515b_
  (1) Must be Diagnosed with High Blood Pressure
- Exclusion Criteria: _516_
  (1) Can't have Diabetes
  (2) Can't be Pregnant
- Target Date: April, 2024 _517_
  ...

Diversity Analysis Results (Enrollment) _520b_

- Target Group Composition: _522_  50% / 25% / 25%
- Enrolled Group Composition: _524_  48% / 27% / 24%
- Predicted Group Composition at Completion: _525_  55% / 20% / 25%
- Anticipated Diversity Level at Completion: _526_  0.83
- Warning: _527_ Group Composition Outside of Target Composition Range!

Recommended Actions – Start of Study _530b_

Option 1 – (1) Add taxi credit; and (2) Send new enrollment invitations to Group 2 candidates _536_
- Diversity Score: 0.94
- Target Diversity levels: 50% / 25% / 25%
- Predicted New Group Diversity at Enrollment: 43% / 30% / 27%
- Predicted Group Diversity at Study Completion: 51% / 23% / 26%

Study Criteria 510b

- Cohort Size: 100 — 511
- Study Length: 45 days — 512
- Study Region: Virginia — 513
- Requirements: 514
  (1) Must make 3 Medical Office Visits per Month
  (2) Must have a Smartphone
- Inclusion Criteria: 515b
  (1) Must be Diagnosed with High Blood Pressure
- Exclusion Criteria: 516
  (1) Can't have Diabetes
  (2) Can't be Pregnant
- Target Date: April, 2024 — 517
- ...

Diversity Analysis Results (Enrollment) 520b

- Target Group Composition: 522    50% / 25% / 25%
- Enrolled Group Composition: 524    48% / 27% / 24%
- Predicted Group Composition at Completion: 525    55% / 20% / 25%
- Anticipated Diversity Level at Completion: 526    0.87
- Warning: 527 Group Composition Outside of Target Composition Range!

Adjust Enrollment 540

| Recommended Users to Improve Diversity | Recommended Users for Removal or Replacement |
|---|---|
| User S:<br>- Group(s): Group 2 (Underrepresented)<br>- Expected Participation Level: 76%<br>- Anticipated Diversity Level if Added: 0.91<br>[INVITE] | User D:<br>- Group(s): Group 1 (Overrepresented)<br>- Participation Level: 51%<br>- Anticipated Diversity Level if Removed: 0.90<br>[REMOVE] [REPLACE] |
| User R:<br>- Group(s): Group 2 (Underrepresented)<br>- Expected Participation: 71%<br>- Anticipated Diversity Level if Added: 0.90<br>INVITE | User B:<br>- Group(s): Group 1 (Overrepresented)<br>- Participation Level: 59%<br>- Anticipated Diversity Level if Removed: 0.89<br>REMOVE [REPLACE] |

| Study Parameters/Elements | Cluster 1 | | | ... | Cluster 2 | | | ... |
|---|---|---|---|---|---|---|---|---|
| | Effect on Compliance | Effect on Retention | Effect on Data Quality | | Effect on Compliance | Effect on Retention | Effect on Data Quality | |
| Blood Pressure Monitoring | +1 | 0 | +2 | ... | -1 | -1 | +1 | ... |
| Location Monitoring | -1 | -1 | +1 | ... | 0 | 0 | +2 | ... |
| Smartphone Usage | -2 | -1 | 0 | ... | 0 | +1 | +1 | ... |
| In-person Visits (Monthly) | -1 | -1 | +1 | ... | -1 | -1 | +2 | ... |
| In-person Visits (Weekly) | -3 | -3 | +2 | ... | +2 | -2 | +3 | ... |
| Communication (Email) | -3 | +2 | -1 | ... | -3 | -1 | -1 | ... |
| Communication (SMS) | +3 | | +3 | ... | | | +1 | ... |
| ... | | | | | | | | |

FIG. 10

Program Elements 1610

- Cohort Size: 100  *1611*
- Program Length: 45 days  *1612*
- Protocol:  *1613*
  (1) Must make 3 Medical Office Visits per Month
  (2) Must have a Smartphone
- Inclusion Criteria:  *1614*
  (1) Must be Diagnosed with High Blood Pressure
- Exclusion Criteria:  *1615*
  (1) Can't have Diabetes
  (2) Can't be Pregnant
- Target Date: April, 2024  *1616*
- Diversity/Success Criteria: *1617*
  (1) Min. Group Size = 8
  (2) Min. Diversity Score = 0.8
  ...

Monitoring Group *1620*

Cohort Participants:
- User B: Diversity Group 2
- User Z: Diversity Group 3
- User F: Diversity Group 1
- User H: Diversity Group 2
...

Diversity Analysis Results *1630*

- Program-End Target Composition: 50% / 25% / 25%
- Current Group Composition: 48% / 27% / 24%
- Predicted Group Composition at Program-End: 55% / 20% / 25%
- Predicted Diversity Score at Program-End: 0.83
- Warning: Predicted Group Composition Outside of Target Composition Range!

Recommended Actions to Improve Program-End Diversity *1640*

Option 1 – (1) Add taxi credit; and (2) Send new enrollment invitations to Group 2 subjects
- Predicted Diversity Score at Program End: 0.94
- Program-End Target Composition: 50% / 25% / 25%
- Predicted Composition at Program-End: 51% / 23% / 26%
...

FIG. 16A

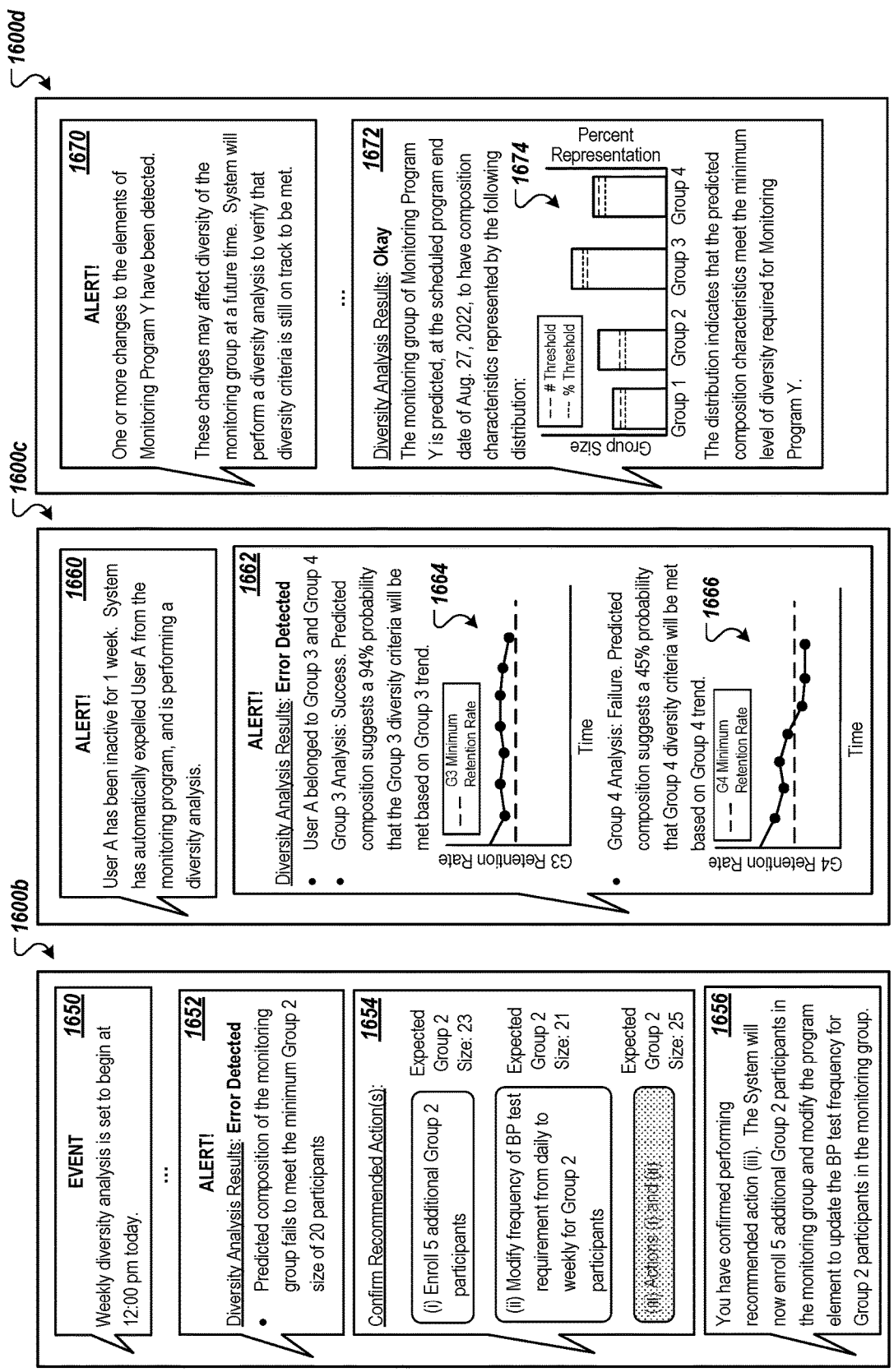

REMOTELY MANAGING AND ADAPTING MONITORING PROGRAMS USING MACHINE LEARNING PREDICTIONS

CROSS REFERENCE TO RELATED APPLICATIONS

This application is a Continuation-in-Part of U.S. application Ser. No. 17/166,899, Filed Feb. 3, 2021, and is also a Continuation-in-Part of U.S. application Ser. No. 17/166,777, filed Feb. 3, 2021, and is also a Continuation-in-Part of U.S. application Ser. No. 17/177,153, filed Feb. 16, 2021.

BACKGROUND

Many different types of monitoring and analysis involve sampling subsets of the total population of devices or other subjects to be monitored. This can provide high efficiencies and allow insight to the larger group from observation of a much smaller group. However, in some cases, the group selected to be monitored may not accurately reflect the composition of the population from which it is sampled. A mismatch between the characteristics or composition of a monitored group and a reference group can reduce the usefulness of the observations. In some cases, a monitored group with an improper composition can result in significant waste and inefficiency, as resources are expended in monitoring that is ineffective or fails to achieve the monitoring objectives.

SUMMARY

In some implementations, a server or other computer system provides a platform for administering monitoring programs that involve customized data collection from groups of remote devices such as phone, laptops, wearable devices, and so on. The system enables different parties, e.g., organizations, administrators, third-parties, etc., to create or register monitoring programs to be distributed and managed by the system. For example, a server system can provide a multi-tenant system that provides functionality to create monitoring programs for each tenant organization, select groups of devices and users to participate in the monitoring programs, and distribute the monitoring programs (e.g., including items such as software modules, configuration data, data collection instructions, interactive content, etc. that cause remote devices carry out the monitoring). The system can thus administer many different monitoring programs on behalf of different tenant organizations, with the system including servers that collect and process data from the remote devices as the monitoring programs are carried out over time. The system can also make predictions as to whether objectives of the monitoring program are anticipated to be met. For example, a monitoring program may require a minimum level of diversity among its monitoring group to be considered successfully completed. The computer system may use attributes of the monitoring group(s) or their corresponding members, and the requirements of the monitoring program to predict whether the minimum level of diversity is likely to be met, e.g., by a scheduled end of the monitoring program, by a deadline set for the monitoring program, or at some future point in time. When a prediction indicates that a future composition of the monitoring group is anticipated to fail one or more diversity criteria of the monitoring program the computer system can recommend adaptations to the monitoring program and the corresponding monitoring group.

Many of the monitoring programs involve consistent, repeated interactions and data collection actions over a period of time (e.g., weeks, months, or even years). The computer system must manage these interactions and data collection actions for, potentially, multiple groups of devices or users participating in different monitoring programs. The computer system may proceed to use the collected data from the various monitoring groups and monitoring programs to make predictions for current monitoring programs, e.g., those that have been initiated or are ongoing. For example, the computer system may use historical data indicating past behaviors for particular users or particular groups of users, e.g., each defined by a particular set of user attributes or observed user actions, to predict how users participating in a specific monitoring program will behave. In more detail, the historical data may include average compliance and retention rates for different users or groups of users that the computer system can use to predict a future composition of the monitoring group. The historical data may also include the elements of past or ongoing monitoring programs and their relation to the collected data that the computer system can use to make predictions. For example, the computer system may use the historical data to identify a subset of the historical data that corresponds to particular requirements, e.g., requirements that are also present in a specific monitoring program that the computer system is making predictions for, and, from this subset, identify a portion of the historical data that corresponds to users or groups of users participating in the monitoring program. The computer system can proceed to use the identified portion of the historical data to make accurate predictions about the future composition of the monitoring program based on the monitoring program's requirements and the past reactions of the monitoring program's participants to those requirements.

As an example, a monitoring program managed by the computer system may require that users submit, through corresponding mobile devices, daily glucose measurements. The historical data may indicate that a particular group of users defined by a specific set of attributes typically exhibit poor compliance and retention when required to submit daily test results. After determining that a participant in a monitoring group for the monitoring program belongs to the particular group of users, the computer system can use the corresponding historical data in predicting compliance and retention rates for the monitoring program. The computer system can use the compliance and retention rates to predict a future composition for the monitoring group, e.g., an estimated population or percentage representation for each group of users anticipated to be present in the monitoring group at a future time. If the prediction indicates that one or more objectives of the monitoring program are unlikely to be met, the computer, the computer system may generate recommendations, e.g., to improve the anticipated compliance or retention for the particular group of users.

In some implementations, each monitoring program has a set of objectives or requirements that the computer system uses to predict whether the monitoring program will be successfully completed. That is, the objectives for a monitoring program can include success criteria, such as minimum levels of compliance, retention, or data quality required of the corresponding monitoring group, a group of users generally that are represented in the monitoring group, or a specific group of users that are represented in the monitoring group. The computer system may perform predictions to determine if the success criteria is likely to be met at some future time, such as a scheduled end of the monitoring program, by a deadline set for the monitoring program, or ever on a running basis. If the computer system predicts that a success criterion is unlikely to be met, the computer system can generate recommendations to account for that particular criterion. For example, if a prediction indicates that low compliance can be expected from the monitoring group, the computer system can generate corresponding recommendations to improve compliance of the monitoring group. Thus, the system can make predictions to determine whether the monitoring program can be successfully completed. Where the system determines that successful completion is unlikely, the system may determine a set of actions to improve the likelihood of successful completion and, thereby, significantly reduce the waste of resources, e.g., that would arise from having to repeat the monitoring program or from prolonging the monitoring program.

In some implementations, the objectives or requirements for the monitoring program include diversity criteria that the computer system uses to predict whether the monitoring program will be successfully completed. That is, the success of the monitoring program as a whole can depend on the monitoring group having at least a minimum level of diversity (e.g., variation or variety in different attributes or categories), where devices and/or users for each of different profiles or contexts each comply with the required actions of the monitoring program over time. Accordingly, the diversity criteria can, e.g., along with compliance, retention, and data quality requirements, serve as success criteria for the monitoring program.

The diversity criteria may include required or target composition characteristics for the monitoring group or a portion of the monitoring group at a future time. The target composition characteristics can include composition thresholds, such as populations minimums for particular groups of users, e.g., that correspond to a profile that defines a category of users, minimum percentage representations for particular groups of users, a minimum number of users, etc. for the monitoring group at a future time. These characteristics may also include acceptable ranges of populations or acceptable ranges of percentage representation among different groups of users in the monitoring group at a future time. Similarly, the target composition characteristics may specify ideal values, such as an ideal distribution of different groups of users, ideal populations for different groups of users, or ideal percentage representations for different groups of users among the monitoring group at a future time. The computer system may compare these ideal values to corresponding predicted values to determine if they are sufficiently similar and, therefore, meet the corresponding target composition characteristics.

When the computer system determines that a diversity criterion, such as a target composition characteristic, is not met for a period of time, the system may generate one or more recommendations to improve the predicted diversity of the monitoring group at a future time. The diversity criteria may indicate sufficient real-world applicability or viability of monitoring program results. By using the diversity criteria by using the criteria to predict whether the results of the monitoring program will have sufficient viability and to recommend actions anticipated to improve the viability of the monitoring program results, the system can improve efficiency by reducing the need to repeat the monitoring program with different monitoring groups, the length of the monitoring program, or the size of the monitoring group.

In some implementations, all or a subset of the objectives or requirements for a monitoring program are set for all monitoring programs. In contrast, the objectives or requirements, or a subset of the objections or requirements, can be specific to particular monitoring programs. The objectives or requirements may depend on the type of monitoring program, such as whether the monitoring program involves a medical study, a particular type of medical study such as a pharmaceutical study, a study that corresponds to a particular portion of the population, a study that requires users to submit particular data, etc.

In some implementations, the computer system makes multiple predictions for a monitoring program. For example, the computer system may make different predictions for different participants or groups of participants represented in the monitoring group. The computer system may use these different predictions to, for example, predict composition characteristics for the monitoring group at a completion of the monitoring program. As another example, the system may make predictions at different times throughout the monitoring program. Specifically, the system can predict the composition characteristics for the monitoring group at an onset of the monitoring program after the monitoring group has been invited or enrolled in the monitoring program. The system may continue to make additional predictions on an ongoing basis, e.g., periodically or in response to detected events. Accordingly, the system can track the anticipated monitoring group composition to determine, for example, if intervening actions are needed to successfully complete the monitoring program, the accurateness of previously made predictions, or if past intervening actions are having their anticipated effect on the monitoring group.

In some implementations, the computer system generates recommendations to improve the likelihood of objectives of the monitoring program being met. For example, if the computer system predicts that a diversity criterion is unlikely to be met at a future time, the computer system may recommend a set of actions to improve the anticipated diversity among the monitoring group at the future time. The recommendations may include actions to modify the requirements of the monitoring program for the entire monitoring group or for a portion of the monitoring group, such as for a particular group of users in the monitoring group that are predicted to be underrepresented in the monitoring group at a future time. The recommendations may also include actions to enroll or invite additional users to the monitoring group, such as those that belong to a particular group of users that are predicted to experience poor retention through the monitoring program and, therefore, are predicted to not meet a minimum population threshold. The recommendations may also or alternatively include actions to modify the way that the monitoring program is managed by the computer system, e.g., with respect to particular users or particular groups of users. For example, in order to improve the anticipated population of users in a first group of users, the computer system may adjust communications between the computer system and that corresponding portion of the monitoring group to improve compliance, retention, or data quality of that portion of the monitoring group.

In some implementations, the computer system uses models to make the predictions. The models may include static algorithms, machine learning algorithms, or a combination of static and machine learning algorithms. As an example, the computer system may provide the monitoring program requirements and information describing the monitoring group as input to a machine learning model. The information describing the monitoring group may include information identifying the participants in the monitoring group, the groups of users that are represented in the monitoring group, attributes of participants in the monitoring group, or eligibility criteria of groups of users that are represented in the monitoring group, e.g., a study cohort. The machine learning model may, for each participant in the monitoring group, output a probability of the corresponding participant completing the monitoring program. The computer system may use these probabilities to make composition characteristic predictions of the monitoring group at a future time, e.g., that corresponds to the completion of the monitoring program.

As another example, the computer system may provide a portion of the historical data and the information describing the monitoring group as input to a machine learning model. The machine learning model may output predicted completion rates for different groups of users represented in the monitoring group. The computer system can proceed to use these completion rates to make composition characteristic predictions of the monitoring group at a future time, e.g., that corresponds to the completion of the monitoring program.

In some implementations, the computer system uses multiple models that correspond to different groups of users. For example, the computer system may train multiple machine learning models for different groups of users. After training, the system can provide the monitoring program requirements as input to a variety of machine learning models that correspond to different groups of users represented in the monitoring group. The output of the machine learning models can include, for example, predicted completion rates for each group of users represented in the monitoring group. The computer system can proceed to use these completion rates to make composition characteristic predictions of the monitoring group at a future time, e.g., that corresponds to the completion of the monitoring program.

In some implementations, the computer system trains the machine learning models using the historical data collected from past monitoring programs. For example, different portions of the historical data corresponding to different groups of participants can be used by the computer system to train different machine learning models that correspond to those groups.

As discussed below, the present system provides management functions that are superior to typical application stores and other systems that provide interactions over the Internet. A typical application store providing software for mobile phones, for example, provides as many software applications as users desire, but does not track subsequent use of the applications and whether the usage and data provided meets standards and criteria for the applications, much less take actions to increase the usage rates and data quality. Nor is a typical application store configured to track and achieve different application-specific goals, such as targeted levels of diversity among devices and users using different applications, or to adjust applications to avoid or compensate for biases or flaws that disproportionately affect different devices or users. By contrast, the present system does track the extent that users and devices in the monitoring group for a monitoring program comply with the requirements of the monitoring program over time, and, similarly, does predict the extent that users and device in the monitoring group for the monitoring program are expected to comply with the requirements of the monitoring program over time. Each monitoring program can have a defined group of devices and users involved in monitoring programs are often committed to ongoing participation in the monitoring program (e.g., subscribed, enrolled, or otherwise registered). While a monitoring group can change over time, the system can evaluate each monitoring group continually to ensure that the group's current composition and projected future composition (as well as data quality, compliance with requirements, etc.) all meet the overall goals for the monitoring program.

These described techniques make the present system more effective by raising the percentage of participating devices and users that are retained in and comply with requirements of a monitoring program. This also improves the efficiency in the allocation of computational resources, because the rate of successful completion of monitoring programs increases significantly, limiting the additional time, processing, network bandwidth, and other resources that would be needed to re-start a failed program or extend a monitoring program that has not acquired sufficient data. The system can define target characteristics for the composition of a monitoring group, including the level of diversity or distribution among different groups or backgrounds. The system can repeatedly verify, for each monitoring program, through repeated predictions whether successful monitoring is occurring for sufficient numbers of devices or users for the respective groups of backgrounds, and use various actions (e.g., monitoring program changes, monitoring group changes, changed communication, etc.) as feedback to bring the level of diversity. This allows the system to manage each monitoring program at the aggregate level, to achieve desired characteristics (e.g., diversity or distribution of characteristics) in the monitoring group as a whole and consequently for the aggregate data set that will result from the monitoring program. Beyond monitoring the compliance of individual members of a monitoring group, the system detects changes or risks to completion of the objective of the monitoring program (including potential lack of diversity or representation among some subjects to be monitored) recommends and carries out actions to proactively avoid those risks.

The system provides interfaces that provide the functionality to design and update monitoring programs that involve collection of sensor data, user input, and other interactions using remote devices. The various monitoring programs that the system administers can each have their own respective characteristics and requirements. For example, different monitoring programs may have different objectives or purposes, and so may very different parameters, e.g., duration of the program (e.g., 1 month, three months, etc.), frequency of data collection (e.g., hourly, daily, weekly, etc.), latency for sending results, types of data to be collected, types of sensors to be used, types of user interactions or user inputs needed during monitoring, and so on. The system can concurrently manage the data collection and data processing for different monitoring programs, generating separate data sets for each monitoring program and performing individual communications with each remote device for the specific monitoring program(s) that the remote device is involved in.

One of the important aspects of a monitoring program is the set of devices and users that participate in the monitoring program, referred to generally as the "monitoring group" for a monitoring program. In many situations, the monitoring group for a monitoring program must have certain size and composition characteristics in order for the monitoring to be effective (e.g., to meet predetermined requirements for the type, amount, and quality of data collected). If the monitoring group is too small or has a composition that is too homogenous by the completion of the monitoring program, the monitoring results may be inaccurate or incomplete. Even worse, in many cases, if the composition of the end-of-program monitoring group deviates significantly from required characteristics, the results of the monitoring program may be unusable, meaning that the computing resources of client devices and servers (e.g., processing capability, storage capacity, power, network bandwidth, etc.)

expended in in monitoring over weeks, months, or years has been wasted. Systems and users that rely on effective monitoring may expect that monitoring is being performed appropriately (perhaps due to a large number of monitored devices and users), only to find later that monitoring was ineffective due to a skewed composition of the monitoring group, which may have failed to detect and quantify many contexts, situations, and events that should have been monitored.

The present system manages monitoring programs in a way that improves on previous systems with the ability to predict the composition of monitoring groups and actually improve the composition of and compliance of the end-of-program monitoring groups to meet the needs of their associated monitoring programs. The system does this in several ways, such as by guiding the initial selection of subjects to include in the monitoring group, adaptively adding and adjusting membership in the monitoring group, adjusting the characteristics of a monitoring program to avoid or remove bias against compliance by certain groups, and predicting the resulting compliance, retention, and data quality that will be achieved by the end of a monitoring program (e.g., at a scheduled end date or at a certain amount of time in the future. It is not sufficient to simply enroll a group that has the proper size and composition (including diversity), the needed number of participants and diversity of participants need to comply with monitoring program requirements, provide sufficiently complete and accurate data, and be retained until the end of the monitoring program. To assist with this, the system can predict, for individuals or groups of users, the level or extent of compliance with requirements, data quality for collected data, retention to the end of a predetermined time period, and other properties, and use those predictions for updating user interfaces as well as to adjust monitoring programs and monitoring groups that the system manages.

Each monitoring program may have a set of selection criteria that are used to determine the eligibility of devices and/or users to participate in a monitoring program. The selection criteria can include inclusion criteria that specify characteristics that are needed in order to participate, as well as exclusion criteria that specify characteristics that disqualify a user or device from participating. The selection criteria can be applied by the system to identify candidates or confirm that participants should be added to the monitoring group for a monitoring program (e.g., enrolled in the monitoring program and remote monitoring initiated). However, even if the devices and users selected for a monitoring group each individually meet the selection criteria, that does not ensure that the monitoring group as a whole will have the characteristics needed for the monitoring program to be successful by completion (e.g., to provide a predetermined minimum level of statistical validity or confidence). Accordingly, the systems and techniques describes herein allow more sophisticated evaluation and adaptation of monitoring programs (e.g., required actions, data collection, monitoring groups, etc.) so that the system guides the monitoring program to achieve not only data collection by a minimum number of participants, but also to have valid data collection over the course of the monitoring program from at least the minimum numbers for participants corresponding to each of various different profiles or backgrounds.

The system is configured to distribute software for monitoring programs to devices that are used to perform the monitoring. The monitoring program may specify parameters for monitoring, such as times when data is to be obtained from, requested from, or sent to the devices. The monitoring program may also indicate the type of data or the specific data that is to be obtained from, requested from, or sent to the devices. The data obtained or requested from the devices may include sensor data collected using sensors of the devices or from other devices (e.g., connected through wired or wireless links). The data that the system sends to the remote devices may include instructions to collect sensor data, or updates to the monitoring program or a portion of the monitoring program on the devices. In updating software used to implement a monitoring program on the remote devices, the configuration of the remote devices can be adjusted, for example, to change what data is collected, change how the data is collected, change communication network settings, etc.

In some implementations, the computer system adjusts individual monitoring programs and distributes changes to devices for each program's monitoring group. Even within the monitoring group of a single monitoring program, the system may select different settings, interactions, or content to provide to different devices. In some cases, the interactions vary depending which of various profiles the devices correspond to. The computer system may assign each of the device to at least one profile based on attributes of the devices or their users. For example, a first profile may be used for devices that include a GPS unit and a heartrate monitor, and that have a user that lives in an urban environment and is between 25 and 30 years of age. If a first device meets the device requirements of the profile and has a user that meets the user requirements of the profile, the system may classify the first device as corresponding to the first profile and the system interacts with that device using the information in that profile.

In some implementations, the system generates the profiles based on previously observed outcomes for devices and users in other monitoring programs. For example, the system may generate profiles based on observed outcomes of currently ongoing and/or previously completed monitoring programs. The observed outcomes may include the compliance of the devices or their users with the requirements of the monitoring program, and the retention of the devices or their users in the monitoring program. As another example, the system may generate profiles based on attributes of devices and/or users in a set, such as a set of devices and/or users that have participated in one or more monitoring programs. The attributes may include, for example, sensors that the devices include, sensor devices that are compatible with the devices, models of the devices, operating systems of the devices, etc. The attributes may also include demographic or non-demographic information that describes the users. The users may include, for example, users that have previously participated in a monitoring program, that are currently participating in a monitoring program, have indicated that they want to participate in a monitoring program, or that are eligible for a monitoring program.

In some implementations, the system generates the profiles using a machine learning model or a group of machine learning models. As an example, the computer system may using a clustering machine learning model to cluster different devices or users based on observed outcomes. Similarly, as another example, the system may use a clustering model to cluster different groups of devices or users based on attributes of the devices or users. The model may use any or all attributes available to the model in performing the clustering. Alternatively, the model may use a subset of attributes corresponding to key attributes to perform the clustering. These key attributes may be determined using another machine learning model or a group of other machine learning models, using a static algorithm or group of static algorithms, or based on input from an administrator or researcher.

In some implementations, the system uses the profiles to create or adjust the monitoring group for a monitoring program. As an example, in response to determining that a monitoring group is anticipated to have less than a minimum threshold number of devices corresponding to a first profile at the completion of the monitoring program, the system may enroll a device or user that meets the criteria for the first profile in the monitoring group. The profiles can provide a way for the system to diversify a monitoring group or achieve a better distribution of monitored devices and users across different profiles or sets of characteristics. Adjusting the monitoring group may be based on the predicted level of diversity in an end-of-program monitoring group. The profiles, or a subset of the profiles, may correspond to different groups or categories that are assessed during diversity analysis. The system may determine that criteria specifying minimum or target levels of diversity for the monitoring program are not met when, for example, the predicted composition characteristics of the monitoring group indicate that the end-of-program monitoring group will not include any members from a certain group or profile, or if there is an insufficient amount (e.g., number, proportion, etc.) of members that correspond to the group or profile. For example, the system may determine that one or more profiles or categories of devices or users are anticipated to be not be represented or be underrepresented in the end-of-program monitoring group at the program's completion. In response to this determination, the system can adjust the monitoring group to include additional device(s) that correspond to the one or more profiles or categories.

The system may analyze diversity at one or more points during the lifecycle of a monitoring program (e.g., defining the program, selecting the initial monitoring group, while data collection is ongoing, etc.). In performing a diversity analysis, the system can make various predictions to determine characteristics of the monitoring group's composition at the completion of the monitoring program. The system may perform this analysis at the onset of the monitoring program after the monitoring group participants have been invited to or enrolled in the program. The system may perform the diversity analysis repeatedly, periodically or in response to detecting certain events such as sufficiently low compliance for a particular participant or group of participants.

As an example, in an ongoing research study, the system may perform a diversity analysis in response to detecting that a device belonging to a first category of devices fails to provide data of sufficient data quality needed for the study. The system may proceed to determine whether the diversity targets for the research study are still predicted to be met based on the data that has been successfully collected from other devices, based on historical data available for those devices, or based on the original or modified requirements for the research study. For example, the diversity criteria may specify that at least a minimum number or percentage of the participants should be from a first category, and the system can predict composition characteristics for the end-of-study monitoring group and use the predicted composition characteristics to verify that the minimum is still on track to be satisfied by study completion. If the system predicts that the diversity criteria will not be met by study completion, the system can determine a set of actions to correct or improve the diversity of the monitoring group or may automatically perform another action. For example, based on predicting that a diversity criterion for the study will not be met, the system may select an additional device of a user corresponding to the first category to add to the monitoring group and transmit the software, configuration data, content, or other elements needed for the additional device to begin the needed monitoring.

In some implementations, the system is configured to perform a diversity assessment for a monitoring program and perform actions such as providing alerts, providing recommendations, and changing the monitoring program in response. In performing the diversity assessment, the computer system may identify the breakdown of an end-of-program monitoring group among different categories or profiles, e.g., determining the numbers or proportions of each of different categories or profiles in the end-of-program monitoring group. This information is referred to below as the "group composition" for the end-of-program monitoring group, which can include data indicating which groups (e.g., categories, profiles, etc.) make up the end-of-program monitoring group and in which amounts or proportions they occur (e.g., 10% in group 1, 30% in group 2, 0% in group 3, etc.). The groups or categories can be defined using many different attributes, including demographic and non-demographic characteristics. For example, different categories or profiles can be defined based on combinations of attribute values in different ranges, for example, for device types, device capabilities, user demographic characteristics (e.g., age, sex, race, occupation, educational level, etc.), geographic location, health status (e.g., diseases, physiological measurements, etc.).

After identifying the group composition or other composition characteristics for a monitoring group at program completion, the computer system may compare the group composition to a target composition characteristic such as a target distribution to determine if the group composition deviates from the target distribution and to what extent. When a deviation of at least a predetermined amount is detected, the computer system may generate a warning for a researcher or administrator associated with the monitoring program, determine an action to correct the predicted group composition, and/or generate a recommendation to perform the action or automatically perform the action. The system may proceed to generate a diversity report that it transmits to a client device over a communication network.

In some implementations, the diversity report may include the predicted composition characteristics such as the identified group composition (e.g., identifying groups represented, as well as warnings, recommended actions, and/or an indication of actions automatically performed by the system to better align to the diversity target). A researcher may use the information in the diversity report to make changes to the monitoring program, such as by changing the monitoring program elements (e.g., by adding or removing inclusion or exclusion criteria for the monitoring program, modifying requirements for the monitoring program, adjusting communications between the system and the participants, etc.), inviting additional subjects to enroll in the study, enrolling additional participants, changing a software communication of devices belonging to the study participants, etc. Similarly, the system may make these changes automatically or in response to receiving a confirmation from the researcher. The changes made to the study may be targeted to or customized for to certain groups of a population, such as certain user groups represented in the monitoring group, invited to enroll in the monitoring group, or enrolled in the monitoring group.

In one general aspect, a method includes: accessing, by the one or more computers, data describing a monitoring program that involves collecting data over a period of time from geographically distributed devices over a communication network, the accessed data indicating monitoring program requirements for members in a monitoring group of devices or users for the monitoring program; determining, by the one or more computers, composition characteristics of the monitoring group for the monitoring program; based on the monitoring program requirements and the characteristics of the composition of the monitoring group, generating, by the one or more computers, predicted composition characteristics for a portion of the monitoring group predicted to comply with the monitoring program requirements for the period of time, the predicted composition characteristics being generated based on compliance outcomes for one or more prior monitoring programs; determining, by the one or more computers, whether the predicted composition characteristics indicate at least a minimum level of diversity among the portion of the monitoring group predicted to comply with the monitoring program requirements; and communicating, by the one or more computers, with one or more devices associated with the monitoring program based on results of the determination whether the predicted composition characteristics indicate at least the minimum level of diversity.

Implementations include one or more of the following features. For example, in some implementations, communicating with the one or more devices associated with the monitoring program includes providing, to the one or more devices, at least one of (i) the predicted composition characteristics and (ii) an indication of the results of the determination whether the predicted composition characteristics indicate at least the minimum level of diversity.

In some implementations, determining whether the predicted composition characteristics indicate at least the minimum level of diversity includes determining that the predicted composition characteristics indicate that there is at least the minimum level of diversity among the portion of the monitoring group predicted to comply with the monitoring program requirements; and communicating with the one or more devices associated with the monitoring program includes providing a notification that includes an indication that there is at least the minimum level of diversity among the portion of the monitoring group predicted to comply with the monitoring program requirements.

In some implementations, providing the notification includes providing a notification that includes an indication of a difference between (i) a predicted level of diversity among the portion of the monitoring group predicted to comply with the monitoring program requirements and (ii) the minimum level of diversity.

In some implementations, the method includes determining one or more actions anticipated to change the predicted composition characteristics to improve the predicted level of diversity so that the difference between the predicted level of diversity and the minimum level of diversity is increased, where the one or more actions are based on the difference between the predicted level of diversity and minimum level of diversity.

In some implementations, determining whether the predicted composition characteristics indicate at least the minimum level of diversity includes determining that the predicted composition characteristics indicate that there is less than the minimum level of diversity among the portion of the monitoring group predicted to comply with the monitoring program requirements; and communicating with the one or more devices associated with the monitoring program includes providing a notification that includes an indication that there is less than the minimum level of diversity among the portion of the monitoring group predicted to comply with the monitoring program requirements.

In some implementations, the method includes: in response to determining that the predicted composition characteristics indicate that there is less than the minimum level of diversity, determining one or more actions anticipated to change the predicted composition characteristics to improve a predicted level of diversity among the portion of the monitoring group predicted to comply with the monitoring program requirements; and performing at least one of the one or more actions.

In some implementations, determining the one or more actions anticipated to change the predicted composition characteristics includes determining one or more actions to adjust settings for administering the monitoring program.

In some implementations, determining the one or more actions to adjust the settings for administering the monitoring program includes at least one of the following: determining one or more actions to adjust a type of data requested from the one or more devices or a subset of the one or more devices; determining one or more actions to adjust a type of data provided to the one or more devices or a subset of the one or more devices; determining one or more actions to adjust a frequency of communication with the one or more devices or a subset of the one or more devices; determining one or more actions to adjust communication attributes when communicating with the one or more devices or a subset of the one or more devices; determining one or more actions to adjust a user interface of the one or more devices or a subset of the one or more devices; or determining one or more actions to change software for the monitoring program or a software version for the monitoring program used on (i) the one or more devices or (ii) a subset of the one or more devices.

In some implementations, determining the one or more actions anticipated to change the predicted composition characteristics includes: determining one or more members to add to the monitoring group; and inviting the one or more members to the monitoring group, adding one or more members to the monitoring group, or generating a recommendation to add the one or more members to the monitoring group.

In some implementations, determining the one or more actions anticipated to change the predicted composition characteristics includes: determining one or more changes to the monitoring program requirements that should be made for at least a portion of the monitoring group; and making the one or more changes to the monitoring program for at least the portion of the monitoring group, or generating a recommendation to make the one or more changes to the monitoring program requirements for at least the portion of the monitoring group.

In some implementations, determining the one or more actions anticipated to change the predicted composition characteristics includes: identifying one or more of the monitoring program requirements to remove for at least a portion of the monitoring group; and removing the one or more monitoring program requirements for at least the portion of the monitoring group, or generating a recommendation to remove the one or more monitoring program requirements for at least the portion of the monitoring group.

In some implementations, determining whether the predicted composition characteristics indicate at least a minimum level of diversity includes determining that predicated composition characteristics for the portion of the monitoring group predicted to comply with the monitoring program requirements meet one or more diversity criteria.

In some implementations, determining that predicated composition characteristics meet the one or more diversity criteria includes: identifying, from the predicated composition characteristics, multiple subgroups of members in the portion of the monitoring group, each subgroup of members corresponding to a different category of members represented by a unique profile; and determining that a number of members in each of the subgroups meets a corresponding minimum number of members for the respective subgroup.

In some implementations, identifying, from the predicated composition characteristics, the multiple subgroups includes: identifying attributes of members in the portion of the monitoring group; and determining multiple profiles that correspond to the multiple subgroups of members by comparing attributes associated with the multiple profiles to the attributes of the members.

In some implementations, determining that predicated composition characteristics meet the one or more diversity criteria includes: identifying, from the predicated composition characteristics, multiple subgroups of members in the portion of the monitoring group, each subgroup of members corresponding to a different category of members represented by a unique profile; and determining that a proportion of members for each of the subgroups substantially matches a corresponding value or is within a corresponding range of values.

In some implementations, determining that predicated composition characteristics meet the one or more diversity criteria includes: identifying, from the predicated composition characteristics, multiple subgroups of members in the portion of the monitoring group, each subgroup of members corresponding to a different category of members represented by a unique profile; based on the monitoring program requirements, identifying one or more categories of members that must be represented in the portion of the monitoring group; and determining that the multiple subgroups include one or more subgroups that correspond to the one or more categories members that must be represented.

In some implementations, generating the predicted composition characteristics for the portion of the monitoring group includes: identifying similarities between the monitoring program requirements and requirements of the one or more prior monitoring programs; obtaining compliance outcomes for the one or more prior monitoring programs; and applying the compliance outcomes to the characteristics of the composition of the monitoring group to generate the predicted composition characteristics.

In some implementations, generating the predicted composition characteristics for the portion of the monitoring group includes: providing the characteristics of the composition of the monitoring group and the monitoring program requirements as input to a machine learning model that has been trained on the compliance outcomes for one or more prior monitoring programs; and receiving an output of the machine learning model, where the output is the predicted composition characteristics or is used to determine the predicted composition characteristics.

In some implementations, receiving an output of the machine learning model includes: receiving a value that indicates whether a minimum level of diversity is among the portion of the monitoring group; or receiving a value that corresponds to a likelihood of the monitoring program requirements being met within the period of time.

The described techniques can be used to realize various advantages. The system provides active evaluation of the progress of monitoring programs over time, ensuring that the data collection and compliance with program requirements are sufficient to meet the objectives of the monitoring program. This enables the system to verify that not only the nominal size and composition of the monitoring group is sufficient, but that the realized compliance, retention, data collection quality, and diversity will result in a successful monitoring program. For example, a monitoring program begins with 100 enrolled participants, 50 in group 1 and 50 in group 2, where the program needs a minimum of 40 active participants in each of the two groups at the end of the three-month monitoring period. The system stores data specifying these requirements and then on a regular basis, for example, daily, performs predictions used to determine composition characteristics of the monitoring group that indicate whether the data collection and participant actions yield the characteristics that would meet the requirements for the study as a whole. Even if all 100 participants nominally remain in the study, the system may determine that in the first month 7 of the participants in group 1 provided incomplete or inaccurate data and are anticipated to continue to provide incomplete or inaccurate data, e.g., based on historical data for group 1 participants. Detecting this trend or pattern of decreasing compliance in group 1, the system can predict that this presents above a threshold likelihood that the minimums for group 1 will not be met at the end of the three-month program period. The system can take various actions to address the issue, including: alerting a researcher associated with the program, changing the interaction some or all members of group 1, adding or recommending to add additional members of group 1, changing the data collection actions for members of group 1 to increase compliance, changing elements of the program (e.g., substituting a requirement for an in-person visit with one for a phone call), and so on. These changes may ensure or, at least, improve the likelihood that the one or more set goals for the monitoring program are achieved.

For example, the system can manage monitoring programs by using subject responses to determine that a subset of subjects are failing to comply with at least one requirement of the monitoring program. In response, the system may add a subset of new subjects to the monitoring program, or replace the low compliance subjects with a new subset of subjects. Similarly, the system may, at an outset of a new monitoring program, modify the requirements of the monitoring program for a particular group of subjects if it determines that one or more requirements are likely to result in one or more group of subjects failing to achieve particular outcomes and, therefore, the monitoring program failing to meet the one or more set goals. As an example, the management and distribution system may use a profile for a group of subjects to determine that a group of subjects is unlikely to have access to a sensor that can obtain data with sufficient accuracy or consistency for the requirements of the monitoring program and, based on this, that the monitoring program is anticipated to fail to obtain needed results at a future time, such as by a scheduled end of the monitoring program. The system can modify the monitoring program for the group of subjects to include additional data requests so that additional data can be obtained from the group of subjects during the monitoring program to counter the data inaccuracies or inconsistencies. These actions can be taken automatically by the system, or can be recommended to administrators and confirmed before the system performs them.

This active management and verification is a significant improvement over other systems. For example, even if other systems begin with an appropriate set of subjects, they generally do not have the capability to check on an ongoing basis whether a monitoring program is still viable, or the capability to predict whether the monitoring program will be successful or its results viable by a completion time.

The system also improves the ability of monitoring programs to reach their objectives by the system selecting individuals for monitoring groups that, together, form a monitoring group predicted to meet the defined goals for the monitoring program. In more detail, the system may select a diverse group of subjects to enroll in or invite to the monitoring program such that the composition of the group meets predetermined diversity requirements (e.g., which may be inferred by the system from analysis of other monitoring programs or may be specified by a user). By including a diverse group of subjects at the outset of the monitoring program, the management and distribution system can start the monitoring program in track to obtain a viable monitoring data set from the monitoring program. This is a much needed feature today, as many medical studies today fail to produce viable results or produce results having severely limited applicability due to a failure to include or maintain a diverse set of participants. This also improves efficiency by reducing the needed size of the monitoring group needed at the onset of a study when compared to many medical studies today. That is, many medical studies may simply invite or enroll a large number of user to a study in the hopes of obtaining viable results. However, by predicting composition characteristics of a monitoring group, the described system can reduce the size of the monitoring group required to meet the diversity criteria for the program, and, thereby, reduce the amount of resources used for and allocated to managing the monitoring program and monitoring the group. As discussed below, diversity is not limited to demographic attributes such as age, sex, race, socioeconomic status, and so on, but can also encompass diversity among physical characteristics, medical histories, genetic profiles, geographic locations, and many other attributes that are not demographic in nature.

The disclosed systems may also take into account other attributes of the subjects when selecting a group of subjects to enroll or invite to a monitoring program. For example, the systems may take into account historical data, trends in the historical data, and, optionally, trends among certain populations to select subjects that are likely to meet the requirements of the study. The historical data or trends may indicate past or anticipated retention rates for subjects or groups of subjects, past or anticipated compliance rates for subjects or groups of subjects, or past or anticipated data quality obtained from subjects or groups of subjects. For example, the historical data may indicate that a particular subset of subjects is likely to have low compliance with a particular requirement of a monitoring program. In response to this determination, the management and distribution systems may avoid enrolling or inviting those subjects to the monitoring program. More significantly, to ensure that members of these groups are still represented and participate successfully, the system can increase the number of participants from that group to account for higher expected attrition. More efficiently, the system can identify the elements that are correlated to low compliance for that group, and change those elements or include additional supports to boost compliance, specifically providing supports that the historical data has shown to have been effective in prior monitoring programs with that specific group. For example, those subjects may be needed to achieve certain minimum diversity criteria or other goals for the monitoring program. The system may modify the elements of the monitoring program for that particular subset of subjects to improve compliance. Modifying the elements may include modifying or removing requirements of the monitoring program, or adding remedial elements. For example, if the particular subset of subjects is determined by the management and distribution system to generally not have access to a vehicle and, as a result, have low compliance with required medical office visits, the system may add taxi credit to a new version of the monitoring program for those subjects as a remedial measure to improve compliance rates for those subjects with respect to office visits.

In selecting participants at an outset of a monitoring program or determining how to modify the elements of a monitoring program to improve, the disclosed systems may use various profiles that represent categories of participants. These profiles may be used to determine how particular participants are likely to respond to certain monitoring program requirements, and, therefore, to determine if they should be enrolled to the monitoring program or if the monitoring program needs to be adjusted for one or more particular groups of participants. These profiles may additionally or alternatively be used to improve the diversity of a monitored group or to determine if a monitored group has a sufficient diversity. For example, the management and distribution system may identify the profiles corresponding to a monitoring group and use the profiles to predict whether there will be sufficient diversity at completion of the monitoring program. If the predicted diversity is insufficient, the management and distribution system may use the profiles to identify unrepresented or underrepresented profiles, and proceed to enroll or invite participants from categories represented by those unrepresented or underrepresented profiles.

By selecting at the outset of a monitoring program a group of participants that will likely provide the overall set of data and the diverse context to be able to capture the variety of data needed for the monitoring program, the management and distribution systems are able to significantly reduce computational inefficiencies. Notably, this selection improves the likelihood of obtaining viable results and otherwise successfully completing the monitoring program, which reduces, on average, the time to complete the monitoring programs and/or eliminates, or at least significantly reduces, the need to repeat monitoring programs and the waste resulting from having to cancel or discard results from a monitoring study that fails to achieve participation from the needed categories of participants.

Other embodiments of these and other aspects disclosed herein include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 5A-5C are diagrams that illustrate example diversity assessment and action selection interfaces.

FIG. 10 is a diagram that illustrates an example table that indicates impact scores corresponding to different clusters.

FIGS. 16A-16D are diagrams that illustrate example interfaces for diversity prediction.

Like reference numbers and designations in the various drawings indicate like elements.

DETAILED DESCRIPTION

Figure 1:
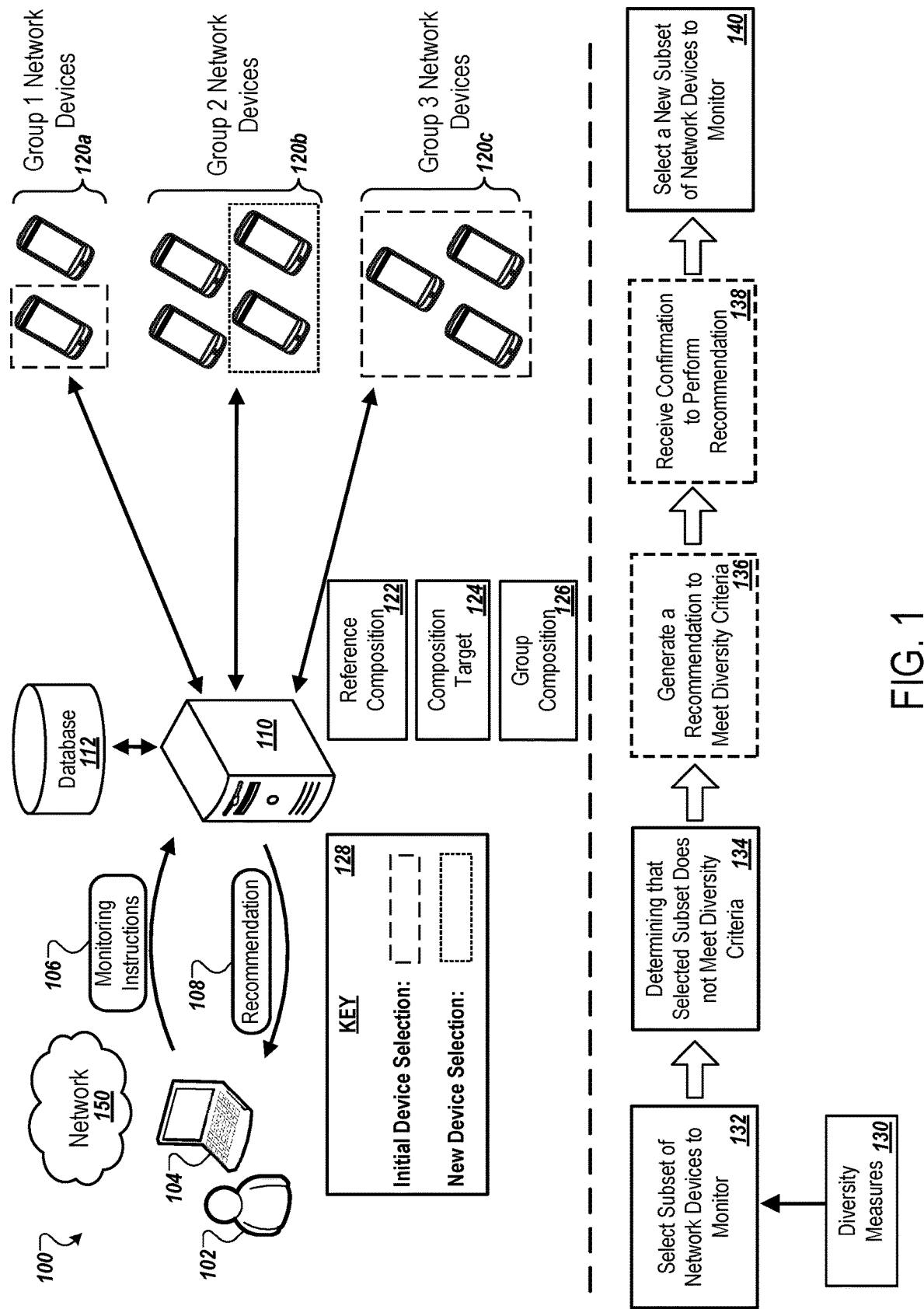
FIG. 1 is a diagram that illustrates an example system for assessing and selecting technologies to meet diversity requirements.

A computer system provides a platform for administering monitoring programs that involve customized data collection from groups of remote devices. The system enables different parties, e.g., organizations, administrators, third-parties, etc., to create or register monitoring programs to be distributed and managed by the system. For example, a server system can provide a multi-tenant system that provides functionality to create monitoring programs each tenant organization, select groups of devices and users to participate in the monitoring programs, and distribute the monitoring programs (e.g., including items such as software modules, configuration data, data collection instructions, interactive content, etc. so that groups of remote devices carry out the monitoring). The system can thus administer many different monitoring programs on behalf of different tenant organizations, with the system including servers that collect and process data from the remote devices as the monitoring programs are carried out over time. The systems and methods disclosed herein can include features as described in (1) U.S. patent application Ser. No. 17/166,899, filed Feb. 3, 2021, issued as U.S. Pat. No. 11,196,656 on Dec. 7, 2021, (2) U.S. patent application Ser. No. 17/166,777, filed on Feb. 3, 2021, and (3) U.S. patent application Ser. No. 17/177,153, filed on Feb. 16, 2021, all of which are incorporated herein by reference.

The system can also make predictions as to whether objectives of the monitoring program are anticipated to be met. These objectives, e.g., monitoring program requirements, include diversity criteria that the computer system uses to predict whether the monitoring program will be successful. For example, the diversity criteria can correspond to a sufficiently high confidence that the results of a study will be viable and/or applicable. Accordingly, the success of the monitoring program as a whole can depend on having a monitoring group with at least a minimum level of diversity (e.g., amount of variation or variety in different attributes or categories) by the completion of the monitoring program, where devices and/or users for each of different profiles or contexts each comply with the required actions of the monitoring program over time.

As will be described in more detail below, in determining whether the diversity criteria is met, the computer system can make predictions that indicate future composition characteristics of the monitoring group or that the computer system uses to determine future composition characteristics of the monitoring group. These predictions can include predictions of compliance, retention, and/or data quality for a particular participant or group of participants represented in the monitoring group. The predictions can be based on the historical data collected during past monitoring programs for particular users or groups of users. These predictions can additionally or alternatively be based on the requirements of the monitoring program, such as other success criteria, protocols for the monitoring program, objectives for the monitoring program, parameters for the monitoring program, etc.

For example, a monitoring program may require a minimum level of diversity among its monitoring group to be considered successfully completed. The computer system may use attributes of the monitoring group(s) or their corresponding members, and the requirements of the monitoring program to predict whether the minimum level of diversity is likely to be met, e.g., by a scheduled end of the monitoring program, by a deadline set for the monitoring program, or at some future point in time. When a prediction indicates that a future composition of the monitoring group is anticipated to fail one or more diversity criteria of the monitoring program, e.g., prediction or corresponding value fails to meet a threshold confidence score, the computer system can recommend adaptations to the monitoring program and the corresponding monitoring group.

The diversity criteria can be set so that, when satisfied, the data collection outcomes for the study have sufficient real-world applicability or viability of monitoring program results. For example, if a group of participants who successfully complete a medical study fail to meet certain diversity criteria, the results of the study may have limited real-world applicability and the study would have to be repeated or extended. Thus, the system can significantly improve efficiency by using the diversity criteria to predict whether the results of the monitoring program will be viable or if there is a sufficiently high risk of the monitoring program producing unviable results. The system can recommend actions anticipated to improve the viability of the monitoring program results when the results are predicted to be unviable or there is a sufficiently high risk of the results being unviable as indicated by the failure to meet one or more diversity criteria. The computer system can also use the results of the diversity analysis to reduce the monitoring program invitation or enrollment size for the monitoring group, and, thereby, improve efficiency by reducing the amount of resources used for and allocated to manage the monitoring group. That is, the computer system can avoid over-enrollment or significant over-enrollment if the predictions indicate that the monitoring group will have a minimum level of diversity by the end of the monitoring program. Similarly, the computer system can identify the most efficient way to improve diversity, e.g., modification to the requirements of a monitoring program or inviting only those participants to enroll in a monitoring program that have demonstrated the highest compliance and/or retention rates.

Accordingly, the computer system significantly improves effectiveness and efficiency by reducing or eliminating the need to repeat monitoring programs, reducing the length of monitoring programs or eliminating the need to extend monitoring programs, or reducing the size of monitoring groups.

In general, diversity criteria can refer to values, ranges of values, data structures, or rules that define a standard or reference for determining whether there is sufficient variety among a monitoring group of participants (e.g., users and/or devices). That is, the diversity criteria for a monitoring program can define a minimum level of diversity required of that program. The values or ranges of values may define thresholds that correspond to sufficient or insufficient variety among the monitoring group, such as minimum thresholds and/or maximum thresholds that correspond to percentage representations for multiple diversity groups in the monitoring group. Similarly, the values or ranges of values may define target values or ranges of values that correspond to sufficient variety among the monitoring group, such as target populations of diversity groups in the monitoring group. The data structures can include target distributions for the monitoring group, such as target population distribution and/or target percentage representation distribution for multiple diversity groups in the monitoring group. The diversity criteria may also indicate the extent that predicted values for the monitoring group can vary from target values, such as a maximum number or percentage change that a predicted number of participants in a group can deviate from a corresponding target value. The diversity criteria can also include a minimum diversity score, e.g., a single value that indicates a minimum level of diversity for a monitoring program. As will be described in more detail below, the computer system can predicted a diversity score using predicted composition characteristics for the monitoring group and proceed to compare to the predicted diversity score to the minimum diversity score.

Diversity of the monitoring group can be based on the variety of attributes among the participants in the monitoring group, and/or the variety of groups of participants (e.g., predicted diversity groups that represent different categories of users) in the monitoring group. The diversity criteria is not limited to demographic attributes such as age, sex, race, socioeconomic status, and so on, but can also encompass diversity among physical characteristics, medical histories, genetic profiles, geographic locations, and many other attributes that are not demographic in nature.

In some cases, diversity of the monitoring group is also or is alternatively based on the variety of behaviors of participants or groups of participants in the monitoring group. For example, diversity of the monitoring group can be based in part on observed or anticipated (e.g., predicted based on historical data collected from past monitoring programs) behaviors of participants, such as participants' observed or expected reaction to different program elements, reaction to communications having particular attributes, health-related behaviors, atypical behaviors or those that have been found to have had a significant impact on meeting monitoring program protocols, etc. In more detail, the system may use collected data to determine that a particular participant typically demonstrates poor sleep hygiene. This behaviors may be stored by the system and associated with the participant. For example, this behavior may be stored as an attribute for the participant.

As will be described in more detail below, the computer system can assess the diversity of a monitoring group using the diversity criteria. To perform this assessment, the computer system may predict one or more characteristics of the monitoring group at a future time, such as at a set or anticipated completion of the monitoring program, and compare those characteristics to the diversity criteria to determine if the diversity criteria are met.

In general, composition characteristics refer to a set of features that describe a composition of the monitoring group. Composition characteristics can refer to either observed characteristics of the current composition of the monitoring group for a monitoring program, or to predicted characteristics of the composition of the monitoring group at a future time such as by a set or anticipated completion time for the monitoring program. As an example, the composition characteristics can include a size of the monitoring group, the size (e.g., population) of diversity groups in the monitoring group, and/or the percentage representation of diversity groups in the monitoring group. The composition characteristics can also include an overall compliance rate for the monitoring group, an overall retention rate for the monitoring group, and/or an overall data quality for the monitoring group. Similarly, the composition characteristics can include compliance rates for each participant or group of participants (e.g., diversity group represented by a profile) in the monitoring group, retention rates for each participant or group of participants in the monitoring group, and/or data quality for each participant or group of participants in the monitoring group. The computer system can use the composition characteristics to determine if a monitoring program is on track to be successfully completed. For example, the computer system can predict composition characteristics for a particular monitoring program, and proceed to compare the predicted characteristics to the diversity criteria. Based on this comparison, the computer system can determine (i) that the diversity criteria is met and the results of the monitoring program are sufficiently likely to produce viable results, or (ii) that one or more diversity criteria are not met and the results of the monitoring program are not sufficiently likely to produce viable results.

When the computer system determines that one or more diversity criteria or other success criteria are not met or that there is a sufficiently high likelihood of one or more criteria not being met, the computer system can determine a set of remedial actions to address the anticipated failure or sufficiently high risk of failure. These actions can include changes to the elements of the monitoring program, the invitation of additional subjects to the monitoring program, the enrollment of additional participants in the monitoring program, and/or changes to the software configuration of remote devices used by the monitoring program's participants.

In general, monitoring program elements can refer to various features of the program, such as features that specify the operation of the computer system in initializing the program, managing the program, and interacting with remote devices during the program. In more detail, the monitoring program elements can include criteria used to identify eligible subjects. For example, the monitoring program elements can include inclusion criteria used to determine what subjects are eligible for enrollment, and exclusion criteria used to determine what subjects (e.g., otherwise eligible subjects) must be excluded from the monitoring program. The monitoring program elements can also include requirements/protocols for the monitoring program that define what actions and/or data is required of the program's participants. For example, the elements of a monitoring program can provide that all participants that belong to a first category of participants must visit with a medical professional once a week, and all participants that belong to a second category of participants must visit with a medical professional once every two weeks. The monitoring program elements can also include settings that define how the computer system manages the monitoring program and/or interacts with the participants in the monitoring group. For example, the elements can include different sets of communication parameters that the computer system uses to generate communications for different groups of participants in the monitoring program. The settings can also include event schedules and/or queues for the monitoring group, for different groups of participants in the monitoring group, and/or different participants in the group. The elements can also include the software configuration(s) for the monitoring program for the monitoring group as a whole, for particular participants, and/or for particular groups of participants. A software configuration for a monitoring program may specify, for example, how a monitoring program interface appears on remote devices, how notifications from the computer system appear on the remote devices, types of data to be collected by the remote devices, and/or a frequency or schedule for transmitting data from the remote devices to the computer system. Finally, the elements can also include the particular success criteria for the corresponding monitoring program, such as the diversity criteria for determining whether the monitoring group of the program will have a minimum level of diversity.

FIG. 1 is a diagram that illustrates an example system 100 for assessing and selecting technologies to meet diversity requirements. Among other uses, the system 100 can be used to identify and/or select devices and/or software to monitor to ensure that certain diversity criteria is being met. Similarly, the system 100 can be used to analyze device and/or software selections made by a user, and perform an action such as generating a recommendation to adjust the analyzed devices if the selected devices and/or software does not meet the diversity criteria or would not be expected to meet the diversity criteria by the end of a monitoring period. For example, if the selections made by the user would result in an insufficient number of devices associated with a particular group from being monitored, the system 100 may generate a warning to send to an administer with a recommendation to add a device from the underrepresented group, remove a device from one of the overrepresented groups, to add a device from the underrepresented group and remove a device form one of the overrepresented groups, or to perform one or more other actions such as to adjust the criteria for making a device and/or software selection.

Monitoring a set of devices or particular software running on a set of devices may include the system 100 collecting data from a distributed group of devices over a network. Data may be collected over a predetermined amount of time, until a goal is achieved, and/or until an event is detected. The frequency of data collection may be predetermined such that data is collected (e.g., requested and/or received) at predetermined intervals. Alternatively, data may be collected as it is produced, in response to certain goals or milestones being met, in response to certain events occurring or being detected, etc.

The system 100 can be used to, for example, identify (e.g., calculate) a target diversity level for a group of devices to be monitored (or a group of devices that are used to run software to be monitored), assess the current diversity of the group of devices (e.g., that have been selected for monitoring), and generate recommendations to reach or approach the target diversity level. The system 100 includes a client device 104 and a computer system 110 that includes functionality to make diversity assessments of devices and/or software selected for monitoring. The computer system 110 may further include functionality to select corresponding actions to perform or recommend in order to achieve the target diversity level.

It may be important to achieve and/or maintain a target diversity level for monitored devices to ensure the viability of data or results obtained during the monitoring period. For example, the computer system 110 may monitor how particular software performs on a variety of devices associated with different groups to determine how the software will perform when publicly released. If however, the monitored devices are not representative of the devices used by the general population, then data or results obtained from the monitoring of the devices may lack utility or otherwise have only limited applicability. For example, the data or results may fail to identify incompatibility between the monitored software and devices associated with a particular group when those devices are not included in the monitoring or are unrepresented (e.g., when compared to the use of those devices in the general population) to the point that statistically significant results regarding those groups of devices cannot be obtained or are sufficiently unlikely to be obtained.

Accordingly, in identifying a target diversity level and working to achieve or maintain the target diversity level, the computer system 110 can obtain improved data or results from the monitoring of multiple devices or software running on those devices. The improved data or results may be more comprehensive in that they correspond to a more diverse device pool.

In addition, in identifying a target diversity level and working to achieve or maintain the target diversity level, the computer system 110 can more efficiently conduct monitoring of multiple devices or software running on those devices. For example, the computer system 110 may determine that based on a reference population of devices (e.g., devices used in target region), the target diversity level should provide that no devices (or a very limited number of devices) that are Group 4 devices should be monitored. This may be based on, for example, the reference population of devices not including any (or a very limited number of) Group 4 devices. As such, the computer system 110 can improve efficiency by limiting the enrollment and monitoring of devices to those devices that are not Group 4 devices. That is, the computer system 110 can limit the enrollment and monitoring of devices to only those devices that will produce useful results (e.g., as may be indicated by the target diversity level). This has the added benefit of reducing computational burden on the computer system 110, reducing the amount of computing resources (e.g., CPU hours, RAM, etc.) that would have been otherwise spent monitoring the unnecessary devices (e.g., Group 4 devices), freeing up computing resources to perform other tasks, etc.

As illustrated in FIG. 1, the computer system 110 has access to a database 112 and also communicates with the client device 104 over a network 150. The computer system 110 can receive data from the client device 104 and can send data to the client device 104 as will be described in more detail below. For example, the computer system 110 can receive monitoring instructions 106 from the client device 104 indicating monitoring criteria and/or criteria for device selection, an indication of devices to select for monitoring, and/or an indication of software to monitor that is to be run on a cohort of devices. The computer system 110 may store the monitoring instructions 106, e.g., the criteria and/or device selections, in the database 112, perform a diversity analysis using the monitoring instructions 106, generate analysis results and/or recommendation(s) for the monitoring program, and/or transmit the analysis results and/or recommendation(s) to the client device 104. The computer system 110 may additionally or alternatively automatically perform one or more actions based on the results of the diversity assessment. For example, the computer system 110 may automatically adjust monitoring parameters, add or remove inclusion criteria for devices, add or remove exclusion criteria for devices, enroll or remove from enrollment one or more devices, etc.

Eligibility criteria such as inclusion criteria which dictates the minimum requirements that devices must meet to be enrolled in the monitoring program and exclusion criteria which dictates which devices must be excluded (e.g., even if they meet the inclusion criteria) may be used to determine which devices to enroll and, therefore, which devices to monitor. Sometimes eligibility criteria can have a detrimental effect on diversity as certain eligibility criteria may disproportionately impact certain groups of devices, e.g., a particular model of device, devices running a particular operating system (OS), devices running a particular OS version, a particular model or series of devices, devices having a particular hardware component, etc.

The client device 104 may be used by an administrator 102 to perform various actions with respect to the monitoring of devices. For example, the administrator 102 can use the client device 104 to create a new monitoring program (e.g., to test new software or a new version of software, such as a particular software module, a new operating system version, etc.), update a monitoring program (e.g., update parameters of a monitoring program, add or remove inclusion criteria for the devices, add or more exclusion criteria for the devices, enroll or remove devices from monitoring, etc.), and/or monitor the devices (e.g., monitor the performance of devices while running particular software, monitor the devices for errors or malfunctions, monitor the devices activity of participants, data collected from participants, review recommendations from the computer system 210, etc.). The client device 204 may be a computing device, such as a desktop computer, a laptop computer, a smartphone, a tablet, a cell phone, etc.

The computer system 110 may monitor a cohort of devices to, for example, test new or existing software. For example, the computer system 110 may, based on the monitoring instructions 106, determine that a new software program, Program A is to be tested on a cohort of devices to determine if minimum performance can be achieved across a variety of devices, to identify errors that are caused or might be caused as a result of running the Program A on a variety of devices such as system crashes, to determine if Program A causes any devices to overheat or experience other malfunctions, etc. The administrator 102 may initiate the monitoring of devices through the client device 104, e.g., in order to determine if new software is ready for release (e.g., to the public, to a particular country, to a particular region, to personnel of a particular business, to a particular group of persons, etc.), to determine if new or existing software is sufficient to meet the needs of a client (e.g., a particular business, a government entity, a particular group of persons, etc.), to determine if the new or existing software meets performance criteria (e.g., minimum loading times, minimum response times such as a render response time or a server response time, maximum battery life drain on underlying device, minimum throughput performance, minimum concurrency performance, maximum load times, latency requirements, maximum error rates, etc.).

The computer system 110 may monitor a cohort of devices to, for example, test the performance of the devices and/or test the hardware components of devices. For example, the computer system 110 may, based on the monitoring instructions 106, determine that devices with the latest CPU B should be tested to identify the performance benefits provided by CPU B. The administrator 102 may initiate the monitoring of devices through the client device 104, e.g., in order to start the monitoring of devices having CPU B during performance testing. The monitoring instructions 106 may indicate, for example, that the inclusion criteria for the monitoring program includes a requirement that all enrolled devices have the CPU B. Based on this, the computer system 110 may select a subset of available devices for performance testing, where each of the selected devices includes the CPU B. The computer system 110 may perform a diversity analysis on the selected subset of devices. The diversity analysis may reveal, for example, that one more additional devices should be included in the performance testing, such as one or more devices from varying groups of devices (e.g., the groups of devices corresponding to particular manufactures, particular hardware components, particular operating systems or other software, etc.).

The computer system 110 may communicate with the client device 104 and various devices, such as devices in a first group of network devices 120a, in a second group of network devices 120b, and/or in a third group of network devices 120c over a network 150. The network 150 can include public and/or private networks and can include the Internet. The network 150 may include wired networks, wireless networks, cellular networks, local area networks, wide area networks, etc.

The devices in the first group of network devices 120a, the second group of network devices 120b, and the third group of network devices 120c may include devices that may optionally be monitored. These candidate devices may be, for example, specifically used for testing, e.g., software and/or performance testing. For example, these devices may be part of a mobile device farm. These devices may include, for example, network-enabled computing devices, such as one or more desktop computers, laptop computers, smartphones, cell phones, tablets, etc.

A reference composition 122 is the group composition for a particular population of devices and is used by the computer system 110 to determine a composition target 124. That is, the reference composition 122 may reflect group diversity for a particular set of devices (e.g., the set of devices used by the general public, used by a particular government agency, used by a particular business, used by a particular group of individuals that meet certain selection criteria such as being recently released or having particular hardware components, etc.). The reference composition 122 may be selected by the administrator 102, or determined by the computer system 110 based on information provided by the administrator 102 (e.g., provided in the monitoring instructions 106). For example, if the administrator 102 provides in the monitoring instructions 106 that a new software module is to be tested for a particular government agency, the computer system 110 may determine that the devices currently in use for the personnel of the government agency should be used as a reference population of devices. Based on this the computer system 110 may determine the reference composition 122 by, for example, accessing data from the database 112 or from remote storage that indicates that 70% of the personnel of the government agency use smartphones running OS A, and 30% of the personnel of the government agency use smartphones running OS B.

The computer system 210 may use the reference composition 122 to determine a composition target 124 for the set (e.g., cohort) of devices to be monitored. For example, the composition target 124 may be determined by removing one or more group of devices from the reference composition 122, by adjusting the reference composition 122 to account for trends (e.g., to estimate a new composition for a population of devices at a future point in time), etc. The composition target 124 may indicate the sought device diversity for monitoring, e.g., at an enrollment stage of monitoring or, more likely, at the conclusion of the conclusion of monitoring. As an example, if a selected set of devices to be monitored for performance over a period of one month is being performed for new devices that have not previously undergone performance tests, the computer system 110 may determine the composition target 124 by limiting the device population of the reference composition 122 to only those devices in the device population that are new models released in the last year and/or are models that have not previously undergone performance tests. The computer system 110 may use the reference composition 122 to identify the different group percentages for the composition target 124. The computer system 110 may similarly determine what devices to enroll in monitoring based on the cohort composition target 224, e.g., in an effort to have an observed/enrolled group composition 126 of devices at the end of the monitoring program match the composition target 124.

The composition target 124 may additionally or alternately indicate a quota that needs to be met for the different groups of devices. For example, the composition target 124 may additionally or alternatively indicate that there needs to be at least two devices from the Group 3 network devices 120c and at least one device from the Group 1 network devices 120a.

Continuing the earlier example, if the reference composition 122 provides for 70% Group 3 devices 120c and 30% Group 1 devices 120a and trend data (e.g., previously determined by the computer system 110 and stored in the database 112) indicates that there is a trend of a growing population of Group 3 devices 120c relative to the population of Group 1 devices 120a, then the computer system 110 may calculate the composition target 124 based on the trend data as 75% Group 3 devices 120c and 25% Group 1 devices 120a.

The group composition 126 may represent the current composition of a relevant population of devices to be monitored. For example, at a time of enrollment, the group composition 126 may refer to the composition of a group of devices that have been enrolled by the computer system 110 in the monitoring program. Similarly, during the monitoring program, the group composition 126 may refer to the composition of a group of devices that are still undergoing monitoring. Some devices that were initially enrolled may no longer be monitored at this time due to, for example, errors, crashes, hardware failures, etc. As another example, some devices that were initially enrolled may have been removed by the computer system 110 from enrollment to meet diversity criteria. Accordingly, the computer system 110 may determine the group composition 126 multiple times through the monitoring program, e.g., at fixed time intervals, in response to errors or warnings being detected, when certain monitoring milestones are reached (e.g., tests regarding a particular performance parameter are completed).

The computer system 110 can also be used to automatically determine devices and/or software eligible for monitoring or to enroll in monitoring based on information provided by the administrator 102. For example, the administrator 102 may provide selection criteria that indicates parameters for monitoring (e.g., as part of the monitoring instructions 106), such as a length of time that the monitoring will take place for, a time of day that the monitoring will take place for, frequency of data requests to the monitored devices and/or data transmissions from the monitored devices, inclusion requirements for the devices or software that are used to determine eligibility, exclusion criteria for the devices or software that may dictate the automatic removal of any devices or software that meet one of the exclusion criteria (e.g., even if the devices or software meet the inclusion requirements), etc.

Where the selection criteria has or is predicted by the computer system 110 to have a disproportionately adverse effect on a particular group of devices (e.g., such that it is predicted that the diversity of devices at an end of the monitoring period will be outside of a target diversity device composition), the system 100 may generate a warning and/or a recommendation to adjust the selection criteria. In some cases, instead of generating a recommendation, the system 100 may perform one or more actions automatically.

The devices or software to be monitored may include, for example, computer devices, such as network enabled smartphones, tablet computers, laptop computers, desktop computers, etc. The devices or software may additionally or alternatively include particular software that is running on device, a virtual machine, a container, a network environment, a virtual network environment, etc. For example, the computer system 110 may be used to monitor a particular type of OS software that it would like to test on multiple different devices (e.g., of different manufacturers, models, hardware specifications, CPU types, RAM amounts, etc.). The computer system 110 may receive an indication from the administrator 102 of the software to be monitored and selection criteria for the devices that are to run the software. The computer system 110 may determine a diverse group of devices to run the software, or determine that a group of devices selected by the administrator 102 does not meet diversity criteria (or is unlikely to meet the diversity criteria).

As illustrated in FIG. 1, the overall process of creating and carrying out a monitoring program may be broken down into different stages 132-140. In the first stage 132, the administrator 102 can select through the client device 104 a set of devices (e.g., cohort of devices) to monitor or the computer system 110 can select the set of devices based on the monitoring instructions 106. Continuing the earlier example, the computer system 110 may select three devices from Group 3 devices 120*c* and one device from the Group 1 devices 120*a* to monitor based on the monitoring instructions 106 and previously determined trend data. In response to the selection of the set of devices that are to be monitored, the computer system 110 may calculate diversity measures 130 to determine if the selected set of devices meets diversity criteria. The diversity measures 130 may include, for example, the current group composition 126 determined using the selected devices. For example, the computer system 110 may determine that group composition is 75% Group 3 devices 120*c* and 25% Group 1 devices 120*a* as indicated by the key 128. The diversity measures 130 may include the reference composition 122 or an update to the reference composition 122, the composition target 124 or an update to the composition target 124, and/or the results of a comparison of the group composition 126 (or a predicted group composition 126 for the end of the monitoring program) to the composition target 124. The diversity measures 130 may also include the calculation of new trend data or the updating of existing of trend data using new information.

As an example, in generating the diversity measures 130, the computer system 110 may determine, based on trends in one or more devices populations, that Group 2 devices have a fast growing population. Based on this, the computer system 110 may determine that the results of the monitoring program will have limited applicability if Group 2 devices are unrepresented or not included. As such, the computer system 110 may calculate a new composition target 124 that accounts for the growing use of Group 2 devices. For example, the computer system 110 may determine that the composition target 124 should be 20% Group 1 devices 120*a*, 40% Group 2 devices 120*b*, and 40% Group 3 devices 120*c*.

In the second stage 134, the computer system 110 determines that the selected subset (e.g., the initial device selection) does not meet diversity criteria. For example, the computer system 110 may determine that the diversity criteria is not met if the group composition 126 does not include or is predicted not to include by the end of the monitoring program a device from a device group in the composition target 124. Similarly, the computer system 110 may determine that the diversity criteria is not met if the group composition 126 deviates a threshold percentage (e.g., for any one group of devices) or predicted to deviate by a threshold percentage by the end of the monitoring program from the composition target 124. As another example, the computer system 110 may determine that the diversity criteria is not met if the group composition 126 or the predicted group composition at the end of the monitoring program is not within range (e.g., for any one group of devices) of a target diversity range (e.g., calculated based on the composition target 124).

In an optional third stage 136, the computer system generates a recommendation to meet the diversity criteria. For example, the computer system 110 may generate a recommendation 108 that it transmits to the client device 104. The recommendation may be to add a device from an underrepresented group of devices, remove a device from enrollment that is in an overrepresented group of devices, remove inclusion an inclusion criterion so that more devices may qualify for enrollment, remove an exclusion criterion so that less devices will be rejected from enrollment, etc. For example, if the inclusion criteria indicated that the device had to be one of a set of specific device models, the computer system 110 may recommend that the inclusion criteria be removed (e.g., as it may be overly restrictive for failing to account for new device models). Similarly, continuing the earlier example, the computer system 110 may recommend for two devices from the Group 2 devices 120*b* to be added and for one of the Group 1 devices 120*c* to be removed.

In an optional fourth stage 138, the computer system 110 receives confirmation from the client device 104 to perform the actions specified in the recommendation 108.

In some cases, the computer system 110 receives instructions to perform one or more different or modified actions compared to the actions in the recommendation 108.

In the fifth stage 140, the computer system 110 selects a new subset of devices to monitor. For example, in response to receiving a confirmation to perform the recommended actions provided in the recommendation 108, the computer system 110 may enroll two devices from the Group 2 devices 120*b* as indicated by the key 128. By doing this, the computer system 110 can update the group composition 126 so that the current group composition 126 or a predicted group composition at the end of the monitoring program will match (or be sufficiently close to) the composition target 124 and/or so that a minimum number of Group 2 devices 120*b* can be enrolled in the monitoring program. This would indicate that sufficient device diversity is predicted to be met based on the updates to the enrolled devices.

Other changes or modifications to the enrolled devices may be performed at other stages of the monitoring program. These changes or modifications may be made for diversity purposes based on newly determined diversity measures. These changes or modifications may be based on changes to the enrolled devices, a warning generated in response to new data indicating that the composition target 124 is unlikely to be met by the end of the monitoring program (e.g., new trend data, data indicating the a number of devices from a particular group of devices have been unenrolled, etc.), etc.

Figure 2:
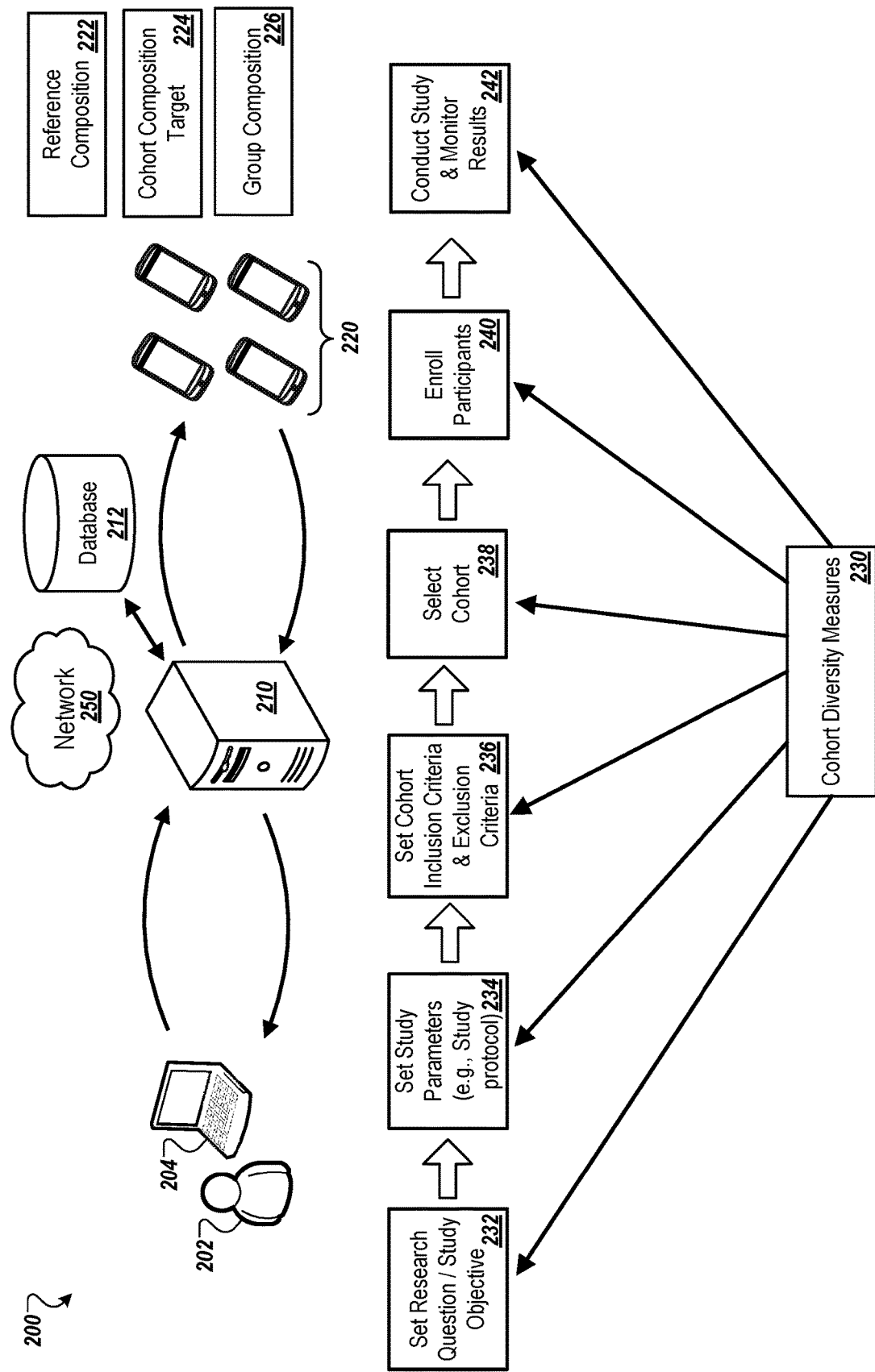
FIG. 2 is a diagram that illustrates an example system for performing diversity assessment and action selection.

FIG. 2 is a diagram that illustrates an example system 200 for performing diversity assessment and action selection. Among other uses, the system 200 can be used to assist in the creation and implementation of research studies (e.g., clinical trials, experimental studies, longitudinal studies, correlational studies, case studies, etc.). Specifically, the system 200 can be used to, for example, identify a target diversity level for a research study (e.g., based on one or more goals for the research study), assess the current diversity of the research study, and generate recommendations to reach or approach the target diversity level. The system 200 includes a client device 204 and a computer system 210 that includes functionality to make diversity assessments of one or more research studies and to select corresponding actions to perform or recommend. The numerous benefits discussed above with respect to the computer system 110 are applicable to the computer system 210.

The systems discussed herein, including the computer system 210, can be used to create, manage, adapt, and evaluate monitoring programs in many fields, including manufacturing quality control, environmental monitoring, health research, and many other areas where sampling is used to monitor a subset of a population. In the case of health research in particular, the system can be a multi-tenant system for administering clinical trials through remote devices. The system can create and adapt clinical trials that involve many users remotely collecting user input and sensor data through mobile devices. The system can create and administer studies for various different organizations, allowing the system to efficiently administer many clinical trials concurrently, each with their own separate monitoring groups (e.g., cohorts of participants with associated devices), objectives for monitoring, data collection and reporting procedures, and requirements for diversity in the monitoring groups.

The techniques described can be used to achieve various benefits. For example, by taking into account diversity at the beginning and multiple times throughout a clinical study, numerous health benefits can be achieved. Notably, diversity in a research study can be monitored and actions performed in an effort to maintain a target level of diversity such that the results of the study are applicable to typically unrepresented segments of a population. With respect to new medications and treatments, the applicability of these new medication and treatments may be extended such that those belonging to the underrepresented segments can be safely administered the medications/treatments where there otherwise would have been significant doubt due to, for example, there being no data collected for these groups and/or an insufficient amount of data for the results to be statistically relevant for these groups. Similarly, negative interactions and side effects of new medications/treatments for those belonging to the underrepresented segments are more likely to be identified, thereby reducing the risk of injury or death.

As an example, many recent COVID-19 vaccine trials excluded pregnant women due to pregnant women being a high risk group. Unfortunately, by eliminating this group of participants from the vaccine trials, there is insufficient data to determine if many of the vaccines can be safely administered to pregnant women. The disclosed system may identify pregnant women as a group that should be included for a vaccine or medical trial as an underrepresented or excluded group of participants. This may be especially true for medications that are likely to be taken by pregnant women, such as those that are meant to address pregnancy issues, illness that commonly arise during pregnancy, medications that are typically taken by women between the ages 18 and 54, etc. The disclosed system may further account for the increased risks by, for example, making a researcher aware of the increased risks, recommending additional or more comprehensive monitoring during the study for this particular group of participants, recommending a lower dose of the medication or vaccine being tested for this particular group of participants, etc. In this way, important data can be collected on the underrepresented or excluded group of pregnant women while steps can be taken to reduce the risk presented to this group. The collected data may indicate whether it is safe to administer the vaccine to pregnant women, whether there are any side effects unique to pregnant women, whether there are any reactions to the vaccine associated with medications typically taken by pregnant women, etc. Accordingly, in recommending that this group of typically excluded or underrepresented participants be included in the study, the disclosed system can improve the safety afforded to those in the group.

In general, diversity or diversity level may refer to the type or amount of variety of groups or attributes represented in a set (e.g., a monitoring group for a monitoring program, a candidate pool, etc.). For example, a diversity level may be a value or a set of values (e.g., a distribution) that indicates the variety of groups of users represented in, or predicted to be represented in, a monitoring group of a monitoring program. One way to assess diversity is to assess distribution of members of a monitoring group across different groups, e.g., to determine whether the distribution of members into the different groups is sufficiently similar to the distribution of those groups among a reference population. This population may be a current population at a geographical region or an expected future population, a group that has been invited to participate in a research study, a group (e.g., cohort) that has enrolled in a research study, a group that has enrolled and remains active in a research study, a group that has a particular set of attributes (e.g., a disease relevant to a research study), etc. This population may additionally or alternatively be a subset of a larger reference population. Alternatively, diversity may be assessed without a reference population. For example, diversity may be assessed simply based on the amount of variation or difference present of groups of users and/or attributes of users represented in or predicted to be represented in the monitoring group (e.g., a number of different groups represented, size of the largest group, size of the smallest group, proportion of members outside the largest group, mean or median group size, and other measures) without comparison to a reference population.

The categories or profiles used as different groups to assess diversity may be defined using one or more attributes, including demographic and non-demographic characteristics. In many cases it is important to obtain diversity not only in demographics, but also in health status, lifestyle, location, context, medical history, and other factors to obtain a broad and effective monitoring. As an example, groups to be assessed during a research study may be defined to have certain combinations of attributes, with one group having a first set of attributes, a second group having a second set of attributes, and so on. The attributes used to define groups can include race, ethnicity, nationality (or nationality of relatives such as parents or grandparents), residence in a certain region (e.g., city, county, state, country, etc.), genomics data (e.g., having a particular gene variant or not having a particular gene variant), state of health (e.g., a body fat percentage of less than 25%), physiological attributes (e.g., weighing more than a threshold amount, weighing less than a threshold amount, having a RHR within a particular range, etc.), psychological attributes, and so on. The attributes can include behavior factors such as sleep, diet, exercise, and other behavior factors.

Other examples of characteristics that can be used to define a group may include ages, age ranges, medical conditions, medicines (e.g., that have been prescribed and/or are being taken by individuals), treatments (e.g., that individuals are undergoing), etc. For example, a first group of a particular population may correspond to all those in the population that have been diagnosed with diabetes, while a second group of the population may correspond to all those in the population that have not been diagnosed with diabetes, and a third group of the population may correspond to all those in the population between the ages of 20-40 regardless of whether they are diagnosed with diabetes It may be important to achieve and/or maintain a target diversity level for participants in a study to ensure the viability of data or results obtained during the study. For example, the computer system 210 may want to perform a research study to determine the effectiveness and safety of a new pharmaceutical. If however, the study participants are not representative of a reference population that is to use the new pharmaceutical, then data or results obtained from the study may lack utility or otherwise have only limited applicability. For example, if a target group composition cannot be achieved by the end of the study (or the target group composition cannot be achieved within a margin of error), the results of the study may fail to identify side effects of those in groups that are typically excluded from studies due to the higher risk they present (e.g., pregnant women, elderly persons, those with particular diseases or other serious ailments, etc.), of those in groups that are typically less likely to join or complete a study, those in groups that have difficulty meeting the requirements of a study (e.g., due to residential location, access to vehicles, access to computing devices, etc.), etc. Similarly, the data may be insufficient to determine if the medication can be safely administered to those groups.

The computer system 210 may access data corresponding to a particular reference population, such as a list of persons in the reference population. The computer system 210 may filter the reference population to those that have the characteristics corresponding to a particular group, and proceed to sample from the filtered list, e.g., in order to identify a manageable list of persons associated with first group. As will be described in more detail below, the computer system 210 can use this sampled list in a variety of ways. For example, the computer system 210 may simply invite the persons in the sample list. As another example, the computer system 210 may analyze the other characteristics of the persons in the sample list and use these characteristics to identify persons to be invited/enrolled in the study, and/or removed from consideration or enrollment for the study. In this way, the computer system 210 can enroll participants who more accurately represent the larger reference set (e.g., the reference population).

In general, study parameters may include the information that defines the protocol for a study. The study parameters may include, for example, one or more locations where the study is to be conducted, an expected number of participants for the study, a length of the study, an age range of participants for the study, a budget for the study, a target date for the release of a medication or treatment being studied, etc. The study parameters may also include requirements of the participants and/or for how the study is to be conducted. For example, a first parameter for a new research study may provide that participants will be required to attend three medical office visits per month, and a second parameters may provide that participants are required to have or obtain a smartphone. The study parameters may be set by a researcher 202 through the client device 204, by the computer system 210, or by a combination of the researcher 202's inputs and the computer system 210.

In general, eligibility criteria (also referred to as selection criteria) are used to identify devices and users that can appropriately participate in a monitoring study. The criteria may include inclusion criteria and exclusion criteria described in more detail below. Eligibility criteria may also refer to other requirements provided in the study parameters. For example, there may be an eligibility criterion that participants have access to a smartphone, laptop, or other network-enabled computing device due to the study parameters requiring the participants to make frequent telehealth visits. The system 210 ensures not only that eligibility criteria are satisfied for participants in a monitoring program, but that the desired level of diversity is present across the monitoring group as a whole, with diversity being tracked and achieved for each of the different types of attributes that are important for achieving the outcome of the monitoring program.

In general, inclusion criteria may refer to the minimum requirements that candidates must meet in order to be enrolled in study. The inclusion criteria may be based on the question (e.g., goal) of the study, e.g., provided by the researcher 202. For example, if a new study is designed to research the side effects of a new Drug X for the treatment of high cholesterol, then the inclusion criteria for the study may include a requirement that participants have high cholesterol. The inclusion criteria may be set by the researcher 202 using the client device 204. The computer system 210 may additionally or alternatively set the inclusion criteria. For example, based on information sent to the computer system 210 from the client device 204 indicating that the goal of the researcher study is to identify the side effects of a new Drug X for the treatment of high cholesterol, the computer system 210 may, based on this information, add a requirement that each participant have high cholesterol to the inclusion criteria or may generate a recommendation for the researcher 202 to add this criterion or confirm its inclusion. Other examples of inclusion criteria may include a particular age or age range (e.g., corresponding to a particular group of persons that are most likely to take Drug X).

In general, exclusion criteria may refer to attributes of candidates that prevent them from being enrolled in the study (e.g., even if they meet the inclusion criteria). The exclusion criteria may be based on and/or otherwise take into consideration risk factors. For example, the exclusion criteria may prevent those who are pregnant or over a certain age from participating in the study. The exclusion criteria may be based on the question (e.g., goal) of the study, e.g., provided by the researcher 202. For example, if a new study is designed to research the side effects of a new Drug X for the treatment of high cholesterol, then the exclusion criteria may include attributes that have known negative effects with Drug X. For example, the computer system 210 may refer to previous studies stored in a database 212 that indicates that Drug X cannot be safely administered to those with diabetes. In response, the computer system 210 may automatically add diabetes as an exclusion criterion for the research study, or generate a recommendation to add diabetes as an exclusion criterion and send the recommendation to the client device 204 to present to the researcher 202.

As illustrated in FIG. 2, the computer system 210 has access to the database 212 and also communicates with the client device 204 over a network 250. The computer system 210 can receive data from the client device 204 and can send data to the client device 204 as will be described in more detail below. For example, the computer system 210 can receive data from the client device 204 indicating a question and/or requirements for a study (e.g., to initiate a new research study). The computer system 210 may store questions and/or requirements in the database 212, perform a diversity analysis using the questions and/or requirements, generate analysis results and/or recommendation(s) for the new study, and/or transmit the analysis results and/or recommendation(s) to the client device 204. The computer system 210 may additionally or alternatively automatically perform one or more actions based on the results of the diversity assessment. For example, the computer system 210 may automatically adjust study parameters, add or remove inclusion criteria, add or remove exclusion criteria, enroll or remove one or more participants, send invitations to enroll to one or more participants, etc.

The client device 204 may be used by a researcher 202 to perform various actions with one or more research studies. For example, the researcher 202 can use the client device 204 to create a research study, update a research study (e.g., update parameters of a research study, add or remove inclusion criteria of a research study, add or more exclusion criteria of a research study, enroll or remove participants of a research study, etc.), and/or monitor a research study (e.g., monitor activity of participants, data collected from participants, review recommendations from the computer system 210, etc.). The client device 204 may be a computing device, such as a desktop computer, a laptop computer, a smartphone, a tablet, a cell phone, etc.

The computer system 210 may communicate with the client device 204 and the participant devices 220 over a network 250. The network 250 can include public and/or private networks and can include the Internet. The network 250 may include wired networks, wireless networks, cellular networks, local area networks, wide area networks, etc.

The computer system 210 can also communicate with participant devices 220. The participant devices 220 may belong to users who have been invited to enroll in a research study, have enrolled in the research study, and/or are enrolled and active in the research study. The participant devices 220 may be computing devices. For example, the participant device 220 may include one or more desktop computers, laptop computers, smartphones, cell phones, tablets, etc.

A reference composition 222 is the group composition for a particular population and is used by the computer system 210 to determine a cohort composition target 224. That is, the reference composition 222 may reflect group diversity for a particular population (e.g., for a particular region, a particular region at a future point in time, those having a particular medical condition, those taking a certain medication, those belonging to a particular age group, etc.). The reference composition 222 may be selected by the researcher 202, or determined by the computer system 210 based on information provided by the researcher 202. For example, if the researcher 202 provides that a study regarding a new cholesterol medication is to take place in Virginia and does not specifically indicate a reference population, the computer system 210 may use Virginia as a reference population. The computer system 210 may proceed to identify the group composition of the reference population. For example, the computer system 210 may look up and/or estimate the percentage of Virginia's population that have or are likely to experience high cholesterol, percentages corresponding to particular races or ethnicities, percentages corresponding to particular age ranges, etc.

The computer system 210 may use the reference composition 222 to determine a cohort composition target 224. For example, the cohort composition target 224 may be determined by removing one or more groups from the reference composition 222 (e.g., if you want to focus the study on only persons suffering from a particular medication), by adjusting the reference composition 222 to account for trends (e.g., to estimate a new composition for a population at a future point in time), etc. The cohort composition target 224 may indicate the sought group diversity for a new research study, e.g., at enrollment or, more likely, at the conclusion of the research study. As an example, if a new research study is to study the effects of a new cholesterol medication, the computer system 210 may determine the cohort composition target 224 by limiting the population of the reference composition 222 to only those in the population that are suffering from high cholesterol or are likely to suffer from high cholesterol. The computer system 210 may use the reference composition 222 to identify the different group percentages for the cohort composition target 224. The computer system 210 may determine what candidates to invite and/or enroll based on the cohort composition target 224, e.g., in an effort to have a group composition 226 at the end of the study match the cohort composition target 224.

As an example, the reference composition 222 may indicate for a corresponding population that a first group corresponding to those of a first ethnicity makes up 55% of the population, that a second group corresponding to a second ethnicity makes up 20% of the population, that a third group corresponding to third ethnicity makes up 15% of the population, and that a fourth group corresponding to those that have or are likely to from high cholesterol makes up 43% of the population. In determining the cohort composition target 224, the computer system 210 may refer to the reference composition 222 to determine percentages for the first three groups when the population is limited to the fourth group. For example, the computer system 210 may use the reference composition 222 to determine that 52% of the individuals in the fourth group also belong to the first group, that 25% of the individuals in the fourth group also belong to the second group, and that 12% of the individuals in the fourth group also belong to the third group. The computer system 210 may proceed to set the cohort composition target 224 to 52% for the first group, 25% for the second group, 12% for the third group, and 11% to one or more other groups.

The group composition 226 may represent the current composition of a relevant population of the study. For example, the group composition 226 may refer to the composition of a group of candidates that were invited to enroll in a study and/or to a cohort of enrolled participants. The computer system 210 may determine the group composition 226 multiple times through the study, e.g., once for each stage of the research study. The group composition 226 may be calculated using different populations. For example, the group composition 226 may initially be calculated for the candidate pool of potential participants, to a group of candidates that were invited to enroll, to the cohort of enrolled participants (e.g., at one or more points throughout the study), etc.

As illustrated in FIG. 2, a research study may be broken down into different stages 232-242. In the first stage 232, the researcher 202 can use the client device 204 to set a research question or study objective. For example, the researcher 202 can initiate a new study through the client device 204 by submitting a study objective to study the side effects of a new Drug X for treating high cholesterol. In the second stage 234, the researcher 202 and/or the computer system 210 set parameters for the study, such as a study size, a region where the study is to take place, devices and/or sensors needed for the study, etc. As an example, the computer system 210 may generate one or more recommendations for study parameters, such as a recommended study size. In the third stage 236, the researcher 202 and/or the computer system 210 set cohort inclusion criteria and/or exclusion criteria. In the fourth stage 238, the researcher 202 and/or the computer system 210 select the cohort. Selecting the cohort may include identifying a group of candidates send enrollment invitation to. Alternatively, selecting the cohort may include identifying a group of candidates from an applicant pool to enroll. In the fifth stage 240, the cohort participants are enrolled. The computer system 210 may generate and send a notification to the participant devices 220 indicating that they have been enrolled. In the sixth stage 242, the study is conducted and the results are monitored. Data may be obtained from the participants through the participant devices 220. The data may be used to identify an activity or participation level of the participants, participants who are inactive, participants who have unenrolled, etc.

Each of the stages 232-242 of the research study may be based on cohort diversity measures 230. That is, the cohort diversity measures 230 may be used by the computer system 210 to confirm or modify how the research study is to proceed from one stage to the next. The cohort diversity measures 230 may include results of one or more diversity analyses, e.g., which may differ depending on the present stage of the research study. For example, with respect to the first stage 232, the cohort diversity measures 230 may include an indication of biases associated with the research question/study objective, or type of research question/study objective. Specifically, if the research study objective is set to study the effects of Drug X for the treatment of high cholesterol, the computer system 210 may access historical data and/or remote data of previous cholesterol research studies that shows that persons of Asian ethnicity are often unrepresented by 20% in cholesterol research studies. There may be relevant reasons for this, such as the possibility of persons of Asian ethnicity being significantly less likely to have high cholesterol. However, despite this, it may be critical to accurately represent the Asian ethnicity segment of the cohort composition target 224 to ultimately determine if Drug X can be safely administered to those of Asian ethnicity and/or to identify dangerous side effects which may disproportionately affect those of Asian ethnicity. More generally, the cohort diversity measures 230 may show that persons of a certain group are consistently underrepresented in clinical trials involving a new medication, such as pregnant persons, persons older than 70 years of age, persons with immune system disorders, etc.

The cohort diversity measures 230 may include one or more diversity levels calculated by the computer system 210. These diversity levels may correspond to a current level of diversity, e.g., present among previous participants (e.g., potential candidates), those invited to enroll in the study (e.g., candidates), those that have accepted to be enrolled in the study and/or are enrolled in the study (e.g., participants), etc. Additionally or alternatively, these diversity levels may correspond to a predicted level of diversity at a future point in time, such as the study completion.

A determined diversity level may indicate how close the predicted group composition at study completion is to the cohort composition target 224. The diversity level may be expressed as, for example, a diversity score. That is, the diversity level may be expressed a value (e.g., a number, a classification, etc.) that is indicative of how close the predicted group composition at study completion is to the cohort composition target 224 (e.g., a target group composition). In some cases, the score can indicate a magnitude of how far the distribution or composition of members of the cohort varies from the target distribution or composition. As an example, a diversity score of 1.0 may indicate that the predicted group composition at study completion matches the cohort composition target 224. Lower scores can indicate increasing differences from the target level, e.g., a score of 0.9 may indicate that the composition varies from the target by at least 5% in at least one category or attribute, a score of 0.8 may indicate that the composition varies from the target by at least 10% in one target or attribute, etc. The scoring can change linearly or nonlinearly with the amount of deviation from the target.

The diversity score for a monitoring group may be determined as an aggregate or composite of separate scores for different categories or profiles for which composition is tracked. For example, if there are 5 different types of participants needed, and only four of the 5 meet the requirements for the minimum number of participants, then the diversity score can be 80%. Separate scores may be determined for each category or group to be included, and those scores can be averaged (e.g., if group 1 has 100% of needed members, group 2 has 90% of needed members, and group 3 has 60% of needed members, the average of 83% can be used as a diversity score for the monitoring group as a whole).

The diversity score may be based on absolute measures, such as the numbers of participants in each group, or it may be relative measures, such as the amount in one group relative to the amount in another category or to the monitoring group as a whole (e.g., a ratio, proportion, fraction, percentage, etc.). A diversity score can also be determined relative to other references, such as a previously predicted group composition, a previously determined diversity score, a predicted group composition corresponding to one or more recommendations (e.g., predicated based on an assumption that the recommended actions will be performed), etc.

Diversity scores can be generated and provided for each of the different categories or attributes that are relevant to the monitoring program. For example, the system can determine, for each of various groups to be represented in the monitoring group, how close the subset representing that group is to the target level for the group. This can help indicate, for example, the specific groups or categories of devices and users where additional representation is needed in the monitoring group.

Additionally or alternatively, the diversity level may be expressed as a probability or confidence score indicating the expected results for the study, such as a likelihood that a minimum amounts or proportions of the different groups represented in the monitoring group will achieve compliance with the requirements until the end of the monitoring program. Because there are multiple different groups or categories of members in the monitoring group, set of probabilities or confidence scores can be determined, with one for each of the different groups or categories. In addition, multiple versions of the scores can be determined for different scenarios, e.g., one for the current state of the monitoring program and the current monitoring group, and others representing the expected likelihood(s) of success that would result after performing different actions corresponding to different recommendations.

The diversity level may indicate a level of confidence in achieving the cohort composition target 224, and/or achieving a group composition that is with an acceptable range (e.g., a percentage range or value range) of the cohort composition target 224. For example, a diversity score of 0.91 may indicate that the computer system 210 has determined that there is 91% possibility of the group composition at study completion being within a threshold percentage (e.g., 5%, 3%, 1%, etc.) of the cohort composition target 224. Or, if the cohort composition target 224 is expressed as one or more ranges, the score can indicate the likelihood of the composition having representation of groups that falling within the target ranges.

Diversity level may also or alternatively describe a group composition (e.g., a predicted group composition), or the difference between a group composition (e.g., current or predicted) and the cohort composition target 224. For example, a predicted group composition at study enrollment may be a first diversity level, a predicted group composition at study completion may be a second diversity level, and a difference (e.g., difference between two sets of values, absolute value of the difference between the two sets of values, etc.) the group composition at study completion and the cohort composition target 224 as a third diversity level.

In some cases, there are multiple diversity metrics used to assess the level of diversity. For example, a first diversity level may include a diversity distribution indicating different likelihoods of achieving the cohort composition target 224, and a diversity score may be second diversity level identified from the diversity distribution (e.g., as the value associated with the highest probability out of the all of the values).

The target diversity level described above and elsewhere may refer to a single diversity level or to a group of multiple diversity levels or metrics. For example, a target diversity level may require as a first level or metric a requirement that a cohort (e.g., monitored group) meets certain enrollment minimums (e.g., at least one subject from each diversity group). For example, the enrollment minimums may provide that for each medical condition in a list of particular medical conditions, there are at least two corresponding subjects that have the medical condition. The target diversity level may further require a diversity score metric. For example, the monitoring program may require a diversity score of 0.7 or greater by the end of the monitoring program. This diversity score may be calculated using a target group composition of subjects and an observed or anticipated (e.g., at the end of the monitoring program) composition of subjects (e.g., determined from the current or anticipated enrollment of subjects in the monitoring program). This diversity score can, for example, represent the difference between the actual (e.g., observed or anticipated) composition of subjects and the target composition (e.g., a composition having sufficient or ideal diversity). For example, the diversity score may be a value between 0 and 1. Here, 0 may correspond to complete or maximum divergence or difference between a vector (or array) representing an actual composition of subjects and a second vector (or array) representing the target composition of subjects. Similarly, 1 may correspond to no or minimum divergence or difference between the two vectors or the two arrays. The computer system 210 may, therefore, calculate a diversity score and/or a target diversity level by calculating the difference or divergence between two or more vectors. Similarly, the computer system 210 may, therefore, calculate a diversity score and/or a target diversity level by calculating the difference or divergence between two or more arrays.

In determining a diversity level such as a diversity score, the computer system 210 may sample from a larger reference set to obtain a makeup that is representative of the larger reference set (e.g., replicating, within a predetermined tolerance, the distribution of certain attributes or characteristics that are relevant to the monitoring program). That is, the computer system 210 may sample from a larger reference set so that the sample reflects the characteristics across the reference group. For example, the computer system 210 may access from the database 212 or from an external data storage, data that corresponds to persons having characteristics that define a first group, such as being of a specific race, being of a specific ethnicity, being of a specific nationality, living in a certain region (e.g., city, county, state, country, etc.), having particular genomics data (e.g., particular gene variant), having a particular state of health, having particular physiological attributes (e.g., weighing more than a threshold amount, weighing less than a threshold amount, having a RHR within a particular range, etc.), having a particular diet or having particular eating habits (e.g., vegetarian, vegan, etc.), having a particular occupation, having a particular level of education (e.g., high school diploma, two years of college, four years of college, graduate degree, etc.), etc. The computer system 210 may access this data, such as a list of persons in the reference population (e.g., used to determine the reference composition 222) that belong to this first group, and proceed to sample the data (e.g., in order to identify a manageable list of persons associated with first group).

The computer system 210 can use this sampled list in a variety of ways. For example, the computer system 210 may simply invite the persons in the sample list, or a subset of persons in the sampled list, to participate in the study. As another example, the computer system 210 may analyze the other characteristics of the persons in the sample list and use these characteristics to identify persons to be invited/enrolled in the study, and/or removed from consideration or enrollment for the study. For example, if the sample data indicates that 95% of users associated with Group 1 also have characteristic B and none of the users associated with Group 1 have characteristic C, the computer system 210 may set characteristic B as inclusion criteria for Group 1 participants, and characteristic C as exclusion criteria for Group 1 participants. In this way, the computer system 210 can enroll participants who more accurately represent the larger reference set (e.g., the reference population).

The computer system 210 may make various recommendations or take various actions based on the determined diversity level(s). These diversity measures may be, for example, compared by the computer system 210 to one or more thresholds that correspond to particular recommendations and/or actions.

As another example with respect to the first stage 232, the cohort diversity measures 230 may also include an indications of determinations made by the computer system 210 with respect to whether the question/objective is too limited. For example, the computer system 210 may generate a warning if it determines that a study objective set by the researcher 202 will result in a restrictive FDA label. The computer system 210 may also generate a recommendation or identify an action to perform as part of the cohort diversity measures 230. For example, if the objective is to study the effects of a particular treatment on a small population segment, the computer system 210 may generate a recommendation to modify the objective to take into account other population segments, such as similar population segments.

As another example, with respect to the second stage 234, the cohort diversity measures 230 may include indications of particular study parameters that disproportionately affect certain groups of the cohort composition target 224. For example, the computer system 210 may generate a warning for a study parameter that requires that participants have or use a smartphone upon determining that the study parameter is predicted to significantly reduce the enrollment of users belonging to an example Group A. The cohort diversity measures 230 may also include a recommendation for a revised study parameter, a replacement study parameter, a removal of the study parameter, or an addition of a study parameter (e.g., the providing a smartphone to users in Group A as part of the study). The recommendations may be specific to particular population groups. Instead of a recommendation, one or more of the actions may be automatically performed by the computer system 210. The cohort diversity measures 230 may additionally or alternatively include the reference composition 222 determined by the computer system 210 based on the study parameters.

As another example, with respect to the third stage 236, the cohort diversity measures 230 may include indications of particular study criteria that disproportionately affect certain groups of the cohort composition target 224. For example, the computer system 210 may generate a warning for an exclusion criterion that prevents those older than 65 years old from enrolling in the study upon determining that the majority of persons belonging to Group B that are likely to enroll are older than 65 years old and/or upon determining that persons belonging to Group B that are older than 65 years old are much more likely to be retained than those in Group B under 65 years old. Accordingly, the exclusion criterion may prevent or make it exceedingly difficult for the group composition 226 to reach the cohort composition target 224 by the end of the research study. The cohort diversity measures 230 may also include a recommendation for a revised inclusion criterion or exclusion criterion, a replacement inclusion criterion or exclusion criterion, a removal of an inclusion criterion or exclusion criterion, or an addition of an inclusion criterion or exclusion criterion. The recommendation may be specific to particular population groups. Continuing the earlier example, the computer system 210 may generate a recommendation to remove the age exclusion criterion for only those belonging to Group B (e.g., to account for the particular conduct of Group B participants while limiting the amount of risk introduced that comes from enrolling those of advanced age). The cohort diversity measures 230 may additionally or alternatively include the reference composition 222 determined by the computer system 210 based on the study parameters, the inclusion criteria, and/or the exclusion criteria.

As another example, with respect to the fourth stage 238, the cohort diversity measures 230 may include recommendations as to what candidates should be invited for enrollment in the study, and/or what candidates should be accepted for enrollment if there are a group of applicant candidates. The cohort diversity measures 230 may also include a determined group composition for the recommended invitees/applicants, for the predicted cohort of enrolled participants at the start of the study (e.g., based on a prediction of what percentage of invitees from the different groups are expected to enroll), and for the predicted cohort of enrolled participants at the end of the study (e.g., based on a prediction of what percentage of the invitees from the different groups are expected to enroll and expected to be retained/remain active). The recommendation may be specific to particular population groups. As an example, the computer system 210 may generate a recommendation to invite 25% more candidates from Group B than from Group A based on historical data indicating that those from Group A are 20% more likely to enroll than those from Group B. Instead of generating a recommendation to send to the client device 204, the computer system 210 may perform one or more actions automatically. For example, the computer system 210 may automatically determine which candidates from an applicant pool to enroll, and/or which candidates from a candidate pool (e.g., previous study participants, previous study applicants, previous study participants that completed their respective studies, etc.) to invite.

As another example, with respect to the fifth stage 240, the cohort diversity measures 230 may include an updated group composition 226 based on the enrolled participants and an updated prediction for the group composition 226 at the end of the study (e.g., based on the past behaviors and/or trends of the different groups). The cohort diversity measures 230 may include an indication of the results of a comparison between the updated prediction for the group composition 226 at the end of the study and the cohort composition target 224. For example, the cohort diversity measures 230 may include warning that indicates too many persons from Group A have enrolled relative to the number of persons from Groups B and C that have enrolled. The cohort diversity measures 230 may also include recommendations corresponding to the enrolled participants. For example, if more candidates from Group A enrolled than was anticipated, the recommendations may include removing one or more of the participants from Group A (e.g., those that have been identified as the least reliable/active from historical data and/or stored user profile information in the database 212), to send new invites to candidates of Groups B and C, and/or to revise the study parameters, the inclusion criteria, and/or the exclusion criteria in order to increase the retention of those in Groups B and C. As an example, due to a low enrollment of Group C participants and trend of poor retention of Group C participants when they are required to visit medical offices, the computer system 210 may determine as a recommendation a support option to account for the identified problem. For example, the computer system 210 may determine a first recommendation to provide Group C participants taxi fare to counter the known cause of the poor Group C retention, and a second recommendation to allow Group C participants to make their appointments through telehealth services.

In some cases, the fourth stage 238 and the fifth stage 240 are part of the same stage. For example, if there are pool of candidates who have applied, selecting the cohort from the applicant pool may include enrolling those selected as participants for the study.

As another example, with respect to the sixth stage 242, the cohort diversity measures 230 may include an updated group composition 226 based on the remaining enrolled participants and an updated prediction for the group composition 226 at the end of the study. For example, the computer system 210 can take into account participants that have left the study or that are no longer active. The cohort diversity measures 230 may include an indication of the results of a comparison between the updated prediction for the group composition 226 at the end of the study and the cohort composition target 224. For example, the cohort diversity measures 230 may include warning that indicates too many persons from Group B are at risk of being removed from the study due to low activity, and/or that it is unlikely that the cohort composition target 224 can be reached based on observed data for Group B and previously determined trends for Group B. The cohort diversity measures 230 may also include recommendations corresponding to the enrolled participants. For example, the computer system 210 may recommend adding one or more study parameters specific to participants in Group B that have previously worked to increase participation.

Many different research studies are conducted every year, including clinical studies for new treatments and medications. However, health care disparities are an issue plaguing various research studies that can arise due to a failure to take into account certain segments of a population. Particular segments of the population, such as older adults, pregnant women, children, and racial and ethnic minorities are affected in different ways but are often underrepresented in research studies. As a consequence, the results of these research studies may have limited applicability, particularly for those in the underrepresented segments of the population. This often leads to health care disparities such that there is incomplete or unreliable information as to how those segments of the population will be affected, which can prevent, for example, new medications and treatments from being safely administered to those segments of the population. Moreover, many current studies fail to take into account behavioral variation among the different segments of the population. This often leads to lower enrollment and retention of some segments of the population.

The techniques discussed herein enable the computer system 210 to detect and correct for bias and underrepresentation of different population segments at many stages throughout the research study process. As noted above, the computer system 210 can calculate diversity metrics and impacts of different factors in a study on different segments, when defining a research question (232), when setting study parameters (234), when setting cohort inclusion and exclusion criteria (236), when selecting members of cohorts (238), enrolling participants (240), and when conducting a research study and monitoring results (242). At each stage, the computer system 210 can assess levels of representation to verify that the needed diversity is present both for the current study data and cohort, as well as for the ultimate outcomes for the study (e.g., for the group within the cohort that is retained to completion of the study, and the data set obtained by the end of the study). At each stage, the computer system 210 can assess diversity and alert a study administrator if the composition deviates from a target composition by more than a predetermined amount (e.g., exceeds a threshold level of difference for at least one segment of interest). The computer system 210 can also identify and recommend actions, e.g., changes to the study parameters or group of individuals selected as a cohort that will improve the distribution or composition of the cohort toward target levels representing the desired level of diversity.

Figure 3:
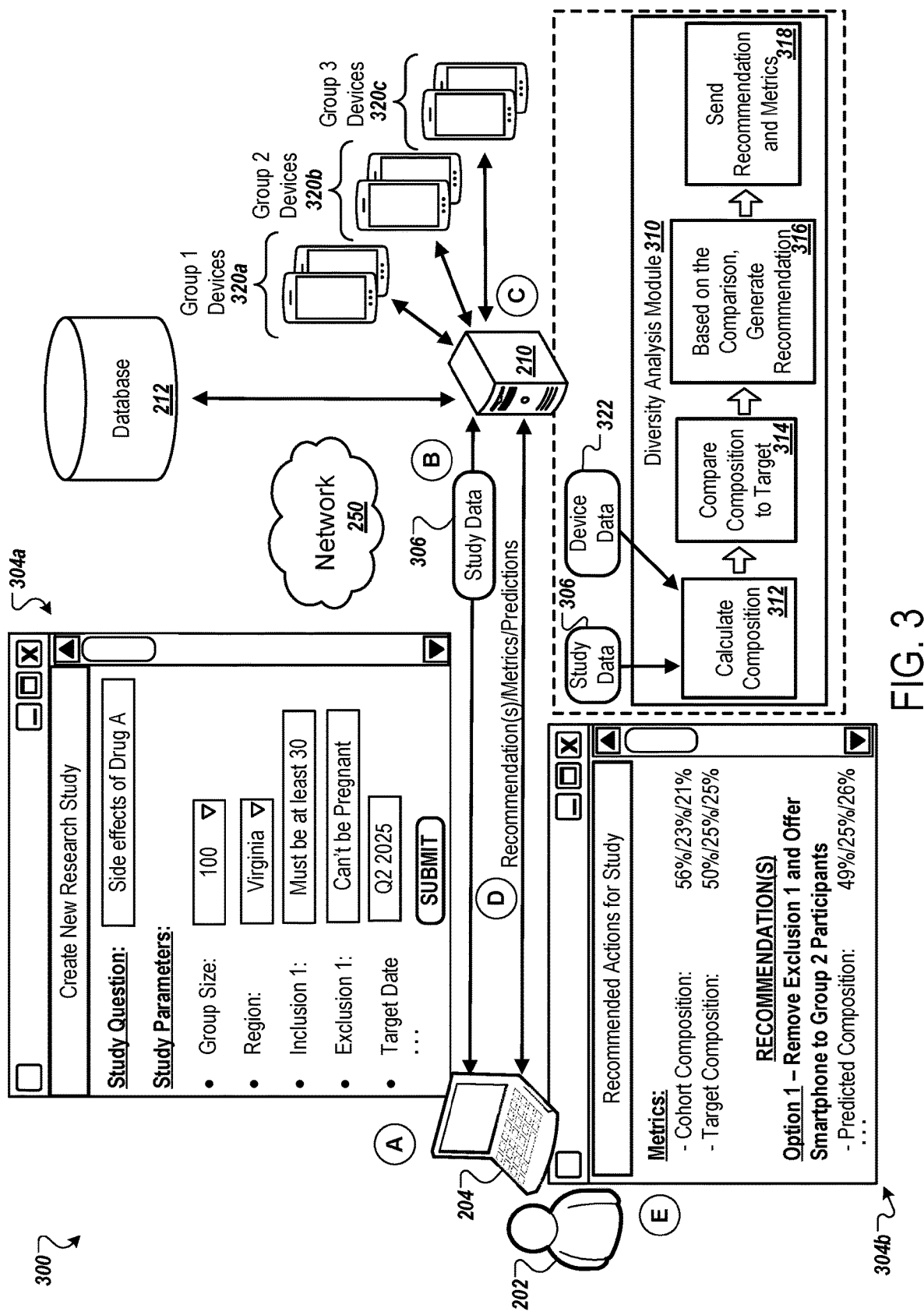
FIG. 3 is a diagram that illustrates an example system and process for performing diversity assessment and action selection for a new research study.

FIG. 3 is a diagram that illustrates one or more components of the system 200 and a process for performing diversity assessment and action selection for a new research study.

In general, FIG. 3 illustrates the researcher 202 initiating a research study through the client device 204. The computer system 210 can use the information received from the client device 204 to calculate one or more diversity measures, such as the reference population for the study, the reference composition, and the target composition. The computer system 210 may also invite users to enroll in the study and/or enroll users in the study based on the received information. Based on the users that enrolled and their associated groups, the computer system 210 may generate and transmit to the client device 204 a recommendation to improve the diversity of the study participants.

FIG. 3 illustrates various operations and flows of data represented as stages (A)-(E), which can be performed in the order shown or in a different order. For example, one or more of the stages (A)-(E) can occur concurrently.

As illustrated, in stage (A), the researcher 202 may be presented an interface 304a of the client device 204 to create a new research study and/or to set a new research question. The researcher 202 may interact with one or more interface elements in the interface 304a to set a study question, to set study parameters, to set inclusion criteria, and/or to set exclusion criteria.

In stage (B), after providing the study question and/or the corresponding study parameters, the researcher 202 may submit the new study to the computer system 210. For example, in response to receiving an indication that the researcher 202 has selected a "Submit" interface element, the client device 204 may generate and transmit study data 306 to the computer system 210 over the network 250.

The study data 306 may include, for example, a study question or research objective, study parameters, inclusion criteria, and/or exclusion criteria. In some cases, the study data 306 may only include the study question or research objective. The computer system 210 may automatically select the study parameters, inclusion criteria, and/or exclusion criteria based on the study question/research objective and/or based on default values. Alternatively, the researcher 202 may set the study parameters, the inclusion criteria, and/or the exclusion criteria at a later time, e.g., after the computer system 210 has performed a diversity analysis of the study question or research objective.

In stage (C), in response to receiving the study data 306, the computer system 210 may perform a diversity analysis using the study data 306. In performing the diversity analysis, the computer system 210 may calculate the cohort diversity measures 230 discussed above with respect to FIG. 2. The computer system 210 may, for example, use a diversity analysis module 310 to perform the diversity analysis based on the study data 306 and/or device data 322, to generate recommendations based on the diversity analysis, and/or to perform one or more actions based on the diversity analysis. The device data 322 may include data received from or generated for Group 1 devices 320a that correspond to a first group of users (e.g., candidates or enrolled participants), Group 2 devices 320b that correspond to a second group of users (e.g., candidates or enrolled participants), and/or Group 3 devices 320c that correspond to a third group of users (e.g., candidates or enrolled participants). The Group 1 devices 320a, the Group 2 devices 320b, and the Group 3 devices 320c may represent three groups of devices whose corresponding users are candidate participants for the study. As an example, these devices may represent all users (e.g., previous study participants; previous study applications; current study applications; etc.) who meet the inclusion criteria and do not meet the exclusion criteria. Similarly, these devices may represent users who the computer system 210 has invited to enroll in the study. As another example, these devices may represent the users who have enrolled in the study.

The device data 322 may indicate, for example, data received from at least a subset of the Group 1 devices 320a, the Group 2 devices 320b, and/or the Group 3 devices 320c. For example, the device data 322 may include responses to invitations to enroll in the study. The device data 322 may, therefore, indicate each of the users that have been invited to enroll in the study and have agreed to enroll in the study. Similarly, the device data 322 may include data indicating which users have enrolled in the study. The device data 322 may also or alternatively indicate other information such as which invitations to enroll have successfully been transmitted to the users (e.g., to their corresponding device), which users have viewed an invitation to enroll (e.g., but have not yet responded), the percentage of users by group that have responded positively to an invitation to enroll, the percentage of users by group that have responded negatively to an invitation to enroll, etc.

As part of the diversity analysis, the diversity analysis module 310 of the computer system 210 may perform an operation 312 of calculating a composition to use for the study based on the study data 306 and/or the device data 322. The composition may be current group composition or a predicted composition at a future point in time, such as at the end of the study (e.g., determined based on machine learning models or statistical data indicating the predicted compliance or retention levels for different groups). The composition may be, for example, the group composition 226 shown in FIG. 2. As an example, the diversity analysis module 310 may use the device data 322 indicating which devices (and their corresponding users) have responded positively to an invitation to enroll in the study. That is, the device data 322 may indicate which users have enrolled in the study. The diversity analysis module 310 may use the device data 322 to determine the current group composition (e.g., participants who are currently enrolled), or a predicted group composition (e.g., at the time of enrollment, or at the time of study completion).

In some cases, the diversity analysis module 310 may use the device data 322 to update the database 212. For example, the diversity analysis module 310 may simply store the device data 322 on the database 212. As another example, as explained in more detail below with respect to FIG. 4 and FIGS. 6A-6B, the diversity analysis module 310 may use the device data 322 to update trend data associated with different user groups. This trend data may be stored in the database 212, and used by the diversity analysis module to make predictions and/or recommendations. For example, the diversity analysis module 310 may update trend data in the database 212 corresponding to the likelihood of a Group 1 users accepting invitations to enroll in a study based on the number of invitations successfully transmitted to the Group 1 devices 320a and the number of positive responses received from the Group 1 devices 320a as provided in the device data 322.

The diversity analysis module 310 performs a second operation 314 of comparing the group composition to a composition target, such as the cohort composition target 224 shown in FIG. 2. The composition target may be set by the researcher 202 and be part of the study data 306. Alternatively, the computer system 210 may determine the cohort composition target based on the study data 306. For example, the computer system 210 may first determine a reference composition based on the study data 306. As an example, the computer system 210 may use the region parameter (Virginia) and the target date parameter (Q2 2025) to determine the reference composition. Specifically, the computer system 110 may use the two parameters and corresponding data stored in the database (e.g., trend data, population data, etc.) to estimate the population composition in the region at the target date (e.g., the ethnic population composition of Virginia in the year 2025). The computer system 110 may proceed to set this estimated population composition as the reference composition.

From the reference composition, the diversity analysis module 310 may determine the cohort composition target. For example, the diversity analysis module 310 may use the inclusion criteria of "must be at least 30" and the exclusion criteria of "cannot be pregnant" to limit the population of the reference composition to only those who are over 30 and/or are not pregnant. The diversity analysis module 310 may calculate the cohort composition target 224 from the reference composition using the identified subset of the population. In some cases, the diversity analysis module 310 may detect diversity issues, such as that the inclusion criteria and/or the exclusion criteria are too limiting (e.g., to specific groups). For example, the diversity analysis module 310 of the computer system 210 may generate a warning if the updated population to use for the cohort composition target 224 excludes or significantly reduces the representation of certain segments in the reference population.

In comparing the group composition to the composition target, the diversity analysis module 310 may determine if the group composition matches the composition target, is within a threshold percentage (e.g., for any one group) of the composition target, and/or falls within an acceptable target diversity range (e.g., calculated based on the composition target).

The diversity analysis module 310 performs a third operation 316 of generating a recommendation to send to the client device 204 based on the results of the comparison. In generating a recommendation, the diversity analysis module 310 may perform a statistical analysis to identify one or more actions to include in the recommendation. The statistical analysis may be based on identified correlations between different parameters, criteria, and/or actions and certain participant groups and/or group trends. For example, historical data may indicate that past participants associated with Group C have a very low percentage of attending medical appointments, and that previously performed actions of providing taxi credits was typically effective at improving the visit attendance of participants in this group. Accordingly, if the diversity analysis module 310 identifies an issue where participants of Group C are not attending medical appointments, the computer system 210 may recommend that the researcher 202 provide the Group C participants with a taxi credit. The computer system 210 may also make this recommendation prior to any attendance issue being observed, to prevent such an issue from arising.

Additionally or alternatively, in generating the recommendation, the diversity analysis module 310 may use one or more machine learning models to select one or more actions to recommend. As an example, the diversity analysis module 310 may provide an input vector describing the characteristics of the study, such as the cohort composition target, as input to a machine learning model. The diversity analysis module 310 may additionally or alternatively provide a second input vector describing the current characteristics of the cohort, such as the group composition 226, as input to the machine learning model. The output of the machine learning model may be a vector containing a series of values. Each value may correspond to a particular action such that a relatively higher value indicates that a particular action corresponding to the value is better suited for recommendation and/or performance given the input data.

As an example, the diversity analysis module 310 may determine that the exclusion criterion of preventing those who are pregnant from joining the study will be too detrimental to certain population groups. If reference population of the calculated composition may correspond to persons who are likely to take "Drug A" for the treatment of a certain condition and the diversity analysis module 310 determines that a large percentage of persons who are anticipated to take Drug A are pregnant women, then the diversity analysis module 310 may generate update the cohort composition target to include pregnant women as a first group. The diversity analysis module 310 may proceed to generate a diversity warning based on a comparison of the group composition containing no pregnant women to the updated cohort composition target that now includes pregnant women as a group. In response to the warning, the diversity analysis module 310 may provide an input vector describing the characteristics of the study, the updated cohort composition target, and the group composition to a set of machine learning models. The output of the machine learning models may indicate one or more recommended actions to perform in order to achieve the cohort composition target. For example, the output of the machine learning models may correspond to an action of removing the exclusion criterion of preventing pregnant women from joining the study, as this has the most significant and detrimental effect on the group composition 226 with respect to pregnant women and prevents the cohort composition target from being achieved. Be removing this exclusion criterion, pregnant women will be permitted to join the research study which may allow the cohort composition target that includes pregnant women to be achieved.

The diversity analysis module 310 may also calculate metrics corresponding to a recommendation. For example, the diversity analysis module 310 may calculate the potential effects of the recommendation on group enrollment (e.g., likelihood of enrollment), of group composition (e.g., at start of study, at the end of the study, etc.), on the likelihood of reaching the cohort composition target, etc.

In stage (D), the diversity analysis module 310 performs a fourth operation 318 of generating instructions for the computer system 210 to send the recommendation and corresponding metrics to the client device 204 over the network 250. The metrics may also include the calculated reference composition, the cohort composition target, a current group composition, and/or a predicted group composition at a future point in time (e.g., at the end of the study).

In stage (E), the client device 204 presents a recommendation interface 304b to the researcher 202. The recommendation interface 304b may depict the diversity metrics such as the cohort/group composition and the cohort composition target. The recommendation interface 304b may also present one or more recommendations, and their corresponding effects on cohort diversity. If multiple recommendations are presented, the recommendations may be presented in an order corresponding to what actions or groups of actions are most likely to succeed in reaching the cohort composition target 224, or most likely to get sufficiently close to the cohort composition target 224.

As discussed in some detail above, the diversity analysis module 310 may use one or more algorithms to perform the diversity analysis, generate the diversity measures 130, and/or generate recommendations. For example, the diversity analysis module 310 may use one or more static algorithms to calculate the group composition at a future point in time using previously obtained data or previously determined trends (e.g., generated using previously obtained data) for those groups of users (e.g., indicating the expected or average percentage of users in a particular group completing a study). The diversity analysis module 310 may additionally or alternatively use one or more machine learning algorithms trained to predict the group composition at a future point in time, and/or trained to select actions to perform and/or predict the diversity effects of those actions. The one or more machine learning algorithms may be trained using historical data that indicates the behavior of past study participants (e.g., an indication as to whether they completed or unenrolled from a study, an activity level of the participant during the study, etc.), the groups that the participants belong to, and/or the study parameters (e.g., inclusion criteria, exclusion criteria, other requirements or study parameters).

As input (e.g., an input vector), the one or more machine learning algorithms may receive an indication of the participants currently enrolled in the study and/or the group composition (e.g., group composition 226), and the current study parameters (e.g., including inclusion criteria and exclusion criteria). Other input may include an indication of the observed activity levels of users and/or groups for this study, and/or an enrollment trend of users and/or groups for this study.

With respect to machine learning algorithms configured to predict the group composition at the end of the study, the output (e.g., an output vector) of the machine learning algorithm may include a vector of values that correspond to different group composition possibilities. The highest value may indicate the most likely group composition that will be observed at the end of the study.

With respect to machine learning algorithms configured to select actions and/or predict the effects of actions, the output (e.g., an output vector) of the machine learning algorithms may include a vector of values corresponding to different actions and/or different combinations of actions. The highest value may indicate the highest recommended action or combination of actions, corresponding to the action or combination of actions that is most likely to result in achieving the cohort composition target, getting sufficiently close to the cohort composition target, and/or getting closer to the cohort composition target than other actions or combinations of actions.

Figure 4:
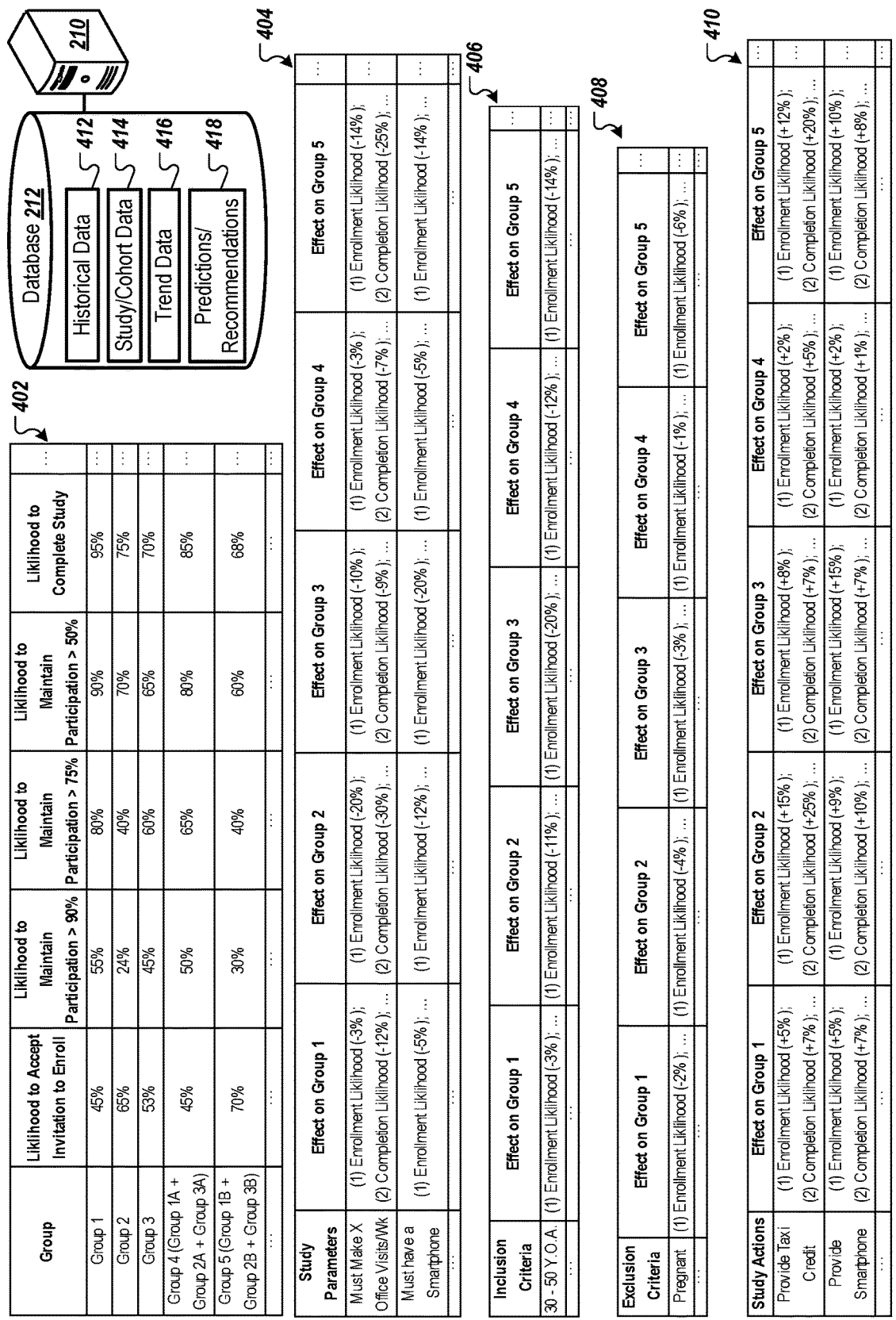
FIG. 4 is a diagram that illustrates example tables used for diversity assessment and action selection.

FIG. 4 is a diagram that illustrates example tables 402-410 used for diversity assessment and action selection. The tables 402-410 may be generated, updated, and referenced by the computer system 210. The computer system 210 may use the information in the tables 402-410 to perform a diversity analysis, calculate diversity measures (e.g., including diversity levels), and generate recommendations. The computer system 210 may store the tables 402-410 in the database 212.

Importantly, the tables 402-410 indicate the different effects that different monitoring program parameters have on the actions of individuals in different groups. For example, one element, such as a requirement of an in-person visit, may have a high negative effect on enrollment or compliance of members of one group but may have a less negative effect, or a neutral or positive effect on enrollment or compliance of members of another group. The computer system 210 analyzes the records of prior actions to characterize or profile the correlations between different factors and the resulting observed outcomes. This allows the system to quantify the potential bias that different factors cause on enrollment, compliance, and retention. It also provides the source data that the system 210 can use to trace the causes of low enrollment, compliance and retention in monitoring programs and signals to the system 210 the opportunities to address factors that may be harming monitoring program outcomes. For example, the system 210 can detect that compliance among a particular group is low, identify from the tables a data collection action that is correlated with low compliance, and then select an alternative method of collecting the data that the tables indicate has a higher likelihood of compliance As an example, the tables 402-410 may be generated by the computer system 210 using historical data 412 and study/cohort data 414 (e.g., data collected from study participants, diversity analyses during a study, etc.). The tables 402-410 may represent determined trend data 416 and/or predictions/recommendations 418 corresponding to different participant groups.

As illustrated, different groups of participants may be associated with different behaviors during a research study, and/or are likely to react differently to particular actions, study parameters, inclusion criteria, and/or exclusion criteria. By identifying how different groups are likely to behave and/or react, a study can be generated and conducted in a manner to ensure (or significantly increase the likelihood) of achieving a set cohort composition target by the end of the study.

A first table 402 indicates example trends in activities levels and study completion rates for different groups. The computer system 210 may generate the first table 402 using historical data 412. The historical data 412 may include, for example, enrollment data from one or more past studies, participation data from one or more past studies, participant profiles corresponding to participants in one or more past studies, etc. The participant profiles may include data that indicates one or more groups associated with the participants, such as demographic and/or non-demographic information of the participants. The participant profiles may include enrollment data (e.g., an indication of how many studies that the participant has been invited to join, has applied for, has enrolled in, etc.) and/or participation data (e.g., average participation level of the participant, how often the participant remained an active participant, etc.). The computer system 210 may update the table 402 using study/cohort data, which may include, for example, data measured, observed, or received during a research study such as one currently being conducted.

The first table 402 may be part of trend data 416 that is generated by the computer system 210 based on the historical data 412 and/or the study/cohort data 414. The computer system 210 may refer to the table 402 in order to generate predictions and/or recommendations 418.

A second table 404 indicates the predicted effects of particular study parameters on different groups. The effects may include, for example, anticipated changes to study enrollment, participation, and/or completion likelihood for each group. The second table 404 may be generated by the computer system 210 using the historical data 412. The second table 404 may be updated by the computer system 210 using the study/cohort data 414.

The second table 404 may be part of trend data 416 that is generated by the computer system 210 based on the historical data 412 and/or the study/cohort data 414. The computer system 210 may refer to the table 404 in order to generate the predictions and/or recommendations 418.

A third table 406 indicates the predicted effects of particular inclusion criteria on different groups. The effects may include, for example, anticipated changes to study enrollment, participation, and/or completion likelihood for each group. The third table 406 may be generated by the computer system 210 using the historical data 412. The third table 406 may be updated by the computer system 210 using the study/cohort data 414.

The third table 406 may be part of trend data 416 that is generated by the computer system 210 based on the historical data 412 and/or the study/cohort data 414. The computer system 210 may refer to the third table 406 in order to generate the predictions and/or recommendations 418.

A fourth table 408 indicates the predicted effects of particular exclusion criteria on different groups. The effects may include, for example, anticipated changes to study enrollment, participation, and/or completion likelihood for each group. The fourth table 408 may be generated by the computer system 210 using the historical data 412. The fourth table 408 may be updated by the computer system 210 using the study/cohort data 414.

The fourth table 408 may be part of trend data 416 that is generated by the computer system 210 based on the historical data 412 and/or the study/cohort data 414. The computer system 210 may refer to the fourth table 408 in order to generate the predictions and/or recommendations 418.

A fifth table 410 indicates the predicted effects of particular study actions on different groups. The effects may include, for example, anticipated changes to study enrollment, participation, and/or completion likelihood for each group. The fifth table 410 may be generated by the computer system 210 using the historical data 412. The fourth table 408 may be updated by the computer system 210 using the study/cohort data 414.

The fifth table 410 may be part of trend data 416 that is generated by the computer system 210 based on the historical data 412 and/or the study/cohort data 414. The computer system 210 may refer to the fifth table 410 in order to generate the predictions and/or recommendations 418.

The computer system 210 may generate the predictions and/or recommendations 418 for a particular study by applying the trend data 416 to the measured study/cohort data 414. For example, based on the likelihood of Group 2 participants enrolling in a study being higher than Group 3 participants, the computer system 210 may recommend that less Group 2 participants be invited to enroll in the study if the same number of participants from Groups 2 and 3 are being sought.

FIGS. 5A-5B are diagrams that illustrate example diversity assessment interface and action selection interfaces 502a-502c. These interfaces 502a-502c may be presented on the client device 204 of the researcher 202. The client device 204 may present the interfaces 502a-502c at one or more stages of the study based on information received from the computer system 210. As will be described in more detail below, the interfaces 502a-502c may present diversity measures calculated by the computer system 210, the results of a diversity analyses performed by the computer system 210, and/or recommendations generated by the computer system 210. The researcher 202 can interact with the interfaces 502a-502c to make various selections, such as the selections of recommendations, to make modifications (e.g., modifications to a recommendation), or to initiate one or more actions to take (e.g., one or more actions that were not recommended by the computer system 210 that the researcher 202 indicates that the computer system 210 should perform).

As will be discussed in more detail below, the recommendations may be ranked and presented in an order corresponding to their rank. The researcher 202 may interact with the interface 502a to select actions to finalize a monitoring program, adjust a monitoring program, select recommended actions to adjust a monitoring group, or make other adjustments.

FIG. 5A illustrates example diversity assessment and action selection interface 502a during a cohort selection stage of a study. The interface 502a may be presented on the client device 204. As an example, the interface 502a may be presented on the client device 204 after (e.g., in response to) the researcher 202 submitting a research question or study objective (e.g., optionally along with other study information initially submitted by the researcher 202). The interface 502a may present various diversity metrics calculated by the computer system 210 and recommendations generated by the computer system 210. The researcher 202 may interact with the interface 502a to, for example, select a recommendation for the computer system 210 to perform, adjust study parameters, select users to enroll in a study, select users to be invited to the study, etc.

The interface 502a includes a monitoring program elements section 1610, a diversity analysis results section 520a, and a recommendation section 530a. The researcher 202 may, for example, use the interface 502a to review recommendations generated by the computer system 210 at a beginning stage of the study. The researcher 202 may, through the interface 502a, select one or more recommended actions to be performed.

The researcher 202 may be able to also use the interface 502a to indicate one or more actions to be performed, e.g., that may not have been recommended. For example, the researcher 202 may, through the interface 502a, add or remove an exclusion criterion to or from the exclusion criteria 516.

As shown, the monitoring program elements section 510a may include various parameters for a given study. For example, the monitoring program elements section 510a may include a cohort size 511, a study length 512, a study region 513, study requirements 514, and a target date 517.

In addition to study parameters, the study criteria 510a may also include inclusion criteria 515a that enrolled participants are required, at a minimum, to meet, and exclusion criteria 516. If a candidate happens to meet any of the exclusion criteria 516, that candidate is automatically excluded from consideration, e.g., even if they meet the inclusion criteria 515a and any other requirements in the study criteria 510a. Similarly, if new information is obtained that indicates that an enrolled participant meets an exclusion criterion, the computer system 210 may automatically remove the participant from enrollment.

However, in some cases, the computer system 210 generates a warning indicating the problem, and transmit the warning to the client device 204. The computer system 210 may refrain from removing the participant until it receives a confirmation or instructions to do so from the client device 204. The computer system 210 may, however, change how it interacts with the participant. For example, if the study involves taking a new drug, the computer system 210 may send a notice to the participant to immediately stop taking the drug, to contact their doctor, to go to the hospital, etc. Depending on the possible severity associated with the exclusion criteria (e.g., increased likelihood of a serious allergic reaction by 500%), the computer system 210 may contact a doctor for the participant and/or emergency services for the participant (e.g., if the participant does not respond to an initial message with a threshold amount of time).

The study criteria may be set by the researcher 202, the computer system 210, or a combination of the researcher 202 and the computer system 210.

The diversity analysis results section 520a depicts the results of a diversity analysis performed by the computer system 210 at the start of a study. The diversity analysis presented may be based on a research question provided by the researcher 202 and/or the study criteria 510a. This diversity analysis may reflect a diversity analysis performed before any participants have been enrolled in the study, and/or before any candidates have been invited to participate in the study.

As shown, the diversity analysis may include a determined reference population 521, a target group composition 522 (e.g., for the enrolled participant at the completion of the study), and identified previous participants 535. The identified previous study participants 523 may be all participants that are relevant to the study. For example, if the study calls for monitoring participants from Group 1, Group 2, and Group 3, the previous study participants 523 may include all previous participants of those groups. As another example, the previous study participants 523 may include only those participants that meet the study criteria 510a, e.g., meet the requirements 514, meet the inclusion criteria 515a, don't meet any of the exclusion criteria 516, live in or sufficiently near the study region 513, etc.

In some cases, the previous study participants 523 may also include participants who have registered for a study (e.g., registered for this current study) but have not necessarily participated in or completed a previous study.

The recommendation section 530a may include one or more recommendations generated by the computer system 210 using the diversity analysis results. The computer system 210 may generate one or more recommendations using the diversity analysis results in order to achieve the target group composition 522.

As shown, a first recommendation option 532 is displayed in the interface 502a and has been selected (e.g., by the researcher 202). This recommendation option 532 includes a modification to the study criteria 510a. Specifically, the recommendation option 532 provides for removing one of the inclusion criterion from the inclusion criteria 515a. The recommendation option 532 also provides that invitations to enroll will be sent to all previous study participants 523, which includes, for example, 915 participants from Group 1, 211 participants from Group 2, and 201 participants from Group 3. The previous study participants 523 may be limited to those participants that have successfully completed a study, that completed a study with an average activity level that meets a threshold activity level, that maintained an activity level above a threshold activity level, that participated in a threshold number of previous studies, that completed a threshold number of previous studies, etc.

The recommendation section 530a also includes a second recommendation option 534. The computer system 210 may provide for presenting the recommendation option 532 above the recommendation option 534 based on an anticipated diversity level associated with the recommendation option 532 being greater than an anticipated diversity level associated with the recommendation option 534. That is, the computer system 210 may rank the different recommendation options and display the different recommendations options in accordance with their respective ranks.

The diversity level may indicate how close the predicted group composition at study completion is to the target group composition. The diversity level may be, for example, a diversity score. That is, the diversity level may be a single value that is indicative of how close the predicted group composition at study completion is to the target group composition. As an example, a diversity score of 1.0 may indicate that the predicted group composition at study completion matches the target group composition 522. The diversity score may be absolute, or it may be relative, e.g., relative to a previously predicted group composition at study completion or relative to the predicted group composition at study completion of one or more other recommendation options. Additionally or alternatively, the diversity level may be, for example, a calculated distribution (e.g., probability distribution). This diversity distribution may, for example, indicate probabilities of achieving the target group composition 522 (e.g., after performing actions corresponding to a particular recommendation option) and/or probabilities associated with different possible group compositions at study completion.

The diversity level can indicate a level of confidence in achieving the target group composition 522, and/or achieving a group composition that is with an acceptable range (e.g., a percentage range or value range) of the target group composition 522. For example, a diversity score of 0.91 may indicate that the computer system 210 has determined that there is 91% possibility of the group composition at study completion being within a threshold percentage (e.g., 5%, 3%, 1%, etc.) of the target group composition 522 provided that the actions corresponding to the recommendation option 532 are performed.

Diversity level may also or alternatively describe a group composition, or the difference between a group composition (e.g., current or predicted) and the target group composition 522. For example, a predicted group composition at study enrollment may be a first diversity level, a predicted group composition at study completion may be a second diversity level, and a difference (e.g., difference between two sets of values, absolute value of the difference between the two sets of values, etc.) the group composition at study completion and the target group composition 522 as a third diversity level.

In some cases, there are multiple diversity levels (e.g., diversity metrics) that include both one or more singular values, and one or more distributions. For example, a first diversity level may include a diversity distribution indicating different likelihoods of achieving the target group composition 522, and a diversity score may be second diversity level identified from the diversity distribution (e.g., as the value associated with the highest probability out of the all of the values).

As discussed above, the computer system 210 may rank the recommendations based on one or more diversity metrics (e.g., diversity levels) calculated for the recommendations. For example, the computer system 210 may rank the recommendations presented in the recommendation section 530*a* according to a calculated anticipated diversity score for each of the recommendations (e.g., that indicates the anticipated diversity of the cohort at the end of the study should the actions in the corresponding recommendation be performed). The anticipated diversity score is likely to be higher if the actions in a recommendation are predicted to produce a group composition that matches or gets sufficiently close (e.g., with respect to the performance of actions in other recommendations) to the target group composition 522. The computer system 210 may provide instructions to the client device 204 to have the recommendations presented on the interface 502*c* according to their rank. For example, the computer system 210 may provide instructions to the client device 204 to present the recommendation option 532 above the recommendation option 534 based on the anticipated diversity score (e.g., at the end of the study) associated with the recommendation option 532 being greater than the anticipated diversity score associated with recommendation option 534. By ranking the recommendations according to their influence in achieving the target group composition 522 and, therefore, their influence in on the study's ability to produce viable data, the computer system 210 can (i) more efficiently present its recommendations to the researcher, and/or (ii) take greater advantage of the limited screen space available on the client device 204 (or a display connected to the client device 204).

In some implementations, computer system 210 may only recommend a threshold number of recommendation options (e.g., for display on the client device 204) and/or only send a threshold number of recommendation options to the client device 204. For example, the computer system 210 may only recommend the two, three, or four highest ranking recommendation options for display on the client device 204. The threshold may be selected by the researcher 202 or may be automatically determined by the computer system 210. As an example, the computer system 210 may determine the threshold based on diversity scores associated with the different recommendations, and/or based on the difficulty of the actions in the recommendation options. In more detail, the computer system 210 may generate instructions to present less recommendation options if there are significant diversity score differences (e.g., greater than 5%, 10%, or 20% divergence with respect to the top three, four, or five highest ranking recommendation options) between the different recommendation options such that there are recommendation options that are clearly superior to other recommendation option, or may present more recommendation options if there are insignificant diversity score differences between the different recommendation options (e.g., less than 2%, 5%, or 10% divergence with respect to the top three, four, or five highest ranking recommendation options) such that there are multiple recommendation options that are likely to produce similar diversity results. By presenting only a subset of recommendations, the computer system 210 can (i) more efficiently present the key recommendations to the researcher, and/or (ii) take greater advantage of the limited screen space available on the client device 204 (or a display connected to the client device 204) by removing the need to devote screen space to recommendations that are unlikely or less likely to achieve the diversity needs of the study.

Prior to recommending a set of actions, the computer system 210 may first ensure that the corresponding prospective recommendation meets certain criteria. For example, the computer system 210 may first apply a minimum anticipated diversity level threshold to the recommendation before it can be presented on a display of the client device 204 and/or sent to the client device 204. For example, the computer system 210 may apply a static threshold of 0.90 to the anticipated diversity level. This would have the effect of permitting only the first recommendation option 532 from being displayed in the interface 502*a*. The diversity level threshold may instead be dynamic, e.g., based on a current anticipated diversity level, based on historical data for the groups being invited to participate in the study, based on the trends for the groups being invited to participate in the study, etc. For example, the computer system 210 may only allow recommendations that result in the anticipated diversity level improving by at least 5% with respect to a current anticipated diversity level at completion. By presenting only a subset of recommendations that meet certain quality criteria, the computer system 210 can (i) more efficiently present the key recommendations to the researcher that are likely to have a minimum beneficial effect on meeting the diversity needs of the study, and/or (ii) take greater advantage of the limited screen space available on the client device 204 (or a display connected to the client device 204) by removing the need to devote screen space to recommendations that are unlikely or less likely to achieve the diversity needs of the study.

The recommendations determined by the computer system 210 may also include recommendations to mitigate risks presented by the inclusion of high risk groups in the study. The inclusion of these high risks groups can benefit the diversity of the study so that the study can achieve its diversity needs (e.g., the target group composition 522, a minimum number of participants from Group 1, a minimum number of participants from Group 2, a minimum number of participants from Group 3, a minimum activity level for each of the participants or minimum average activity level for each group of participants, etc.). However, the inclusion of these high risk groups can also present additional risks that may need to be mitigated in other ways, such as through the addition, removal, or modification of study parameters (or for the provision other study actions) for those participants in these at risk groups.

The computer system 210 may identify a group of persons as at risk based on the group being tagged or preprogramed as at risk in the database 212 (e.g., tagged by the researcher 202 or tagged by a previous researcher) such as elderly persons, based on historical data showing disproportionately high incidents (e.g., side effects from pharmaceuticals, hospitalizations, death, etc.) for those in the at risk group, etc. After determining that one or more participants in the at risk group are to be enrolled in the study or invited to enroll in the study, the computer system 210 may generate one or more recommendations to mitigate the risks presented to these groups, such as a recommendation to provide additional monitoring for those in the at risk group, a recommendation for more frequent data collection for those in the at risk group, a recommendation to reduce the medication dosage for those in the at risk group to spread the vaccine administration over a longer period of time for those in the at risk group, a recommendation for the medication or vaccine to be administered only by a doctor, a recommendation for the medication or vaccine to be administered only by a doctor in a hospital, etc.

FIG. 5B illustrates example diversity assessment and action selection interface 502*b* during a participant enrollment stage of a study. The interface 502*b* may be presented on the client device 204. As an example, the interface 502*b* may be presented on the client device 204 at an enrollment stage of the study. Specifically, the interface 502*b* may be presented after (e.g., in response to) all or threshold percentage of users have responded to enrollment invitations, after a threshold amount of time has passed since enrollment invitations were sent out, after a threshold number of users have enrolled, etc. The interface 502*b* may present various diversity metrics calculated by the computer system 210 and recommendations generated by the computer system 210 for this stage of the study. The researcher 202 may interact with the interface 502*b* to, for example, select a recommendation for the computer system 210 to perform, adjust study parameters, select new users to enroll in a study, select new users to be invited to the study, select users to remove from enrollment, select users to have their invitations revoked, etc.

The interface 502*b* includes an updated study criteria section 510*b*, a diversity analysis results section 520*b*, and a recommendation section 530*b*. The researcher 202 may, for example, use the interface 502*b* to review recommendations generated by the computer system 210 at an enrollment stage of the study. The researcher 202 may, through the interface 502*b*, select one or more recommended actions to be performed.

The researcher 202 may be able to also use the interface 502*b* to indicate one or more actions to be performed, e.g., that may not have been recommended. For example, the researcher 202 may, through the interface 502*b*, add or remove an inclusion criterion to or from the inclusion criteria 515*b*.

As shown, the study criteria section 510*b* may include various parameters for a given study. For example, the study criteria section 510*b* may include a cohort size 511, a study length 512, a study region 513, study requirements 514, and a target date 517.

In addition to study parameters, the study criteria 510*b* also include updated inclusion criteria 515*b* and exclusion criteria 516. The inclusion criteria 515*b* has been updated based on a selected recommendation so that an inclusion criterion has been removed. This has the effect of increasing the candidate pool of potential participants.

The diversity analysis results section 520*b* depicts the results of a diversity analysis performed by the computer system 210 at an enrollment stage the study. The diversity analysis presented may be based on a research question provided by the researcher 202, the study criteria 510*b*, the candidates invited to enroll and/or the candidates that have applied to enroll, and/or the actual enrollment of the study.

As shown, the diversity analysis results section 520*b* may include the target group composition 522 (e.g., for the enrolled participant at the completion of the study), an enrolled group composition 524 (e.g., indicating the diversity of participants who have actually enrolled in the study), and a predicted group diversity at completion 525. The computer system 210 may determine the predicted group diversity at completion 525 based on, for example, a combination of historical data or trends determined from historical data, and the enrolled group composition 524.

The computer system 210 may compare the predicted group diversity at completion 525 to the target group composition 522. If the predicted group composition 525 falls outside of a target composition range (e.g., based on the target group composition 522), then the computer system 210 may generate a warning 527 indicating that it is anticipated that the target group composition 522 will not be achieved.

As another example, the warning 527 may be generated by the computer system 210 in response to determining that the diversity level 526 does not meet a threshold diversity level. For example, the computer system 210 may compare the diversity level 526 to a threshold diversity level of 0.90. Based on the diversity level 526 being below the threshold diversity level, the computer system 210 may generate the warning 527 or a similar warning (e.g., indicating low diversity level and/or that the target group composition is unlikely to be achieved by study completion), and transmit the warning to the client device 204.

In some cases, the computer system 210 may compare the diversity level 526 to multiple thresholds. These thresholds may correspond to different actions performed by the computer system 210. For example, if the diversity level does not meet a first threshold but does meet a second threshold, the computer system 210 may generate a low priority warning and transmit it to the client device 204. However, if the diversity level does not meet the first threshold and the second threshold, the computer system 210 may generate a high priority warning, transmit the warning to the client device 204, and automatically perform one or more actions to account for the low diversity level. For example, the computer system 210 may determine one or more actions to take to improve the diversity level, such as invite persons to enroll from an underrepresented group, remove persons from an overrepresented group, remove or modify inclusion or exclusion criteria, adjust the study parameters, etc.

The recommendation section 530*b* may include one or more recommendations generated by the computer system 210 using the diversity analysis results indicated in the diversity analysis results section 520*b*. The computer system 210 may generate one or more recommendations using the diversity analysis results in order to achieve the target group composition 522. Specifically, the computer system 210 may determine a first recommendation option 536 based on or in response to the warning 527. The first recommendation option 536 may be a recommendation to perform one or more actions so that the predicted group diversity at completion 525 will match the target group composition 522 or will be within a target diversity range (e.g., that is based on the target group composition 522).

FIG. 5C illustrates example diversity assessment and action selection interface 502*c* during a participant enrollment stage of a study. The interface 502*c* may be presented on the client device 204. As an example, the interface 502*c* may be presented on the client device 204 at an enrollment stage of the study. Specifically, the interface 502*c* may be presented after (e.g., in response to) all or a threshold percentage of users have responded to enrollment invitations, after a threshold amount of time has passed since enrollment invitations were sent out, after a threshold number of users have enrolled, etc. The interface 502c may present various diversity metrics calculated by the computer system 210 and recommendations to adjust enrollment generated by the computer system 210 for this stage of the study. The interface 502c may include various interface elements that allow a user to quickly consider and act on recommendations to invite or enroll new users in the study, remove users from enrollment, or replace users who are currently enrolled. The researcher 202 may interact with the interface 502c to, for example, select new users recommended by the computer system 210 to enroll in a study, select new users recommended by the computer system 210 to be invited to the study, select users recommended by the computer system 210 for removal from enrollment, select users recommended by the computer system 210 for replacement, select users recommended by the computer system 210 for having their invitations revoked, etc.

As another example, the interface 502c may be presented on the client device 204 at one or more later stages of the study (e.g., after some of study data has been obtained from the participant devices). Specifically, the interface 502c may be presented after (e.g., in response to) a participant leaving the study, a participant's activity level dropping below a threshold activity level, a diversity score falling below a diversity score threshold, etc.

The interface 502c includes the updated study criteria section 510b, the diversity analysis results section 520b, and an enrollment section 540. The researcher 202 may, for example, use the interface 502c to adjust the enrollment for the study at the start of the study or at one or more later points in time during the study.

As shown, the study criteria section 510b may include various parameters for a given study. For example, the study criteria section 510b may include a cohort size 511, a study length 512, a study region 513, study requirements 514, and a target date 517. In addition to study parameters, the study criteria 510b also include updated inclusion criteria 515b and exclusion criteria 516.

The diversity analysis results section 520b depicts the results of a diversity analysis performed by the computer system 210 at an enrollment stage the study. The diversity analysis presented may be based on a research question provided by the researcher 202, the study criteria 510b, the candidates invited to enroll and/or the candidates that have applied to enroll, and/or the actual enrollment of the study.

As shown, the diversity analysis may include the target group composition 522 (e.g., for the enrolled participant at the completion of the study), the enrolled group composition 524 (e.g., indicating the diversity of participants who have actually enrolled in the study), and the predicted group diversity at completion 525. The computer system 210 may determine the predicted group diversity at completion 525 based on, for example, a combination of historical data or trends determined from historical data, and the enrolled group composition 524.

As discussed above, using the target group composition 522 and at least one of the enrolled group composition 524 and the predicted group composition 525, the computer system 210 calculates a diversity level 526. As shown, the diversity level 526 is an anticipated diversity level at study completion, e.g., that is indicative of the difference (e.g., actual or percentage difference) between the predicted group composition 525 and the target group composition 522.

The computer system 210 may compare the predicted group diversity at completion 525 to the target group composition 522. If the predicted group composition 525 falls outside of a target composition range (e.g., based on the target group composition 522), then the computer system 210 may generate the warning 527 indicating that it is anticipated that the target group composition 522 will not be achieved.

As another example, the warning 527 may be generated by the computer system 210 in response to determining that the diversity level 526 does not meet a threshold diversity level. For example, the computer system 210 may compare the diversity level 526 to a threshold diversity level of 0.90. Based on the diversity level 526 being below the threshold diversity level, the computer system 210 may generate the warning 527 or a similar warning (e.g., indicating low diversity level and/or that the target group composition is unlikely to be achieved by study completion), and transmit the warning to the client device 204.

In some cases, the computer system 210 may compare the diversity level 526 to multiple thresholds. These thresholds may correspond to different actions performed by the computer system 210. For example, if the diversity level does not meet a first threshold but does meet a second threshold, the computer system 210 may generate a low-priority warning and transmit it to the client device 204. However, if the diversity level does not meet the first threshold and the second threshold, the computer system 210 may generate a high priority warning, transmit the warning to the client device 204, and automatically perform one or more actions to account for the low diversity level. For example, the computer system 210 may determine one or more actions to take to improve the diversity level, such as invite persons to enroll from an underrepresented group, remove persons from an overrepresented group, remove or modify inclusion or exclusion criteria, adjust the study parameters, etc.

The enrollment section 540 may present more detail information on the currently enrolled participants, and/or may present options, such as recommended options, for adjusting the enrollment of the study. As shown, the enrollment section 540 may include a table 542 that includes a first column the displays that displays users that the computer system 210 recommends to be invited for enrollment and/or added to enrollment, and a second column that displays users that the computer system 210 has marked for possible removal or replacement.

Factors for recommending users for invitation, addition, removal, or replacement may include the group(s) associated with the user and an expected participation for the user. The computer system 210 may recommend the addition of users that are associated with an unrepresented group or a group that is anticipated to be unrepresented at study completion. Similarly, the computer system 210 may recommend the remove or replacement of users that are associated with an overrepresented group or a group that is anticipated to be overrepresented at study completion. As an example, the computer system 210 may be more likely to recommend Group 2 users based on the predicted group composition 525 indicating that the anticipated enrollment of Group 2 participants will be significantly lower than that indicated in the target group composition 522. The computer system 210 may also recommend users that have a higher expected participation as they will be more likely to provide data and/or consistently provide data required for a study, and/or more likely to complete the study.

The table 542 may also indicated the predicted effect that the addition, removal, or replacement of the specific users may have on the study. As an example, the computer system 210 may determine the anticipated diversity level at study completion should the corresponding user be added, removed or replaced. For example, the addition of the User S to the study is anticipated to raise the diversity level from 0.87 to 0.91.

The researcher 202 may interact with the table 542 to select one or more users to add/invite. Similarly, the researcher 202 may interact with the table 542 to select one or more users to remove or replace. If the researcher 202 select to replace a user, they the client device 204 may prompt the researcher 202 to select a replacement user to invite/add.

The recommendation for the addition, invitation, removal, or replacement of participants may further be based on the past studies that the participants have previously been a part of. For example, candidates may be more likely to be recommended for invitation and/or addition (e.g., addition may be an option if the participant has already agreed to enrolled or applied to enroll) if the participants have enrolled in a previous research study, have completed a previous research study, have enrolled in a relatively high number of research studies (e.g., compared to other candidates, enrolled participants, etc.), have completed a relatively high number of research studies, and/or have completed a threshold percentage of research studies that they previously enrolled in. In contrast, enrolled participants may be more likely to be marked for removal or replacement if, for example, they have not enrolled or completed a previous research study (e.g., which would introduce a great deal of uncertainty such that there may be, for example, insufficient information to anticipate whether the participant will complete the study and/or the expected participation of the participant), have enrolled in or completed a relatively low number of studies, and/or have a low study completion percentage.

The expected participation of the candidates and the enrolled participants may be determined using information obtained from past studies. For example, the computer system 210 may access a previously calculated expected participation for an enrolled participant from a user profile for the participant. As another example, the computer system 210 may access study data stored and associated with a user, and calculated, based on the study data, an expected participation level of the user. The expected participation level may be based on, for example, a user's task completion percentage, task completion time, inquiry response time, data upload consistency, etc.

The computer system 210 may rank the users that it recommends for invitation, enrollment, removal, or replacement. For example, the users may be ranked based on the anticipated diversity level calculated by the computer system 210 should the recommendation be acted on. The effects of a user being added or invited to a study on the anticipated diversity level are likely to increase more significantly if the user belongs to a currently underrepresented group or anticipated unrepresented group (e.g., anticipated to be unrepresented by the end of the study, such as the Group 2 participants that are currently overrepresented but are anticipated to be underrepresented) than if the user belongs to a currently overrepresented or anticipated overrepresented group (e.g., Group 1 participants that are currently underrepresented but anticipated to be overrepresented by the end of the study). Additionally or alternatively, the users may be ranked based on their expected activity level in the study (e.g., based on historical data indicating their past activity levels, past study completion rates, etc.). This however may be taken into account by the anticipated diversity level since the anticipated diversity level may correspond to the predicted group composition 522 at the end of the study and a lower expected activity level associated with a user would indicate a higher likelihood of the user not completing the study and/or not producing sufficient data needed for the study.

The computer system 210 may provide instructions to the client device 204 to have the recommended users presented in the interface 502c according to their rank. For example, as shown, User S may be presented above User R based on the anticipated diversity level of 0.94 (e.g., by the end of the study) for inviting or enrolling User S being greater than the anticipated diversity level of 0.93 for inviting or enrolling User R. By ranking the user recommendations according to their influence in achieving the target group composition 522 and, therefore, their influence in on the study's ability to produce viable data, the computer system 210 can (i) more efficiently present its recommendations to the researcher, and/or (ii) take greater advantage of the limited screen space available on the client device 204 (or a display connected to the client device 204).

In some cases, the client device 204 may present the user recommendations as a list that is not necessarily organized by the types of actions recommended. The list may instead be ordered based on the anticipated diversity level and/or the expected participation level. For example, the client device 204 may present a list of user recommendations starting with inviting User S (e.g., based on the recommendation being associated with the highest diversity level), followed by inviting User R (e.g., based on the recommendation being associated with the second highest diversity level), followed by removing or replacing User D (e.g., based on the recommendation being associated with the third highest diversity level), and followed by removing or replacing User B (e.g., based on the recommendation being associated with the fourth highest diversity level).

Similarly, the computer system 210 may only recommend a subset of the available users based on their determined ranks. For example, the computer system 210 may only recommend a threshold number of user recommendations (e.g., a total of only three, four, or six user recommendations are initially presented to the researcher 202 on the client device 204 unless the researcher 202 requests additional recommendations) or a threshold number of user recommendations for each specific action (e.g., a maximum of three invitation or enrollment recommendations are presented on the client device 204, and a maximum of two removal or replacement recommendation are presented on the client device 204) selected accordingly to their respective ranks. The thresholds may be selected by the researcher 202 or may be automatically determined by the computer system 210. As an example, the computer system 210 may determine the thresholds based on the total number of participants currently enrolled in the study and/or on a target number of participants for the study. By presenting only a subset of user recommendations, the computer system 210 can (i) more efficiently present the key recommendations to the researcher, and/or (ii) take greater advantage of the limited screen space available on the client device 204 (or a display connected to the client device 204) by removing the need to devote screen space to recommendations that are unlikely or less likely to achieve the diversity needs of the study.

The computer system 210 may apply additional criteria to the user recommendations. For example, the computer system 210 may apply one or more thresholds that indicate the maximum number of recommendations presented on the interface 502c. However, the computer system 210 may first apply a minimum anticipated diversity level threshold to the recommendation before it can be presented on a display of the client device 204 and/or sent to the client device 204. For example, the computer system 210 may apply a static threshold of 0.90 to the anticipated diversity level. This would have the effect of only the recommendations of inviting User S, inviting User R, and removing or replacing User D being displayed on the interface 502*c*. The diversity level threshold may instead be dynamic, e.g., based on the current anticipated diversity level at completion 526, based on historical data for the groups and/or participants enrolled in study, based on the trends for the groups and/or participants enrolled in the study, etc. For example, the computer system 210 may only allow user recommendations that result in the anticipated diversity level improving by at least 5% with respect to the current anticipated diversity level at completion 526. By presenting only a subset of user recommendations that meet certain quality criteria, the computer system 210 can (i) more efficiently present the key recommendations to the researcher that are likely to have a minimum beneficial effect on meeting the diversity needs of the study, and/or (ii) take greater advantage of the limited screen space available on the client device 204 (or a display connected to the client device 204) by removing the need to devote screen space to recommendations that are unlikely or less likely to achieve the diversity needs of the study.

The computer system 210 may apply similar thresholds to the expected participation level. For example, the computer system 210 may apply a first static or dynamic threshold (e.g., relative to the activity level of other candidates, of currently enrolled users, activity level of other candidates in the same group as the recommended user, of currently enrolled users in the same group as the recommended user, etc.) that indicates a minimum expected participation level to be recommended by the computer system 210 for an invitation to enroll in the study or to be enrolled in the study. Similarly, the computer system 210 may apply a second static or dynamic threshold (e.g., relative to the activity level of other candidates, of currently enrolled users, activity level of other candidates in the same group as the recommended user, of currently enrolled users in the same group as the recommended user, etc.) that indicates a maximum expected participation level to be recommended by the computer system 210 for removal or replacement. Again, by presenting only a subset of user recommendations that meet certain quality criteria, the computer system 210 can (i) more efficiently present the key recommendations to the researcher that are likely to have a minimum beneficial effect on meeting the diversity needs of the study, and/or (ii) take greater advantage of the limited screen space available on the client device 204 (or a display connected to the client device 204) by removing the need to devote screen space to recommendations that are unlikely or less likely to achieve the diversity needs of the study.

In some cases, a similar interface to the interface 502*c* is presented at one or more points throughout the study. For example, a similar interface may be presented at the user's request to modify an enrollment of participants in the study. As another example, a similar interface may be prepared and/or presented in response to certain research milestones being met, in response to a diversity warning or error being generating (e.g., due to participants associated with particular groups leaving the study; participants of particular groups not being sufficiently active in the study; etc.

Although various examples described throughout this disclosure provide for a target group composition or target group diversity including one or more target percentages for one or more groups of devices or users, the target group composition or target group diversity may alternatively provide, for each of multiple categories or types of devices or users, a target number for that category or type (e.g., a quota representing a total or minimum number to include). For example, the target group composition 522 may include a first quota of at least five-hundred users from Group 1, a second quota of at least two-hundred and fifty users from Group 2, and a third quota of at least two-hundred and fifty users from Group 3. In these examples, the relative composition of the group populations may not matter or may be a secondary factor when compared to the goal of meeting the quotas.

In some cases, there is a target group composition and one or more quotas that must be met. For example, the computer system 210 may set the target group composition 522 to 50% for Group 1 participants, 25% for Group 2 participants, and 25% for Group 3 participants, and set an acceptable target composition range as 48-52% Group 1 participants; 24-26% Group 2 participants, and 24-26% Group 3 participants. However, the computer system 210 may also set quotas for each of the groups. The target group composition and the quotas may be set in order to ensure the viability of the study results. For example, the target group composition and the quotas may be set in order to ensure (or significantly increase the likelihood) that statistically relevant results can be obtained from the study.

In some cases, the interfaces 502*a*-502*c* present different options and/or functionality depending on the current stage of the study, detected events, and/or obtained data. For example, the interface 502*a* may be presented at a study parameter stage of the study (e.g., the second stage 234 shown in FIG. 2), an inclusion and exclusion criteria stage of the study (e.g., the third stage 236), or a select cohort stage of the study (e.g., the fourth stage 238). In contrast, the interface 502*b* and/or the interface 502*c* may be presented at an enroll participants stage of the study (e.g., fifth stage 240). Based on the different stages associated with the interfaces, the client device 204 may present (e.g., based on instructions provided by the computer system 210) different options for the researcher 202 to interact with. For example, the client device 204 may present options in the interface 502*a* for the researcher 202 to select, modify, add, and/or remove study parameters. In contrast, in the client devices 204 may not immediately present these options in the interfaces 502*b* and 502*c* (e.g., although the researcher 202 may be able to still access them). Instead, the client device 204 may present in the interfaces 502*b* and 502*c* different options to view details of those currently enrolled in the study, to invite or enroll new users, to remove or replace enrolled users, to view details of candidates such as historical data of previous study participants, to view in real-time or substantially real-time the effects of different user selection scenarios (e.g., to see the effects on a calculated diversity score, on the anticipated group composition 522 at the end of the study, on anticipated participation level by group by the end of the study, on an anticipated participation level by group over the course of the study, on an anticipated group composition over the course of the study, etc.), etc.

Figure 6A:
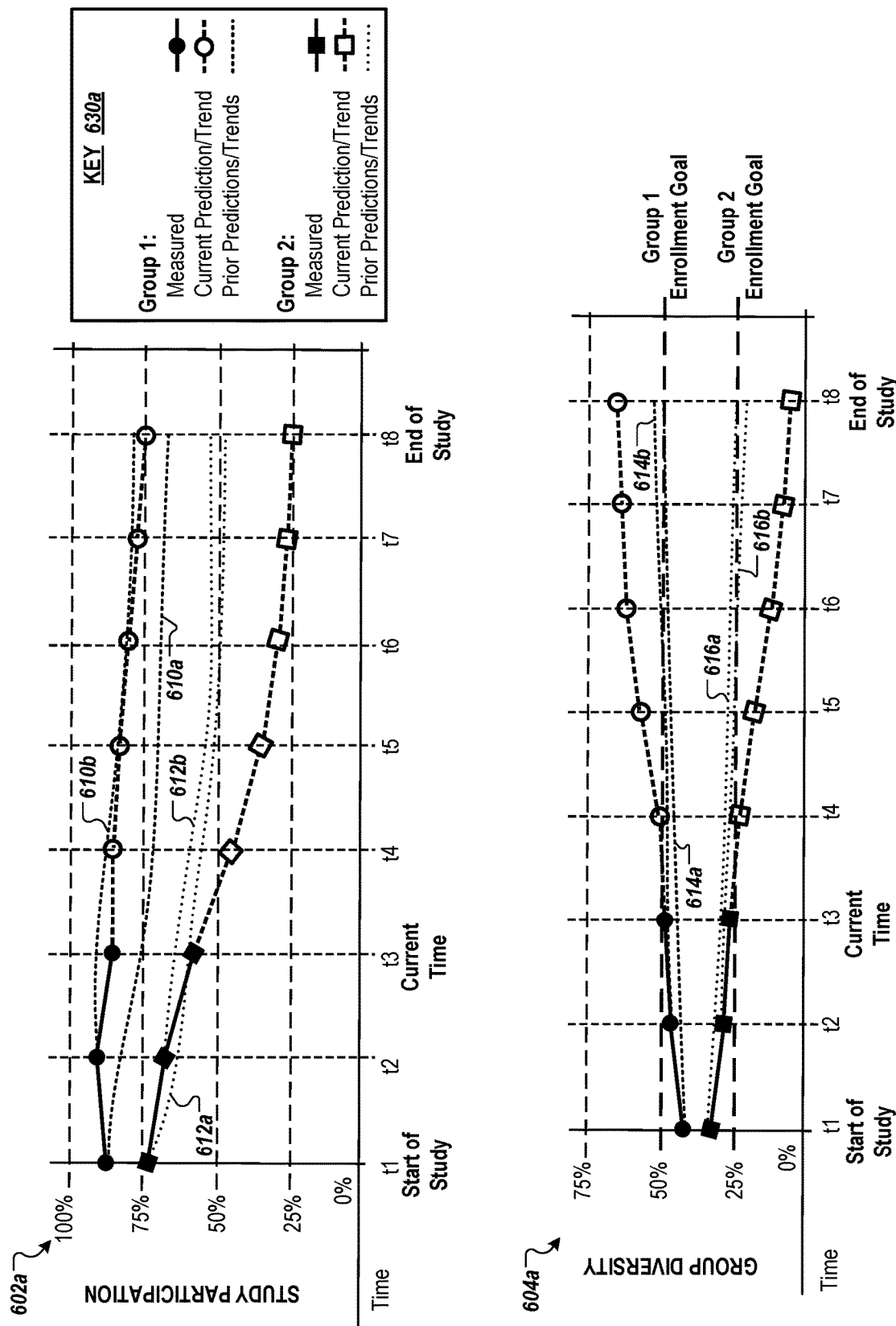
FIGS. 6A-6B are diagrams that illustrate group predictions for a research study.
Figure 6B:
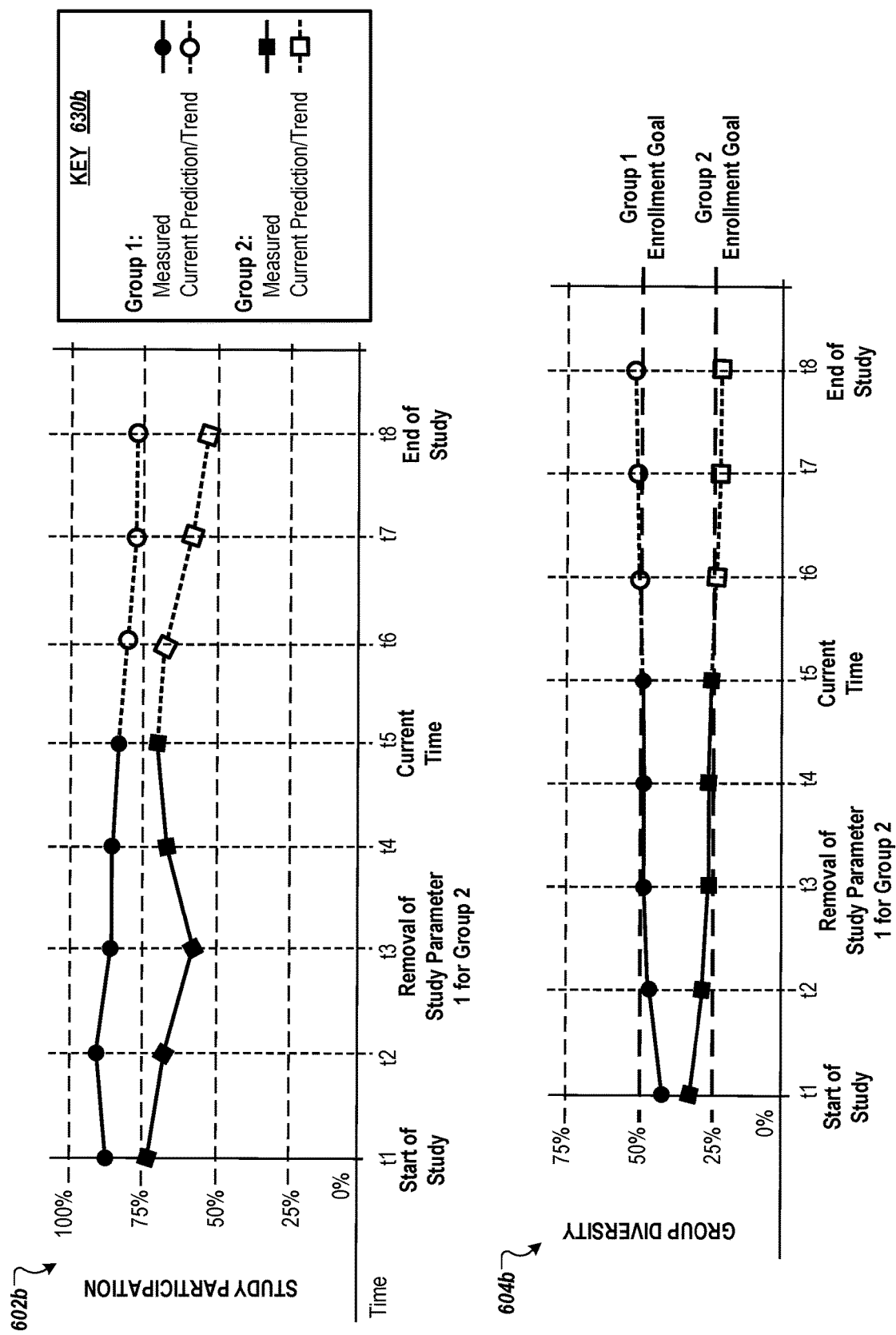

FIGS. 6A-6B are diagrams that illustrate group predictions for a research study. These predictions may be generated by the computer system 210 during the performance of diversity analyses. In generating the predictions, the computer system 210 may access the table data shown and described above with respect to FIG. 4. Specifically, the computer system 210 may use previously determined trend data to make predictions regarding specific groups of participants. The computer system 210, may also make predictions for specific participants. These predictions can be used to update or modify the predictions or the prediction calculations for the groups that the specific participants belong to.

FIG. 6A is a diagram that illustrates group predictions for a research study, such as a clinical trial, or other monitoring program. The predictions may be made by the computer system 210 described above with respect to FIGS. 2-4. The computer system 210 may use the predictions to determine the predicted group composition at a future time, such as at study completion.

A first graph 602a indicates measured and predicted group participation levels. As illustrated by a key 630a, the graph 602a depicts measured or observed study participation levels, previous predictions made or trends corresponding to a time before the current time (t3), and a current prediction or trend corresponding to the current time (t3). For example, the computer system 210 may have, based on one or more data points corresponding to a start of study time (t1) and known trends for Group 1 participants (e.g., as indicated in the trend data 416 shown in FIG. 4, such as the table 402), generated a prediction 610a corresponding to the start of study time (t1). The prediction 610a indicates, for example, that anticipated study participation levels of Group 1 participants at one or more future points in time with respect to the start of study time (t1). For example, the prediction 610a indicates that the Group 1 participants are most likely to have a study participation level of 66% by the end of the study (t8). The prediction 610a may be a trend line for Group 1 that is applied to one or more observed data points, such as a measured participation level of 87% at the start of the study.

Similarly, the computer system 210 may have, based on one or more data points corresponding to a start of study time (t1) and known trends for Group 2 participants (e.g., as indicated in the trend data 416 shown in FIG. 4, such as the table 402), generated a prediction 612a corresponding to the start of study time (t1). The prediction 612a indicates, for example, that anticipated study participation levels of Group 2 participants at one or more future points in time with respect to the start of study time (t1). For example, the prediction 612a indicates that the Group 2 participants are most likely to have a study participation level of 49% by the end of the study (t8). The prediction 612a may be a trend line for Group 1 that is applied to one or more observed data points, such as a measured participation level of 74% at the start of the study.

The computer system 210 may have, based data measured (e.g., received, observed, and/or collected) over the time range of t1-t2 and known trends for Group 1 participants (e.g., as indicated in the trend data 416 shown in FIG. 4, such as the table 402), generated a second prediction 610b corresponding to a second time (t2). The prediction 610b indicates, for example, that anticipated study participation levels of Group 1 participants has significantly changed such that the Group 1 participants are now anticipated to have a study participation level of 78% by the end of the study (t8). The computer system 210 also determines an updated prediction 612b for the Group 2 participants indicating a new anticipated participation level of Group 2 participants of 55% by the end of the study.

Finally, the computer system 210 may have, based on data measured from the start of the study (t1) to the current time (t3) generated a current study prediction for the Group 1 participants and the Group 2 participants. The new prediction for the Group 1 participants indicates modest changes to the anticipated study participation levels that does not raise any alarms. In contrast, a significant dip in the measured study participation levels for the Group 2 participants (and/or other indicators) has resulted in the predicted study participation levels of Group 2 participants to drop significantly. The computer system 210 may generate a warning in response to the current prediction for the Group 2 participants. For example, the computer system 210 may generate a warning based on a slope of a current prediction trend line, based on anticipated participation levels of the Group 2 participants dropping below one or more threshold study participation levels that correspond to one or more different times, etc.

As an example, participants may be automatically unenrolled from a study if there participation drops below a certain threshold (e.g., 40%). As such, because the most recent prediction for the Group 2 participants indicates an average study participation level below 40% at one or more points (e.g., before or at the end of the study), the computer system 210 may, in response, generate a warning to transmit to the client device 204. The warning may be accompanied with one or more recommendations on how to address the low study participation of Group 2 participants. Alternatively, the computer system 210 may automatically perform one or more actions in attempt to address the identified issues. As will be discussed in more detail with respect to FIG. 6B, the computer system 210 may remove a study parameter from the study for Group 2 participants that, for example, the historical data 412 has shown to have a negative effect on the participation levels (e.g., and therefore the enrollment) of Group 2 participants. This cause and effect may be depicted, for example, in table 404 of FIG. 4. The study actions recommended or performed by the computer system 210 may be depicted for example, in table 410 of FIG. 4.

In general, trend lines determined and/or applied to make predictions for group participants based on various factors. For example, a trend line applied for a particular group may be determined for and/or otherwise specific to a particular time or stage of a study (e.g., particular percentage of the study that is complete), such that there may be multiple different or possible trend lines for a given group of participants. Similarly, different group trend lines may additionally or alternatively correspond to different ranges of observed or measured values. For example, the computer system 210 may apply a first trend line for study participation of Group 1 participants if a measured data point for the start of study time falls between 80% and 90% participation, and a second trend line if the measured data point for the start of study time falls between 70% and 80% participation. Accordingly, here, the computer system 210 may apply the first trend line to the Group 1 start of study measured data point(s) to generate the prediction 610a.

The computer system 210 may make new predictions at different points throughout the study. For example, the computer system 210 may make a new prediction after a threshold amount of time has passed, after a particular study completion percentage is reached or added since a last prediction was made (e.g., prediction is made every time is determined that the current study completion percentage is 5% closer to 100% from a prior study completion percentage corresponding to when an immediately preceding prediction was made), in response to new data being collected or received (e.g., from the study participants), after a milestone in the study is reached, and/or after a stage or phase of the study changes. For example, the graphs 602a and 604a may be generated in response to receiving measuring new data from the study participants, and/or weekly based on data received and/or collected from study participants over the last week.

A second graph 604a indicates measured and predicted group diversity levels (e.g., diversity of enrolled participants). As shown, the most recent group diversity predictions indicate very low retention of Group 2 participants such that it is very unlikely that the target cohort diversity will be achieved. This low retention of Group 2 may be based, at least in part, on the low study participation levels observed and/or predicted. As an example, the computer system 210 may generate the group diversity prediction based, at least in part, on the measured and/or predicted study participation of the different groups.

As an example, the computer system 210 may have, based on one or more data points corresponding to a start of study time (t1) and known trends for Group 1 participants (e.g., as indicated in the trend data 416 shown in FIG. 4, such as the table 402), generated a prediction 614a corresponding to the start of study time (t1). The prediction 614a indicates, for example, an anticipated Group 1 enrollment relative to one or more other groups in the study. For example, the prediction 614a indicates that the Group 1 participants are most likely to make up about 50% of the study enrollment by the end of the study (t8), e.g., which is in line with a Group 1 enrollment goal to achieve the cohort composition target 224 by the end of the study. The prediction 614a may be a trend line for Group 1 that is applied to one or more observed data points, such as a measured enrollment percentage of Group 1 participants of 42% at the start of the study.

Similarly, the computer system 210 may have, based on one or more data points corresponding to a start of study time (t1) and known trends for Group 2 participants (e.g., as indicated in the trend data 416 shown in FIG. 4, such as the table 402), generated a prediction 616a corresponding to the start of study time (t1). The prediction 616a indicates, for example, an anticipated Group 2 enrollment relative to one or more other groups in the study. For example, the prediction 616a indicates that the Group 2 participants are most likely to make up about 25% of the group composition 225 by the end of the study (t8), e.g., which is in line with a Group 2 enrollment goal to achieve the cohort composition target 224 by the end of the study. The prediction 616a may be a trend line for Group 2 that is applied to one or more observed data points, such as a measured enrollment percentage of Group 2 participants of 33% at the start of the study.

The computer system 210 may have, based data measured (e.g., received, observed, and/or collected) over the time range of t1-t2 and known trends for Group 1 participants (e.g., as indicated in the trend data 416 shown in FIG. 4, such as the table 402), generated a second prediction 614b corresponding to a second time (t2). The prediction 614b indicates, for example, that anticipated study participation levels of Group 1 participants has modestly changed such that the Group 1 participants are now anticipated to make up roughly 53% of the group composition 226 by the end of the study. The computer system 210 also determines an updated prediction 616b for the Group 2 participants that the Group 2 participants are now anticipated to make up 23% of the group composition 226 by the end of the study. These changes may, in some cases, be enough to trigger the computer system 210 to generate a warning, to determine one or more recommendations, and/or to automatically perform one or more actions.

Finally, the computer system 210 may have, based on data measured from the start of the study (t1) to the current time (t3) generated a current study prediction for the Group 1 participants and the Group 2 participants. The new predictions for the Group 1 and Group 2 participants indicates significant changes to the group composition 226, such that the computer system 210 may, in response, generate a warning. Notably, the current prediction indicates that the enrollment of Group 2 participants is expected to deviate significantly from the Group 2 enrollment goal of 25%, and that, relatedly, the enrollment of Group 1 participants is expected to deviate significantly from the Group 1 enrollment goal. The computer system 210 may generate a warning in response to the current prediction for the Group 1 and Group 2 participants. For example, the computer system 210 may generate a warning based on a slope of a current prediction trend line, based on an anticipated group composition 226 at the end of the study (t8), based on the enrollment percentage of the Group 2 participants dropping below a threshold at one or more current and/or future points in time, based on the enrollment percentage of the Group 1 participants exceeding a threshold at one or more current and/or future points in time, etc.

FIG. 6B is a diagram that illustrates updated group predictions for a research study. The predictions may be made by the computer system 210 described above with respect to FIGS. 2-4. The computer system 210 may use the predictions to determine the predicted group composition at a future time, such as at study completion.

As illustrated in FIG. 6B and by the key 630b, time has elapsed and the predictions have been updated accordingly when compared to FIG. 6A. The updated prediction may have been made by the computer system 210. During the elapsed time, (e.g., at the time t3) a study action of removing "Study Parameter 1" for the Group 2 participants has been performed. This study action may have been automatically performed by the computer system 210, or may have been part of a recommendation generated by the computer system 210 that was accepted by a researcher of the study. As shown, the performance of the study action has had a significant effect on the observed and predicted data (e.g., diversity related data) for the study with respect to Group 2 participants.

The first graph 602b indicates updated measured and predicted participation levels of study participants by group last updated at a time t5. As shown, the performance of the study action to remove a study parameter for Group 2 participants has had a significant effect (here an improvement) on the participation levels of Group 2 participants.

A second graph 604a indicates updated measured and predicted group diversity levels (e.g., diversity of enrolled participants). The measured and predicted group diversity levels were in this example last updated at a time t5. As shown, the most recent group diversity predictions indicate a significantly improved group diversity predictions such that the expected group diversity at the end of the study is now expected to be within 3% of the target cohort diversity.

Figure 8A:
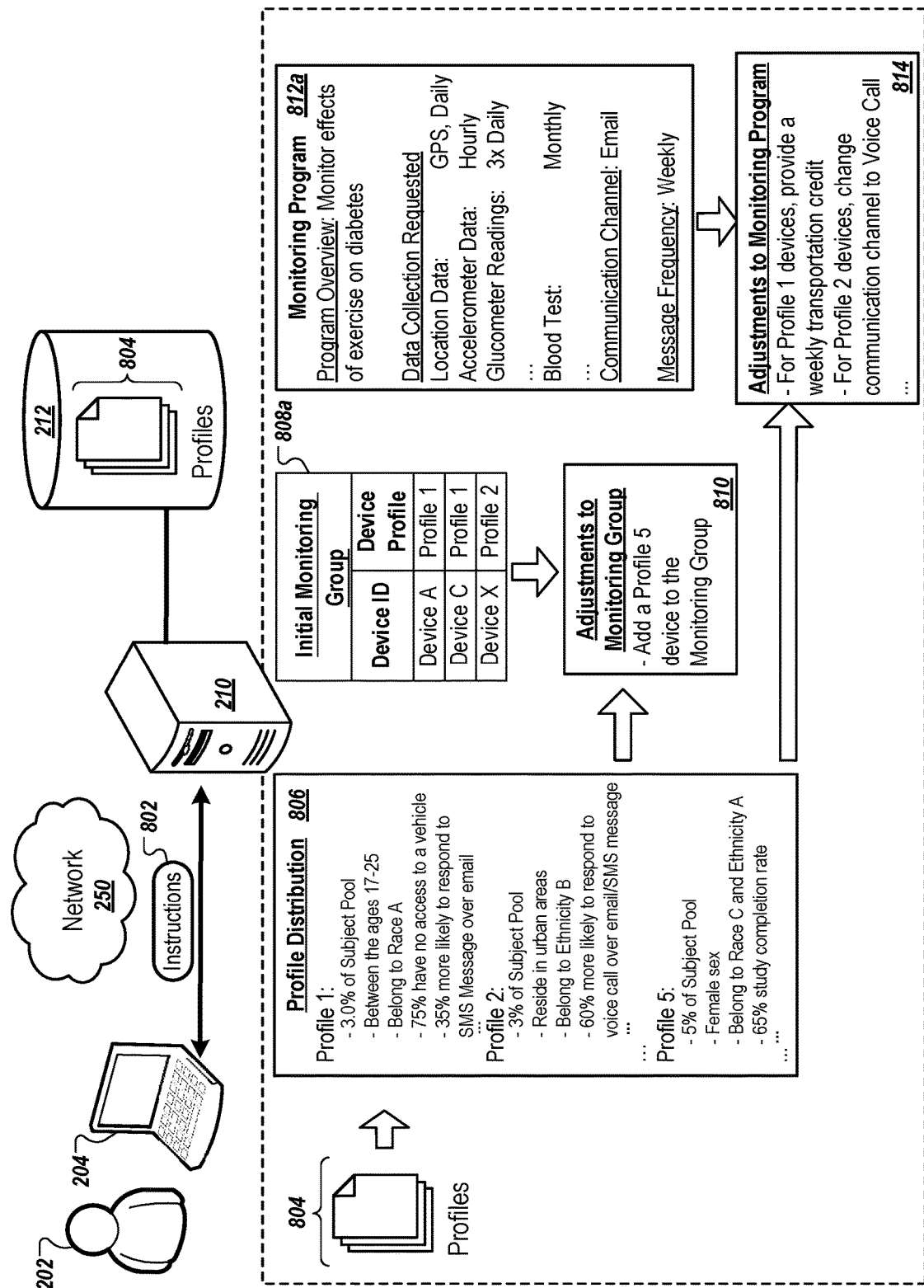
FIGS. 8A-8B are diagrams that illustrate an example system for customizing monitoring programs involving remote devices.
Figure 8B:
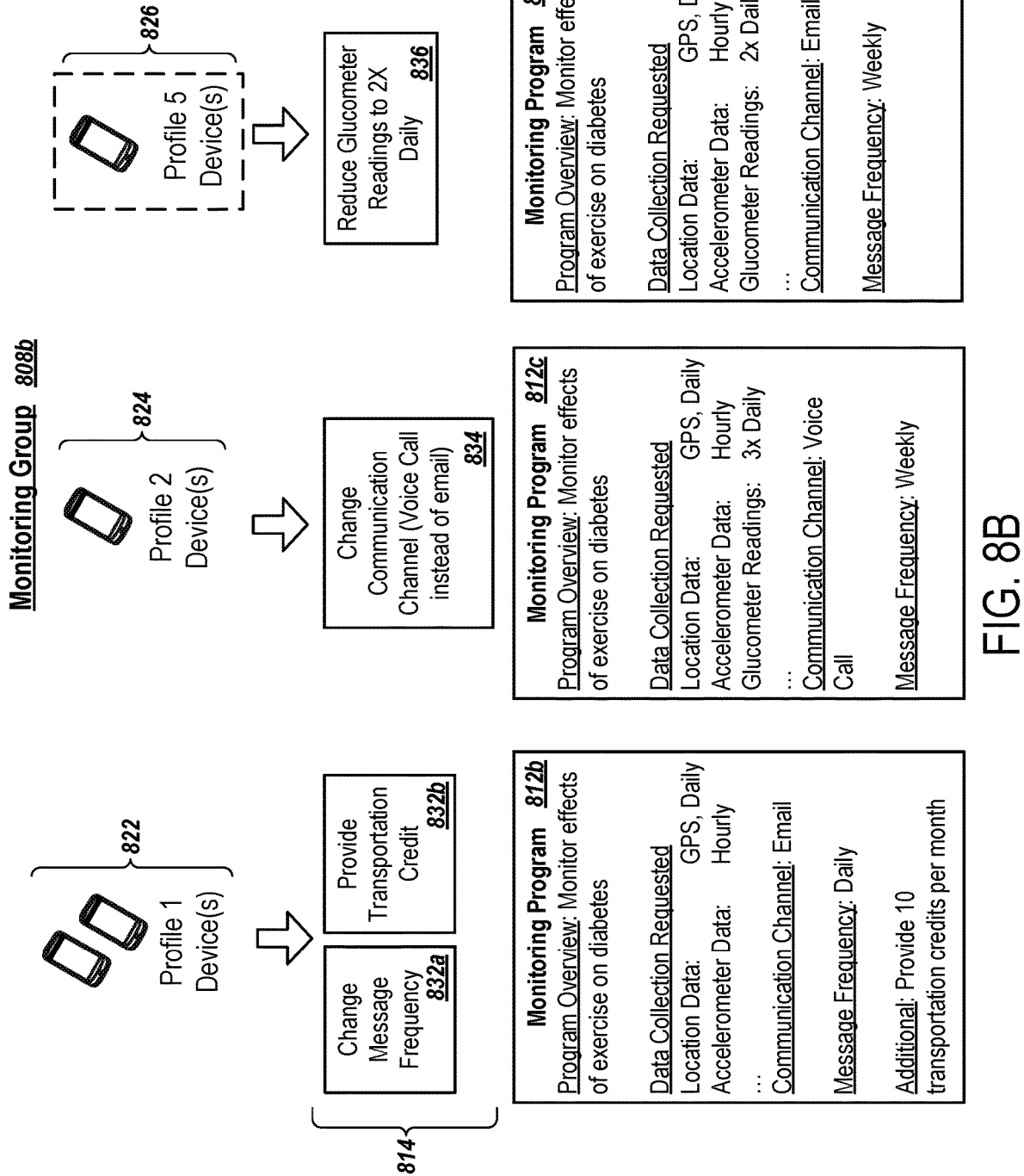

FIGS. 8A-8B are diagrams that illustrate one or more components of the system 200 and a process for customizing monitoring programs involving remote devices. In customizing monitoring program, the computer system 210 of the system 200 can assess and adjust the composition of groups for a monitoring program 812a or the monitoring program 812a using a set of profiles 804. The computer system 210 may distribute adjusted monitoring program 812 to multiple remote devices.

The computer system 210 may be configured to distribute software for a monitoring program to devices that are to be monitored. The monitoring program may indicate times when data is to be obtained from, requested from, or sent to the monitored devices. The monitoring program may also indicate the type of data or the specific data that is to be obtained from, requested from, or sent to the monitored devices. The data obtained or requested from the monitored devices may include sensor data collected using sensors of the monitored devices or sensor devices electronically connected to the monitored devices. The data sent to the monitored devices may include instructions to collect sensor data, or may include updates to the monitoring program or a portion of the monitoring program on the devices. In updating the monitoring program or a portion of the monitoring program on the devices, a configuration of the monitored devices can be adjusted to, for example, change what data is monitored or how the data is monitored.

The computer system 210 can adjust the monitoring program for particular groups of devices or users. These groups may correspond to different profiles generated by the computer system 210. The computer system 210 may assign each of the monitored devices to at least one profile based on attributes of the devices or attributes of users of the devices. For example, a first profile may indicate that a device must include a GPS unit and a heartrate monitor, and that the user of the device must live in an urban environment and must be between the ages of 25 and 30 years of age. If a first device of the group of device meets the device requirements of the profile criteria and has a user that meets the user requirements of the criteria, the computer system 210 may classify the first device as belonging to the first profile.

The computer system 210 may generate the profiles based on previously observed outcomes. For example, the computer system 210 may generate profiles based on observed outcomes of a currently running and/or previously performed monitoring programs. The observed outcomes may include the compliance of the devices or their users with the requirements of the monitoring program, and the retention of the devices or their users in the monitoring program. As another example, the computer system 210 may generate profiles based on attributes of devices or users in a candidate pool. The attributes may include, for example, sensors that the devices include, sensor devices that are compatible with the devices, models of the devices, operating systems of the devices, etc. The attributes may also include demographic or non-demographic information that describes the users. The users may include, for example, users that have previously participated in a monitoring program, that are currently participating in a monitoring program, have indicated that they want to participate in a monitoring program, or that are eligible for a monitoring program.

The computer system 210 may generate the profiles using a machine learning model or a group of machine learning models. As an example, the computer system 210 may using a clustering machine learning model to cluster different devices or users based on observed outcomes. Similarly, as another example, the computer system 210 may use a clustering model to cluster different groups of devices or users based on attributes of the devices or users. The model may use all attributes available to the model in performing the clustering. Alternatively, the model may use a subset of attributes corresponding to key attributes to perform the clustering. These key attributes may be determined using another machine learning model or a group of other machine learning models, using a static algorithm or group of static algorithms, or based on input from an administrator or researcher.

In general, a monitoring program refers to a set of elements that define how to conduct a monitoring program of multiple devices and/or persons. The elements may include parameters for the monitoring program. These parameters may, for example, define inclusion criteria for persons or devices in the monitoring program, and/or exclusion criteria for persons or devices in the monitoring program. The elements may also include a definition of the monitoring program or an indication of what type of studies the monitoring program has (i) previously been used for, and/or (ii) is applicable to. The elements may also include an indication of the particular data that is to be requested and/or received during a program, a schedule that indicates when data is to be requested and/or received, and/or a frequency of data collection or reception. The elements may further define one or more conditions for determining the end of the monitoring program. For example, an element may indicate that sessions of the monitoring program are (e.g., by default) to be run for six months. As another example, an element may in dictate that sessions of the monitoring program are to be run until a set of particular conditions are met (e.g., enough data is collected from each of the participants). Similarly, the elements may define conditions for determining one or more milestones of the monitoring program.

The elements may define or otherwise indicate other information of the monitoring program, including other communication information. For example, the elements may indicate a default communication channel, a default word choice (e.g., vocabulary) for communication, a default sentence structure (e.g., formal, semi-formal, informal, etc.).

Figure 7:
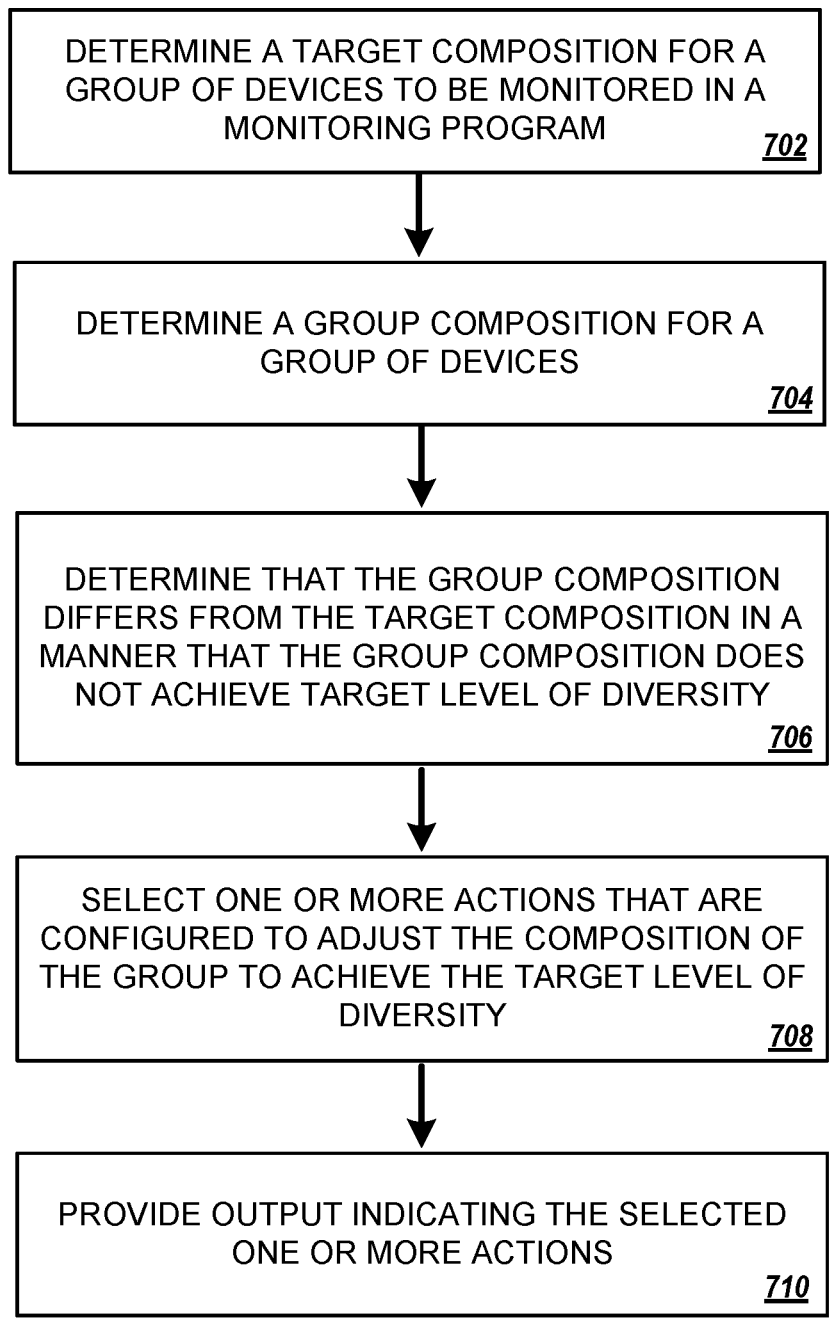
FIG. 7 is a flowchart diagram that illustrates an example process for diversity assessment and action selection.

FIG. 7 is a flowchart diagram that illustrates an example process for diversity assessment and action selection. The process 700 may be performed by the computer system 110 shown in FIG. 1. The process 700 may be performed by the computer system 210 shown in FIGS. 2-4.

In many cases, the administrator of a monitoring program, such as a researcher conducting a clinical trial, cannot determine whether the monitoring group provide sufficient diversity to achieve the needs of the monitoring program. Beyond simply whether a sufficient total number of participants are enrolled, it is difficult to determine whether the makeup of the monitoring group provides the right variety in participant backgrounds. Further, the effective level of diversity can be diminished through the lack of compliance that disproportionately affects some groups over others. The process 700 helps the system determine and inform an administrator whether a monitoring group has sufficient diversity, as well as to indicate what adjustments should be made to obtain the proper diversity representation level if it is not present.

Briefly, the system can identify a reference population for the monitoring program (e.g., population at large, or a group most likely to use a drug or product) and determine a diversity goal that reflects the characteristics of the reference population. The system can also determine diversity metrics for a monitoring group (e.g., a clinical trial cohort) and provide the diversity metrics to the administrator, indicating whether the current and expected future monitoring group characteristics will meet the target level of diversity. For example, the system can compare the diversity metrics for the cohort to the goal levels (e.g., thresholds, ranges, minimums, etc.), determine that the diversity metrics are outside a desired range, and then select actions to improve diversity in the monitoring group.

The process 700 includes determining a target composition for a group to be monitored in a monitoring program (702). In some cases, the system provides a user interface through which a researcher or other administrator can specify the target composition. In other cases, the system determines the target composition, calculating an appropriate target from data describing a reference population and other data.

As discussed above, the target composition can be based on a reference population, such as a set of devices or users in a particular geographical area. The target composition can be based on other populations or subgroups. For example, for a research study about diabetes, the target composition may be based on the set of people in the United States that have diabetes, and so the target composition represents the characteristics of that population rather than the general population. The system can receive input indicating the location or general population of interest, and then retrieve population data (e.g., census data, survey data, etc.) specifying the makeup of the population. The system then sets the target composition to have characteristics (distribution of profiles or attributes) that are the same as or are based on the characteristics in the population data.

The target composition can be defined with respect to attributes that are specified by a user as relevant to the study or as inferred by the system as relevant to the study. The dimensions used for assessing composition and diversity can be different from one monitoring program to another. Some monitoring programs may define composition in terms of a desired distribution across each of age, sex, and race. Other monitoring programs may additionally or alternatively use other attributes, such as whether a person has a certain health status or not (e.g., high blood pressure, obesity, diabetes, cancer history, etc.), a certain genetic profile, or whether the user has a certain behavior pattern. Thus, the dimensions for which diversity can be assessed and achieved can be well beyond simple demographics.

The target composition can be expressed in different ways, and even with multiple types of constraints for a single monitoring program. One is a relative measure for different groups or profiles (e.g., 10% from group 1, 20% from group 2, etc.). Another is a set of minimums or quotas for each of different groups (e.g., at least 10 from group 1, at least 25 from group 2, etc.). Another is a set of ranges, thresholds, or constraints. For example, the target may be expressed as amounts or percentages of the monitoring group for each of different attribute values (e.g., a minimum of 40% male, a minimum of 40% female, a minimum of 30 individuals that have diabetes and a minimum of 30 individuals that do not have diabetes, no more than 40% Caucasian participants, at least 15% for each of multiple different racial backgrounds, etc.)

The process 700 includes determining a group composition for a group of devices or users for the monitoring program (704). The group can be a monitoring group of enrolled devices or users that have registered or subscribed to participate in the monitoring program. As another example, the group can be a group of candidates selected to invite to participate, or a candidate pool from which candidate participants can be selected. In health research studies, the group can be an actual cohort of individuals enrolled in a research study. Similarly, at the creation of the research study, before the study has begun, the group can be a candidate pool or a selected prospective cohort (e.g., a set of prospects identified as meeting the selection criteria which may not yet have enrolled).

The system can determine the measures of composition of the group for each of the different constraints or measures of diversity used to define the target. For example, if the target is a set of quotas for different participant types or profiles (e.g., defined by age, race, sex, or other attributes), the system can determine the number of people in the assessed group that meet each type or profile. Similarly, if the target is expressed in terms of percentages for different types or profiles, the group composition can also be determined as the percentages for the different types or profiles. In general, the group composition can indicate the amounts of members in different categories and the distribution of different attribute values among the group, in absolute or relative terms.

The process 700 includes determining that the group composition differs from the target composition in a manner that the group composition does not achieve the target level of diversity (706). The system can store user profiles that describe the attributes, history, medical history, and other characteristics of individuals. The system can compare the group composition with the target composition and determine whether the group composition is within a threshold level of the target composition. This can involve comparing the amounts of participating devices or users in different categories to the respective amounts indicated by the target composition data. This may also include generating a diversity score, for the group as a whole or for different categories of participants, and determining whether the difference is less than a predetermined threshold (e.g., less than 5% different, etc.). In many cases, a difference of at least the predetermined magnitude for any one of various categories or groups (e.g., less than the minimum needed for any of group 1, group 2, group 3, etc.) or for any of the predetermined attributes for which diversity is needed (e.g., age, sex, race, diabetes status, location, mental health history, etc.) can trigger the system to take corrective actions to bring the monitoring group back to the composition needed.

Notably, the system can assess diversity for not only the nominal membership of the monitoring group (e.g., the set enrolled or invited to enroll), but also the set of members actually complying with (or predicted to comply with) the requirements of the monitoring program. For example, for a clinical trial, 1000 participants may be enrolled, but only 850 may be complying with the requirements of the study protocol. These requirements may be for data collection (e.g., completing a survey, acquiring sensor data, etc.) or for other actions separate from data collection (e.g., taking a medication, performing a needed amount of exercise, sleeping according to study guidelines, etc.). As a result, the system can assess the composition and diversity of the set of the 850 complying participants to provide a more accurate indicator of the results of the study. Because compliance and attrition can vary for different participant backgrounds and different participant attributes, the system's assessment of the complying set can provide an early indicator where compliance problems for some groups may decrease the effective diversity among the valid, usable data sets for the study. Participants that do not comply with the requirements may be considered withdrawn from participation for the purposes of the calculation showing the diversity status, even if the participants continue to be enrolled and outreach is made to bring them back into compliance.

In many cases, administrators may enroll an appropriately diverse group of participants at the beginning of the study, but poor quality data collected, incomplete data collection, lack of compliance with participant disproportionately affects participants in one or more groups, which can put the entire research study at risk of cancellation. This, of course, risks wasting all of the resources expended on the study, at the servers of the system as well as at all of the many remote devices. The system can compare the collected data for individual participants with the requirements of the monitoring program they participate in to determine compliance, on a repeated or ongoing basis. This then gives the system the ability to determine the composition and diversity status of the subset of the monitoring group that is complying with the requirements.

The system can be a multi-tenant system that manages many different monitoring programs each with their own requirements for diversity and their own target compositions. The system can monitor the compliance of individuals in each monitoring group with respect to the particular requirements of the corresponding monitoring programs. This allows the system to track, in real time or substantially in real time, whether each monitoring program is meeting its own objectives for composition and diversity.

The process 700 includes selecting one or more actions that are configured to adjust the composition of the group to achieve the target level of diversity (708). When the desired diversity level is not met, the system can identify the participant categories or participant attributes that are underrepresented and determine actions to bring levels for those categories or attributes up to the levels needed to meet the target composition. For example, the system can determine that within a monitoring group, a first category is represented by only 7 participants while the target is 10 individuals. In response, the system can search the user profile database and identify at least three additional individuals in the first category that meet the eligibility criteria for the monitoring program. The identified candidates may then be added to monitoring group (e.g., invited to enroll, added as participants, etc.) to bring the composition and diversity level to the needed state.

The selection of actions can include actions determined to increase the compliance with study requirements for participants in specific categories or with specific attributes that are underrepresented. For example, if 10 participants are needed for category 2, but only 8 out of the 10 enrolled participants in that category are complying with the data collection requirements, then the system can select actions that are calculated to increase the compliance of the two non-complying participants and/or to increase future compliance for all participants in that category. The tables shown in FIG. 4 can be used by the system to identify additional elements to add to the monitoring program to increase compliance (e.g., those associated with positive effect on compliance or at least lower negative effects). The system can also change the manner of communicating with those participants, add additional participants for underrepresented categories or take other actions to improve the diversity level.

The process 700 provides output indicating the selected actions (710). This can include providing the output to a device associated with a researcher or other administrator for the monitoring program, for display in a user interface on the administrator's device. The user interface may include interactive controls, and in response to the controls the system can carry out one or more recommended actions to improve the composition and diversity level for the monitoring group toward the target composition.

In addition, the system may carry out the one or more selected actions, in some cases automatically without requiring specific user input or confirmation. In these cases, the system can carry out adjustments to the monitoring groups (e.g., inviting or enrolling new participants in categories that are underrepresented or are effectively underrepresented when compliance is taken into account), adjusting monitoring program elements for unrepresented groups (e.g., adding or substituting interactions, survey elements, configuration data, etc.), changing the form or content of communications to underrepresented groups, and so on. The system can identify and carry out various types of actions to improve the level of diversity among enrolled and complying members of the monitoring group. This includes providing customized support or interaction to customized for the needs or preferences of different groups. Depending on the participant's background, some may respond better to being provided a credit for taxi service, providing a mobile phone, changing manner of interactions in the study, etc. Similarly, the system may broaden inclusion criteria (e.g., remove limitations to joining the monitoring group) to encompass more of people of the needed backgrounds. Similarly, the system can reduce or remove exclusion criteria to similarly encompass more candidates when needed. As discussed further below, various actions can add additional participants to the cohort from underrepresented groups or may communicate with participants to restore compliance with program requirements. In addition, the system may determine a reason that diversity metrics are out of target ranges, such as identifying one or more factors in the study that are resulting in a bias to enrollment, compliance, or retention. For example, for certain groups, one or more requirements may be disproportionately missed, signaling a need to change that requirement or add additional support for those groups. For each of various potential changes, the system can determine a candidate pool or predicted outcome as if the change was carried out, then select the actions with the best results predicted (e.g., scored as providing the least disruption, highest improvement to diversity, etc.)

In addition to assessing effective level of diversity among participants currently complying with program requirements, the system can assess the diversity among the set of participants projected or predicted to comply with the requirements. This can be useful at the creation of a study, to assess how the requirements of a new study may disproportionally affect the compliance or retention of one group over another. Using the analysis of FIG. 4, the system can identify the elements that have the negative effect and propose substitute elements with better outcome profiles and/or recommend additional elements to compensate for the effect. Similarly, the predictions of compliance rates and retention rates for different groups can be used while a study is ongoing, showing that although current compliance is acceptable, historically the compliance or retention by the end of the study may be worse and may remove the diversity level currently seen.

FIGS. 8A-8B are diagrams that illustrate one or more components of the system 200 and a process for assessing and adjusting the composition of groups for a monitoring program 812a or the monitoring program 812a using a set of profiles 804.

The disclosed systems can be used to achieve number benefits. For example, the computer system 210 can provide numerous benefits to realize and improved program monitoring and distribution system.

Notably, other systems often, if not always, fail to start with an appropriate set of subjects to monitor. That is, these systems are incapable of checking if a set of subjects, such as a set of devices or device users, will provide the overall set of data and the diverse context to be able to capture the variety of data required in the monitoring program. Often these systems are simply provided a pre-selected group subjects or randomly select a group of subjects that are bound to produce, or have an unacceptably high likelihood of producing, unviable results or results that fail one or more other goals of the monitoring program.

In contrast, the computer system 210 can address this issue by selecting a group of subjects to invite or enroll in a monitoring program that are predicted to meet the set goals for the monitoring program. In more detail, the computer system 110 may select a diverse group of subjects to enroll or invite to the monitoring program such that the composition of the group meets certain diversity requirements. By including a diverse group of subjects at the outset of the monitoring program, the computer system 210 can at least improve the likelihood of obtaining viable results from the monitoring program. As an example, many medical studies today fail to produce viable results or produce results having severely limited applicability due to a failure to include or maintain a diverse set of participants. Diversity may refer to diversity among various subject attributes, including both demographic and non-demographic attributes.

The computer system 210 may also take into account other attributes of the subjects when selecting a group of subjects to enroll or invite to a monitoring program. For example, the computer system 210 may take into account historical data, trends in the historical data, and, optionally, trends among certain populations to select subjects that are likely to meet the requirements of the study. The historical data or trends may indicate past or anticipated retention rates for subjects or groups of subjects, past or anticipated compliance rates for subjects or groups of subjects, or past or anticipated data quality obtained from subjects or groups of subjects. For example, the historical data may indicate that a particular subset of subjects is likely to have low compliance with a particular requirement of a monitoring program. In response to this determination, the computer system 210 may avoid enrolling or inviting those subjects to the monitoring program.

However, if those subjects are necessary to achieve certain minimum diversity criteria or other goals for the monitoring program, the computer system 210 can modify the elements of the monitoring program for that particular subset of subjects to improve compliance. Modifying the elements may include modifying or removing requirements of the monitoring program, or adding remedial elements. For example, if the particular subset of subjects is determined by the computer system 210 to generally not have access to a vehicle and, as a result, have low compliance with required medical office visits, the system 210 may add taxi credit to a new version of the monitoring program for those subjects as a remedial measure to improve compliance rates for those subjects with respect to office visits.

In selecting subjects at an outset of a monitoring program or determining how to modify the elements of a monitoring program to improve, the computer system 210 may use various profiles that represent categories of subjects. These profiles may be used to determine how particular subjects are likely to respond to certain monitoring program requirements, and, therefore, to determine if they should be enrolled to the monitoring program or if the monitoring program needs to be adjusted for one or more particular groups of subjects. These profiles may additionally or alternatively be used to improve the diversity of a monitored group or to determine if a monitored group has a sufficient diversity. For example, the computer system 110 may identify the profiles corresponding to a monitoring group and use the profiles to determine if there is sufficient diversity, at the outset or predicted diversity at completion of the monitoring program. If diversity is insufficient, the computer system 210 may use the profiles to identify unrepresented or underrepresented profiles, and proceed to enroll or invite subjects from categories represented by those unrepresented or underrepresented profiles.

By selecting at the outset of a monitoring program a group of subjects that will likely provide the overall set of data and the diverse context to be able to capture the variety of data needed for the monitoring program, the computer system 210 is able to significantly reduce computational inefficiencies. Notably, this selection improves the likelihood of obtaining viable results for the monitoring program as a whole, which greatly reduces. As such, the computer system 210 is able to significantly reduce the computational load on the system and the remote devices and the CPU hours of the system and the remote devices.

As shown in FIG. 8A, in response to receiving instructions 802 from the client device 204, the computer system 210 may access the profiles 804 from the database 212 and use the accessed profiles 804 to determine adjustments to make to the monitoring program 812a or to a group composition selected for the monitoring program 812a.

The instructions 802 may also include other information. For example, the instructions 802 may indicate an initial monitoring group 808a. That is, the instructions 802 may include or point to an initial list of devices and/or persons that have been invited to, selected for, or enrolled in the monitoring program.

The instructions 802 may also or alternatively include or otherwise indicate the elements of the monitoring program 812a. In response to receiving the instructions 802, the computer system 210 may generate the monitoring program 812a, may select an existing monitoring program that includes the elements in the instructions 802, or may update an existing monitoring program to include the elements in the instructions 802.

The instructions 802 may include data that the computer system 210 uses to initiate a monitoring program 812a. Specifically, the instructions 802 may include an indication of the specific monitoring program that should be selected for a new monitoring program (e.g., from a list of available monitoring programs).

Alternatively, the computer system 210 may select the initial monitoring group 808a from a candidate pool of devices and/or users based on the instructions 802. As an example, the instructions 802 may include criteria, such as diversity criteria, for a monitoring program that is to be performed. The computer system 210 may use this criteria to select devices and/or people for the monitoring program to place into the initial monitoring group. As an example, the instructions 802 may include diversity criteria indicating an exact or minimum number of devices or persons there needs to be in the monitoring program that are associated with specific profiles. Specifically, the monitoring instructions 802 may indicate that the monitoring group 808a must include at least one device assigned to Profile 1, and at least one device assigned to profile 2. Similarly, the instructions 802 may indicate exact, minimum, and/or maximum percentages that represent the population of devices or persons associated with specific profiles in the monitoring group 808a. For example, the monitoring instructions 802 may indicate that at least 50% of the devices in the monitoring group 808a should be assigned to Profile 1 and that at least 25% of the devices in the monitoring group 808a should be assigned to Profile 2.

Each of the profiles in the profiles 804 may correspond to a subgroup of devices and/or persons. Specifically, each profile may correspond to a subgroup or a distinct (e.g., non-overlapping) subgroup of devices and/or persons that share at least one of the same key attributes, similar attributes, or demonstrate the same or similar behaviors. That is, each profile may represent a category of devices and/or candidates. As will be discussed in more detail with respect to FIGS. 9A-9B, the computer system 210 can generate the profiles using previously observed outcomes (e.g., behaviors) and/or attributes attributed candidates for inclusion in the monitoring group. The computer system 210 may generate the profiles using one or more machine learning models, such as one or more clustering algorithms.

The profiles 804 may be previously generated and stored in the database 212. Alternatively, the profiles 804 may be generated or updated in response to the computer system 210 receiving instructions 802 from the client device 204. For example, in response to receiving the instructions, the computer system 210 may generate the profiles 804 or may update the profiles 804 using the most recently available monitoring data.

A profile distribution 806 indicates example information that defines a number of example profiles. The information in the profile distribution 806 may include criteria for determining if a device or person is eligible for assignment to the profile, e.g., inclusion criteria. For example, the criteria for Profile 1 indicates that a subject must be between the ages of 17-25 and belong to Race A to be eligible. The information may also include outcome information (e.g., anticipated behaviors such as retention, compliance, and quality of data) associated with subjects (e.g., devices and/or persons) associated with the profile. As will be discussed in more detail with respect to FIGS. 9A-9B, this outcome information may be determined for each of the profiles by analyzing outcome information associated with previous subjects or current subjects in a category of subjects corresponding to each of the profiles. As an example, 75% of the subjects in Profile 1 do not have access to a vehicle and 25% of the subjects are more likely to respond to SMS message when compared to an email message. The profile distribution may also contain various other data such as a population percentage that the subjects of each of the profiles represent of the total candidate pool. For example, 3.0% of the subjects in the candidate pool are associated with Profile 1. The candidate pool may include all subjects that have previously or are currently enrolled in a monitoring program. Alternatively, the candidate pool may include all active subjects, e.g., those that are currently enrolled in a monitoring program or are available for enrollment in a monitoring program.

In some cases, a subject may be associated (e.g., assigned to) multiple profiles. For example, a subject may meet the inclusion criteria for multiple profiles and, therefore, be associated with the multiple profiles.

In some cases, a subject is associated with only a single profile. For example, if a subject has been assigned to a first profile, they may be prevented from being assigned to a second profile.

The computer system 210 may reassign subjects to different profiles (e.g., determine that they belong to different categories of subjects) over time based on the monitored actions of the subjects. For example, a particular subject may initially demonstrate a smartphone compliance rate below 60% over the first three monitoring programs they participate in, and, as a result, be assigned by the computer system 210 to a first profile of the profiles 804. However, if over the next three monitoring programs they improve their overall compliance rate to 75%, the computer system 210 can reassign the subject to a second profile of the profiles 804.

The computer system 210 may use the profile distribution 806 to adjust the monitoring group (810). The computer system 210 may use the profile distribution 806 to adjust the initial monitoring group 808a at the outset of the monitoring program for the monitoring program 812a. In more detail, the computer system 210 may use the profile distribution 806 to identify categories of devices or persons that are underrepresented in the initial monitoring group 808a. For example, the computer system 210 may use the profile distribution 806 and the initial monitoring group 808a to determine that a device corresponding to Profile 5 should be added to the monitoring group 808. The computer system 210 may make this determination based on diversity reasons, e.g., in order to have at least one device from each profile or from each profile in one or more subsets of profiles. The computer system 210 may make this determination based on one or more determinations or predictions. For example, the computer system 210 may use the profile distribution 806 to select a Profile 5 device based on the higher study completion rate of the profile 5 subjects in order to boost efficiency, increase likelihood that study will be successful (e.g., if an analysis of the initial monitoring group reveals that there is a higher than acceptable chance of study failure), etc. As another example, the computer system 210 may determine to add a Profile 5 device based on the percentage of the candidate pool. Specifically, the computer system 210 may add devices associated with unrepresented or underrepresented profiles for each profile that corresponds to at least threshold percentage (e.g., 3%) of the candidate pool. Accordingly, the computer system 210 may determine to add a Profile 5 subject to the monitoring group 808 based on the Profile 5 population meeting the threshold percentage.

After determining to add a Profile 5 subject to the monitoring group 808, the computer system 210 may automatically enroll a Profile 5 subject in the monitoring program, or may generate and send an invitation to a Profile subject to enroll in the monitoring program. As an example, the computer system 210 may take into consideration one or more factors to determine which subject to enroll or invite to the monitoring program. These factors may include, for example, the retention rates associated with the subject, the compliance rates associated with the subject, quality of data previously obtained from the subject or otherwise associated with the subject, the experience of the subject (e.g., number of monitoring program the subject has previously participated in), the activity level of the subject (e.g., how recent the subject has participated in a monitoring program), invitation acceptance rate of the subject, trends in factors (e.g., trends in the retention rates, compliance rates, activity level, etc. of the subject), etc. For example, a subject that has participated in at least one monitoring program over the last year and has a retention rate of 78% may be selected by the computer system 210 for enrollment over a subject that has not participated in at least one monitoring program over the last year and/or has a retention rate less than 70% despite both subjects corresponding to Profile 5.

After determining to add a Profile 5 subject to the monitoring group 808, the computer system 210 may generate and send a recommendation to the researcher 202 to enroll a Profile 5 subject or to send an enrollment invitation to a Profile 5 subject. The recommendation may include multiple subjects recommended by the computer system 210. The multiple subjects may be arranged in an order that corresponds to a recommendation order, such that the subject that the computer system 210 recommends most is shown first or highest in a list of subjects. The computer system 210 may wait to receive a response from the researcher, e.g., wait to receive a response from the client device 204, to enroll or invite one or more of the recommended subjects. Alternatively, the computer system 210 may wait for a predetermined amount of time after transmitting the recommendation to the client device 204. If a response is not received by this point, the computer system 210 can automatically enroll a Profile 5 subject in the monitoring program, or generate and send an invitation to a Profile subject to enroll in the monitoring program.

The computer system 210 may also use the profile distribution to adjust the monitoring program 812a (814). That is, the computer system 210 can determine adjustments to make to the monitoring program 812a using information in the profile distribution 806 corresponding to profiles associated with subjects in the monitoring group 808. The adjustments may include one or more changes to elements of the monitoring program 812a. As an example, these adjustments may include one or more of the following: modifications to the inclusion criteria for the monitoring program; modifications to the exclusion criteria for the monitoring program; modifications to the type, source, schedule, or frequency of data collection; modifications to the type, source, schedule, or frequency of data requests; modifications to monitoring program events or other requirements; modifications to communication methods, content, schedule, and/or frequency; and/or the addition of support features.

The adjustments may correspond to particular profiles of the profiles 804. For example a first set of adjustments may be particular to the Profile 1 subjects while a second set of adjustments may be particular to the Profile 2 subjects. That is, the computer system 210 may customize the monitoring program 812a for one or more profiles, e.g., based on the information contained in or associated with the profiles as indicated by the profile distribution 806. As shown, the computer system 210 uses the profile distribution 806 to customize the monitoring program 812 for the Profile 1 devices and the Profile 2 devices. Specifically, for the Profile 1 devices, the computer system 210 adjusts the monitoring program 812 to provide a weekly transportation credit to those Profile 1 devices based on, for example, the profile distribution 806 indicating that 75% of Profile 1 subjects do not have a vehicle and the monitoring program 812 requiring weekly medical office visits. Similarly, the computer system 210 adjusts the monitoring program 812 for the Profile 2 devices to update the communication channel from email to voice call based on the profile distribution 806 indicating that Profile 2 subjects are 60% more likely to respond to voice call over email and SMS message.

The computer system 210 can automatically make the adjustments to the monitoring program 812 or, alternatively, can generate a recommendation that includes the proposed adjustments. The computer system 210 may transmit the recommendation to the client device 204.

The computer system 210 may update the monitoring program for one or more groups of devices to improve efficiency and/or the likelihood of success of the monitoring program. That is, the computer system 210 may update the monitoring program 812a to improve the outcomes of the monitoring program (e.g., improve likelihood of subject compliance, compliance rates, retention rates, and/or quality of data obtained).

The adjustments to the monitoring program 812 may be temporary for the particular monitoring program. Alternatively, the adjustments to the monitoring program 812 may be permanent so as to update the default elements of the monitoring program.

FIG. 8B illustrates the adjustments made by the computer system 210 to the monitoring group 808 and to the monitoring program 812 for different categories of subjects. As shown, the computer system 210 has updated the monitoring group 808a which included a first subgroup 822 of devices that belong to a first category of subjects (e.g., subjects that correspond to Profile 1 of the profiles 804) and a second subgroup 824 of devices that belong to a second category of subjects (e.g., subjects that correspond to Profile 2 of the profiles 804) to the monitoring group 808. The monitoring group 808b includes the first subgroup 822 of devices, the second subgroup 824 of devices, and a third subgroup 826 of devices that belong to a third category of subjects (e.g., subjects that correspond to Profile 5 of the profiles 804).

Based on determinations made using the profile distribution 806 and the monitoring group 808b, the computer system 210 generates customized monitoring programs 812b, 812c, and 812d for each subgroup of devices 822, 824, and 826, respectively. The changes 814 indicate the changes that the computer system 210 made to the initial monitoring program 812a to generate each of the customized monitoring programs 812b, 812c, and 812d. The changes 814 made to the initial monitoring program 812a for the different subgroups of subjects may be made to improve predicted outcomes for the study. For example, the changes 814 may be made by the computer system 210 in an effort to improve retention of the subjects in the different subgroups, improve compliance with the requirements of the monitoring program, improve the likelihood of obtaining a minimally acceptable amount of data (e.g., to get results from the monitoring program that are statistically relevant, or that meet some other viability measure), improve the likelihood of obtaining at least a minimum level of data quality (e.g., to get results from the monitoring program that are statistically relevant, or that meet some other viability measure), etc.

For the subgroup 822 subjects, the changes 814 include a change 832a to message frequency, and an addition of an assistive element 832b to the monitoring program 812 to provide transportation credit 832b. As an example, Profile 1 of the profiles 804 may indicate that the Profile 1 subjects respond better to more frequent communication (e.g., may indicate higher compliance and/or retention rates with more frequent event reminders). The computer system 210 may use this information to increase the default message, e.g., from weekly to daily.

For the subgroup 824 subjects, the changes 814 include a change 834 to the communication channel. As an example, Profile 2 of the profiles 804 may indicate that the Profile 2 subjects demonstrate higher compliance when voice calls are used over other communications channels. The computer system 210 may use the information in Profile 2 to change the default communication channel, e.g., from email to voice call.

For the subgroup 826 subjects, the changes 814 include a change 836 to the communication channel. As an example, Profile 5 of the profiles 804 may indicate that the Profile 5 subjects have significantly lower retention rates when monitoring programs require the subjects to submit test results more than two times a day when compared to the retention rates for Profile 5 subjects when they are required to submit test results two times a day or less frequently. The computer system 210 may use the information in Profile 5 to modify the glucometer reading requirement, e.g., form requiring three readings per day to two readings per day.

Figure 9A:
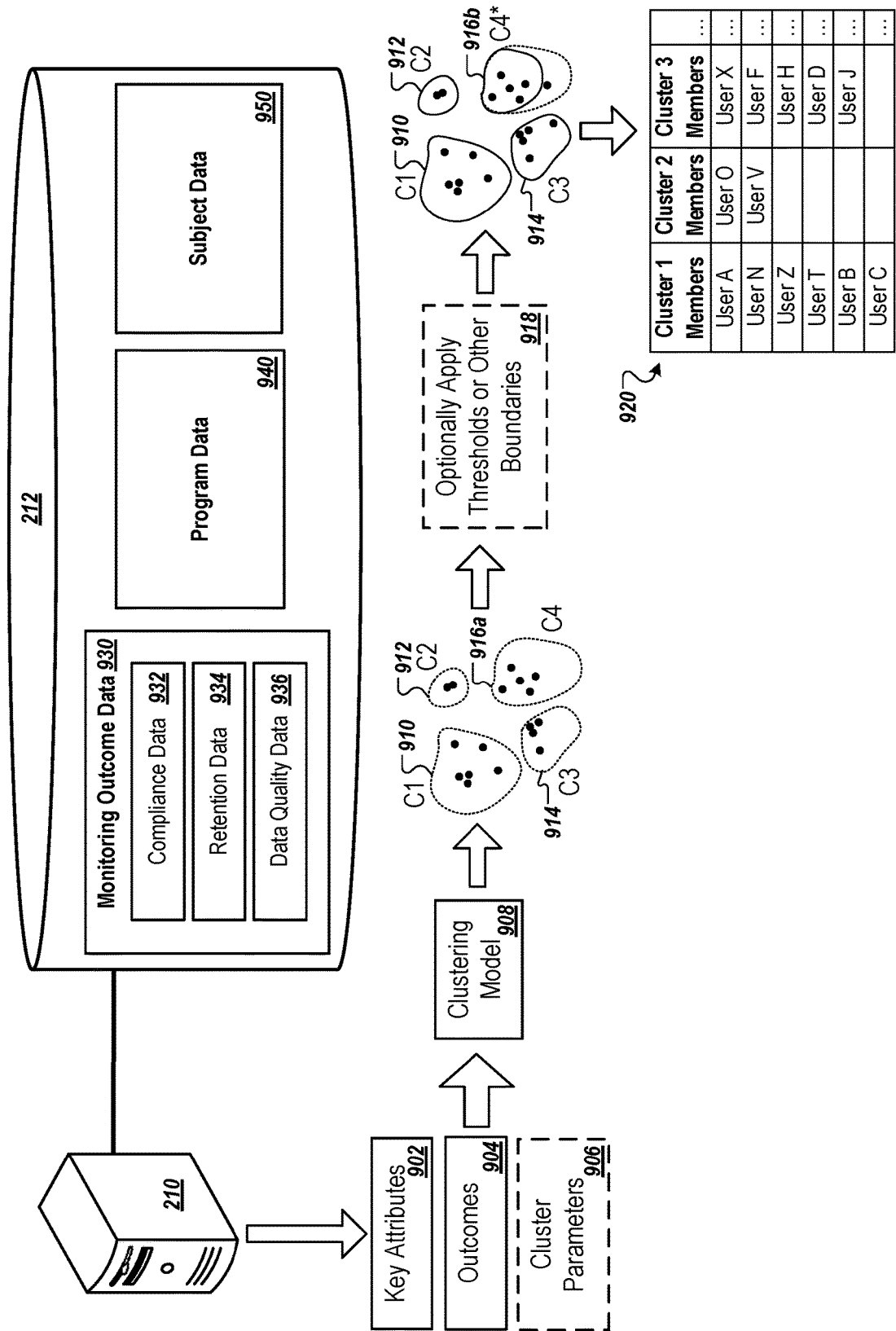
FIGS. 9A-9B are diagrams that illustrate an example system for generating profiles.
Figure 9B:
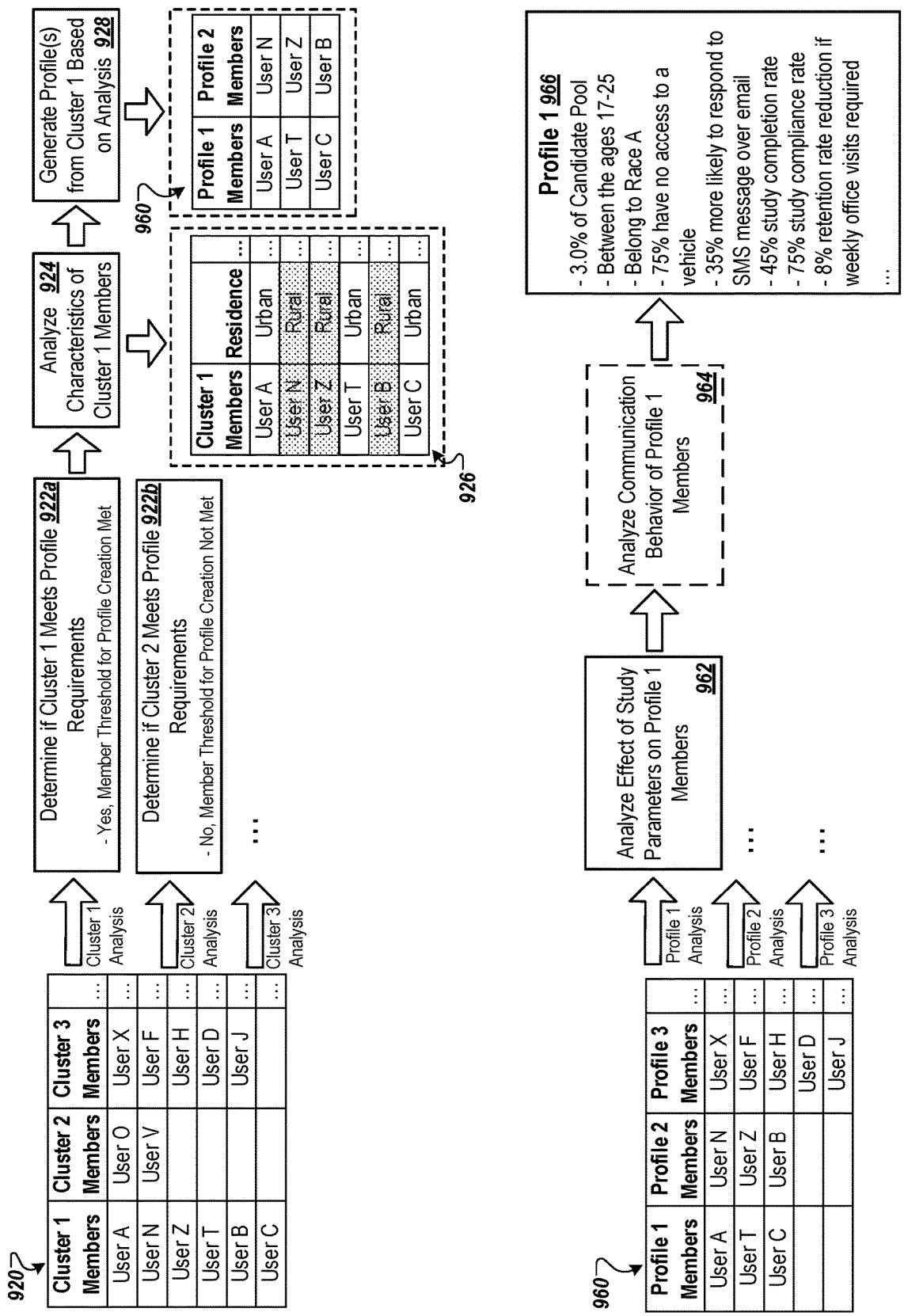

FIGS. 9A-9B are diagrams that illustrate one or more components of the system 200 an example system for generating profiles.

As shown in FIG. 9A, the computer system 210 may generate profiles using outcome data 940, program data 940, and/or subject data 950 stored in the database 212.

The monitoring outcome data 940 may include compliance data 932 (e.g., that indicates previously observed compliance rates for past subjects), retention data 934 (e.g., that indicates previously observed compliance rates for past subjects), and data quality data 936 (e.g., that indicates the quality of data that was obtained from past subjects). The monitoring outcome data 930 may be organized based on the individual subjects. For example, different portions of the compliance data 932, the retention data 934, and the data quality data 936 may correspond to a specific subject. The portion of the compliance data 932 associated with the specific subject may indicate, for example, the overall compliance of the subject across all requirements for all previous monitoring programs or all monitoring programs that are sufficiently recent, the compliance of the subject for particular requirement categories (e.g., smartphone compliance, office visit compliance, etc.) across all previous monitoring programs or all monitoring programs that are sufficiently recent, etc.

The program data 940 may describe the requirements of each monitoring program. For example, the program data 940 may include the default elements of each monitoring program. As was described in more detail with respect to FIGS. 8A-8B, these elements may be removed or modified based on profile data associated with the monitored group. Similarly, elements may be added to monitoring programs based on profile data associated with the monitored group.

More specifically, the program data 940 may include instructions to acquire or request specific data or types of data from subjects, instructions for subjects to perform particular actions, instructions as to the channel of communication and/or the frequency of communication between the computer system 210 and the subjects, instructions to provide accommodations (e.g., taxi credits), etc.

The program data 940 may also include various data packages corresponding to different monitoring programs. These data packages may include, for example, installation files for programs that are to be run on devices to be monitored in a monitoring program.

The subject data 950 may include the attributes, history, behavior, and other tracked data for monitored subjects. As an example, the attribute information in the subject data 950 may include demographic as well as non-demographic information for each of the monitored subjects (e.g., previously monitored subjects or currently monitored subjects), such as race, ethnicity, age, sex, residential area (e.g., city, state, country, etc.), type of residential area (e.g., urban, suburban, or rural), medical conditions, surgeries (e.g., type of surgery and date of surgery), prescriptions, etc. The history information may include information indicating the past monitoring programs that the subject has participated in or completed, and/or the past monitoring programs used during those sessions. The behavior information may indicate the particular subject's observed responses or compliance with certain monitoring program requirements (e.g., elements). As an example, the behavior information may indicate that the subject is 50% less likely to be retained if the monitoring program requires him to make weekly doctor visits. The behavior information may also include or point to portions of the compliance data 932, the retention data 934, and/or the data quality data 936 associated with that particular subject.

In generating the profiles, the computer system 210 may first use one or more machine learning models to cluster subjects from a set. The set may include, for example, subjects that have previously participated in a monitoring program, have previously completed a monitoring program, are currently participating in a monitoring program, have previously participated in a monitoring program that was held sufficiently recent, or have previously completed a monitoring program that was held sufficiently recent. The computer system 210 may use a clustering model 908 to generate different clusters of subjects or eligible subjects based on certain input.

As shown, the computer system 210 may provide one or more of key attributes 902 or outcomes 904 as input to the clustering model 908. The computer system 210 may optionally provide cluster parameters 906 as input to the clustering model 908. In addition, the clustering model 908 may have access to the monitoring outcome data 930, the program data 940, and/or the subject data 950, or may be provided the monitoring program data 930, the program data 940, and/or the subject data 950 as input.

The key attributes 902 may include a list of types of attributes that the clustering model 908 can use to cluster the subjects. For example, the key attributes 902 may include a list of attribute types that are found in the subject data 950. The key attributes 902 may be selected by the researcher 202, may correspond to a particular monitoring program selected for a monitoring program, and/or may be determined by the computer system 210. For example, a researcher 202 may indicate, for diversity purposes, that the key attributes 902 should include race, ethnicity, and medical conditions of the subjects. Based on this, the clustering model 908 may cluster the subjects based on the key attributes 902 or based in part on the key attributes 902 (e.g., clustering model 908 may also take into account the outcomes 904 or other data in the subject data 950).

The key attributes 902 may additionally or alternatively include a subset of the subject data 950. That is, the key attributes 902 may include a portion of the attribute information in the subject data 950 corresponding to the type of attribute selected.

The outcomes 904 may include a list of types of outcomes that the clustering model 908 is to cluster the subjects based on. For example, the outcomes 904 may include a list of outcome types that are found in the monitoring outcome data 930. The outcomes 904 may be selected by the researcher 202, may correspond to a particular monitoring program selected for a monitoring program, and/or may be determined by the computer system 210. For example, a researcher 202 may indicate that subjects should be clustered based on smartphone compliance during monitoring programs.

The outcomes 904 may additionally or alternatively include all or a portion of the monitoring outcome data 930. For example, the outcomes 904 may include all or a portion of the compliance data 932, the retention data 934, or the data quality data 936.

The cluster parameters 906 may include additional criteria for the clusters. For example, the cluster parameters 906 may specify a minimum cluster size, a maximum cluster size, the number of clusters, a minimum number of clusters, a maximum number of clusters, etc.

The clustering model 908 uses the key attributes 902, the outcomes 904, and/or the cluster parameters 906 to generate the clusters 910, 912, 914, 916a. Each of the clusters contain at least one subject of the subject pool. As an example, the key attributes 902 may include medical conditions or a particular set of medical conditions. Based on this, the clustering model 908 may generate the clusters 910, 912, 914, and 916a such that each includes subjects that generally have the same or similar medical conditions. As another example, the clustering model 908 may additionally or alternatively cluster subjects in the subject pool based on outcome data associated with the subjects. That is, the clustering model 908 may group subjects that have the same or similar monitoring program compliance rates, monitoring program retention rates, data quality, or health outcomes (e.g., degree of recovery or management of a disease, occurrence of side effects, etc.).

Clustering by the clustering model 908 may be performed in a number of ways. As discussed above, clustering may be primarily based on the attributes of the subjects, such as demographic and/or non-demographic information stored for subjects as part of the subject data 950. In this example, the clustering model 908 may generate clusters of subjects where each cluster includes a group of subjects that have a number of attributes in common (e.g., same ethnicity, same race, same medical conditions, etc.), have a number of similar attributes (e.g., similar or otherwise related medical conditions that fall into the same category of medical conditions, a height that falls within a particular height ranged determined by the clustering model, etc.), have a number of the key attributes 902 in common, and/or have a number of similar attributes of the key attributes 902. In more detail, the clustering model 908 may cluster subjects based on subjects in each of the groups having the highest number of attributes in common or the highest number of the key attributes 902 in common for that particular cluster when compared to the subjects assigned to other clusters.

Another way that the clustering model 908 can generate the clusters 910-916 is by clustering based on the outcome data 930. For example, the clustering model 908 can generate clusters of subjects based on those that perform similarly. In more detail, the clustering model 908 may generate the clusters 910-916 that each correspond to different groups of subjects that have the same or similar retention rates, the same or similar study completion rates, the same or similar compliance rates (e.g., smartphone compliance, office visit compliance, etc.), etc. Accordingly, the computer system 210 can use profiles generated from these clusters to predict how a subject is likely to perform in a current monitoring program if they meet the eligibility criteria for the profiles. Determining on the number of subjects that are assigned to the different profiles, the computer system 210 may determine that more subjects need to be enrolled in the current monitoring program (e.g., due to the profiles indicating a low retention rate and/or completion rate), ideally those that correspond to a profile which indicates a high completion rate, retention rate, and/or compliance rate.

In assigning subjects to clusters, the clustering model 908 may determine a set of attribute values or ranges that serve as criteria for the clusters. For example, the clustering model may determine that the second cluster 912 requires that the subjects belong to Race B, be over thirty-five years old, and have diabetes. Based on subjects 0 and V meeting these criteria, the clustering model 908 may determine that the second cluster 912 includes subjects 0 and V. This criteria may be used to generate a profile corresponding to the second cluster 912. For example, the same criteria may be used as eligibility criteria for determining if a corresponding profile is applicable to a subject in a current monitoring program, and/or the criteria may be modified (e.g., by an administrator) before being used as eligibility criteria for determining if a corresponding profile is applicable to a subject in a current monitoring program. Clustering in this manner can be used to achieve clusters of subjects that can be used to meet certain diversity criteria. That is, clusters of subjects can be formed where each cluster includes subjects having particular attributes. Accordingly, in conducting a new monitoring program, profiles generated from these clusters can be used to determine if certain diversity criteria is being met or may be used a substitute for diversity criteria. For example, if it is determined that no subjects in a current monitoring program belong to a first profile corresponding to the cluster 910, then additional subjects should be invited to join the monitoring program in order to improve the diversity of the monitoring program and, thereby, improve the applicability of the results and/or improve the likelihood of the results being valid.

Alternatively, the clustering model 908 may generate a set of attribute values or ranges after determining the clusters from the attributes of the subjects in the determined clusters. For example, after generating the clusters 910-916, the clustering model 908 may determine for each of the clusters eligibility criteria for the cluster using the attributes of subjects assigned to each of the clusters. In more detail, for the second cluster 912, the clustering model 908 may access a subject of the subject data 950 corresponding to the subjects 0 and V based on the subjects 0 and V having been assigned to the cluster 912. The clustering model 908 may use this subset of data to generate eligibility criteria for the cluster 912 and/or eligibility criteria for a profile based on the cluster 912. The types of attributes used to generate the criteria may be those that are indicated in the key attributes 902. For example, if the key attributes 902 indicate that clustering should take into account the ethnicity of the subjects, then the ethnicity of the subjects assigned to the cluster 912 should differ from the ethnicity of the subjects assigned to the other clusters. Accordingly, the computer system 210 can access from the subject data 950 the ethnicity data corresponding to the Subjects 0 and V and use that data to generate the criteria. Additionally or alternatively, the clustering model 908 may determine what attributes of the subjects assigned to the cluster 912 are unique with respect to the other clusters. For example, the clustering model 908 may determine that the cluster 912 is the only cluster to include subjects over thirty-five years old. Accordingly, the clustering model 908 may determine that the criteria corresponding to the cluster 912 should include a requirement of a subject being over thirty-five years old.

Thresholds or other boundaries may be optionally applied to one or more of the generated clusters (918). For example, thresholds or other boundaries set by the researcher 202 may be applied to one or more of the clusters 910, 912, 914, and 916a. Applying the thresholds or other boundaries can result in removing clusters, splitting a cluster into two or more new clusters, removing a subject from a cluster or otherwise dissociating the subject with the cluster, etc. As an example, the threshold or other boundaries may include inclusion criteria for the clusters generated by the computer system 210 or set by the researcher 202. The computer system 210 may apply this inclusion criteria to the clusters. As an example, the computer system 210 may apply an inclusion criterion that all subjects in the cluster 916a must be older than 30 years of age. As such, the computer system 210 may update the cluster 916a to disassociate any subjects that were 30 years of age or younger, resulting in cluster 916b.

The subjects associated (e.g., assigned to) each of the clusters 910, 912, 914, and 916 may be considered members of their respective clusters. A table 920 includes example members of the first cluster 910, the second cluster 912, and the third cluster 914.

As shown in FIG. 9B, the computer system 210 may use the different clusters to generate profiles. In more detail, the computer system 210 may generate one or more profiles from the clusters. Additionally or alternatively, the computer system 210 may determine that one or more of the clusters are not eligible for profile generation, e.g., due to not meeting eligibility requirements (e.g., minimum member size; minimum subject population representation; minimum diversity level; etc.). For example, the computer system 210 may analyze each of the clusters to determine if they meet certain requirements for profile generation. As an example, a cluster may only be eligible for profile creation if it represents a threshold percentage of the subject pool or eligible subject pool.

In generating the profiles, the computer system 210 may analyze each of the previously determined clusters. For example, the computer system 210 may perform a first analysis on the cluster 910. In this analysis, the computer system 210 may determine if the cluster 910 meets the requirements for a profile (922a). Here, the profile requirements include a requirement that the number of members in the cluster meet a member threshold (e.g., at least three members, at least ten members, at least one-hundred members, etc.). The computer system 210 may compare the number of members in the cluster 910 to the member threshold to determine that the member threshold is met, and, therefore, that the cluster 910 meets the profile requirements.

After determining that a cluster meets the profile requirements, the computer system 210 can analyze the characteristics of the cluster's members (924). For example, the computer system 210 may obtain the demographic and non-demographic corresponding to the members of the cluster 910. For example, the computer system 210 may generate a table 926 from subject data obtained from the database 212. After obtaining this information, the computer system 210 may use the information to identify shared or common attributes among the members (e.g., race, religion, ethnicity, sex, residence area, level of education, health conditions, prescriptions, past surgeries, etc.), calculate various statistics for the members (e.g., percentage of members that live in a rural area, percentage of members that have access to a vehicle, etc.), and determine likelihoods of particular outcomes (e.g., likelihood of completing a study, meeting a minimum compliance rate, providing sufficient data for monitoring program/session requirements, etc.) and behaviors (e.g., smartphone compliance, attending medical appointments, responding to reminders, etc.).

The computer system 210 may also identify trends or patterns in the obtained subject data. For example, the computer system 210 may recognize that those cluster 910 members that reside in rural areas tend to have similar and distinct smartphone compliance rates when compared to the cluster 910 members that reside in urban areas.

The computer system may proceed to generate profiles 960 from the cluster based on the analysis results (928). For example, the computer system 210 may use the shared or common attributes among the members to generate inclusion criteria for the profile. Similarly, the computer system 210 can include the calculated statistics and determined likelihoods in the profile(s) corresponding to the cluster 910.

In generating profile(s) from the cluster, the computer system may generate multiple from the cluster. For example, the computer system 210 may generate a first profile corresponding to a first subset of the cluster 910 members and a second profile corresponding to a second subset of the cluster 910 members. The subset of members may be determined by the computer system 210, e.g., based on identified trends or patterns in the subject data. Alternatively, the computer system 210 may determine the subsets based on input from the researcher 202. For example, the researcher 202 may indicate one or more attributes that must be shared among profile members. In more detail, the input from the researcher 202 may indicate that all profile members must share the same residence type. Based on this, the computer system 210 may split the cluster 910 members into a first subgroup corresponding to a first profile for members that reside in urban areas, and a second subgroup corresponding to a second profile for members that reside in rural areas.

If the computer system 210 generates multiple profiles from a single cluster, the computer system 210 may analyze each of the multiple profiles. The computer system 210 may do this to (i) determine if the profiles meet the profile requirements (e.g., computer system 210 may eliminate one of the multiple profiles if it does not meet the member threshold) and (ii) analyze the characteristics of the profile members. The computer system 210 may use the determined shared or common attributes among the profile members to generate inclusion criteria for the profile. Similarly, the computer system 210 may include the resulting statistics and likelihoods in the profiles.

In some cases, in generating the profiles, the computer system 210 uses the clustering model 908 to perform another round of clustering. For example, the computer system 210 may use the clustering model 908 to perform another round of clustering based on a different set of attributes (e.g., a set of attributes other than the key attributes 902) and/or based on the outcomes 904. The computer system 210 may perform this second round of clustering before analyzing the clusters, such that the resulting clusters are analyzed to determine if they meet the cluster requirements.

After generating the profiles 960, the computer system 210 may perform an analysis on each of the profiles. In performing the analysis, the computer system 210 may analyze the effect of study parameters on the profile members (962). For example, the computer system 210 may use the subject data 950 to calculate the effects of different parameters (e.g., monitoring program requirements such as required tests that must be performed by subjects, frequency of tests that must be performed subjects, office visits that subjects must attend, morning office visits, afternoon office visits, etc.) on the outcomes of subjects (e.g., retention rates, compliance rates, sufficient data quality rates, etc.). As an example, based on this analysis, the computer system 210 can determine that Profile 1 subjects are 35% more likely to comply (e.g., respond to) with SMS message over communications sent by email. Similarly, based on this analysis, the computer system 210 can determine that the retention rate of Profile 1 subjects is reduced by 8% when subjects are required to attend weekly office visits.

In some cases, the computer system 210 may analyze the communication behavior of the members of a profile (964). This analysis may be a separate analysis from analyzing the effect of study parameters, or may be part of that analysis. In analyzing the communication behavior, the computer system 210 may determine the preferred communication channel, communication frequency, communication time, communication content, communication vocabulary (e.g., word choice), or communication sentence structure for the profile's members. The computer system 210 may further determine the effects of particular communication attributes (e.g., channel, frequency, time sent, etc.) on the outcomes of the profile's members, e.g., when compared to other communication attributes. For example, the computer system 210 may determine that the Profile 1 subjects prefer communication by SMS text message over email. The computer system 210 may analyze the subject data 950 to determine that, when compared to email, the Profile 1 subjects are 35% more likely to respond to SMS text message.

The computer system 210 may update profiles over time using monitored data. For example, the computer system 210 may reanalyze the effects of study parameters on profile members using updated subject data. The computer system 210 may perform this analysis after a triggering event is detected, such as the passing of a predetermined amount of time, after a threshold amount of monitored data is collected, after a monitoring program ends, etc. Similarly, the computer system 210 may use the clustering model 908 to cluster subjects after a triggering event is detected (e.g., after a predetermined amount of time has passed, after a threshold amount of monitored data is collected, after a threshold number of new subjects have appeared/joined, etc.). The computer system 210 may proceed to analyze the clusters in the manner described above. Additionally or alternatively, the computer system 210 may avoid additional analysis of a cluster (e.g., to improve efficiency, reduce processor load, increase processing speed, etc.) if it is determined that the members for a particular cluster match the membership for a previously determined cluster.

The computer system 210 may reassign users to different profiles over time. For example, the computer system 210 may reassign users using the clustering model 908 (e.g., if the output of the model indicates that the users now belong to a cluster not associated with their current profile(s)). As another example, the computer system 210 may automatically assign users to profiles and/or reassign users to different profiles if the corresponding subject data indicates that they (i) meet the inclusion criteria for one or more profiles that they are currently not assigned to, and/or (ii) they no longer meet the inclusion criteria for one or more profiles that they are currently assigned to (e.g., current age indicates that they are no longer in a particular age range required for a first profile).

FIG. 10 is a diagram that illustrates an example table 1000 that includes impact scores corresponding to different clusters 1002 and 1004. In more detail, the table 1000 indicates the impact that different study parameters and other elements are anticipated to have on different clusters of subjects 1002 and 1004.

The impact scores may indicate a quantified impact on one or more outcomes of a monitoring program, such as the retention of subjects, compliance of subjects (e.g., overall compliance, or compliance with particular requirements), data quality, etc. An impact on retention of subjects may indicate an anticipated increase or decrease to the retention rate for a group of subjects (e.g., based on stored historical data) that is attributable to one or more particular study parameters or other elements. As another example, an impact on retention may indicate an anticipated increase or decrease to the likelihood of a minimum number or percentage of subjects being retained by the end of the monitoring program with respect to those subjects in the cluster or assigned to the corresponding profile.

Similarly, an impact on compliance of subjects may indicate an anticipated increase or decrease to the compliance rate for a group of subjects (e.g., based on stored historical data) that is attributable to one or more particular study parameters or other elements. As another example, an impact on compliance may indicate an anticipated increase or decrease to the likelihood of a minimum acceptable compliance rate for the monitoring program (e.g., for study data viability) with respect to those subjects in the cluster or assigned to the corresponding profile.

An impact on data quality may indicate an anticipated increase or decrease to the data quality (e.g., determined based on whether required or requested data was received, the accuracy of data received, the accuracy of the sensor(s) used to acquire the data, the time spent by a subject to produce the data (e.g., did subject spend the time to read and accurately respond to a set of questions), the quantity of data received, the response time of receiving data after requested, etc.). As another example, an impact on data quality may indicate an anticipated increase or decrease to the likelihood of a minimum acceptable data quality (e.g., for study data viability) being achieved (e.g., by the end of the study) with respect to those subjects in the cluster or assigned to the corresponding profile.

The impact scores may correspond to percentages. For example, a "−1" impact score on retention may indicate that it is anticipated that about 10% (e.g., a value rounded to the nearest decimal place and assigned a positive or negative indicator based on the effect of the parameter) of the cluster 1 subjects will not be retained during the study session (e.g., based on historical data of the subject data 950). The percentages may be particular to the effect. For example, a "+2" impact score on effect of data quality may indicate that it is anticipated that there will be about a 15% increase in data quality as a result of the inclusion of the particular study parameter or element in a monitoring program. In contrast, a "+2" effect on retention may indicate that it is anticipated that there will be about a 10% increase in retention as a result of the inclusion of the particular study parameter or element in a monitoring program.

The impact scores may correspond to percentage ranges. For example, a "−1" may indicate a decrease of 10% or less, a "−2" may indicate a decrease of 25% or less, and a "−3" may indicate a decrease of greater than 25%. The percentage ranges may be set by the researcher 202 or may be determined by the computer system 210. For example, an impact of "±1" may indicate small impact as defined by the researcher 202, an impact of "±2" may indicate medium impact as defined by the researcher 202, and an impact of "±3" may indicate a large impact as defined by the researcher 202. As previously mentioned, the impact scores may be particular to the effect such that percentage ranges differs between effect on compliance, effect on retention, and/or effect on data quality.

The computer system 210 may calculate the impact scores in the table 1000. For example, the computer system 210 may calculate the impact scores when analyzing the effects of study parameters on profile members (962) described above with respect to FIG. 9B.

Instead of impacts on clusters of subjects, the table 1000 may additionally or alternatively indicate the anticipated impact of different study parameters and other elements on different groups of subjects that correspond to particular profiles. For example, the impact information in the table 1000 corresponding to the cluster 1002 may actually correspond to Profile 1 of the profiles 960. Similarly, the impact information in the table 1000 corresponding to the cluster 1004 may actually correspond to Profile 2 of the profiles 960.

Figure 11:
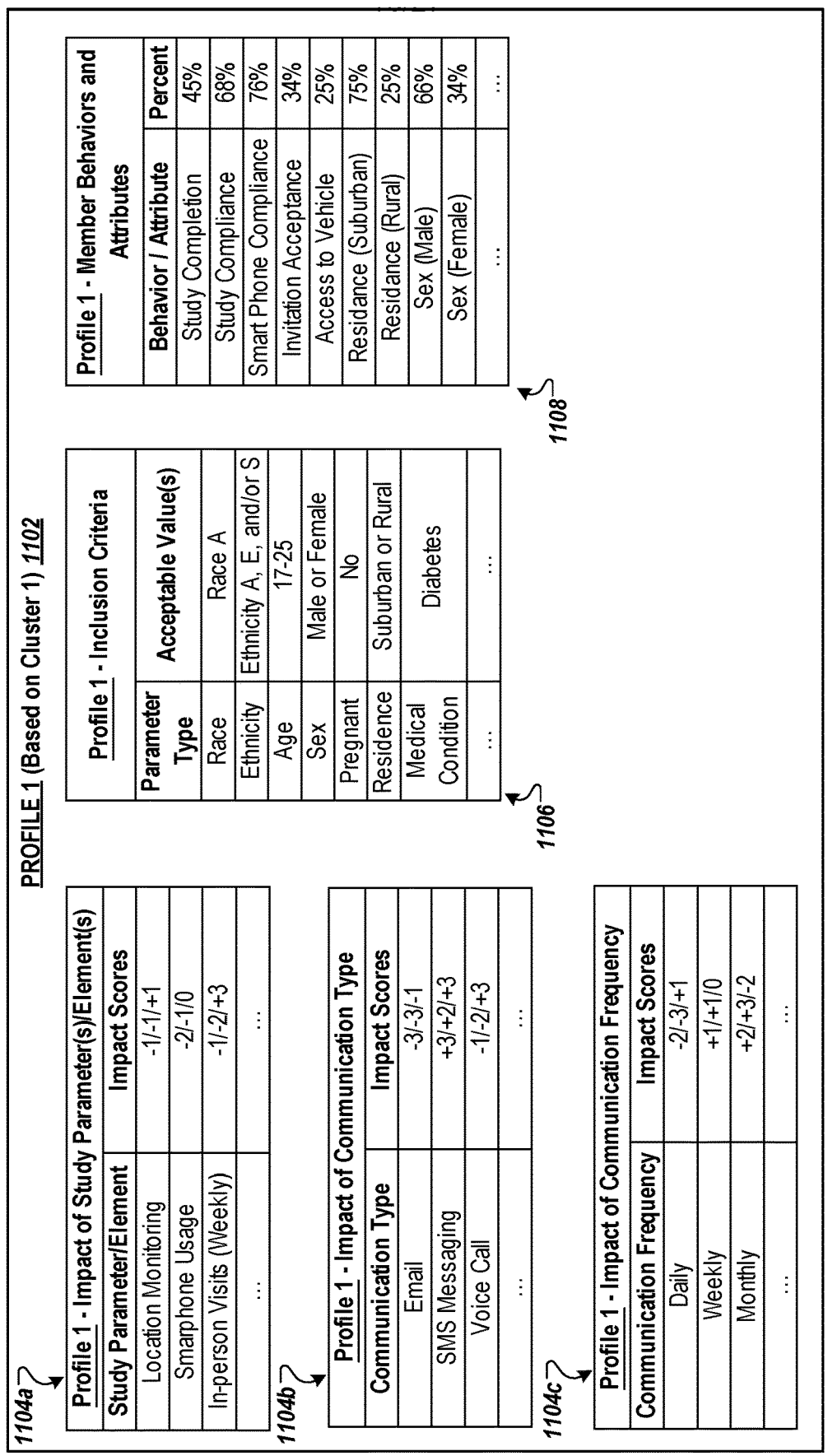
FIG. 11 is a diagram that illustrates an example profile.

FIG. 11 is a diagram that illustrates an example profile 1102.

As shown, the profile 1102 includes a number of tables 1104a, 1104b, and 1104c that indicate the impact of different study parameters or other elements on the compliance, retention, and data quality. The profile 1102 includes a first table 1104a that indicates the anticipated impact of different study parameters and/or other elements on the compliance, retention, and data quality during a given monitoring program. For example, if a monitoring program requires weekly in-person visits, the computer system 210 can anticipate a small reduction to Profile 1 subject retention (e.g., compared to their typical retention rate), a moderate reduction to Profile 1 subject compliance (e.g., compared to their typical compliance rate), and a significant improvement to Profile 1 subject data quality (e.g., compared to their typical data quality provided).

The profile 1102 also includes a second table 1104b that indicates the anticipated impact of different communication types on the compliance, retention, and data quality during a given monitoring program, and a third table 1104c that indicates the anticipated impact of different communication frequencies on the compliance, retention, and data quality during a given monitoring program.

The information in the tables 1104a, 1104b, and 1104c can be determined by the computer system 210. For example, the computer system 210 may calculate the impact scores of the various study parameters and other elements when it analyzes the effect of study parameters on profile members (962) described in more detail above.

The profile 1102 also includes a fourth table 1106 that indicates the inclusion criteria to determine if subjects belong to a category of subjects represented by the profile 1102. The inclusion criteria may include both demographic and non-demographic information. For example, the inclusion criteria in the fourth table 1106 may require that all Profile 1 subjects be between the ages of 17-25 but also require them to being diagnosed with the medical condition, diabetes.

The profile 1102 also includes a fifth table 1108 that includes the determined behaviors and attributes for those subjects associated with the profile 1102. For example, the computer system 210 may determine these behaviors and/or attributes using the subject data 950. The behaviors may include, for example, an overall retention rate (e.g., study completion rate), an overall compliance rate, one or more particular compliance rates (e.g., corresponding to particular requirements of a monitoring program, such as a smart phone compliance rate if a monitoring program requires subjects to use a smart phone and/or collect sensor data with a smart phone), etc. The attributes may include a subset of attributes that are determined to be unusual (e.g., significantly deviate from subject averages). For example, it may be unusual that only 25% of Profile 1 subjects have access to a vehicle (e.g., where 55% of subjects on average have access to a vehicle).

Figure 12:
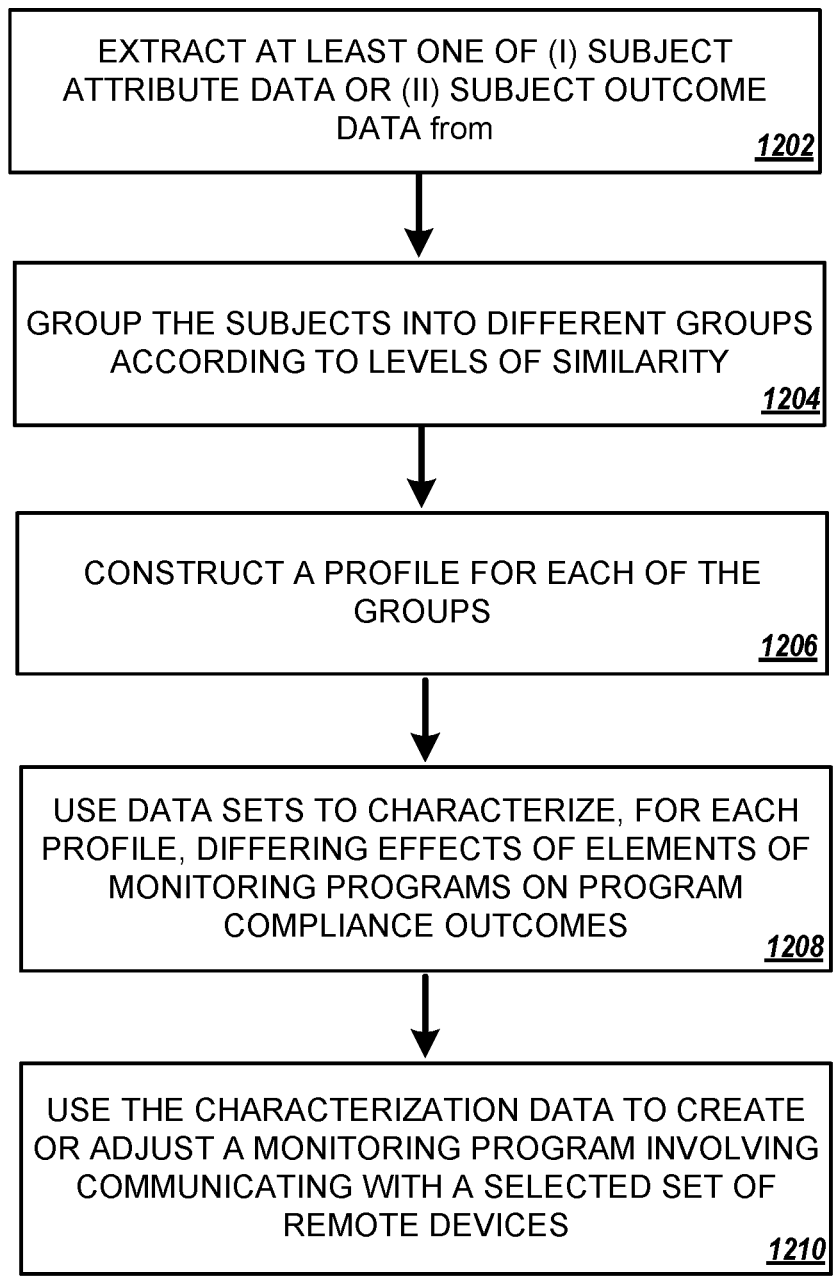
FIG. 12 is a flowchart diagram that illustrates an example process for customizing monitoring programs involving remote devices.

FIG. 12 is a flowchart diagram that illustrates an example process 1200 for customizing monitoring programs involving remote devices. The process 1200 may be performed by one or more computers, such as the computer system 210 shown in various figures including FIG. 2. The operations of the process 1200 may be distributed among one or more servers, one or more client devices, and/or other computing systems. For example, the operations of the process 1200 may be performed by a management and distribution system, such as the system 210, that includes one or more servers, one or more client devices, and/or other computing systems.

The process 1200 includes extracting at least one of (i) subject attribute data or (ii) subject outcome data (1202). Subjects may include at least one of devices or users. For example, a group of subjects selected for a monitoring program may include a diverse set of devices, such as a set of different smartphones. Prior to monitoring the subject devices, the computer system 210 may distribute software for the monitoring program to the subject devices. The subject devices may proceed to install the software. The software may specify the collection of data using sensors of the subject devices or devices connected to the subject devices (e.g., according to a set schedule or in response to receiving particular requests from the computer system 210), provide for a channel of communication between the computer system 210 and the subject devices (e.g., a secure channel of communication, such as an encrypted communication channel), a user interface through which one or more users of the subject devices can interact (e.g., to respond to messages or notifications sent to the subject devices from the computer system 210), etc.

Subjects may additionally or alternatively include a set of users. The users may include users that have participated in one or more previous monitoring programs or monitoring programs. In some cases, the users may include users that are new and have not participated in any monitoring programs or monitoring programs. Prior to monitoring the subjects, the computer system 210 may distribute software for the monitoring program to remote devices that the subject users have access to. The software may be installed in these remote devices and specify, for example, the collection of data of the subject users using sensors of the devices (e.g., according to a set schedule or in response to receiving particular requests from the computer system 210), provide for a channel of communication between the computer system 210 and the devices (e.g., a secure channel of communication, such as an encrypted communication channel), a user interface through which one or more of the subject users can interact with the devices (e.g., to respond to messages or notifications sent to the subject devices from the computer system 210), etc.

Where the subject is a device, extracting subject attribute data describing characteristics of a subject may include, for example, extracting an identifier assigned to the subject device, a manufacturer of the device, a model of the device, a software version running on the device, a CPU speed of the device, a memory size of the device, an indication of sensors installed in the device (e.g., fingerprint scanner, GPS unit, Lidar, accelerometer, etc.), etc. Similarly, where the subject is a user, extracting subject attribute data describing characteristics of the subjects may include, for example, extracting a name of the user, an identifier assigned to the user, demographic information of the user (e.g., age, race, ethnicity, gender, marital status, income, education, employment, residential state, etc.), non-demographic information of the user (e.g., past surgeries, medical conditions, genetics, lifestyle patterns, environmental factors, access to health care, etc.), an indication of what devices and/or sensors that user has access to, etc. As will be described in more detail below, the computer system 210 may use the attribute data of the subjects to categorize the subjects. As an example, with respect to FIG. 9A, the subject attribute data may be part of the subject data 950.

Extracting the subject outcome data can include extracting subject outcome data including results from monitoring programs that involved the subjects. The results may include, for example, compliance data for the subjects, retention data for the subjects, and data quality data for the subjects. As an example, with respect to FIG. 9A, the subject outcome data may include the compliance data 932, the retention data 934, and the data quality data 936. The computer system 210 may determine the subject outcome data using, for example, monitored results of subjects during the past monitoring programs. The monitored results may be stored, at least initially, as part of the subject data 950. The computer system 210 may extract the relevant information from the subject data 950, such as response times, response content, sensor data, etc., to determine the subject outcome data.

The compliance data may include, for example, compliance rates such as an overall compliance rate for each of the subjects or for each category of subjects with respect to monitoring program requirements of past monitoring programs and/or monitoring programs that the subjects have participated in. However, the compliance data may also or alternatively include compliance rates for particular areas, such as the subjects' compliance with device usage (e.g., smartphone compliance, blood pressure device compliance, heart rate monitor compliance, etc.), with responsiveness (e.g., does the subject on average respond within thirty minutes of receiving a message or notification, within one hour of receiving a message or notification, within one day of receiving a message or notification, etc.; does the subject consistently provide required test results; does the subject consistently perform required tasks; etc.), with office visits (e.g., medical visits scheduled as part of the monitoring program), etc. In determining a compliance rate for a subject, the computer system 210 may average all of the relevant compliance rates (e.g., overall compliance rate, or subject-specific compliance rate) for the subject across their past monitoring programs.

The retention data may include, for example, a retention rate for each of the subject or for each category of subjects over their past monitoring programs sessions. As an example, the computer system 210 may determine a retention rate for each subject using the number of monitoring programs the subject has previously participated in, and the number of monitoring program the subject successfully completed. As an example, the computer system 210 may determine that a subject was not retained in (e.g., did not complete) a particular monitoring program if they stopped responding, if their compliance rate(s) fell below threshold compliance rate(s), if they failed to perform one or more tasks (e.g., perform tests, upload tests results, attend medical office visits, fill out surveys, meet dietary restrictions, perform required exercises, etc.), or if they indicated that they were withdrawing from the monitoring program. The computer system 210 may keep track of the subject retention rates as part of the retention data 934. The computer system 210 may optionally determine and track retention rates of subjects in particular monitoring programs or types of monitoring programs. For example, if a particular subject has participated in three monitoring programs of a monitoring program (e.g., potentially different versions of the monitoring program including customized versions), the computer system 210 may determine and track a retention rate for the subject with respect to this particular monitoring program. The computer system 210 may similarly track the subject's compliance data and data quality data that correspond to this monitoring program.

The data quality data may include, for example, an indication of data quality for each of the subjects or for different categories of subjects. Additionally or alternatively, the data quality data may include data quality rates that indicate, for each of the subjects or for each category of subjects, the percentage of data that meets minimum data quality requirements. The computer system 210 may use various factors to determine data quality or which may be used to set minimum data quality requirements. These factors can include response times (e.g., where relatively quick response times and/or relatively long response times may correspond to low data quality), sensor data accuracy (e.g., based on the sensor and/or device used to collect the sensor data), sensor data consistency (e.g., based on the sensor and/or device used to collect the sensor data, and/or the other sensor data values collected using the same sensor and/or device or the same sensor type and/or device type), response content (e.g., text input that is relatively short or that is below a threshold word count may correspond to low data quality; text input that is relatively long or that is above a threshold word count may correspond to high data quality; etc.), etc. The computer system 210 may use one or more algorithms to determine a data quality score or a data quality rate, e.g., for a particular monitoring program and/or across all monitoring programs. As an example, the computer system 210 may calculate a data quality score for each monitoring program of each subject or each category of subjects, and average the data quality scores to obtain an overall data quality score for the subject or the group of subjects.

Extracting at least one of the subject attribute data or the subject outcome data can include extracting at least one of the subject attribute data or the subject outcome data from a database. The database may store data sets for multiple different subjects, such as data sets for different devices and/or data sets for different users. The data sets can include attribute data for the different subjects. For example, where the subject is a device, a corresponding data set may include an identifier assigned to the device, make of the device, a model of the device, a software version running on the device, a CPU speed of the device, a memory size of the device, an indication of sensors installed on the device (e.g., fingerprint scanner, GPS unit, Lidar, accelerometer, etc.), etc. The computer system 210 may extract all or a portion of this information from the data sets. Similarly, where the subject is a user, a corresponding data set may include the name of the user, an identifier assigned to the user, demographic information of the user (e.g., age, race, ethnicity, gender, marital status, income, education, employment, residential state, etc.), non-demographic information of the user (e.g., past surgeries, medical conditions, genetics, lifestyle patterns, environmental factors, access to health care, etc.), an indication of what devices and/or sensors that user has access to, etc. The computer system 210 may extract all or a portion of this information from the data sets.

The data sets may include results of monitoring performed for the subjects using one or more remote computing devices. For example, the data sets may include an indication of messages sent to the subjects, responses received from the subjects, sensor data received from the subjects, etc. The data sets may additionally include information determined from received data and/or responses, such as subject outcomes. For example, the data sets may include response times, response frequency, message compliance or compliance rates for the user, an indication of user retention or retention rates for the user, indications of data quality, etc.

Extracting at least one of (i) the subject attribute data or (ii) the subject outcome data can include using metadata to identify the data in one or more data sets that should be extracted. For example, the computer system 210 may use an identifier or data type to extract attribute data from the database 212. Similarly, the computer system 210 may use a different identifier or data type to extract outcome data from the databased 212.

Extracting at least one of (i) the subject attribute data or (ii) the subject outcome data can include parsing through stored, monitored subject data to identify at least one of the subject attribute data or the subject outcome data. For example, the computer system 210 may store the monitored data in the database 212. In response to receiving instructions to start a new monitoring program, receiving instructions to update the profiles or groups, determining that monitoring data has been collected on one or more new subjects, and/or detecting a different event, the computer system 210 may parse through the data sets in the database 212 to identify the subject attribute data and/or the subject outcome data.

The process 1200 includes grouping the subjects into different groups according to levels of similarity (1204). The levels of similarity can be levels of similarity among the attributes of the subjects and/or the monitored outcomes for the subjects. As an example, with respect to FIG. 9A, the computer system 210 may determine or receive an indication of the key attributes 902 and the outcomes 904. The key attributes 902 may include a subset of particular subject attributes extracted by the computer system 210 from the subject data 950. Similarly, the outcomes 904 may include a subset of particular monitored outcomes for the subjects extracted by the computer system 210 from the monitoring outcome data 930. The computer system 210 may proceed to use at least one of the key attributes 902 and the outcomes 904 to group the subjects into different groups.

In grouping the subjects, the computer system 210 may group subjects based on the extracted attributes, the extracted outcomes, or a combination of the attributes and outcomes. As an example, the computer system 210 may use the extracted attributes to identify those subjects that share the same or a similar subset of subject attributes. In grouping the subjects, the computer system may additionally or alternatively identify those subjects that have demonstrated the same or similar outcomes. For example, the computer system 210 may identify those subjects that tend to have similar overall compliance rates (e.g., compliance rate are within a range of multiple ranges of compliance rates), similar device compliance rates, similar retention rates, produce similar data quality, etc. The computer system 210 may then further organize the subjects by those that have similar medical conditions or that share other attributes to identify multiple groups of subjects. For example, the computer system 210 may identify a first group of subjects that have diabetes and a compliance rate above 60%, a second group of subjects that have diabetes and a compliance rate below 60%, a third group of subjects that do not have diabetes and a compliance rate above 60%, and a fourth group of subjects that do not have diabetes and have a compliance rate below 60%.

In grouping the subjects, the computer system 210 may use one or more static or machine learning algorithms. For example, in some implementations, grouping the subjects into different groups according to levels of similarity includes grouping the subjects into different groups using one or more machine learning models. The one or more machine learning models can include a clustering machine learning model. For example, the computer system 210 can provide the key attributes 902 and/or the outcomes 904 to the clustering model 908 as input. The clustering model 908 may proceed to cluster the subjects (e.g., previous monitoring program participants) based on the key attributes 902 and/or the outcomes 904 into multiple groups of subjects. The clustering model 908 can cluster the subjects according to a subset of subject attributes and/or particular outcomes (e.g., desirable outcomes, undesirable outcomes, or certain types of outcomes, such as compliance rates, retention rates, or data quality).

Where a clustering machine learning model is used to group the subjects, the clustering model may be one of following models: a density clustering model, a connectivity clustering model, a centroid clustering model, distribution clustering model, a subspace clustering model, a group clustering model, a graph clustering model, signed-based clustering model, or a neural network model. In some cases, multiple machine learning models are used. As an example, two or more clustering models may be used to group the subjects.

In some implementations, the machine learning model(s) used for grouping subjects are trained (e.g., supervised) using input data sets and expected outputs for those data sets. The data sets may include, for example, subject attribute data and/or subject outcome data. The expected outputs for those data sets may include an indicator for each of the subjects that specifies which group that the subject belongs to. For example, the expected outputs may include values corresponding to subjects that fall within a first range of values corresponding to a first group of subjects, values corresponding to other subjects that fall within a second range of values corresponding to a second group of subjects, etc.

In some implementations, the machine learning model(s) used for grouping subjects are not-trained (e.g., unsupervised). For example, the machine learning model(s) may include an unsupervised k-means clustering algorithm that does not require ground truth in order to group the data points of the input data into distinct subgroups.

The output of the machine learning model may indicate a group that each of the subjects belong to. For example, the output of the machine learning model may include a value for a first subject that falls within a first range of values corresponding to a first group of subjects, and a second value for a second subject that falls within a second range of values corresponding to a second group of subjects. The output of the machine learning model may indicate one or more value ranges or thresholds that define the different groups. As another example, the output of the machine learning model may include a value for each subject, where the value corresponds to a particular group that the subject is placed in. In more detail, the output value may indicate the centroid that each subject was assigned to during grouping (e.g., clustering).

In some implementations, additional input is provided to the machine learning model. For example, with respect to FIG. 9A, the computer system 210 may provide cluster parameters 906 to the clustering model 908. The cluster parameters 906 may define a number of clusters, a minimum or maximum cluster size, a number of clustering iterations, a centroid change threshold, etc.

In some implementations, in grouping the subjects, the machine learning model performs multiple grouping iterations. For example, the machine learning model may be a k-means clustering algorithm that performs multiple clustering iterations until there is no change to the centroids or until the change to the centroids is below a threshold value.

The process 1200 includes constructing a profile for each of the groups (1206). A profile may represent a category of subjects. A profile may be constructed using one of the different groups of subjects. The resulting profile may represent a category of subjects that corresponds to one of the different groups of subjects. For example, after grouping the subjects into the different groups, the computer system 210 may construct corresponding profiles for the different groups. Each profile may be constructed using subject data from one of the different groups of subjects.

In some implementations, a profiles is constructed using two or more groups of subjects of the different groups. For example, the computer system 210 may combine multiple of the different groups of subjects, and used the combined groups to construct the profile such that the profile corresponds to multiple groups of the different groups of subjects.

Similarly, in some implementations, a profile is constructed using only a portion of one of the different groups. For example, the computer system 210 may split a group of subjects into two or more subgroups (e.g., based on input from a researcher or an administrator). The computer system 210 may proceed to use one of these subgroups to construct the profile such that the profile corresponds to the subgroup but does not correspond to all subjects in the larger group of subjects.

The computer system 210 may use subject data corresponding to one or more of the different groups to construct each of the profiles. The computer system 210 may use subject attribute data (e.g., not necessarily limited to the extracted subject attribute data) and subject outcome data (e.g., not necessarily limited to the extracted subject outcome data) to construct the profiles for each of the groups. In more detail, in constructing the profiles, the computer system 210 may use the subject attribute data and/or the subject outcome data to define inclusion criteria for each category of subjects corresponding to one of the different groups. For example, for a particular group of subjects, the computer system 210 may determine based on the attribute data that each subject in the group is over the age of 37, lives in an urban environment, and has been diagnosed with high blood pressure. Based on this, the computer system 210 may, in constructing a profile to represent a category of subjects corresponding to this group, set inclusion criteria for the group to require that subjects be above the age of 35, reside in an urban environment, and be diagnosed with high blood pressure or are observed to have at least 7/10 indicators for high blood pressure (e.g., based on a preliminary test, entry survey, etc.).

The set criteria may include a broader range of values than observed values, e.g., to make the group more inclusive. Alternatively, the set criteria may include a range of values that is the same range as the observed values. Similarly, the set criteria may include a range of values that is less than the observed values, e.g., to make the group more exclusive and/or to account for outliers in the group. Finally, the set criteria may include a combination of different range of values that are greater than, less than, and/or the same as the observed values.

In some implementations, the computer system 210 filters the different groups to identify a subset of groups in the different groups that meet criteria for profile construction. For example, in order to be used for profile construction, each of the different groups may need to include a minimum number of subjects. The groups may also need to meet other profile criteria, such as minimum diversity requirements. The profile criteria may be set by a researcher or an administrator. After determining the subset of groups in the different groups that meet the criteria for profile construction, the computer system 210 may use each of the groups in the subset of groups to construct corresponding profiles.

In some implementations, the inclusion criteria is used to determine which subjects correspond to which profiles. For example, although the subjects were previously assigned to groups, the inclusion criteria may differ from the observed values of the group. Accordingly, the computer system 210 may compare the inclusion criteria against the attribute data and/or outcome data of the subjects to determine or verify which subjects correspond to which profiles. The attribute data and/or outcome data of the subjects used by the computer system 210 used to determine or verify which subjects correspond to which profiles may include attribute data and/or outcome data of active subjects (e.g., subjects that have participated in a monitoring program or monitoring program over the last year, have participated in a monitoring program or monitoring program over the last two years, are listed as active, etc.). In contrast, the attribute data and/or outcome data used to construct the profiles may include attribute data and/or outcome data of all subjects in a subject pool (e.g., for which monitored data has been collected), including active and inactive subjects.

In some implementations, information is added to the profiles that is not used as inclusion criteria. For example, the computer system 210 may include subject attribute data and/or attribute data statistics in the profile. In more detail, the computer system 210 may include the number or percentage of subjects in the profile that have a particular attribute (e.g., percentage of subjects that have high blood pressure, that are of a first ethnicity, that have a college education, etc.), and/or that demonstrate the same or similar outcomes (e.g., that have a retention rate greater than 75%, that have a retention rate between 50% and 75%, and that have a retention rate less than 50%). The computer system 210 may also determine and include in the profile an indication of the number of subjects in the category of subjects, or a percentage of the total or active subject pool that the category of subjects represents. For example, the computer system 210 may compare the number of subjects in a category of subjects represented by a profile to the total number of subjects or to a total number of active subjects to determine that the category of subjects represents 4.2% of the subject pool or of the active subject pool.

The process 1200 includes using data sets to characterize, for each profile, differing effects of elements of monitoring programs on program compliance outcomes (1208). The data sets may be stored in a database by, for example, the computer system 210. The data sets may include monitored subject data over multiple monitoring programs. In determining the different effects of elements of monitoring programs, such as tasks (e.g., tests, appointments, exercises, etc.), message content, message frequency, message time, task or event schedule, etc., on subjects' outcomes, the computer system 210 may use the program data 940 to identify various monitoring program elements and use the monitoring outcome data 930 to identify the effects of those program elements on the different categories of subjects. In more detail, for a particular monitoring program element, the computer system 210 may determine which subjects have encountered that element before and in which past monitoring program(s), and use a portion of the outcome data 930 corresponding to those past monitoring programs and subjects to determine what effect on subject outcomes, if any, the particular element had on those subjects.

For example, if three subjects assigned to a first profile are determined to have encountered the requirement for weekly office visits in one or more prior monitoring programs, the computer system 210 may obtain a portion of the monitoring outcome data 930 corresponding to those monitoring programs for the first profile subjects. The computer system 210 may proceed to use the portion of the outcome data 930 and the corresponding subject data 950 to determine (e.g., to see if there was a deviation or a statistically significant deviation from the first profile subject's typical behavior) if the weekly office visits had a negative, positive, or neutral effect on compliance rates, retention rates, and/or data quality for the first profile subjects, and the magnitude of that effect on those subject outcomes. The computer system 210 may proceed to include the effect (e.g., direction and magnitude) as part of the profile As discussed above, the effect of a monitoring program element on subject outcomes may be in the form of calculated impact scores as shown and described above with respect to FIGS. 10-11. An impact score may be an absolute or relative score. This score may represent a percentage or a percentage range. The percentage or percentage range that the impact score represents may depend on the magnitude of the impact score and/or on the corresponding outcome (e.g., larger percentage range for compliance rates than, for example, retention rates which are likely to fluctuate to a lesser degree than compliance rates).

In some implementations, the computer system 210 analyzes the communication behavior of the subjects of a profile. This analysis may be a separate analysis from analyzing the effect of study parameters, or may be part of that analysis. In analyzing the communication behavior, the computer system 210 may determine the preferred communication channel, communication frequency, communication time, communication content, communication vocabulary (e.g., word choice), or communication sentence structure for the profile's subjects. The computer system 210 may further determine the effects of particular communication attributes (e.g., channel, frequency, time sent, etc.) on the outcomes of the profile's subjects, e.g., when compared to other communication attributes. For example, the computer system 210 may determine that the Profile 1 subjects prefer communication by SMS text message over email. The computer system 210 may analyze the subject data 950 to determine that, when compared to email, the Profile 1 subjects are 35% more likely to respond to SMS text message.

The computer system 210 may update profiles over time using monitored data. For example, the computer system 210 may reanalyze the effects of study parameters on profile subjects using updated subject data obtained in one or more ongoing monitoring programs or results from recently completed monitoring programs. The computer system 210 may perform this analysis after a triggering event is detected, such as the passing of a predetermined amount of time, after a threshold amount of monitored data is collected, after a monitoring program ends, etc. Similarly, the computer system 210 may use the clustering model 908 to cluster subjects after a triggering event is detected (e.g., after a predetermined amount of time has passed, after a threshold amount of monitored data is collected, after a threshold number of new subjects have appeared/joined, etc.). The computer system 210 may proceed to analyze the clusters in the manner described above. Additionally or alternatively, the computer system 210 may avoid additional analysis of a cluster (e.g., to improve efficiency, reduce processor load, increase processing speed, etc.) if it is determined that the members for a particular cluster match the membership for a previously determined cluster.

In some implementations, the computer system 210 analyzes the effects of each element of every monitoring program that has been run in a sessions. Because various monitoring programs and monitoring programs may include all or a portion of the same elements, the computer system 210 does not necessarily need to analyze each and every element of each monitoring program (or version of monitoring program) separately.

In some implementations, the computer system 210 analyzes the effects of only a subset of elements of the monitoring programs that have been run in one or more monitoring programs. For example, the computer system 210 may choose to analyze the effects of only those elements for which sufficient monitored data has been collected on. In more detail, the computer system 210 may choose to only analyze the effects of those elements that have been in at least three monitoring programs, for which there have been at least six months of data collected for, for which at least twenty unique subjects experienced, etc.

In analyzing the effects of the monitoring program elements on subject outcomes, the computer system 210 may extract, for each profile, the relevant information from the database 212, and analyze the extracted data together. That is, instead of analyzing the effects on a subject by subject basis, the computer system 210 may collect, for each of the profiles, all of the relevant subject data and analyze the collected data as a whole. This has the benefit if reducing computational burden by reducing the number of processes the CPU(s) of the computer system 210 need to perform, and further increases efficiency by speeding up the processing time.

After analyzing the effects of the monitoring program elements on subject outcomes, the computer system 210 may update the profiles to include the corresponding analysis results. For example, if it is determined that subjects in a category of subjects represented by Profile 1 are twice as likely to not complete a study if it requires blood to be drawn daily, the computer system 210 may update Profile 1 to include an impact score of −5 (e.g., to represent −50% effect on retention rate) for retention for the monitoring program element, "blood drawn" with a frequency of "daily."

The computer system 210 may organize the different effects of different elements into different categories or hierarchies within the profiles. For example, with respect to FIG. 11, the computer system 210 may organize the data in the table 1104*b* and the table 1104*c* under a communication category.

The process 1200 includes using the characterization data to create or adjust a monitoring program involving communicating with a selected set of remote devices (1210). The computer system 210 may identify the profiles that are present among a monitoring group selected for a monitoring program, compare the elements of the selected monitoring program to the element effect information in the profiles, and, based on the comparison, determine one or more adjustments to the monitoring program for the different categories of subjects. The adjustments made by the computer system 210 may include removing or modifying an element of a monitoring program (e.g., reduce number of tests that user must complete if this is determined to significantly lower retention rates), adjusting communication attributes (e.g., communication channel, frequency, time, content, sentence structure, etc.), or adding an element (e.g., account for subjects not having access to a device, account for subject not having access to transportation by providing transportation credit, etc.). For example, if an element of a monitoring program is anticipated to reduce compliance with subjects assigned to a second profile, the computer system 210 may adjust that element using information in the second profile to mitigate the anticipated reduced compliance.

The computer system 210 can automatically make the adjustments for the one or more groups of subjects enrolled in the monitoring program. For example, if the computer system 210 determines that a particular adjustment should account for an anticipated lower retention rate among Profile 1 subject due to an element of the monitoring program, the computer system 210 may generate a new version of the monitoring program and distribute this new version to only remote devices corresponding to the Profile 1 subjects.

The computer system 210 can generate a recommendation to make one or more adjustments and transmit the recommendation to a researcher or an administrator. The recommendation may include multiple recommended adjustments to the monitoring program, such as one or more recommended adjustments for each unique profile present among the selected subjects for the monitoring program. The recommendation may include the most recommended adjustments, such as the five or ten most recommended adjustments. Similarly, the computer system 210 may generate a recommendation that includes at least two recommendations (e.g., two most recommended adjustments) for each of the profiles present among the selected subjects. The computer system 210 may rank the recommended adjustments, e.g., based on predicted effect at achieving a successful monitoring program (e.g., obtaining viable data). For example, the adjustments predicted by the computer system 210 to have the largest remedial effect (e.g., for expected negative outcomes, such as low retention, low compliance, low data quality, etc.) may be ranked above adjustments that are predicted to have less significant effects. Similarly, adjustments that are predicted by the computer system 210 to have a higher likelihood of producing a remedial effect may be ranked by the computer system 210 above adjustments whose beneficial effect is more speculative.

The computer system 210 may wait for a response from the researcher or administrator before proceeding with the monitoring program. The response may include a confirmation (e.g., if it included one recommended adjustment, or one recommended adjustment for each category of subjects represented in the monitoring group). Alternatively, the response may include one or more selections, e.g., that correspond to adjustments selected by the researcher or administrator. The computer system 210 may use the confirmation or response to generate one or more additional versions of the monitoring program, each specific to a particular category of subjects (e.g., corresponding to a particular profile).

In some implementations, if the computer system 210 does not receive a response within a predetermined amount of time, the computer system may implement one or more recommended adjustments itself. For example, for each profile, the computer system 210 may generate a version of the monitoring program where the most recommended adjustment has been made (e.g., if there are recommended adjustments). If there were no recommended adjustments for a particular category of subjects, the computer system 210 may send the default monitoring program to the remote devices of those subjects.

Using the characterization data to create or adjust the monitoring program may also include using the characterization data to adjust the enrolled subjects. For example, if the characterization data indicates that a subset of the enrolled subjects are predicted to have insufficient compliance rates through a session due to the monitoring program requirements (e.g., if the program requirements cannot be adjusted or cannot be adjusted to the extent needed), the computer system 210 may replace the subset of the enrolled subjects with a different set of subjects who are anticipated to produce outcomes that are sufficient with the monitoring program's requirements. The computing system 210 may automatically enroll the other subjects, or may send invitations to the other subjects to enroll.

As another example, the computer system 210 may use the profiles to determine that additional subjects need to be added to the monitoring group due to one or more profiles not being represented. That is, the profiles may be used as a diversity metric. The computer system 210 may, for example, determine that one or more additional subjects should be enrolled or invited to the monitoring program based on the size of the category of subjects that is not represented. For example, the computer system 210 may automatically enroll or generate a recommendation for enrollment of a subject that is in a category of subjects (e.g., corresponding to a particular profile) that represents more than 3%, 5%, or 7% of the subject pool and is not represented in the monitoring group for the current monitoring program. Similarly, certain categories of subjects may be marked as necessary for monitoring program representation for other reasons, such as for meeting diversity criteria required for the monitoring program and/or for obtaining viable results.

Communication with a selected set of remote devices may take place over a communication network such as a wireless internet network (e.g., Wi-Fi), a cellular network (e.g., 5G network), etc. The computer system 210 may form a secure communication channel, such as an encrypted channel between the remote devices and the computer system 210 to protect the transfer of sensitive data such as medical records, medical information, health data, photographs, etc. between the remote devices and the computer system 210.

Prior to starting a monitoring program, the computer system 210 may distribute software to the remote devices. Alternatively, the remote devices may access the software through a website or mobile application. However, the accessed software may be customized to the specific remote device based on it or its user corresponding to a particular subject profile. The software may provide for the configuration of a secure communication channel between a remote device and the computer system 210, and/or for a user interface through which a subject can interact to, for example, respond to messages, provide feedback, provide text input, submit photographs, submit test results, etc. using touch input, keyboard input, voice input, or a combination of different input types.

As previously mentioned, the computer system 210 may customize the monitoring program for different categories of subjects corresponding to different profiles. In doing this, the computer system 210 may generate and distribute different software versions. The different software versions may provide for different and possibly unique interactions between devices of subjects corresponding to a first profile, and devices of subjects corresponding to a second profile. For example, the two different software versions corresponding to the same base monitoring program may provide for a different frequency of data collection, using a different sensor to collect the data, a different channel of communication to send request or message, etc.

In some implementations, the remote devices are the subjects for a monitoring program.

Figure 13:
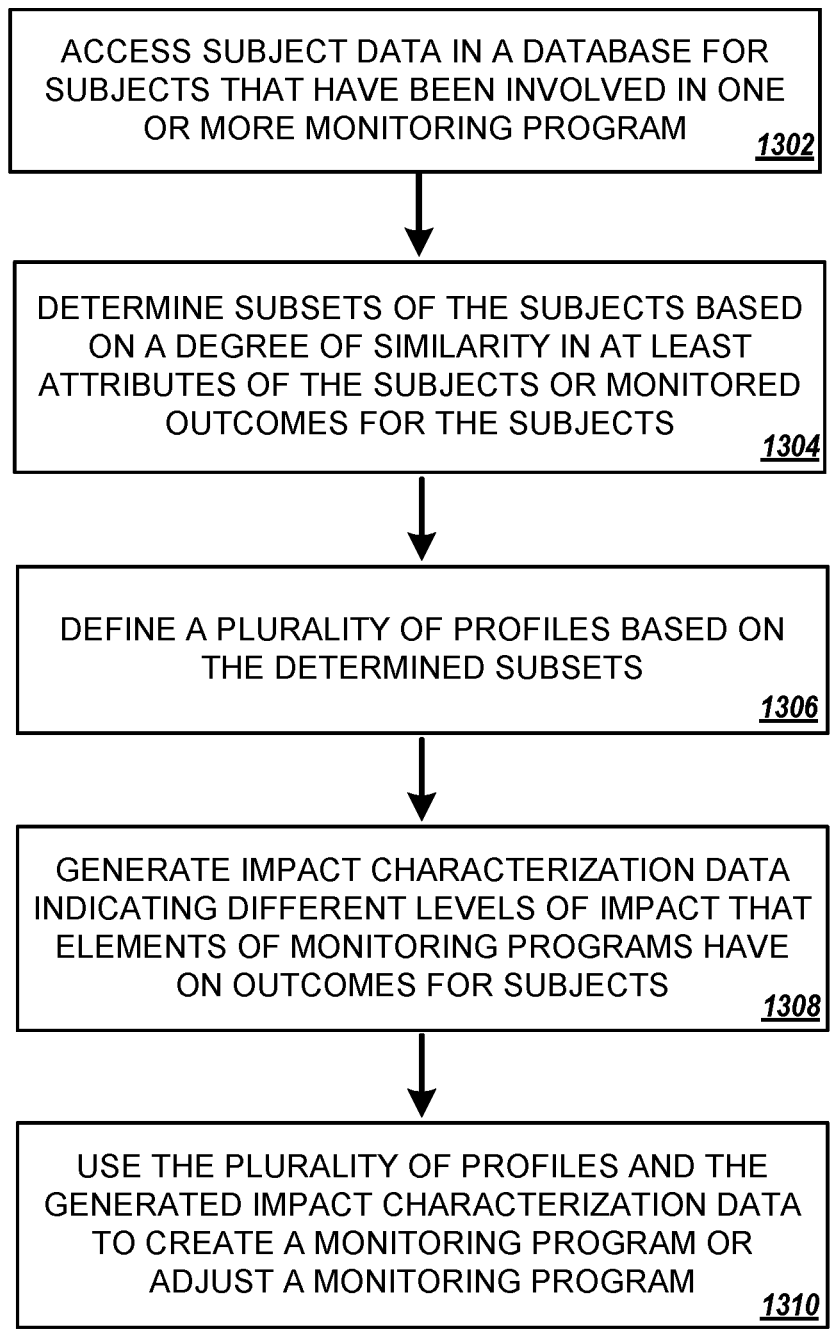
FIG. 13 is a flowchart diagram that illustrates an example process for customizing monitoring programs involving remote devices.

FIG. 13 is a flowchart diagram that illustrates an example process 1200 for assessing and selecting technologies. The process 1300 may be performed by one or more computers, such as the computer system 210 shown in various figures including FIG. 2. The operations of the process 1300 may be distributed among one or more servers, one or more client devices, and/or other computing systems. For example, the operations of the process 1300 may be performed by a management and distribution system, such as the system

210, that includes one or more servers, one or more client devices, and/or other computing systems.

The process 1300 includes accessing subject data in a database for subjects that have been involved in one or more monitoring program (1302). For example, with respect to FIG. 9A, the computer system 210 may access the subject data 950 from the database 212. The subject data 950 may include attributes for subjects in a subject pool that have participated in one or more previous monitoring programs, and/or are currently enrolled in an ongoing monitoring program. The subject data 950 may also include other data, such as historical data, including response times, response content, compliance data, uploaded data, indication of past and/or present monitoring programs that subject has participated in, etc.

The process 1300 includes determining subsets of the subjects based on a degree of similarity in at least attributes of the subjects or monitored outcomes for the subjects (1304). For example, with respect to FIG. 9A, the computer system 210 may use key attributes 902 (e.g., a subset of particular subject attributes selected by the computer system 210 or a researcher) and/or outcomes 904 (e.g., one or more particular outcomes selected by the computer system 210 or a researcher). The computer system 210 may group the subjects using the key attributes 902 and/or the outcomes 904. As an example, the computer system 210 may provide the key attributes 902, the outcomes 904, and subject data for a subject pool to the clustering model 908 as input. The clustering model 908 may proceed to organize the subjects in the subject pool based on the key attributes 902 if that is provided as input, based on the particular outcomes (e.g., data quality, overall compliance rates, compliance rates in a particular category, retention rates, etc.) in the outcomes 904 if that is provided as input the clustering model 908, or based on the key attributes 902 and the outcomes 904 if both are provided as input to the clustering model 908.

The output of the clustering model 908 may include an indication of which cluster each of the subjects in the subject pool belongs to. For example, the output of the clustering model 908 may be an indication of which centroid each subject was assigned to.

The process 1300 includes defining a plurality of profiles based on the determined subsets (1306). For example, the computer system 210 may use each of the groups of the subjects (e.g., the clusters) to a profile that represents a category of subjects. In generating the profiles, the computer system 210 may retrieve information from the subjects in the groups and use the information to define inclusion criteria for the different profiles. The inclusion criteria may be defined by the computer system 210 such that it is mutually exclusive with respect to the inclusion criteria of the other profiles, such that the a subject cannot be assigned to multiple profiles. However, in some cases, a subject may be assigned to multiple profiles.

The process 1300 includes generating impact characterization data indicating different levels of impact that elements of monitoring programs have on outcomes for subjects (1308). The computer system 210 may identify the profiles that are present among a monitoring group selected for a monitoring program, compare the elements of the selected monitoring program to the element effect information in the profiles, and, based on the comparison, determine one or more adjustments to the monitoring program for the different categories of subjects. The adjustments made by the computer system 210 may include removing or modifying an element of a monitoring program (e.g., reduce number of tests that user must complete if this is determined to significantly lower retention rates), adjusting communication attributes (e.g., communication channel, frequency, time, content, sentence structure, etc.), or adding an element (e.g., account for subjects not having access to a device, account for subject not having access to transportation by providing transportation credit, etc.). For example, if an element of a monitoring program is anticipated to reduce compliance with subjects assigned to a second profile, the computer system 210 may adjust that element using information in the second profile to mitigate the anticipated reduced compliance.

The process 1300 includes using the plurality of profiles and the generated impact characterization data to create a monitoring program or adjust a monitoring program (1310). For example, the computer system 210 may customize a monitoring program selected by a researcher to improve the likelihood of viable data being produced as a result of the monitoring program, and/or other goals of the monitoring program being obtained (e.g., such as diversity goals to increase the applicability of the results of the monitoring program). The computer system 210 may create and/or customize a monitoring program for each profile among the enrolled monitoring program subjects. Accordingly, the computer system 210 may first identify what profiles are present among the monitoring group, prior to (i) adjusting the monitoring group and/or (ii) the elements of the monitoring program.

Figure 14:
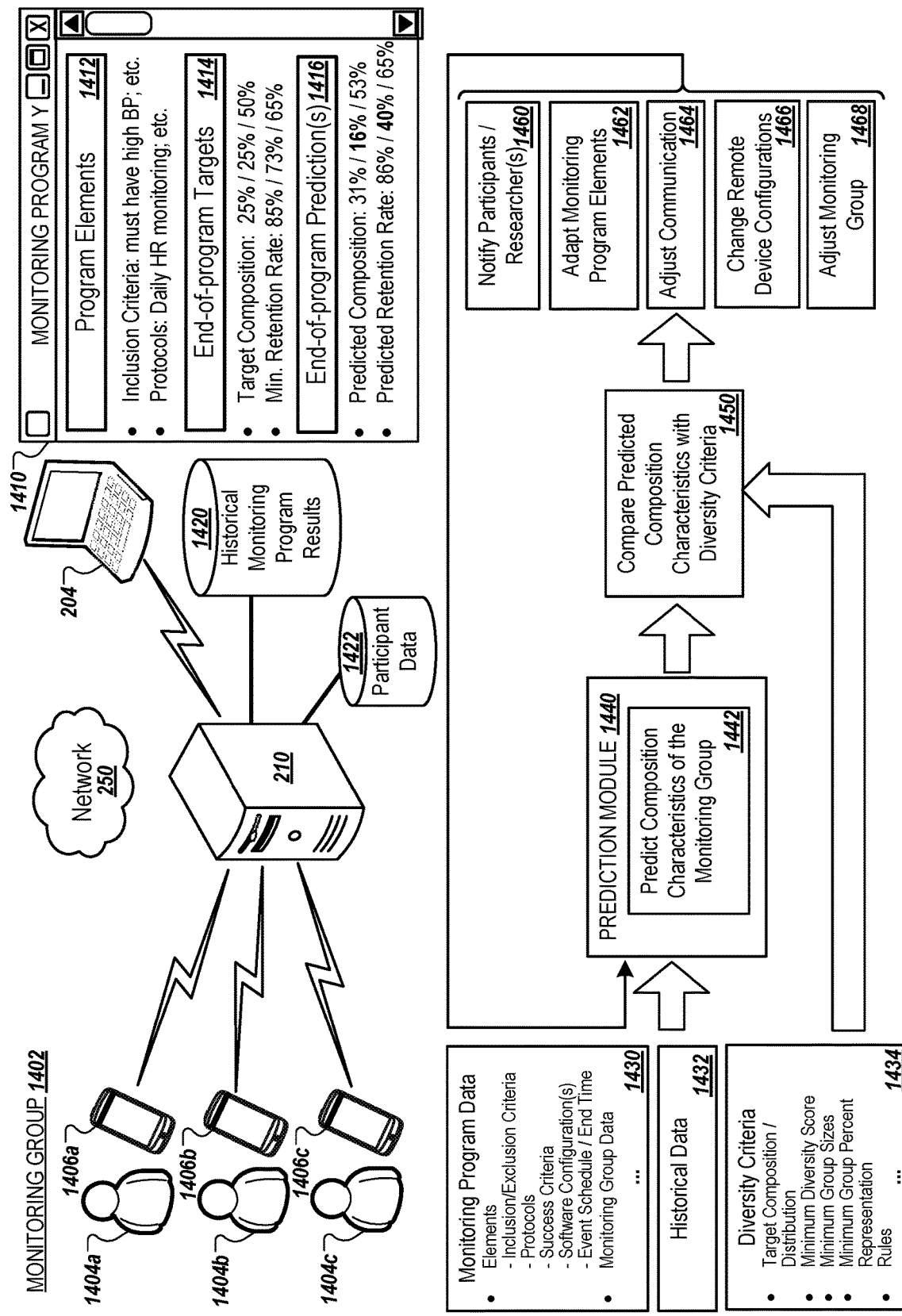
FIG. 14 is a diagram that illustrates an example system for predicting group diversity for monitoring programs.

FIG. 14 is a diagram that illustrates one or more components of the system 200 and a process for predicting group diversity for monitoring programs. The computer system 210 can use a prediction module 1440 to make various predictions for a monitoring group 1402, including predictions of the group 1402's composition and/or diversity in the future. In making these predictions, the computer system 210 can obtain and use information that includes characteristics of the monitoring group 1402 and of the particular monitoring program that the monitoring group 1402 is participating in. The computer system 210 may also use other information to make these predictions, including historical data collected during past monitoring programs from other monitoring groups. The computer system 210 can provide this information as input to the prediction module 1440, and, in response, receive output that includes or indicates predicted characteristics of the monitoring group 1402. The system 210 may compare the characteristics to corresponding criteria to determine if the monitoring group 1402 is predicted to have sufficient diversity at a future time, such as a predetermined future milestone or a known or anticipated end of the monitoring program.

The predictions can help the computer system 210 determine whether the monitoring program will be successfully completed and/or, more specifically, whether the monitoring program will produce viable results. Where the predictions indicate that the monitoring group 1402 will lack sufficient diversity for the monitoring program to produce viable results (e.g., results that are sufficiently applicable to a target population, results that have a sufficiently low probability of producing false-negatives, results that have the ability to meet a required level of statistical significance, etc.), the computer system 210 can determine one or more actions to improve the anticipated diversity of the monitoring group 1402. As a result of performing these actions, the computer system 210 can significantly improve the likelihood of the monitoring program producing viable results, and, therefore, improve the likelihood of successfully completing the monitoring program. These actions have the added benefit of reducing the likelihood of the computer system 210 needing to repeat or extend the length of the monitoring program, and, therefore, reduce the amount of resources spent on or allocated to managing the monitoring program and producing viable results.

As shown, the monitoring group 1402 may include a set of participants 1404a, 1404b, and 1404c and corresponding participant devices 1406a, 1406b, and 1406c. The participant devices 1406a-1406c can communicate with the computer system 210 over the network 250. The computer system 210 may send software packages to each of the participant devices 1406a-1406c. The software packages sent to the devices 1406a-1406c can be based on the particular monitoring program that the monitoring group 1402 is participating in, on the attributes of the corresponding participant, and/or on the participant group(s) that the corresponding participant belongs to.

For example, based on a researcher using the client device 204 to initialize a "Monitoring Program Y", the computer system 210 may identify a default software configuration for the Monitoring Program Y, generate a corresponding data package used to install the software configuration on one or more remote computing devices, and distribute the data package to the devices 1406a-1406c. In this example, each of the devices 1406a-1406c may receive a data package from the computer system 210 that provides for installing software with the same configuration as the other devices in the monitoring group 1402.

As another example, the computer system 210 may use additional information to customize the default software configuration and/or to select a different version of the software. In more detail, the computer system 210 may use participant data stored in the participant database 1422 and/or the historical monitoring program data stored in the monitoring program database 1420 to identify changes to the default software configuration and/or versions of the software configuration that have been shown per the historical data to improve the compliance, retention, and/or data quality of participants having particular attributes or belonging to particular participant groups. The computer system 210 may proceed to distribute customized software configurations and/or select versions of the software to the devices 1406a-1406c based on the attributes of the participants 1404a-1404c and/or the participant groups that the participants 1404a-1404c belong to. In this example, each of the devices 1406a-1406c may receive a data package from the computer system 210 that provides for installing software with a different configuration compared to that installed on the other devices in the monitoring group 1402.

Although the monitoring group 1402 is depicted having the three participants 1404a-1404c and participant devices 1406a-1406c, the monitoring group 1402 may include additional participants and corresponding participant devices that are not shown. For example, the monitoring group 1402 may include hundreds or thousands of participants and/or participant devices.

In some implementations, the monitoring group 1402 includes only the participant devices 1406a-1406c. Alternatively, in some implementations, the monitoring group 1402 includes only the participants 1404a-1404c. In this example, the computer system 210 can communicate with the participants 1404a-1404c through one or more remote devices, such as a remote computer that the participants 1404a-1404c can use to log into corresponding user profiles.

The monitoring program database 1420 can store monitoring program data collected over past monitoring programs and/or ongoing monitoring programs. As will be discussed in more detail below with respect to FIG. 17, the collected data can include or be stored with the protocols for monitoring programs for which data is being collected, other elements for the monitoring programs for which data is being collected (e.g., communication attributes used to generate communications for particular monitoring groups, groups of participants, and/or individual participants), and/or diversity criteria determined for the monitoring programs. The collected data can also include information received from participant devices, such as participant responses, test results, and/or sensor data. The monitoring program data can also include information that is generated by the computer system 210 using the collected data, such as metrics used to determine whether a monitoring program was or is likely to be successful. For example, the computer system 210 may store with the collected data corresponding metrics calculated using the collected data such as a compliance rates, retention rates, and average data quality for particular monitoring groups, groups of participants, and/or participants. Similarly, the computer system 210 can determine and store with the collected data a diversity score and/or composition characteristics for the monitoring groups, such as the final, observed composition characteristics of each of the monitoring groups at an end of their corresponding monitoring program.

The monitoring program database 1420 can be updated to include additional data collected for one or more monitoring programs. For example, the database 1420 can be updated periodically based on default settings or those set by an administrator of the system 210. Additionally or alternatively, the database 1420 can be updated in response to certain events. For example, the database 1420 can be updated in real-time or near real-time in response to the computer system 210 collecting monitoring program data while managing one or more monitoring programs.

The participant database 1422 can store participant data collected during participant registration and/or over past and ongoing monitoring programs. As will be discussed in more detail below with respect to FIG. 17, the participant data collected can include attributes of the participants, such as their age, sex, medical conditions, prescriptions, etc. or other information that may be relevant to analyzing the diversity of the monitoring group 1402. Other participant data collected can include participant responses, test results, sensor data, etc. that the computer system 210 can use to determine compliance rates, retention rates, and/or data quality metrics for the particular participants, for participant groups that the corresponding participants belong to, and/or for the monitoring group as a whole. The participant data collected can also include attributes of the participant devices, such as a make, model, software version, CPU speed, CPU core size, RAM size and/or speed, and/or memory size of the participant devices.

The participant database 1422 can be updated to include additional data collected for one or more monitoring programs. For example, the database 1422 can be updated periodically based on default settings or those set by an administrator of the system 210. Additionally or alternatively, the database 1422 can be updated in response to certain events. For example, the database 1420 can be updated in real-time or near real-time in response to the computer system 210 collecting participant data while managing one or more monitoring programs.

As shown, during the creation or initialization of a monitoring program, an interface 1410 can be presented on a display of the client device 204. The interface 1410 can present information to assist a user of the client device 204 to configure a monitoring program ("Monitoring Program Y"). For example, the interface 1410 can present diversity information that the user can use to adjust the elements of the Monitoring Program Y. The diversity information can be generated by the computer system 210 based on the program elements in the section 1412 that are associated with Monitoring Program Y and/or have previously been selected by a user of the client device 204. In more detail, the interface 1410 can include a program elements section 1412 that includes the current elements for the Monitoring Program Y.

The interface 1410 also includes an end-of-program targets section 1414 that specifies diversity criteria and/or other success criteria required for the Monitoring Program Y. The end-of-program targets may have been previously selected for the Monitoring Program Y, or may be set or updated by a user of the client device 204. Alternatively, the computer system 210 may determine the end-of-program targets based on various factors such as a determined minimum level of diversity required for the program (e.g., based on a target population that the results of the Monitoring Program Y will be applied to, such as to a country's population when a pharmaceutical being studied is planned to be distributed in the country) and the historical data in the database 1420.

The interface 1410 also includes an end-of-program prediction(s) section 1416. The section 1416 can include predictions such as diversity predictions made by the computer system 210. As will be discussed in more detail below with respect to FIGS. 15A-15D, the computer system 210 can use various different techniques to make the end-of-program predictions. As an example, the computer system 210 can use the program elements in section 1412 for the Monitoring Program Y, current composition characteristics for the monitoring group 1402, and/or the historical data in the database 1420 to predict composition characteristics of the monitoring group 1402 at the a scheduled or anticipated end of the Monitoring Program Y.

The computer system 210 may also make other predictions, such as predictions regarding the compliance rate, retention rate, and/or level of data quality expected from the monitoring group 1402, participant groups in the monitoring group 1402 (e.g., different diversity groups represented by one or more participants in the monitoring group 1402), and/or individual participants in the monitoring group 1402 based on the historical data in the database 1420 and/or the participant data in the database 1422. The computer system 210 can use these predictions to predict the composition characteristics for the monitoring group 1402 or to more accurately predict the composition characteristics for the monitoring group 1402.

The predictions in the section 1416 include a predicted composition of the monitoring group 1402. As shown, the predicted composition indicates that by a future time (e.g., scheduled end of the Monitoring Program Y) the monitoring group 1402 will be composed of 31% participants belonging to a first diversity group (e.g., Group 1), 16% participants belonging to a second diversity group (e.g., Group 2), and 53% participants belonging to a third diversity group (e.g., Group 3). The interface 1410 may visualize distinguish predictions that fail to meet the success criteria in section 1414, e.g., based on a determinations made by the computer system 210. These predictions may be highlighted, may have a different color applied to them, may appear in bold text, may appear as a different size text, or may appear as a different font. For example, the "16%" has been displayed on the interface 1410 in bold text based on the computer system 210 determining that this value deviates too far from the corresponding target composition value of 25% (e.g., predicted representation value is at least 20% less than the corresponding target value). Similarly, the computer system 210 may send instructions to the client device 204 to visually distinguish the predicted retention rate of 40% for the second diversity group based on this value failing to meet the corresponding minimum retention rate of 73%.

The predictions displayed in section 1416 of the interface 1410 may correspond to a particular time that is either known or anticipated. For example, where the Monitoring Program Y has a scheduled end time, the prediction may be made for the scheduled end time. However, there may be cases where there is no set or scheduled end time. For example, the computer system 210 may determine a time when all of the end-of-program targets and/or other success criteria in the section 1414 is sufficiently likely to be met. If the computer system 210 identifies such a time, e.g., a time when the Monitoring Program is anticipated to meet all of the success criteria and, therefore, be successfully completed, the predictions made by the computer system 210 can correspond to this time. Similarly, if the computer system 210 determines that there is no future time (e.g., out to threshold point, such as a year from the start date of the Monitoring Program Y) when all of the success criteria is sufficiently likely to be met, the computer system 210 may make predictions for a default time in the future (e.g., three months from current time, three months from start date, one month from current time, one month from start date, etc.) and/or generate and transmit a notification to the client device 204 that the Monitoring Program Y is predicted to fail.

The section 1416 can also include predictions if one or more recommended actions are performed by the computer system 210. For example, as will be discussed in more detail below with respect to FIG. 16A, the computer system 210 may make predictions that assume one or more changes to the program elements, to the monitoring group 1402, and/or to software configurations of the participant devices in the monitoring group 1402. These predictions may indicate which of the recommended actions are anticipated to have the most desirable effects on the diversity of the monitoring group 1402 and/or assist a user of the client device 204 make a better informed selection of actions in a recommended set of actions that the computer system 210 should perform.

In making the predictions found in the section 1416, the computer system 210 may use a prediction module 1440. In more detail, the computer system 210 may obtain monitoring program data 1430, corresponding historical data 1432, and corresponding diversity criteria 1434 and proceed to provide all or a portion of the data to the prediction module 1440 as input. Depending on the data available and/or the data the prediction module 1440 receives as input, the prediction module 1440 may use one or more different techniques for predicting composition characteristics of the monitoring group 1402 at a future time. For example, if the prediction module 1440 only receives the monitoring program data 1430 and the corresponding historical data 1432 as input, the prediction module may use a first technique (e.g., a particular workflow, series of workflows, etc. that call on specific models such as particular machine learning models). In contrast, if the prediction module 1440 only receives the diversity criteria and the monitoring program data 1430, the prediction module 1440 may instead use a second technique different from the first technique. The techniques used by the prediction module 1440 may differ in whether they use statistical models or machine learning (ML) models, and/or in the particular statistical and/or ML models that they use to make the predictions. The techniques may also differ in other ways, such as the information required as input and/or the predictions produced using the techniques.

For example, different techniques used by the prediction module 1440 may differ in that they are used to predict different composition characteristics of the monitoring group 1402 and/or they are used to make predictions for different participant groups (e.g., diversity groups) present in the monitoring group 1402.

As another example, different techniques used by the prediction module 1440 may differ in how they arrive at a diversity prediction. For example, as will be discussed in more detail below with respect to FIGS. 15A-15D, some techniques may rely on predicting completion rates for different diversity groups whereas other techniques rely on predicting a likelihood of meeting the diversity criteria 1434.

The computer system 210 may obtain the monitoring program data 1430 from local storage, from the database 212 or one of the other databases, and/or from the client device 204. For example, all or a portion of the monitoring program data 1430 from the client device 204 in response to a user of the device 204 creating and/or submitting the Monitoring Program Y through the interface 1410 or another interface of the device 204. The monitoring program data 1430 can include the current elements of the monitoring program (e.g., which may be updated over time to account for predicted diversity problems), and monitoring group data for the monitoring group 1402. The monitoring group data 1402 may include an indication of the participants and/or participant devices invited to or enrolled in the monitoring group 1402. For example, the monitoring group data 1430 can include identifiers for the participants 1404*a*-1404*c* that the computer system 210 can later use to retrieve stored attribute data for the participants 1404*a*-1404*c* from the participant database 1422. As another example, the computer system 210 can retrieve the attributes for the participants and/or participant devices in the monitoring group 1402 and include the attribute information in the monitoring program data 1430 that it provides to the prediction module 1440.

The computer system 210 may obtain historical data 1432 from the historical monitoring program database 1420. The historical data 1432 retrieved from the database 1420 can be a subset of the historical data stored in the database 1420. For example, the computer system 210 may request from the database 1420 only that portion of the stored historical data that corresponds to past monitoring programs that one or more of the participants 1404*a*-1404*c* have previously participated in (or are currently participating in) and/or that corresponds to past monitoring programs that included participant groups that are also represented in the monitoring group 1402. For example, based on a determination that the participant 1404*a* belongs to a Group 1 diversity group, the computer system 210 may retrieve all historical data (or all historical data that is sufficiently recent, such as all historical data collected over the past two years, three years, five years, etc.) for monitoring programs that had monitoring groups that included (e.g., at an outset of the respective programs) a participant belonging to Group 1.

The computer system 210 may obtain and/or determine diversity criteria 1434 for the monitoring program. For example, the computer system 210 may receive the diversity criteria 1434 from the client device 204 in response to a user of the device 204 submitting the Monitoring Program Y that includes user-defined diversity criteria, such as a target composition.

Additionally or alternatively, the computer system 210 may determine its own diversity criteria, e.g., that is in addition to the user-specified criteria or in place of user-specified criteria. The computer system 210 may take into account the program elements (e.g., which may indicate a type of monitoring program, goals for the monitoring program, etc.), the monitoring group 1402, and/or a target population in determining the diversity criteria. For example, based on the Monitoring Program Y being a clinical study for a particular pharmaceutical and a target population that is anticipated to be prescribed the pharmaceutical, the computer system 210 can determine rules such that diversity groups found in the target population (e.g., meeting a certain minimum size or minimum representation) must also be represented in the monitoring group 1402 and minimum group sizes for each of the diversity groups calculated using statistical rules (e.g., rules to provide for the possibility of finding statistically significant results given the allowable error for a pharmaceutical study) and/or industry standards for clinical studies.

In determining the diversity criteria, the computer system 210 may also rely on historical data from the database 1420. This historical data may suggest particular composition characteristics of different monitoring groups that typically produced unviable results (e.g., results that have limited or no applicability due to the corresponding monitoring group having too low of a sample size with respect to one or more required diversity groups), or that produced viable results.

The computer system 210 can provide the diversity criteria 1434 as input to the prediction module 1440. Alternatively, the computer system 210 may refrain from providing the diversity criteria 1434 to the prediction module 1440. For example, the computer system 210 may provide the monitoring program data 1430 (or a portion of the monitoring program data 1430 such as the monitoring group data) and the corresponding historical data 1432 as input to the prediction module 1440, and use the diversity criteria 1434 only to compare the output of the prediction module 1440 with.

The prediction module 1440 can use the monitoring program data 1430, the historical data 1432, and/or the diversity criteria 1434 to predict composition characteristics of the monitoring group 1402 at a future time (1442), such as at the end of the monitoring program. The computer system 210 may choose to provide only portions of the monitoring program data 1430, the historical data 1432, and/or the diversity criteria 1434 to the prediction module 1440. Alternatively, the prediction module 1440 may use only a subset of the data that it receives.

In predicting the composition characteristics, the prediction module 1440 can use one or more statistical or ML models that are included in the prediction module 1440 or that the prediction module 1440 can call upon. The models can output metrics that represent predicted composition characteristics and/or that can be used by the prediction module 1440 to determine predicted composition characteristics of the monitoring group 1402. These techniques and others will be described in more detail below with respect to FIGS. 15A-15D.

The future time that the prediction module 1440 makes prediction for can include a set or anticipated end of the monitoring program. For example, if the monitoring program is scheduled to end in six months, the predictions generated by the prediction module 1440 can include predicted composition characteristics for the monitoring group 1402 six months from a current time and/or date. However, the future time can include other times that are not the set or anticipated end of the monitoring program. For example, the future time for predictions generated by the prediction module 1440 may be set for a month, three months, or a year from the current time and/or date.

In some implementations, the computer system 210 may generate and send a request to the client device 204 requesting that a user of the client device 204 (e.g., researcher or admin) enter or select a future time for the prediction module 1440 to perform predictions for. For example, based on the request transmitted to the client device 204 from the computer system 210, the client device 204 may present an interface that includes a list of upcoming dates or times to perform the diversity analysis for. The list may include a date/time corresponding to the set end of the monitoring program, dates/times corresponding to different milestones such as anticipated milestone completion dates, dates/times corresponding to different deadlines for the monitoring program, etc. The interface may also optionally present a field where a custom date/time can be entered. A researcher can interact with the interface to select one or more of the presented dates and times for the prediction module 1440 to generate predictions for. The client device 204 can transmit an indication of the selection(s) to the computer system 210. The computer system 210 can, in response, provide the selection(s) to the prediction module 1440.

As another example, the computer system 210 can automatically determine the future time based on one or more factors, such as when the monitoring program is scheduled or anticipated to be completed, how long ago the monitoring program started, if there are any upcoming milestones for the monitoring program, past predictions, etc. For example, the computer system 210 may use rules that provide if the monitoring program is to end one year or more from the current date, predictions should be made for six months from the current date. The rules can also provide that if the monitoring program is to end less than one year from the current date, predictions should be made three months from the current date unless the monitoring program is scheduled to end in less than three months in which case the predictions should be made for the scheduled end of the monitoring program.

As another example, for each diversity analysis, the prediction module 1440 may predict composition characteristics for the monitoring program at multiple times/dates in the future. In more detail, the prediction module 1440 may start with a time that is sufficiently near the current time for a first set of predictions, and proceed to extend the time from the current time until the predictions indicate that the predicted composition characteristics do not meet the diversity criteria 1434 or sufficiently diverge (e.g., diverge more than a threshold percentage from the diversity criteria 1434). That is, the prediction module 1440 may extend the time from the current time until it identifies a time when failure to meet the diversity criteria is sufficiently likely (e.g., the point where the predicted composition characteristics do not meet the diversity criteria 1434, or the point where the predicted composition characteristics indicate that there is a sufficient likelihood of not meeting the diversity criteria 1434). The predictions outputted by the prediction module 1440 can be those that correspond to the identified time.

The computer system 210 can proceed to compare the predicted composition characteristics with the diversity criteria 1434 (1450). In making the comparison, the computer system 210 may identify problematic composition characteristics. This may include predicted composition characteristics that do not match or diverge sufficiently far from a corresponding target (e.g., target value, target range, target distribution, etc.) specified in the diversity criteria 1434. Other problematic composition characteristics can include those that do not meet a threshold included in the diversity criteria 1434, or that are not within or outside a particular range of values specified in the diversity criteria 1434.

Based on the comparison, the computer system 210 can determine a set of actions to improve the predicted diversity of the monitoring group. For example, the computer system 210 can determine the set of actions in response to the predicted composition characteristics failing to meet at least one of the diversity criteria in the diversity criteria 1434. Where the comparison indicates that all criteria are anticipated to be met, the computer system 210 may either refrain from determining a set of actions or, e.g., if there remains a significantly high likelihood of one or more of the diversity criteria not being met, proceed to determine a set of actions to improve the likelihood of the diversity criteria 1434 being met.

Based on the comparison, the computer system 210 may determine that an action 1460 of notifying participants and/or researchers is likely to improve the diversity of the monitoring group 1402 at the monitoring program's completion. For example, if the comparison reveals the expected Group 2 size at the end of the monitoring program does not meet a minimum Group 2 size in the diversity criteria 1434 due to a low expected compliance rate among the Group 2 participants, the computer system 210 can use the historical data 1432 or other historical data in the database 1420 to determine that notifying Group 2 participants of their low compliance or risk of low compliance typically improves their compliance. The computer system 210 can determine that it should recommend and/or perform an action of notifying Group 2 participants because this action is anticipated to improve the Group 2 compliance rate and, therefore, the expected Group 2 size in the predicted monitoring group 1402 at the end of the monitoring program.

Based on the comparison, the computer system 210 may determine that an action 1462 of adapting monitoring program elements is likely to improve the diversity of the monitoring group 1402 at the monitoring program's completion. For example, if the comparison reveals the expected Group 2 size at the end of the monitoring program does not meet a minimum Group 2 size in the diversity criteria 1434 due to a low expected compliance rate among the Group 2 participants, the computer system 210 can use the historical data 1432 or other historical data in the database 1420 to determine that changing the monitoring program elements for the Group 2 participants by adjusting a required test frequency tends to improves the compliance rate of Group 2 participants. The computer system 210 can determine that an action of adjusting the program elements is likely to improve the Group 2 compliance rate and, therefore, the expected Group 2 size in the predicted monitoring group 1402 at the end of the monitoring program.

Based on the comparison, the computer system 210 may determine that an action 1464 of adjusting communications between the computer system 210 and at least a portion of the monitoring group 1402 is likely to improve the diversity of the monitoring group 1402 at the monitoring program's completion. For example, if the comparison reveals the expected Group 2 size at the end of the monitoring program does not meet a minimum Group 2 size in the diversity criteria 1434 due to a low expected compliance rate among the Group 2 participants, the computer system 210 can use the historical data 1432 or other historical data in the database 1420 to determine that Group 2 participants typically exhibit higher compliance rates when a frequency of communication is increased and informal vocabulary is used. The computer system 210 can determine that an action of adjusting the communications (e.g., adjusting the communication attributes that the communications must comply with and/or that the computer system 210 uses to make the communications) between the computer system 210 and the Group 2 participants in the monitoring group 1402 is likely to improve the Group 2 compliance rate and, therefore, the expected Group 2 size in the predicted monitoring group 1402 at the end of the monitoring program.

Based on the comparison, the computer system 210 may determine that an action 1466 of changing remote device configurations for at least a portion of the participant devices in the monitoring group 1402 (or participant devices that are to be added to the monitoring group 1402) is likely to improve the diversity of the monitoring group 1402 at the monitoring program's completion. For example, if the comparison reveals the expected Group 2 size at the end of the monitoring program does not meet a minimum Group 2 size in the diversity criteria 1434 due to a low expected compliance rate among the Group 2 participants, the computer system 210 can use the historical data 1432 or other historical data in the database 1420 to determine that Group 2 participants typically exhibit higher compliance rates when their devices are configured to collect additional sensor data and when incoming messages are accompanied by an alert. The computer system 210 can determine that an action of adjusting a software configuration for the Group 2 participant devices to collect the additional sensor data and to add audio/visual alerts for messages coming from the computer system 210 is likely to improve the Group 2 compliance rate and, therefore, the expected Group 2 size in the predicted monitoring group 1402 at the end of the monitoring program.

Based on the comparison, the computer system 210 may determine that an action 1468 of adjusting the monitoring group 1402 is likely to improve the diversity of the monitoring group 1402 at the monitoring program's completion. For example, if the comparison reveals the expected Group 2 size at the end of the monitoring program does not meet a minimum Group 2 size in the diversity criteria 1434 due to a low expected compliance rate among the Group 2 participants, the computer system 210 can calculate a number of additional Group 2 participants needed for the predicted Group 2 size to meet the corresponding diversity criteria. The computer system 210 can determine that an action of inviting additional Group 2 participants to or enrolling additional Group 2 participants in the monitoring program is likely to improve the Group 2 compliance rate and, therefore, the expected Group 2 size in the predicted monitoring group 1402 at the end of the monitoring program.

The computer system 210 may use a recommendation module to determine the set of actions to recommend and/or perform. For example, the computer system 210 may use a recommendation module that includes or can call upon one or more statistical or ML models. The computer system 210 may provide as input to the recommendation module the historical data 1432 which may indicate past monitoring program elements and/or changes to monitoring program elements that had beneficial effects on the diversity of monitoring groups. The computer system 210 can also provide all or a portion of the monitoring program data 1430 as input to the recommendation module. The recommendation module can use the monitoring program data 1430 to identify relevant portions of the historical data 1432, to identify potentially problematic elements, and/or identify potentially problematic composition characteristics of the current monitoring group 1402. Importantly, the computer system 210 can also provide the recommendation module the results of the comparison between the predicted composition characteristics and the diversity criteria 1434. The recommendation module can use the comparison results to identify program modifications that have historically resulted in improvements to the particular composition characteristics that fail to meet one or more of the diversity criteria.

The computer system 210 is not limited to determining, recommending, and/or performing the actions depicted, and may determine other types of actions to recommend and/or to perform. For example, the computer system 210 may determine an action to update the diversity criteria 1434 for the monitoring program to reduce the minimum group size for a particular participant group. This action may be in response to, for example, the prediction module 1440 indicating a low likelihood of achieving the minimum group size for a particular group but also indicating a high likelihood of higher than anticipated data quality from the particular group, making the previous minimum group size unnecessary (e.g., unnecessary to achieve the success criteria for the monitoring program, unnecessary for the results of the monitoring program to have statistical significance, etc.).

As another example, this action may be in response to, for example, the prediction module 1440 indicating a low likelihood of achieving the minimum group size for the particular group, and other actions failing to produce sufficient enrollment, compliance, and/or retention for participants in the particular group. That is, the action of adjusting the diversity criteria 1434 may be based on a determination that there is sufficiently low likelihood of meeting one or more of the criteria despite the action(s) taken by the computer system 210. In this situation, the computer system 210 may determine the effects on the results of the monitoring program due to changing the diversity criteria 1434. These effects could include a lower likelihood of the program's results being applicable for one or more populations, e.g., due to a reduced probability of the results being statistically significant for a particular population as a result of small sample size, limited data quantity, and/or poor data quality that correspond to the changes made to the diversity criteria 1434 (e.g., broadening of criteria and/or elimination of criteria).

In general, the diversity analysis can include all or a portion of the described actions performed by the computer system 210. For example, the diversity analysis can include providing at least a portion of the monitoring program data 1430, the historical data 1432, and/or the diversity criteria 1434 as input to the prediction module 1440 and obtaining the predicted composition characteristics as an output of the prediction module 1440. The diversity analysis can also include additional actions, such as determining the diversity criteria 1434, comparing the predicted composition characteristics to the diversity criteria 1434, and/or determining recommended actions to perform.

The computer system 210 may repeat all or a portion of the diversity analysis multiple times. For example, after performing one of the actions 1460, 1462, 1464, 1466, and/or 1468, the computer system 210 may perform the diversity analysis again using the updated monitoring program data 1430. In more detail, the computer system 210 may continue to make additional predictions on an ongoing basis, e.g., periodically or in response to detected events. Accordingly, the computer system 210 can track the anticipated monitoring group composition to determine, for example, if intervening actions are needed to successfully complete the monitoring program, the accurateness of predictions previously made by the prediction module 1440, or if past intervening actions are having their anticipated effect on the monitoring group 1402.

The computer system 210 may perform the described diversity analysis a single time, or at multiple times. For example, the computer system 210 can perform the diversity analysis when a researcher or admin uses the client device 204 to submit a monitoring program. As another example, the computer system 210 may perform a diversity analysis at particular stages of the monitoring program, such as when a group of subjects has been invited to enroll in the monitoring program and/or have been enrolled in the program, when an enrollment period has ended, and/or at one or more set times during the study.

The computer system 210 may perform the diversity analysis in response to detecting particular events. For example, the computer system 210 may perform the analysis in response to determining that a participant has left the monitoring group 1402, is sufficiently unlikely to meet the success criteria for the program, or cannot meet the success criteria (e.g., due to having too low of compliance from which they cannot recover to successfully complete the program; and/or due to having too low of data quality from which they cannot recover to successfully complete the study). Similarly, the computer system 210 may perform the analysis in response to detecting changes to the monitoring program, such as a changes made by researchers or made by the computer system 210. These changes can include changes to the monitoring program elements, changes to the monitoring group 1402, and/or changes to the software configurations of the participant devices in the monitoring group 1402.

The computer system 210 may automatically schedule diversity analysis to be performed, such as periodically and/or in response to detected events as described above. For example, the computer system 210 may schedule a diversity analysis to be performed every month and every time a modification to the monitoring program is made (e.g., manually by a user of the client device, by a participant leaving the monitoring group 1402, and/or by the computer system 210 performing a recommended action). However, the frequency for diversity analyses or changes to the frequency of diversity analyses may depend on the extent that predictions generated by the prediction module 1440 diverge from the diversity criteria 1434. For example, if predictions made by the prediction module 1440 indicate that that there is sufficiently low likelihood of the diversity criteria 1434 being met, the computer system 210 can update the frequency of performing diversity analyses from once a month to once a week. The frequency for diversity analyses or changes to the frequency of diversity analyses can depend on the extent that predictions generated by the prediction module 1440 diverge from the diversity criteria 1434.

FIGS. 15A-15D are diagrams that illustrate one or more components of the system 200 for predicting group diversity for monitoring programs. The diagrams demonstrate that the computer system 210 can use a multitude of different techniques to predict composition characteristics and/or a level of diversity for the monitoring group 1402. The different techniques may require using different information to make the predictions, using a different type or number of models/modules to generate outputs that the computer system 210 uses to make the predictions, and/or using different techniques to interpret the outputs of models/modules. After making these predictions, the computer system 210 can use the predictions to make further insights of the monitoring group 1402 and/or to generate a set of actions to improve the diversity of the monitoring group 1402.

In some implementations, the computer system 210 uses multiple techniques to generate the predictions. For example, the computer system 210 may use a first technique to predict particular composition characteristics, and a second technique to predict other composition characteristics based on the first technique typically producing more accurate predictions with respect to the particular composition characteristics and/or the second technique typically producing more accurate predictions with respect to the other composition characteristics. As another example, the computer system 210 may use multiple techniques to make the same type of predictions. The computer system 210 can use the predictions made through the different techniques to generate a combined prediction (e.g., by averaging the results, averaging weighted results, or using an algorithm to combine the results) that is, for example, more likely to be accurate than the predictions made through a single technique.

Figure 15A:
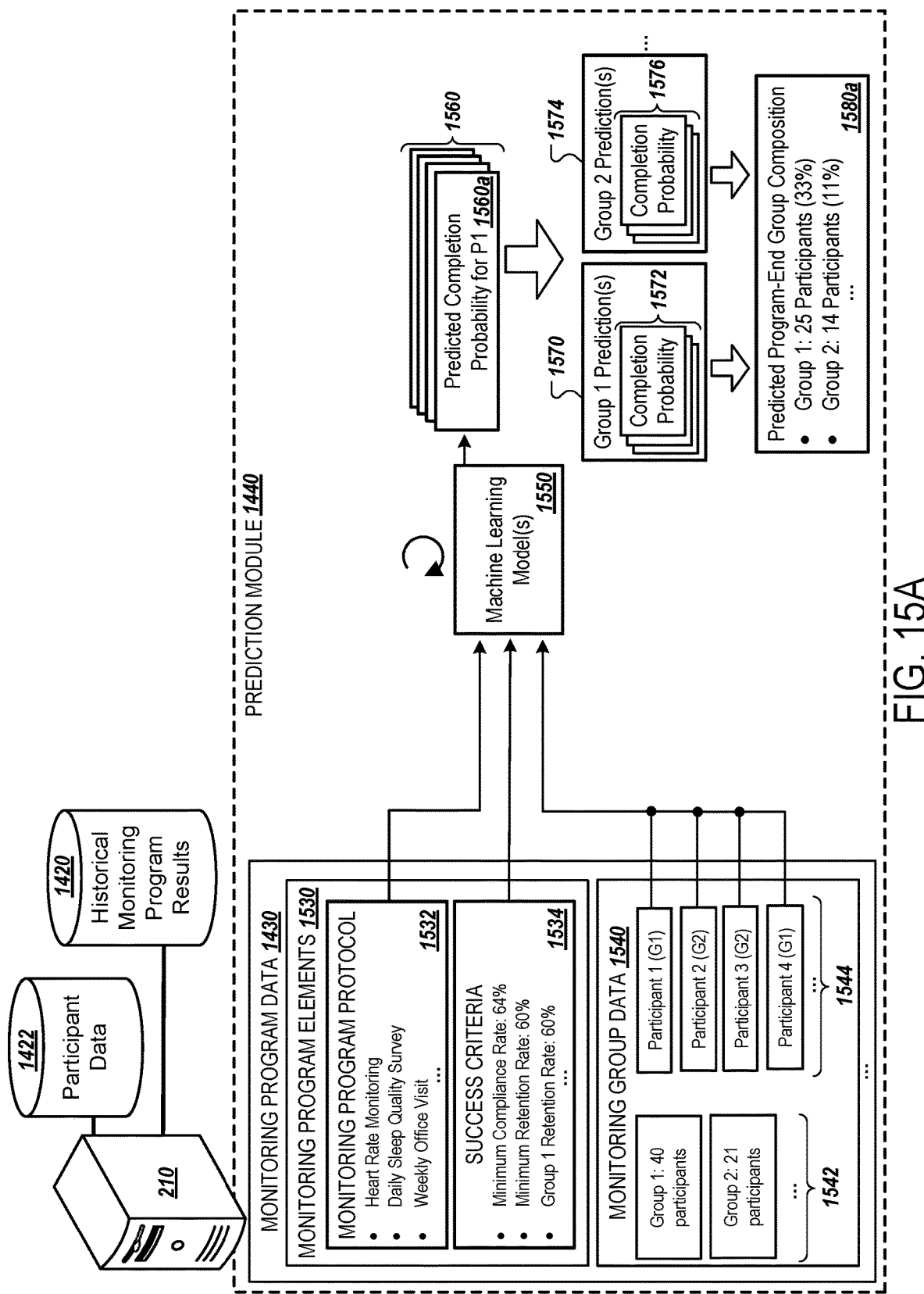
FIGS. 15A-15D are diagrams that illustrate example systems for predicting group diversity for monitoring programs.

In FIG. 15A, the prediction module 1440 uses a set of one or more machine learning models 1550 to generate predictions. The machine learning models 1550 can generate monitoring group 1402 predictions based on received portions of the monitoring program data 1430. In more detail, the prediction module 1440 provides at least a portion of the monitoring program elements 1530 and the monitoring group data 1540 as input to the machine learning models 1550. The machine learning (ML) models 1550 may use this input data to generate outputs 1560 that are, or indicate, predicted completion probabilities for the monitoring group 1402's participants. More generally, the models 1550 and other models can trained to predict future compliance for some future period, for example, for a certain amount of time (e.g., the next day, week, month, etc.) or to a future milestone point, or to another time that may not be the completion or end of the program. In some implementations, the compliance predicted can refer to at least a minimum level of participation (e.g., collecting the minimum amount of data that is acceptable for the monitoring program) occurring for the duration from the current time to the future time. If a survey is required to be completed each day in order to not invalidate results, then the prediction of compliance can involve a prediction whether a participant will submit the survey each day until the future time corresponding to the prediction.

The ML models 1550 can include one or more types of ML models or algorithms. For example, the ML models 1550 can include one or more of a supervised learning model, an unsupervised learning model, a hybrid-learning model, or a reinforcement learning models.

The ML models 1550 may be trained using training data sets generated from historical data stored in the database 1420. Specifically, the computer system 210 can train the ML models 1550 using monitoring program data from previous monitoring programs. This monitoring program data can include monitoring group data for previous monitoring programs such as the starting and ending enrollment data for the previous monitoring groups, protocols for the previous monitoring programs, and/or success criteria for the previous monitoring programs.

The ML models 1550 may be trained with the goal of minimizing a loss function based on the differences between predicted completion probabilities for participants and the observed completion rate. The loss may be defined at the participant group level instead of the individual participant level. For example, the computer system 210 can train the ML models 1550 using monitoring program data for a Monitoring Program X that started with five participants from Group 1. If initial predictions generated by the ML models 1550 indicate an average completion rate of 40% for the Group 1 participants but the observed completion rate for the Group 1 participants turned out to be 60%, the difference of 20% may be used as a loss, used to determine a loss (e.g., a squared loss), and/or used for calculating a mean square error (MSE) for training the ML models 1550. As an example, the ML models 1550 here may include a regression loss models, a classification model, or a neural network. More generally, any of the ML models 1550 or any of the other machine learning models discussed herein may be may be, for example, a neural network, a support vector machine, a classifier, a regression model, a reinforcement learning model, a clustering model, a decision tree, a random forest model, a genetic algorithm, a Bayesian model, or a Gaussian mixture model.

The ML models 1550 may be trained with the goal of correctly specifying whether participants will successfully complete a monitoring program or not. The ML models 1550 may be trained for individual participants and output a classification such as binary value for each of the participants. For example, the computer system 210 can train the ML models 1550 using monitoring program data for a Monitoring Program X that started with ten participants from multiple participant groups. The ML models 1550 can generate an output such as a binary output for each of the ten participants that indicates whether each of the participants are predicted to successfully complete the Monitoring Program X. The computer system 210 can proceed to compare the ten predictions with the actual results that indicate which of those participants successfully completed the Monitoring Program X. The ML models 1550 can be trained to reduce the number or percentage of incorrect predictions. As an example, the ML models 1550 here may include a classification model (e.g., binary classification, decision tree(s), etc.) or a neural network.

The ML models 1550 may be trained using all historical data available. For example, the computer system 210 may convert all historical data in the database 1420 into training data sets and proceed to train the ML models 1550 with them. Alternatively, the ML models 1550 may be trained using only the historical data that the computer system 210 determines meets certain criteria. For example, the computer system 210 may convert only the historical data in the database 1420 that is sufficiently recent (e.g., acquired over the past five years, three years, two years, etc.) into training data sets and proceed to train the ML models 1550 with them.

In some implementations, the ML models 1550 include multiple ML models or algorithms that are used by the prediction module 1440 for different purposes or scenarios. For example, the ML models 1550 may include a ML model for each group of participants. The prediction module 1440 may use a portion of the ML models 1550 that correspond to those groups of participants that are present in the monitoring group 1402, e.g., as indicated by the monitoring group data 1540. Each of these group-specific ML models may be trained using a portion of the historical data in the database 1420 that corresponds to that group of participants.

In making diversity predictions, the prediction module 1440 may first identify a subset of the monitoring program data 1430 to provide as input to the ML models 1550. In more detail, the prediction module 1440 may extract from the monitoring program data 1430 a portion of the monitoring program elements 1530 and a portion of the monitoring group data 1540. The prediction module 1440 can proceed to provide the extracted data as input to the ML models 1550.

Specifically, the prediction module 1440 can obtain the monitoring program protocol 1532 that specifies a set procedure for the monitoring program. This procedure may specify required actions that participants in the monitoring group 1402 must perform and/or specify rules for how the computer system 210 must conduct the monitoring program. For example, the protocol 1532 may specify that participants in the monitoring group 1402 must perform heart rate monitoring and submit heart rate tests daily, fill out and submit a daily sleep quality survey, and attend a weekly office visit to be evaluated by a doctor. As another example, the protocol 1532 may specify a schedule for when the computer system 210 is to send notifications, such as reminders or data requests, to the participant devices in the monitoring group 1402. Similarly, the protocol 1532 may specify rules for communicating with the participants and/or researchers, such as rules that dictate the form and timing of notifications when a participant fails to timely perform a required action.

The prediction module 1440 can also obtain success criteria 1534 that specifies the criteria used by the computer system to determine if participants and/or the monitoring group 1402 successfully completed the monitoring program. The success criteria 1534 obtained may be limited to success criteria other than diversity criteria. Similarly, the success criteria 1534 obtained may be a subset of the success criteria that specifies the success criteria for individual participants, such as a minimum compliance rate required for each participant or for each participant in a particular group of participants.

In some implementations, in obtaining the monitoring program protocol 1532, the prediction module 1440 accesses the monitoring program data 1430 in the database 212 and retrieves the monitoring program protocol 1532 from the database 212.

The prediction module 1440 can also obtain the participant attribute data 1544 that includes attribute information for each of the participants in the monitoring group 1402. As will be described in more detail below with respect to FIG. 17, the participant attribute data 1544 can include demographic and non-demographic information collected on each of the participants in the monitoring group 1402. This information can include names for the participants, identifications assigned to the participants, ages for the participants, known medical conditions of the participants, medications that have been prescribed to the participants, etc. Similarly, this information can include behaviors that the participants have previously demonstrated or have otherwise indicated, such as difficulty keeping a dosage schedule, difficulty complying with dietary restrictions, or difficulty performing particular types of exercises. The participant attribute data 1544 may also include monitoring program related information for the participants, such as indications of the monitoring programs that they have participated in and/or successfully completed, the number of monitoring programs that they have participated in and/or successfully completed, their overall successful completion rate, date(s) for their most recent program completion(s), etc.

The participant attribute data 1544 can include an indication of the participant groups that each participant belongs to. Alternatively, the computer system 210 or the prediction module 1440 can determine which participant groups that each of the monitoring group 1402's participants belong to using the participant group data 1542 of the monitoring group data 1540. For example, the participant group data 1542 may include, for each of the groups, a list of participants that belong to the corresponding group. The computer system 210 or the prediction module 1440 may proceed to compare the names or identifiers in the participant attribute data 1544 to the lists to identify which groups the participants belong to, or the lists may be limited to those participants in the monitoring group 1402. As another example, the participant group data 1542 can include a profile for each of the groups that defines inclusion criteria for each of the participant groups. The computer system 210 or the prediction module 1440 can compare the inclusion criteria to the participant attribute data 1544 to determine the participant group(s) that each of the participants in the monitoring group 1402 belong to, and/or to determine the number or percentage of participants in the monitoring group 1402 that belong to each of the participant groups.

In some implementations, in obtaining the participant attribute data 1544, the prediction module 1440 accesses the monitoring program data 1430 in the database 1422 and retrieves the participant attribute data 1544 from the database 1422.

In some implementations, the prediction module 1440 does not obtain the monitoring program protocol 1532, the success criteria 1534, and the participant attribute data 1544. For example, the prediction module 1440 may obtain only the protocol 1532 and the participant attribute data 1544 to provide as input to the ML models 1550. The ML models 1550 can be configured to generate outputs using the protocol 1532 and the participant attribute data 1544 without the success criteria 1534. In this example, the ML models 1550 may be trained using data sets that indicate which participants successfully completed the past monitoring programs and which did not, which would allow the ML models 1550 to accurately predict successful completion without the need for success criteria 1534. However, potentially more accurate predictions can be made by the ML models 1550 when using the current success criteria 1534 when predicting whether participants will successfully complete a monitoring program.

After obtaining the subset of the monitoring program data 1430, the prediction module 1440 can provide the obtained data as input to the ML models 1550. Specifically, the prediction module 1440 can provide the monitoring program protocol 1532, the success criteria 1534, and the participant attribute data 1544 as input to the ML models 1550. The prediction module 1440 can provide the entirety of the input data to the ML models 1550 at once, or it can provide the input data in separate datasets. For example, the prediction module 1440 can first provide a dataset that includes the monitoring program protocol 1532 and participant attribute data for Participant 1 as input to the ML models 1550 before providing a second dataset that includes the monitoring program protocol 1532 and participant attribute data for Participant 2 as input to the ML models 1550.

In some implementations, the ML models 1550 process different datasets sequentially. For example, the prediction module 1440 may provide different datasets corresponding to each of the participants in the monitoring group 1402 as input to the ML models 1550 (e.g., as they are created, one dataset at a time, all at once, etc.). The ML models 1550 may process the multiple datasets sequentially, e.g., in the order that they are received and/or in a queue order.

In some implementations, the ML models 1550 process different datasets in parallel. For example, the ML models 1550 may process two or more datasets corresponding to two or more participants in the monitoring group 1402 in parallel. The prediction module 1440 may place the datasets in one or more queues for the ML models 1550 to draw from.

Using the input data, the ML models 1550 can generate output data 1560. The output data 1560 can include an output for each of the participants present in the monitoring group 1402. For example, when the diversity analysis is performed at the start of the monitoring program, the monitoring group 1402 may include a first participant and, therefore, the ML models 1550 would generate a corresponding output for that first participant. However, if the first participant leaves or is removed from the monitoring program before a second diversity analysis is performed, the ML models 1550 would not generate another output for the first participant as they are no longer part of the monitoring group 1402.

The output data 1560 may include for each participant a predicted completion probability. For example, the output data 1560 can include a first output 1560a for Participant 1 that indicates the determined likelihood of Participant 1 successfully completing the monitoring program (e.g., the probability of Participant 1 meeting the success criteria of the monitoring program data 1430).

The prediction module 1440 can use the output data 1560 to make predictions for each group of participants in the monitoring program. For example, using the participant group data 1542 and/or the participant attribute data 1544, the prediction module 1440 can organize the output data 1560 into different sets, one for each group of participants present in the monitoring group 1402. For example, the prediction module 1440 may place the predicted completion probability 1560a in a first set of outputs 1572 for Group 1 based on the participant group data 1542 indicating that Participant 1 is in Group 1. The prediction module 1440 may similarly generate other sets of outputs for the other groups present in the monitoring group 1402, including a second set of outputs 1576 for Group 2.

The prediction module 1440 can use the different sets of outputs to generate corresponding predictions for the different participant groups. For example, the prediction module 1440 can use the first set of outputs 1572 to generate a first set of predictions 1570 for Group 1. Similarly, the prediction module 1440 can use the second set of outputs 1572 to generate a second set of predictions 1574 for Group 2. The sets of predictions 1570 and 1574 can each include, for example, an overall completion probability for the respective participant group. For example, the prediction module 1440 can calculate an overall completion probability for Group 1 by averaging the completion probabilities in the first set of outputs 1572. The prediction module 1440 can treat the overall completion probability for each of the participant groups as, for example, a predicted retention rate for that respective participant group.

The prediction module 1440 can use the different sets of outputs to generate other predictions. For example, after determining an overall completion probability for Group 1, the prediction module 1440 can apply the probability to the current number of Group 1 participants in the monitoring group 1402 (e.g., as indicated by the participant group data 1542) to predict the number of Group 1 participants there will be in the monitoring group 1402 at the monitoring program's completion.

The prediction module 1440 can use the predictions generated using the output data 1560 to determine a predicted group composition 1580a. The group composition 1580a can include predicted composition characteristics of the monitoring group 1402 at a future time, such as a set or anticipated end of the monitoring program. As shown, the predicted group composition 1580*a* includes a predicted population and percentage representation for each participant group that is currently represented in the monitoring group 1402. As an example, if the first set of predictions 1570 indicates that twenty-five Group 1 participants are predicted to successfully complete the monitoring program and other sets of predictions indicate that fifty-one other participants are expected to successfully complete the monitoring program, the prediction module 1440 can calculate that the percentage representation of the Group 1 participants is expected to be 33% and include that value in the predicted group composition 1580*a*. As another example, if the first set of predictions 1570 indicates that the overall completion probability for Group 1 is 62.5%, then the prediction module 1440 can calculate the number of Group 1 participants expected to be in the monitoring group 1402 at the monitoring program's completion is twenty-five.

The predicted group composition 1580*a* can also include other predicted composition characteristics of the monitoring group 1402. For example, the predicted group composition 1580*a* can include a predicted diversity score for the monitoring group 1402 at the future time. The diversity score may be calculated using an algorithm that takes into account various other predicted composition characteristics and/or diversity criteria. For example, the diversity score may be calculated using the anticipated sizes for each of the groups present in the monitoring program 1402. As another example, the diversity score may be calculated using an anticipated total size for the monitoring group 1402, the predicted percentage representations for each of the groups present in the monitoring group 1402 (or present at the start of the monitoring program), and/or minimum percentage representations for each of the groups as indicated in the diversity criteria 1434.

The predicted group composition 1580*a* may be represented as a distribution. The computer system 210 can later use the predicted distribution to compare with a target distribution in the diversity criteria 1434.

After generating the predicted group composition 1580*a*, the prediction module 1440 can output the predicted group composition 1580*a* one or more other systems or modules of the computer system 210. The computer system 210 may use the predicted group composition 1580*a* to compare to the diversity criteria 1434 as described above with respect to FIG. 1.

The prediction module 1440 can also output other information to other system or modules of the computer system 210. For example, the prediction module 1440 can output the output data 1560, the first set of outputs 1572, first set of predictions 1570, etc. to a recommendation module of the computer system 210.

As another example, the output data 1560 may include for each participant a classification and/or binary value that indicates whether the corresponding participant is predicted to successfully complete the monitoring program or not. For example, the ML models 1550 may output a value of "1" to indicate that a particular participant in the monitoring group 1402 is anticipated to successfully complete the monitoring program, and output a value of "0" to indicate that a particular participant is not anticipated to successfully complete the monitoring program.

Continuing this example, the first set of outputs 1572 can include the binary values corresponding to each participant of the monitoring group 1402 that is in Group 1, and the second set of outputs 1576 can include the binary values corresponding to each participant of the monitoring group 1402 that is in Group 2. The prediction module 1440 can use the sets of binary values to determine an overall completion probability or retention rate for each group of participants. For example, the prediction module 1440 can average the binary values in the first set of outputs 1572 to calculate an overall completion probability for Group 1. The prediction module 1440 can proceed to use this value to calculate a predicted Group 1 size and/or percentage representation.

Figure 15B:
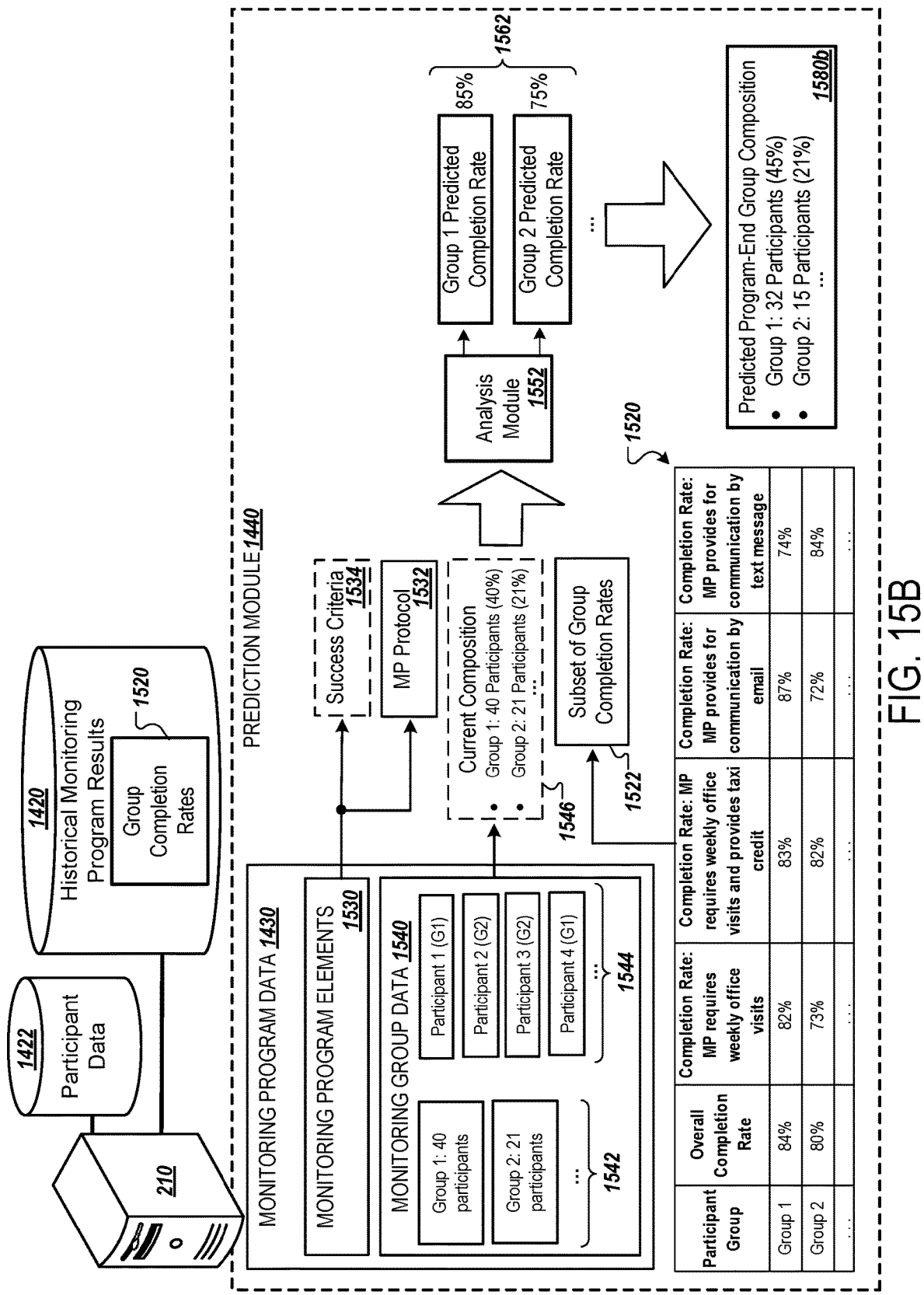

In FIG. 15B, the prediction module 1440 uses an analysis module 1552 to generate predictions. The analysis module 1552 can generate monitoring group 1402 predictions based on received portions of the monitoring program data 1430 and historical data. In more detail, the prediction module 1440 provides at least a portion of the monitoring program elements 1530, the monitoring group data 1540, and group completion rates stored in the database 1420 as input to the analysis module 1552. The analysis module 1552 may use this input data to generate outputs 1562 that are, or indicate, predicted completion probabilities for the monitoring group 1402's participants.

The analysis module 1552 can include statistical models (e.g., statistical algorithms), machine learning models, or a combination of statistical and machine learning models. The machine learning models optionally included in the analysis module 1552 can include one or more of a supervised learning model, an unsupervised learning model, a hybrid-learning model, or a reinforcement learning models.

In some implementations, the analysis module 1552 only includes a statistical model. For example, the analysis module 1552 can calculate anticipated completion rates using only one or more static algorithms without relying on any machine learning.

In some implementations, where the analysis module 1552 includes an ML model, the ML models may be trained using training data sets generated from historical data stored in the database 1420. Specifically, the computer system 210 can train the ML model using monitoring program data from previous monitoring programs.

The prediction module 1440 may obtain the monitoring program protocol 1532, the success criteria 1534, and the monitoring group data 1540 as described above with respect to FIG. 15A.

From the obtained monitoring group data 1540, the prediction module 1440 can determine a current composition 1546 for monitoring group 1402. The current composition 1546 can indicate composition characteristics present among the monitoring group 1402. The prediction module 1440 can use the participant attribute data 1544 and/or the participant group data 1542 in the monitoring group data 1540 to determine a current size and percentage representation of each of the participant groups in the monitoring group 1402. For example, at the time the diversity analysis is imitated, the monitoring program 1402 may include one-hundred participants, forty of which belong to Group 1 and twenty-one of which belong to Group 2. The prediction module 1440 may extract this information from the monitoring group data 1540 and (i) include the information in the current composition 1546 and (ii) use it to determine a percentage representation for each of the groups to include in the current composition 1546.

The prediction module 1440 can also obtain historical data stored in the database 1420. Alternatively, the prediction module 1440 can receive the historical data 1432 that was previously acquired from the database 1420. The historical data obtained by the prediction module 1440 can include all or a subset of group completion rates 1520 for various participant groups. As shown, the group completion rates 1520 can include multiple completion rates (e.g., retention rates) for each participant group for different monitoring program elements, such as particular monitoring group protocols. The group completion rates 1520 may also include a baseline rate for each of the participant groups that, for example, indicates an overall completion rate for the respective participant group. The analysis module 1552 may use the baseline rate for a participant group to determine if a particular program element (e.g., protocol entry) will have a beneficial or negative effect on the completion rate for that participant group.

The prediction module 1440 can identify from the group completion rates 1520 the subset of group completion rates 1522. The subset of group completion rates 1522 may include only those rates that correspond to a participant group represented in the monitoring program 1402 as indicated by the participant group data 1542, and that corresponds to at least one element in the monitoring program elements 1530. The subset of group completion rates 1522 can also include one or more baseline rates for each of the participant groups. For example, based on the participant group data 1542, the prediction module 1440 may filter the group completion rates 1520 to remove all rates that do not correspond to participant groups present in the monitoring group 1402. The prediction module 1440 can proceed to use by comparing the entries in the protocol 1532 to the remaining group of completion rates to identify a subset of group completion rates that match one or more entries of the protocol 1532. The prediction module 1440 may form the subset of group completion rates by filtering, from the remaining group of completion rates, all rates that are not a baseline rate (e.g., overall completion rate) and that were not identified as matching one or more entries of the protocol 1532.

The prediction module 1440 may provide the subset of group completion rates 1522 as input to the analysis module 1552 along with the other obtained data.

The analysis module 1552 can use the input data to generate output data 1562. The output data 1562 can include predicted completion rates for each participant group present in the monitoring group 1402. The analysis module 1552 can determine the predicted completion rates in variety of different ways. For example, the analysis module 1552 can identify and extract a single completion rate for each participant group from the subset of group completion rates 1522. Alternatively, the analysis module 1552 can use multiple completion rates to determine the effect of different monitoring program elements for each of the participant groups, and apply the effects to a corresponding baseline completion rate for each of the participant groups.

In more detail, in determining the outputs data 1562, the analysis module 1552 may identify a single completion rate from the subset of group completion rates for each participant group to include in the output data 1562. For example, the analysis module 1552 can compare the protocol 1532 to descriptions for different completion rates in the subset of group completion rates 1522 to identify a set of completion rates having a description that matches or is substantially similar to the protocol 1532. The analysis module 1552 can extract from the set of completion rates a completion rate for each participant group.

As another example, in determining the outputs data 1562, the analysis module 1552 can use multiple completion rates. Specifically, the analysis module 1552 may match different sets of completion rates (e.g., columns) in the subset of group completion rates 1522 to corresponding monitoring program elements such as entries in the protocol 1532. The module 1552 may proceed to determine the effect of the different protocol entries on the completion rates for each of the participant groups present in the monitoring program 1402 by comparing the completion rates to corresponding baseline completion rates (e.g., overall completion rate). For example, the analysis module 1552 may determine that the protocol entry of requiring weekly office visits is expected to reduce the completion rate for Group 1 participants by 2% (e.g., calculated by subtracting the completion rate of 82% for Group 1 participants when protocol requires weekly office visits from Group 1 baseline completion rate of 84%) and the completion rate for Group 2 participants by 7%.

Continuing this example, the analysis module 1552 may proceed to determine the effect that each of the protocol 1532 entries are likely to have on the baseline completion rate for each of the participant groups, and, from these sets of effects, calculate an predicted completion rate for each participant group.

After generating the output data 1562 by calculating a predicted completion rate for each participant group present in the monitoring group 1402, the prediction module 1440 can use the predicted completion rates to determine a predicted group composition 1580*b*. The prediction module 1440 can use the techniques described above with respect to FIG. 15A to generate the predicted group composition. As an example, the prediction module 1440 may apply the predicted completion rates to the current composition 1546 to obtain predicted sizes for each of the participant groups. The prediction module 1440 can then use the predicted sizes to calculate percentage representations for each of the participant groups and/or to generate a predicted distribution.

The predicted group composition 1580*b* can also include other predicted composition characteristics, such as a diversity score as described in more detail above.

In some implementations, the prediction module 1440 does not provide the current composition 1546 as input to the analysis module 1552. The analysis module 1552 may use other information to predict completion rates for different participant groups. The prediction module 1440 can proceed to apply these predicted completion rates to the starting composition to determine the predicted group composition 1580*b*.

In some implementations, the predicted group composition 1580*b* is the output of the analysis module 1552. For example, when the prediction module 1440 provides the current composition 1546 as input to the analysis module 1552, the analysis module 1552 can first determine the output data 1562, and apply the output data 1562 that includes predicted completion rates to the current composition 1546 to obtain the predicted group composition 1580*b*.

In some implementations, the prediction module 1440 generates the subset of group completion rates 1522 from the historical data 1432. For example, the prediction module 1440 may identify monitoring programs that have the same monitoring program protocol as the monitoring program protocol 1532, or that have a substantially similar protocol (e.g., monitoring programs having protocols that include all or a threshold percentage of the protocol entries found in the protocol 1532). The prediction module 1440 can proceed to extract or calculate completion rates for each participant group in the previous monitoring groups that is also represented in the monitoring group 1402. After extracting or calculating these completion rates from the historical data for the different participant groups, the prediction module 1440 can combine them to generate a single completion rate for each participant group. The prediction module 1440 can combine the various completion rates by averaging them, or by calculating a weighted average where, for example, a higher weight is afforded to more recent monitoring programs and/or to monitoring programs having protocols that more closely match the protocol 1532.

Figure 15C:
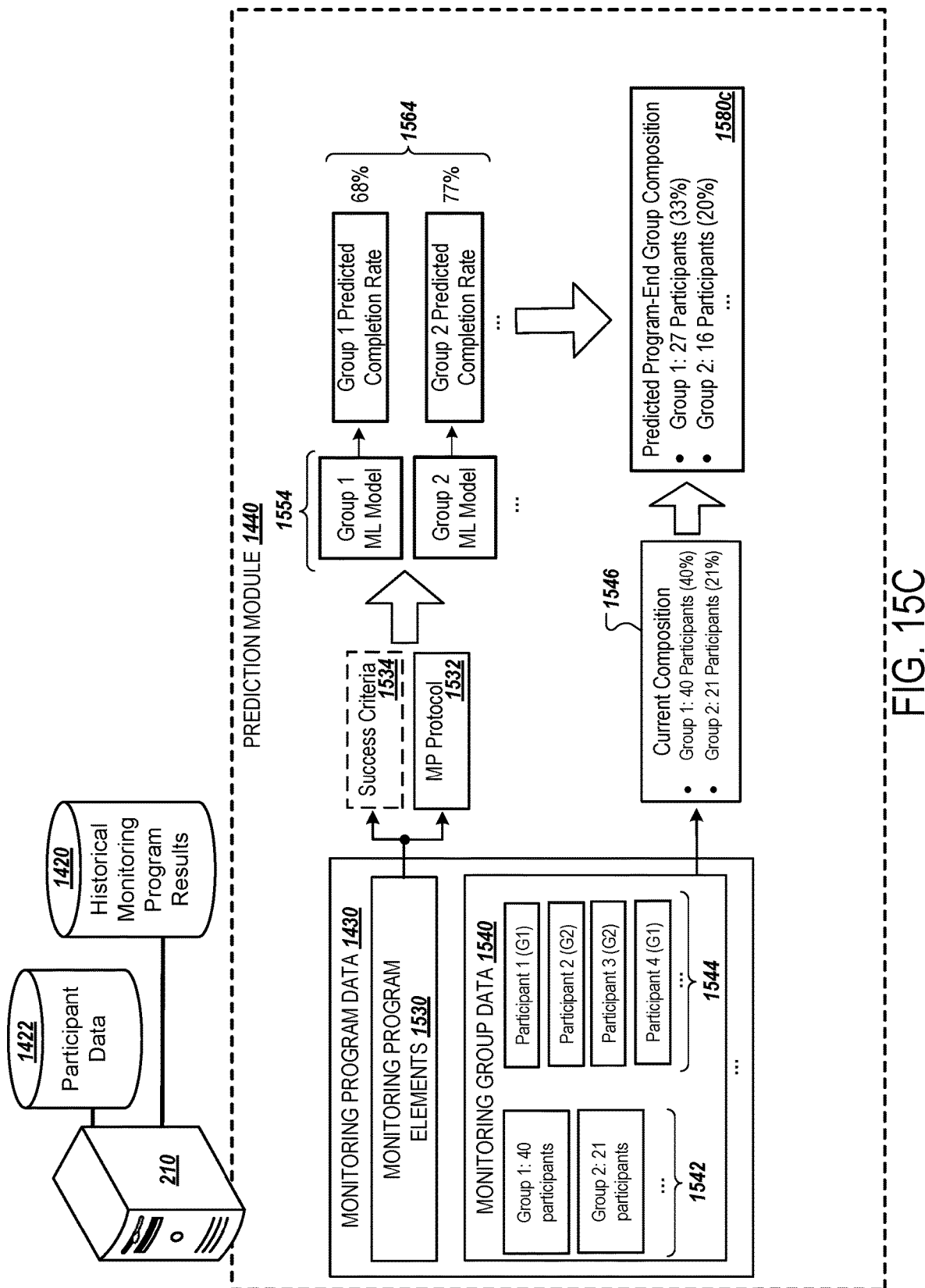

In FIG. 15C, the prediction module 1440 uses a set of multiple machine learning models 1554 to generate predictions. The ML models 1554 can generate monitoring group 1402 predictions based on received portions of the monitoring program data 1430. In more detail, the prediction module 1440 provides at least a portion of the monitoring program elements 1530 as input to the ML models 1554. The ML models 1554 can use this input data to generate outputs 1564 that are, or indicate, predicted completion probabilities for the participant groups present in the monitoring group 1402.

The ML models 1554 can include one or more types of ML models or algorithms. For example, the ML models 1554 can include one or more of a supervised learning model, an unsupervised learning model, a hybrid-learning model, or a reinforcement learning models.

The ML models 1554 may be trained using training data sets generated from historical data stored in the database 1420. Specifically, the computer system 210 can train the ML models 1554 using monitoring program data from previous monitoring programs. This monitoring program data can include protocols for the previous monitoring programs and/or success criteria for the previous monitoring programs.

As described above with respect to the ML models 1550 in FIG. 15A, the ML models 1554 may be trained to reduce a loss. The computer system 210 can determine the loss using predicted completion rates generated by the ML models 1554 for each participant group and corresponding actual completion rates for those participant groups as indicated by the historical data in the database 1420. As an example, the ML models 1554 can include regression loss models, classifiers (e.g., that outputs a value that corresponds to a particular classification represented by a particular completion rate percentage or range of percentages), and/or neural networks.

The prediction module 1440 can provide the protocol 1532 as input to each of the multiple ML models 1554. The prediction module 1440 may also provide the success criteria 1534 for the monitoring program as input to all or a subset of the ML models 1554.

As an example, if there is sufficient historical data to use for training a particular participant group, the prediction module 1440 may determine that it is not necessary to provide the success criteria 1534 as input to the ML models 1554. Similarly, if there is insufficient historical data to use for training a particular participant group, the prediction module 1440 may determine that it is necessary to provide the success criteria 1534 as input to the ML models 1554.

In some implementations, when the success criteria 1534 is not provided as input to the ML models 1554. The ML models 1554 may retrieve default success criteria for the monitoring program or for monitoring programs in general.

The ML models 1554 can use the input data to generate output data 1564. The output data 1564 can include, for example, a predicted completion rate for each participant group present in the monitoring group 1402. That is, each of the ML models in the ML models 1554 can generate a corresponding completion rate for their respective participant group.

In determining the completion rates for the different participant groups, the ML models 1554 may use similarities between the protocol 1532 and the protocols of past monitoring programs to determine the effect (e.g., effect on the completion rate) that the protocol 1532 is expected to have on participant retention in each of the participant groups. The ML models 1554 may use the success criteria 1534 to more accurately predict the completion rates. For example, if the historical data indicates that 75% of Group 1 participants from a previous monitoring program (e.g., having a matching or similar protocol to the protocol 1532) successfully completed the previous monitoring program but the success criteria for that program differs substantially from the success criteria 1534, then a ML model for Group 1 in the ML models 1554 (or the prediction module 1440) may first determine the completion rate for the past monitoring program for the Group 1 participant had the success criteria 1534 been applied to that program. Continuing the example, the Group 1 ML model may determine that the completion rate for the Group 1 participants would have only been 65% had the success criteria 1534 been used. The Group 1 ML model may proceed to use this value to determine the effects of the protocol 1532 on the completion rate for the Group 1 participants.

After the ML models 1554 output the predicted completion rates for the multiple participant groups present in the monitoring group 1402, the prediction module 1440 use the monitoring group data 1540 to determine a predicted group composition 1580c. For example, the prediction module 1440 can determine the current composition 1546 from the participant group data 1542. The prediction module 1440 can proceed to apply the predicted completion rates for each of the participant groups to corresponding group sizes in the current composition 1546 to determine predicted group sizes for each of the participant groups. After determining the predicted sizes, the prediction module 1440 can use the predicted sizes to determine percentage representations for each of the participant groups and/or a predicted distribution.

As discussed above with respect to FIGS. 15A-15B, the predicted composition 1580c can include other predicted composition characteristics for the monitoring group 1402 such as a diversity score.

In some implementations, the ML models 1554 output a value for each participant group that corresponds to a particular classification. The prediction module 1440 may apply the values to a key to identify a classification for each of the participant groups. As an example, the classifications can correspond to 5% ranges where an output value of 0.5 corresponds to a classification for a 50% completion rate, and an output value of 0.57 corresponds to a classification for a 55% completion rate.

Figure 15D:
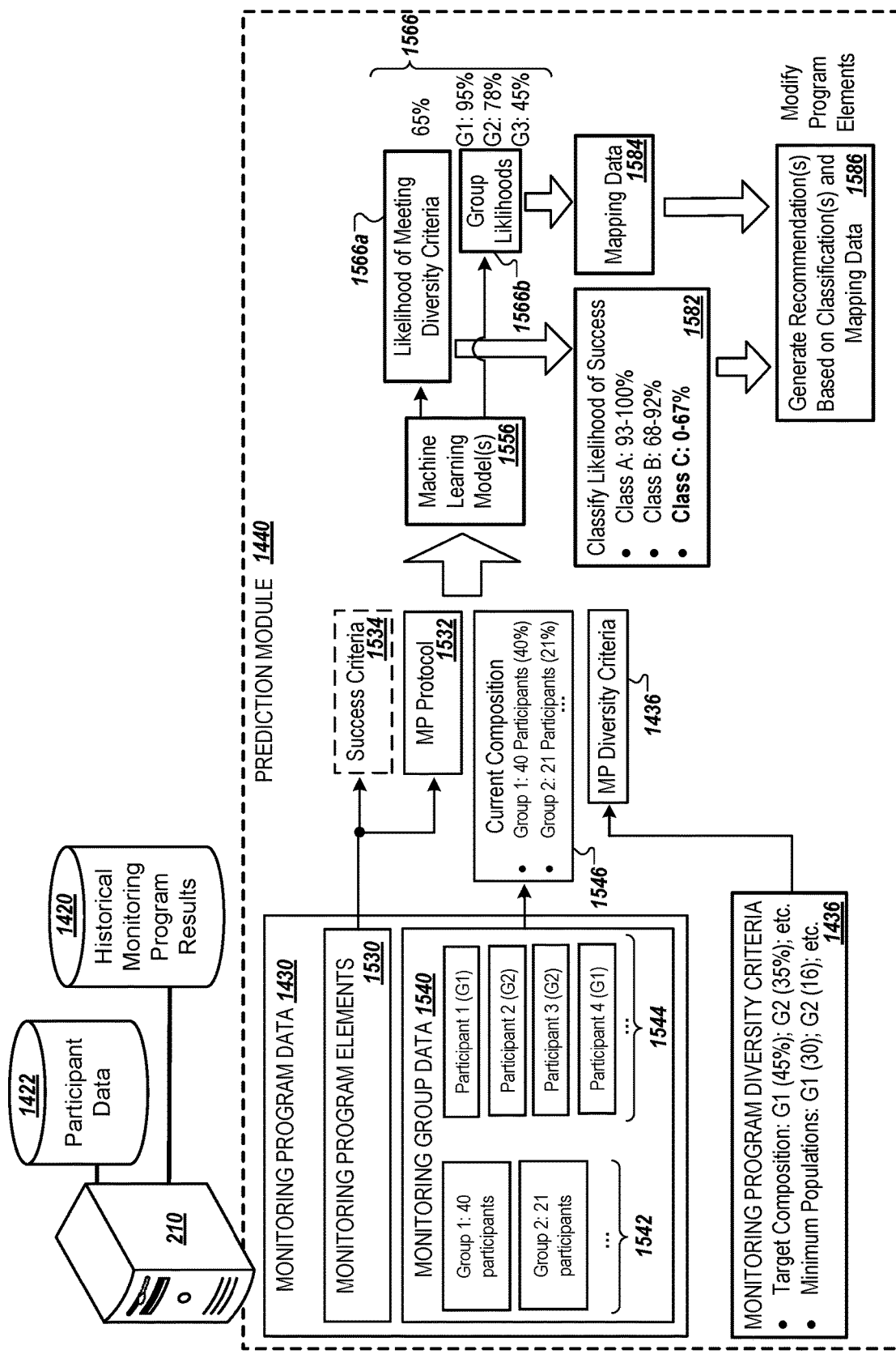

In FIG. 15D, the prediction module 1440 uses one or more machine learning models 1556 to generate predictions. The ML models 1556 can generate monitoring group 1402 predictions based on received portions of the monitoring program data 1430 and the diversity criteria 1436. In more detail, the prediction module 1440 provides at least a portion of the monitoring program elements 1530, the monitoring group data 1540, and the diversity criteria 1436 as input to the ML models 1556. The ML models 1556 can use this input data to generate outputs 1566 that are, or indicate, likelihoods for meeting the diversity criteria 1436.

The ML models 1556 can include one or more types of ML models or algorithms. For example, the ML models 1556 can include one or more of a supervised learning model, an unsupervised learning model, a hybrid-learning model, or a reinforcement learning models.

The ML models 1556 may be trained using training data sets generated from historical data stored in the database 1420. Specifically, the computer system 210 can train the ML models 1556 using monitoring program data and diversity criteria from previous monitoring programs. This monitoring program data can include protocols for the previous monitoring programs, success criteria for the previous monitoring programs, and/or the monitoring group data for previous monitoring programs.

As described above with respect to the ML models 1550 in FIG. 15A and the ML models 1554 in FIG. 15C, the ML models 1556 may be trained to reduce a loss. The computer system 210 can determine the loss using predicted likelihoods generated by the ML models 1556 (e.g., overall likelihood of meeting diversity criteria and/or likelihood of each participant group meeting diversity criteria) and corresponding observed likelihoods as indicated by the historical data in the database 1420. As an example, the ML models 1556 can include regression loss models, classifiers (e.g., that outputs a value that corresponds to a particular classification represented by a particular likelihood percentage or range of percentages), and/or neural networks.

In some implementations, the ML models 1556 include a ML model for each participant group. For example, the ML models 1556 can include a first ML model for Group 1 and a second ML model for Group 2. Each of the multiple models may be trained using different data sets that correspond to their respective participant group. Each of the multiple models can be configured to predict a likelihood of corresponding participant group meeting the diversity criteria 1436 for the monitoring program.

The prediction module 1440 can provide the protocol 1532, the current composition 1546, and the diversity criteria 1436 as input to each of the ML models 1556. The prediction module 1440 may also provide the success criteria 1534 for the monitoring program as input to the ML models 1556.

As an example, the ML models 1556 can use the input data to generate group likelihoods 1566*b* for each participant group represented in the monitoring group 1402. The prediction module 1440 can use the resulting group likelihoods 1566*b* of the output data 1566 to calculate an overall likelihood 1566*a* of the monitoring group 1402 meeting the diversity criteria. For example, an algorithm in the ML models 1556 may be used to calculate the overall likelihood 1566*a* from the group likelihoods 1566*b* by averaging the group likelihoods 1566*b* or using a weighted average of the 1566*b* where the weight applied corresponds to current or predicted percentage representation of each of the participant groups in the monitoring group 1402.

The prediction module 1440 can classify the output data 1566 and use the classifications to generated recommendations. For example, the prediction module 1440 can apply classifications 1582 to the overall likelihood 1566*a* to determine a warning level for the monitoring program at its current stage. As shown, based on the overall likelihood 1566*a* being 65%, the prediction module 1440 can determine that the most-at-risk warning level (e.g., Class C) applies to the monitoring programs. The different warning levels can correspond to different recommended actions, different variable values for recommended actions (e.g., number of participants recommended to be enrolled in the monitoring program, the amount of taxi credit provided to participants, etc.), and/or different number of recommended actions.

For example, based on an overall likelihood meeting the least-at-risk warning level (e.g., Class A), the prediction module may determine that recommended actions are limited to 1-2 actions and that the recommended actions should not include modifications to the monitoring program elements. In contrast, based on the overall likelihood 1566*a* meeting the most-at-risk warning level, the prediction module may determine that at least two recommended actions should be performed and that the recommended actions should include at least one modification to the monitoring program elements.

The prediction module 1440 may similarly apply mapping data 1584 to the group likelihoods to identify the participant groups that are anticipated to cause the most problems with respect to the diversity criteria 1436. As an example, the mapping data 1584 can include likelihoods or ranges of likelihoods for different participant groups, and corresponding recommended actions or sets of recommended actions that are anticipated to improve those likelihoods. The prediction module 1440 can proceed to match the individual likelihoods in the group likelihoods 1566*b* to corresponding values or ranges in the mapping data 1584 to identify a set of one or more recommended actions for each of the participant groups.

As another example, the mapping data 1584 can include various recommendations and sets of recommendations and their corresponding effect on group likelihoods for different groups. The prediction module 1440 can determine, e.g., based on the diversity criteria, a minimum group likelihood needed for each of the participant groups or for all participant groups. Once the minimum likelihood(s) are determined, the prediction module 1440 can find a difference between the minimum likelihoods and the likelihoods in the group likelihoods to identify the likelihood difference that needs to be made up for each of the groups. The prediction module 1440 can use the likelihood differences for each of the participant groups to identify recommended actions and/or sets of recommended actions for the corresponding participant group. For example, if the minimum likelihood for each of the groups is determined to be 80%. The prediction module 1440 may determine that no actions need to be taken with respect to Group 1 participants, that recommendations corresponding to a difference of 2% need to be taken with respect to Group 2 participants, and that recommendations corresponding to a difference of 35% need to be taken with respect to Group 3 participants. Based on this, the mapping data 1584 may indicate that additional or more significant actions need to be taken with respect to the Group 3 participants based on the significant difference between the predicted likelihood for Group 3 and the minimum likelihood.

The mapping data 1584 selected can be based on the classification determined for the overall likelihood 1566*a*. For example, the mapping data 1584 that the prediction module 1440 applies to the group likelihoods 1566*b* may be for when the monitoring group 1402 is most-at-risk of not meeting the diversity criteria 1436. The recommended actions and/or sets of recommended actions in the mapping data 1584 may include those that have an additional number of recommendations and/or larger variable values so that the effect of the actions on the monitoring program is more significant.

The mapping data 1584 can be generated by the computer system 210 using historical data in the database 1420. For example, the computer system 210 can identify from the historical data monitoring programs with matching or similar protocols to the protocol 1532, and map the effects of different actions or monitoring program elements on different participant groups in those monitoring programs.

In some implementations, the mapping data 1584 is specific to the diversity criteria 1436. For example, the mapping data 1584 may be generated (e.g., from default mapping data or otherwise existing mapping data) to take into account the diversity criteria 1436 for the monitoring program. If, for example, the diversity criteria is particularly strict, then the mapping data 1584 may indicate that additional actions are needed and/or actions with larger variable values are needed (e.g., more participants to be invited and/or enrolled in the monitoring program than what would be recommended with less strict diversity criteria).

Based on the application of the classifications 1582 to the overall likelihood 1566a and the mapping data 1584 to the group likelihoods to the mapping data 1584, the prediction module 1440 can determine a set of one or more actions 1586 to recommend. The recommended actions 1586 may include those in the mapping data 1584 that have been shown to improve the likelihoods to the extent needed for different participant groups. The recommended actions 1586 may include different actions or sets of actions for different participant groups. For example, based on only Group 2 and Group 3 having a predicted likelihood less than a minimum ally acceptable likelihood, the recommended actions may include only a first set of actions to improve the likelihood for Group 2 and a second set of actions to improve the likelihood for Group 3. The prediction modules may uses the actions in the first set and the actions in the second set to form recommendations, where recommendations include at least one action from the first set corresponding to Group 1 and one action from the second set corresponding to Group 2.

The prediction module 1440 may also verify that a set of recommended actions is anticipated to produce an overall likelihood 1566a that is in the leas-at-risk warning level, or that at least removes the overall likelihood 1566a from the most-at-risk warning level. For example, the prediction module 1440 may perform additional diversity analyses that each assume a corresponding set of recommended actions has been performed.

In some implementations, the prediction module 1440 uses both monitoring group data for the current monitoring group 1402 and monitoring group data for a starting monitoring group. For example, after predicting completion rates for different participants or groups of participants, the prediction module 1440 can use the starting composition for the monitoring program 1402 to calculate a predicted retention rate for each participant or group of participants.

As demonstrated throughout FIGS. 15A-15D, the results or output of the prediction module 1440 may vary based on the technique(s) implemented by the prediction module 1440. In some cases, the prediction module 1440 may perform multiple analyses using different techniques and then combine the respective results to obtain a more accurate result. For example, the prediction module 1440 may perform a first diversity analysis using the ML models 1550 in FIG. 15A to obtain the predicted group composition 1580a and perform a second diversity analysis using the analysis module 1552 (e.g., at substantially the same time) to obtain the predicted group composition 1580b. The prediction module 1440 can proceed to average the predicted group sizes for each of the participant groups and use the updated group sizes to calculate updated percentage representations for each of the participant groups. The computer system 210 can use the resulting predicted group composition to compare to the diversity criteria 1434, and use to determine a set of recommended actions.

In some implementations, the computer system 210 determines to perform multiple analyses when certain conditions are met. For example, the computer system 210 may allow the prediction module 1440 to use multiple techniques when load or user traffic on the system 210 is below a threshold amount (e.g., in an off-peak time period), when load or user traffic on the system 210 is anticipated to be below a threshold amount (e.g., in an anticipated off-peak time period). Similarly, the computer system 210 may permit the use of multiple techniques when sufficient resources are available, but then limit the prediction module to a single technique when resources are more limited.

In some implementations, the computer system 210 selects which of the multiple techniques to have the prediction module 1440 perform based on detected server conditions. For example, based on the load on the system 210 and/or the amount of resources that are available for use, the computer system 210 may permit the prediction module 1440 to use techniques that require additional processing power or resources or may limit the prediction module 1440 to those techniques that require the least amount of processing power or resources. Specifically, during high-load times, the computer system 210 may limit the prediction module 1440 to use of the analysis module 1552 shown in FIG. 15B which may require less processing power due to using, in some examples, statistical models instead of machine learning models.

FIGS. 16A-16D are diagrams that illustrate example interfaces for diversity prediction. The interfaces can be used to communicate predictions made by the computer system 210 to a user of the client device 204, such as a researcher or an administrator. This information can help the users of the client device 204 quickly understand the health of the monitoring program. In more detail, the interfaces can be presented on the client device 204 based on notifications generated and sent by the computer system 210 in response to detecting events, such as a predicted lack of diversity in the monitoring group 1402 of the corresponding monitoring program. For example, the computer system 210 may perform a diversity analysis periodically or in response to detecting particular events to verify that the monitoring group 1402 is on track to achieve a minimum level of diversity in the future. The notifications sent to and displayed on the client device 204 can include a variety of information, including, for example, an indication that a particular event has occurred that has triggered a diversity analysis or that a scheduled diversity analysis has been started. More detailed notifications can include the results of the diversity analysis which can include various predictions made by the computer system 210 and, in some implementations, details as to how the computer system 210 made the predictions, such as information that the computer system 210 relied on to make the predictions. This additional insight can provide users of the client device 204 a better understanding of how the computer system 210 is making its predictions, which can help the users identify causes for inaccurate predictions and/or explain away divergences between the users' expectations the system 210's predictions. Moreover, the more detailed information may also educate users as to how to better configure a monitoring program to achieve particular outcomes, such as to avoid certain elements when participants from particular diversity groups are included in the program.

The interfaces can also be used to facilitate user interactions to improve diversity of monitoring groups. For example, the computer system 210 can communicate a set of one or more recommended actions that it predicts will improve the diversity of the monitoring group 1402. The client device 204 may receive a notification that indicates that the system 210 will perform at least one of the recommended actions automatically, or, alternatively, can receive a notification that requests a user to select an action from the set for the system 210 to perform. The interfaces can also prompt the users for other information such as the selection (or verification) of particular subjects to add to the monitoring group 1402, the addition of a program element, the removal of a program element or selection of program element recommended for removal, the entering or selection of values for program settings (e.g., data request frequency, etc.). The computer system 210 can use the user interactions to improve its decision making in the future. For example, the computer system 210 can use the selections made by the users of the client device 204 and/or the values provided by the users of the client device 204 to train the prediction module 1440, train one or more modules used to determine recommended actions, and/or update user preferences. This training and/or updates can have the beneficial effects of improving the predictions made by the system 210, improving the recommended actions generated by the system 210, and/or reducing the need for user input or the extent of input required in the future.

The interfaces can be configured in a variety of ways based on, for example, a software configuration corresponding to the particular monitoring program, and/or preferences associated with the client device 204 or associated with particular users of the client device 204. For example, the computer system 210 may provide the client device 204 a particular software package that corresponds to the monitoring program and/or a particular admin/researcher for the monitoring program. The software package may dictate how notifications are presented on a display of the client device 204, the form and/or type of notifications that are sent to the client device 204, and/or how a mobile application corresponding to the monitoring program is displayed on a display of the client device 204.

FIG. 16A illustrates example diversity assessment and action selection interface 1600a during a monitoring group selection stage of a monitoring program. The interface 1600a may be presented on the client device 204. For example, the interface 1600a may be presented on a display of the client device 204 after a researcher cohort selection stage of a study. The interface 502a may be presented on the client device 204. As an example, the interface 1600a may be presented on the client device 204 after (e.g., in response to) the researcher 202 submitting a research question or study objective (e.g., optionally along with other study information initially submitted by the researcher 202). The interface 1600a may present various diversity metrics calculated by the computer system 210 and recommendations generated by the computer system 210, such as the recommended actions 1586 shown in FIG. 15D. The researcher 202 may interact with the interface 1600a to, for example, select or confirm a recommendation of the computer system 210 for the computer system 210 to perform, adjust monitoring program elements such as a monitoring program protocol and monitoring program parameters, select users to enroll in a study, select users to invite to the study, confirm the enrollment or invitation of users recommended by the computer system 210, etc.

The interface 1600a includes a monitoring program elements section 1610, a monitoring group section 1620, a diversity analysis results section 1630, and a recommendation section 1640. The researcher 202 may, for example, use the interface 1600a to review recommendations generated by the computer system 210 at different times in the study. The researcher 202 may interact with the interface 1600a to select or confirm the performance of one or more recommended actions.

In some implementations, the researcher 202 does not need to make a selection or confirmation of recommended actions. For example, the recommendation section 1640 may instead serve as a notification area to notify the researcher 202 of the actions that have or will be taken by the computer system 210, and/or to provide insight as to the computer system 210's predicted effects of actions on the composition of the monitoring group 1402.

The researcher 202 may be able to also use the interface 1600a to indicate one or more actions to be performed by the computer system 210, e.g., that may not have been recommended. For example, the researcher 202 may, through the interface 1600a, modify the monitoring program elements. Specifically, the researcher 202 can use the interface 1600a to update a protocol for the monitoring program, change diversity or success criteria for the monitoring program, etc.

As shown, the monitoring program elements section 1610 may include various program elements for a particular monitoring program. For example, the monitoring program elements section 1610 may include a monitoring program size 1611, a monitoring program length 1612, a monitoring program protocol 1613, inclusion criteria 1614, exclusion criteria 1615, a target date 1616, and diversity/success criteria 1617.

The monitoring program elements in the section 1610 can be set by the researcher 202, the computer system 210, or a combination of the researcher 202 and the computer system 210.

The monitoring group section 1620 includes information for the participants enrolled in the monitoring program, or participants that have been or are to be invited to the monitoring program. As an example, the section 1620 may display the monitoring group data 1540 or the participant attribute data 1544 described above with respect to FIGS. 15A-15D. As shown, the section 1620 includes a name or identifier for each participant that has been enrolled in or invited to the monitoring program. For example, the section 1620 can include the names or identifiers for each participant in the monitoring group 1402. The section 1620 can also display other information such as an indication of the diversity groups that each participant corresponding to the monitoring program belongs to, and/or attributes for each of the participants. For example, as shown, a first participant enrolled in the monitoring group for the monitoring program belongs to the Group 2 diversity group.

The diversity analysis results section 1630 depicts the results of a diversity analysis performed by the computer system 210 prior to the end of the monitoring program. The results of the diversity analysis presented may have been generated by the prediction module 1440. The diversity analysis results section 1630 can include predicted composition characteristics for a monitoring group. For example, as shown, the section 1630 includes percentage representations for different diversity groups (e.g., participant groups) in the monitoring group at the end of the monitoring program and a predicted diversity level (e.g., diversity score) for the monitoring group at the end of the monitoring program.

The section 1630 can present other information related to predicted composition characteristics for the monitoring group. Specifically, the section 1630 may present diversity criteria, such as a program-end target composition for the monitoring group. The section 1630 can also present current monitoring group data such as a current group composition of the monitoring group. The section 1630 may also present warnings or alerts generated as a result of the diversity analysis. For example, based on the computer system 210 determining that the predicted group composition diverges beyond a threshold percentage from the target composition, the computer system 210 can send instructions to present a warning that the predicted group composition is outside of target composition range. The computer system 210 can identify and generate instructions to present other alerts or warnings, such as alerts when the predicted diversity level does not meet a minimum diversity level and/or when a predicted diversity group size does not meet a minimum group size.

The recommendation section 1640 can include one or more actions or sets of actions recommended by the computer system 210 based on the diversity analysis results presented in section 1630. The computer system 210 may determine the recommended actions using the techniques described above with respect to FIGS. 14 and 15A-15D. For example, the computer system 210 can determine a set of recommended actions to improve diversity of the monitoring group at a future time based on predicted composition characteristics generated by the prediction module 1440 for the monitoring group 1402. Similarly, the prediction module 1440 can generate an output that indicates the recommended actions to perform to improve the diversity of the monitoring group 1402 at a future time.

The recommended actions may be selected by the computer system 210 based on the computer system 210 determining that the effects the recommended actions will have on the monitoring group will result in the diversity/success criteria 1617 being met or in improvement to the likelihood of the diversity criteria 1617 being met at a future time such as at the end of the monitoring program.

For each set of recommended actions, the computer system 210 may perform a diversity analysis that assumes that the corresponding set of recommended actions have been performed. The computer system 210 may use the results of the diversity analysis to rank different sets of one or more recommended actions. As described in more detail below, the sets of recommended actions may be presented on the interface 1600a in an order corresponding to their rank. Similarly, only a subset of the sets of recommended actions may be presented on the interface 1600a, such as the highest ranking set, the top three highest rankings sets, etc.

As an example, the computer system 210 determine a first set of recommended actions that includes adding taxi cred and sending enrollment invitations to additional eligible Group 2 subjects (e.g., Group 2 subjects that are not currently enrolled in the monitoring program, were not previously enrolled in the monitoring program, and/or are active). The computer system 210 may predict, e.g., using the prediction module 1440, that should the first set of recommended actions be performed, the predicted diversity score will be improved so that it meets the minimum diversity score as required by the diversity/success criteria 1617. The computer system 210 may also predict that the group composition of the monitoring group is anticipated to substantially match or diverge less than a threshold percentage from the target composition at the end of the monitoring program.

The diversity level (e.g., diversity score) may indicate the extent that the predicted composition characteristics of the monitoring group meet the diversity/success criteria 1617, and/or the likelihood of the monitoring program successfully meeting the diversity/success criteria 1617 at a future time, such as at program completion. The diversity level may be, for example, a diversity score. As an example, the diversity level may be a single value that is indicative of how close the predicted group composition for the monitoring group at program completion is to the target group composition. As an example, a diversity score of 1.0 may indicate that the predicted group composition at program completion matches the target group composition. The diversity score may be absolute, or it may be relative, e.g., relative to a previously predicted group composition at program completion or relative to the predicted group composition at program completion of one or more other recommendation options. Additionally or alternatively, the diversity level may be, for example, a calculated distribution (e.g., probability distribution). This diversity distribution may, for example, indicate probabilities of achieving the target group composition or other diversity criteria (e.g., after performing actions corresponding to a particular recommendation option).

The diversity level can indicate a level of confidence in achieving the diversity/success criteria 1617. For example, the diversity level can indicate a level of confidence in the monitoring group achieving the target group composition, and/or achieving a group composition that is with an acceptable range (e.g., percentage range or value range) of the target group composition. For example, a diversity score of 0.91 may indicate that the computer system 210 has determined that there is 91% possibility of the group composition of the monitoring group at program completion being within a threshold percentage (e.g., 5%, 3%, 1%, etc.) of the target group composition provided that the actions corresponding to the recommendation option are performed.

In some implementations, the computer system 210 calculates multiple diversity scores for different diversity criteria in the diversity/success criteria 1617. The computer system 210 may use these different scores to generate the diversity level, e.g., by taking the average or weighted average of the different scores.

In some implementations, there are multiple diversity levels (e.g., diversity metrics) that include both one or more singular values, and one or more distributions. For example, a first diversity level may include a diversity distribution indicating different likelihoods of achieving the target group composition 522, and a diversity score may be second diversity level identified from the diversity distribution (e.g., as the value associated with the highest probability out of the all of the values).

As discussed above, the computer system 210 may rank the recommendations based on one or more diversity metrics (e.g., diversity levels) calculated for the recommendations. For example, the computer system 210 may rank the recommendations presented in the recommendation section 1640 according to a predicted diversity score for each of the sets of recommend actions (e.g., that indicate the anticipated diversity of the monitoring group at the end of the monitoring program should the actions in the corresponding recommendation be performed). The predicted diversity score is likely to be higher if the actions in the recommended set of actions are predicted to produce a group composition that matches or gets sufficiently close (e.g., with respect to the performance of actions in other recommendations) to the target group composition. The computer system 210 may provide instructions to the client device 204 to have the recommendations presented on the interface 1600a according to their rank. By ranking the sets of recommended actions according to their influence in achieving the diversity/success criteria 1617 and, therefore, their influence in on the study's ability to produce viable data, the computer system 210 can (i) more efficiently present its recommendations to the researcher, and/or (ii) take greater advantage of the limited screen space available on the client device 204 (or a display connected to the client device 204).

In some implementations, computer system 210 may only recommend a threshold number of sets of recommended actions (e.g., for display on the client device 204) and/or only transmit a threshold number of sets of recommended actions to the client device 204. For example, the computer system 210 may only recommend the two, three, or four highest ranking sets of recommended actions for display on the interface 1600a of the client device 204. The threshold may be selected by the researcher 202 or may be automatically determined by the computer system 210. As an example, the computer system 210 may determine the threshold based on diversity scores associated with the different sets of recommended actions, and/or based on the difficulty of the actions in the sets of recommended actions.

Prior to recommending a set of actions, the computer system 210 may first ensure that the corresponding prospective sets of recommended actions meet certain criteria. For example, the computer system 210 may first apply a minimum anticipated diversity level threshold to each set of recommended actions before it can be presented on a display of the client device 204 and/or sent to the client device 204. For example, the computer system 210 may apply a static threshold of 0.90 to the predicted diversity score. The diversity level threshold may instead be dynamic, e.g., based on a current predicted diversity level at the end of the monitoring program, based on historical data for the diversity groups being invited to participate in the monitoring program or enrolled in the monitoring program, based on the trends for the groups being invited to participate in the study, etc. By presenting only a subset of the sets of recommended actions that meet certain quality criteria, the computer system 210 can (i) more efficiently present the key recommendations to the researcher that are likely to have at least a minimum beneficial effect on meeting the diversity needs of the monitoring program by the program's completion, and/or (ii) take greater advantage of the limited display space available on the client device 204 (or a display connected to the client device 204) by removing the need to devote space to recommendations that are unlikely or less likely to achieve the diversity needs of the monitoring program.

FIG. 16B illustrates example interface 1600b for communicating diversity assessment information. The interface 1600b may be presented on the client device 204. However, the interface 1600b may be presented on other devices, such as those belonging to participants in the monitoring group 1402, those belonging to other researchers, or other devices of the researcher 202.

As shown, the interface 1600b may first display an event notification 1650 that indicates that a scheduled diversity analysis has been initiated or set to begin in the near future. The interface 1600b next presents an alert notification 1652 that indicates that the diversity analysis was performed but an error was detected. As an example, the computer system 210 may have detected an error based on the predicted composition of the monitoring group failing to meet certain diversity criteria corresponding to a particular diversity group.

The interface 1600b may next presents an interactive notification 1654 that requests that a user confirm the performance of at least one recommended actions. A user can make selections of interface elements presented in the notification 1654. For example, a user can interact with different interface elements that correspond to individual recommended actions or to sets of recommended actions. The user can select one or more of the interface elements. In response to the selection, the client device 204, for example, can generate instructions for the computer system 210 to perform the one or more actions corresponding to the selection(s) made. As shown, a user has selected an interface element that correspond to the performance of both a first recommended action and a second recommended action.

The notification 1654 can also present other information such as predicted effects that the different recommendation options will have on the monitoring program, or predicted composition characteristics of the monitoring group should the recommendation options be performed. For example, the notification 1654 can display next to each recommendation option a corresponding predicted group size for the particular diversity group should the recommendation option be performed by the computer system 210.

The interface 1600b may next display a confirmation notification 1656 that confirms the selection of the recommendation option. In some implementation, the notification 1656 may include an interface element or a temporary interface element that allows a user to undo the confirmation of the recommendation option.

FIG. 16C illustrates example interface 1600c for communicating diversity assessment information. The interface 1600c may be presented on the client device 204. However, the interface 1600c may be presented on other devices, such as those belonging to participants in the monitoring group 1402, those belonging to other researchers, or other devices of the researcher 202.

As shown, the interface 1600c may first display an alert notification 1660 that indicates that an event has been detected and that a diversity analysis has been, or will be, performed in response to the detected event. As an example, the detected event may be that a participant in a monitoring group has been active for a threshold amount of time. Other events that may trigger a diversity analysis can include, for example, detected modifications to the elements of a monitoring program, and changes to the enrollment of a monitoring program.

The interface 1600c next presents an alert notification 1662 that indicates that the diversity analysis was performed but an error was detected. As an example, the computer system 210 may have detected an error based on predictions for a particular diversity group indicating that there is an insufficient likelihood of diversity criteria for the diversity group being met by the end of the monitoring program. In more detail, based on a participant (User A) no longer being compliant with the protocol for the monitoring program and belonging to two diversity groups (Group 3 and Group 4), the computer system 210 may generate predictions for the two diversity groups to determine if corresponding diversity criteria is on track to be met by the end of the monitoring program without the participant. As shown, the computer system 210 may use a trend 1664 for the first of the two diversity groups to determine that the first diversity group in the monitoring group is still on track to meet corresponding diversity criteria by an end of the monitoring program, such as a minimum retention rate for the first diversity group. However, the computer system 210 may use a second trend 1666 for the second of the two diversity groups to determine that the second diversity group in the monitoring group is no longer on track to meet the corresponding diversity criteria by the end of the monitoring program, such as a minimum retention rate for the second diversity group.

The alert notification 1662 can include additional information including other prediction made by the computer system 210. For example, the alert notification 1662 can include a likelihood corresponding to first diversity group analysis that indicates the probability that diversity criteria corresponding to the first diversity group will be met by the end of the monitoring program. The alert notification 1662 can include a similar likelihood for the second diversity group.

FIG. 16D illustrates example interface 1600d for communicating diversity assessment information. The interface 1600d may be presented on the client device 204. However, the interface 1600d may be presented on other devices, such as those belonging to participants in the monitoring group 1402, those belonging to other researchers, or other devices of the researcher 202.

As shown, the interface 1600d may first display an alert notification 1670 that indicates that an event has been detected and that a diversity analysis has been, or will be, performed in response to the detected event. As an example, the event may be that the computer system 210 has modified an element of the monitoring program or has detected a modification to the monitoring program.

The interface 1600d next presents a diversity analysis notification 1672 that indicates that the diversity analysis was performed and no errors were detected. The notification 1672 may include other information such as predicted composition characteristics of the monitoring group that were generated during the diversity analysis, and/or a future time corresponding to the prediction (e.g., a set time for program's end). For example, the notification 1672 can include a predicted distribution 1674 for the monitoring group at scheduled program end date. The distribution 1674 can be displayed with diversity criteria overlain on the distribution 1674 to show, in this example, that the distribution 1674 met the corresponding diversity criteria. For example, the notification 1672 may overlay the distribution 1674 with minimum sizes for each diversity group and minimum percentage representation for each diversity group. As another example, the notification 1672 may overlay the distribution 1674 with a target distribution of the diversity criteria.

The distribution 1674 and corresponding diversity criteria in the notification 1672 can assist a user by signaling to them which diversity groups in the monitoring program are most likely and the least likely of meeting the diversity criteria. The notification 1672 may also provide other information that can assist a user in understanding the techniques used by the computer system 210 in performing the diversity analysis, such as the trends 1664 and 1666 described above with respect to FIG. 16C.

Figure 17:
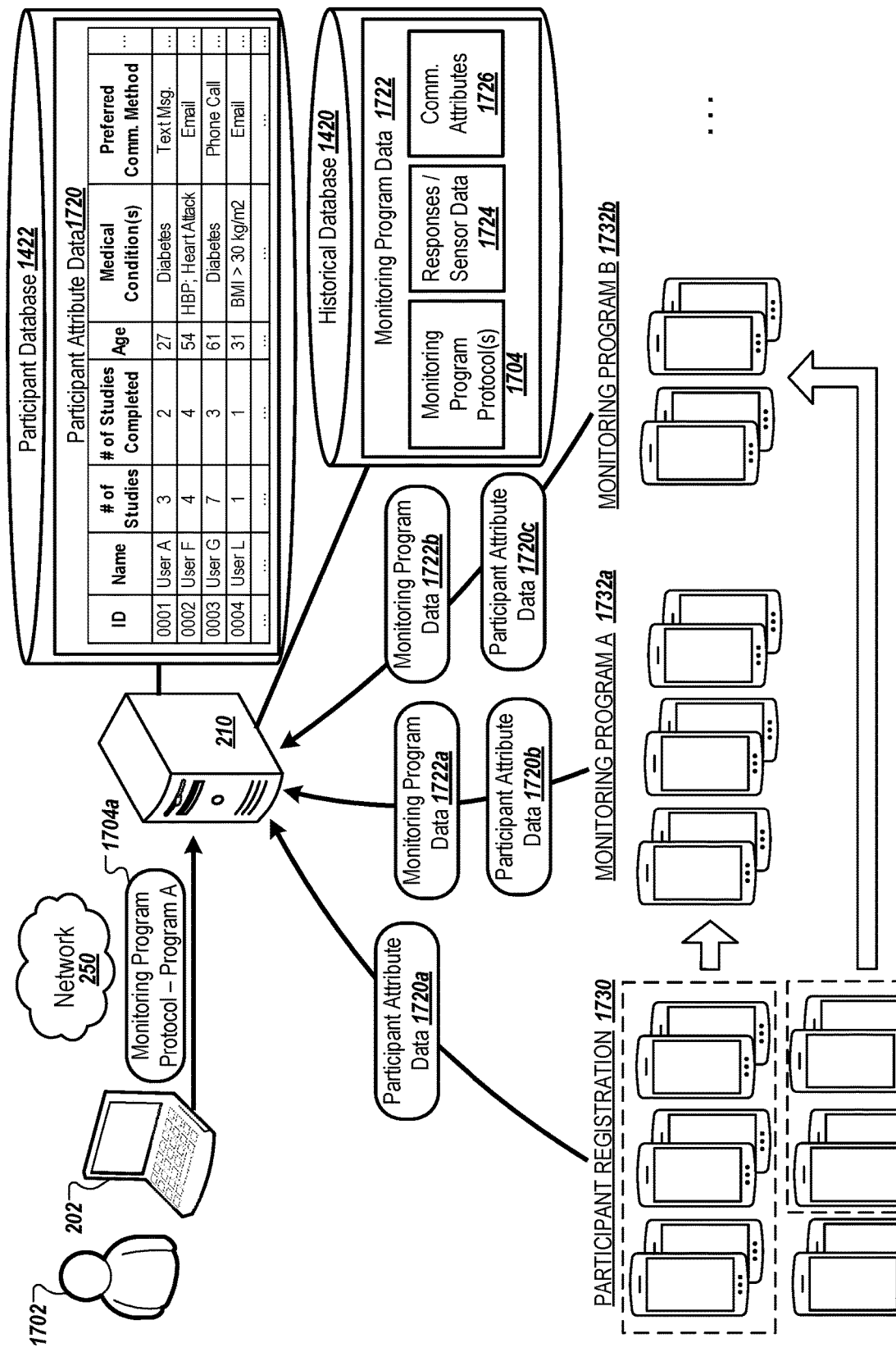
FIG. 17 is a diagram that illustrates an example system for managing monitoring programs.

FIG. 17 is a diagram that illustrates one or more components of the system 200 for managing monitoring programs. The diagram depicts how the computer system 210 can collect various types of information from participants at different stages in the computer system 210's management of monitoring programs. The computer system 210 can also collect information from multiple monitoring groups corresponding to different, ongoing monitoring programs. Using the collected data, the computer system 210 can update information stored in its databases, such as the participant attribute data 1720 stored in the participant database and historical monitoring program data 1722 stored in the historical database 1420. The updated information can be used to improve later predictions made in the ongoing monitoring programs. For example, the computer system 210 may update the databases 1420 and 1422 in real-time or near real-time as information is collected from the remote devices and processed. By quickly processing and storing the collected information, the computer system 210 can improve the accuracy of predictions made and the number of predictions that are made using the most up-to-date information.

As shown, the database 1420 can store the monitoring program data 1722 from multiple monitoring programs. The monitoring program data 1722 can be limited to previous monitoring programs that have concluded. Alternatively, the monitoring program data 1722 can also include information collected from monitoring programs that are ongoing. The monitoring program data 1722 can include protocols 1702 for multiple monitoring programs, responses and sensor data 1724 collected from participant devices in multiple monitoring groups, and communication attributes 1726. The communication attributes 1726 can include characteristics of notifications sent to the participant devices used in the multiple monitoring programs. For example, the communication attributes 1726 can include indications of communication channels, word choices, sentence structures, message types, responses requested, response types, message content, transmission times, message sizes, etc. sent by the computer system 210 to the participant devices.

The database 1422 can store participant attribute data 1720. The participant attribute data 1720 can include demographic and non-demographic attributes for each participant that has enrolled in at least one monitoring program, or that has registered with the computer system 210 so that they can be invited or enrolled in future monitoring programs. As shown, the participant attribute data 1720 can include identifiers assigned by the computer system 210 to the participants, names for the participants, an indication of the number of studies the participants have enrolled in, an indication of the number of studies the participants have successfully completed, an age of the participants, medical conditions of the participants, and preferences of the participants such as preferred communication channels, times, or frequencies. The attribute data 1720 can include other attribute information for the participants such as atypical or notable behaviors for the participants, or trends corresponding to the users. For example, the attribute data 1720 can indicate those participants that typically fail to take prescribed medication consistently. The computer system 210 may use this information to, for example, avoid enrolling those participants in pharmaceutical studies, or those pharmaceutical studies where an inconsistent dosage schedule could result in a serious health risk and/or invalidation of the results for that participant.

The computer system 210 can collect information used to update the information stored in the databases 1420 and 1422 at different times from multiple, different devices. The computer system 210 may receive monitoring program protocols from different researcher devices in response to them generating a new monitoring program or modifying a monitoring program. For example, the computer system 210 can receive the monitoring program protocol 1702a over the network 150 after the researcher has submitted a Monitoring Program A using the client device 204. The computer system 210 can proceed to update the monitoring program protocol 1702 using the protocol 1702.

The computer system 210 may collect participant attribute data 1720 at various stages. For example, the computer system 210 may collect participant attribute data 1720a when a group 1730 of one or more users registers to become monitoring program participants. In more detail, in registering, the computer system 210 may provide to devices of the group 1730 a form to fill out that includes fields that correspond to different types of attribute data. The computer system 210 can proceed to update the attribute data 1720 using the attribute data 1720*a*.

After participants have registered, they may be enrolled in different monitoring programs. The computer system 210 may proceed to collect additional information for the participants during the monitoring programs in addition to monitoring program data. For example, during a first monitoring program 1732*a*, the computer system 210 may collect additional monitoring program 1722*a* and participant attribute data 1720*b* from the participant devices in the corresponding monitoring group for the program 1732*a*. The computer system 210 may simultaneously or at a different time collect monitoring program data 1722*b* and participant attribute data 1720*c* for a second monitoring program 1732*b* that the computer system 210 is also managing. The computer system 210 can proceed to use the program data 1722*a* and 1722*b* to update the monitoring program data 1722. Similarly, the computer system 210 can proceed to use the attribute data 1720*b* and 1720*c* to update the attribute data 1720.

The computer system 210 can update the database 1420 and 1422 in real-time or substantially real-time. Alternatively, the computer system 210 may have scheduled update times, such as once a day during an off-peak time. Scheduled update times may allow the computer system 210 more freedom to select ideal times to process the collected data before storage. For example, with a scheduled update time, the computer system 210 may wait until certain criteria is met before processing the collected data. This criteria can include a threshold amount of resources becoming available, a number of active users being below a threshold number, etc.

Figure 18:
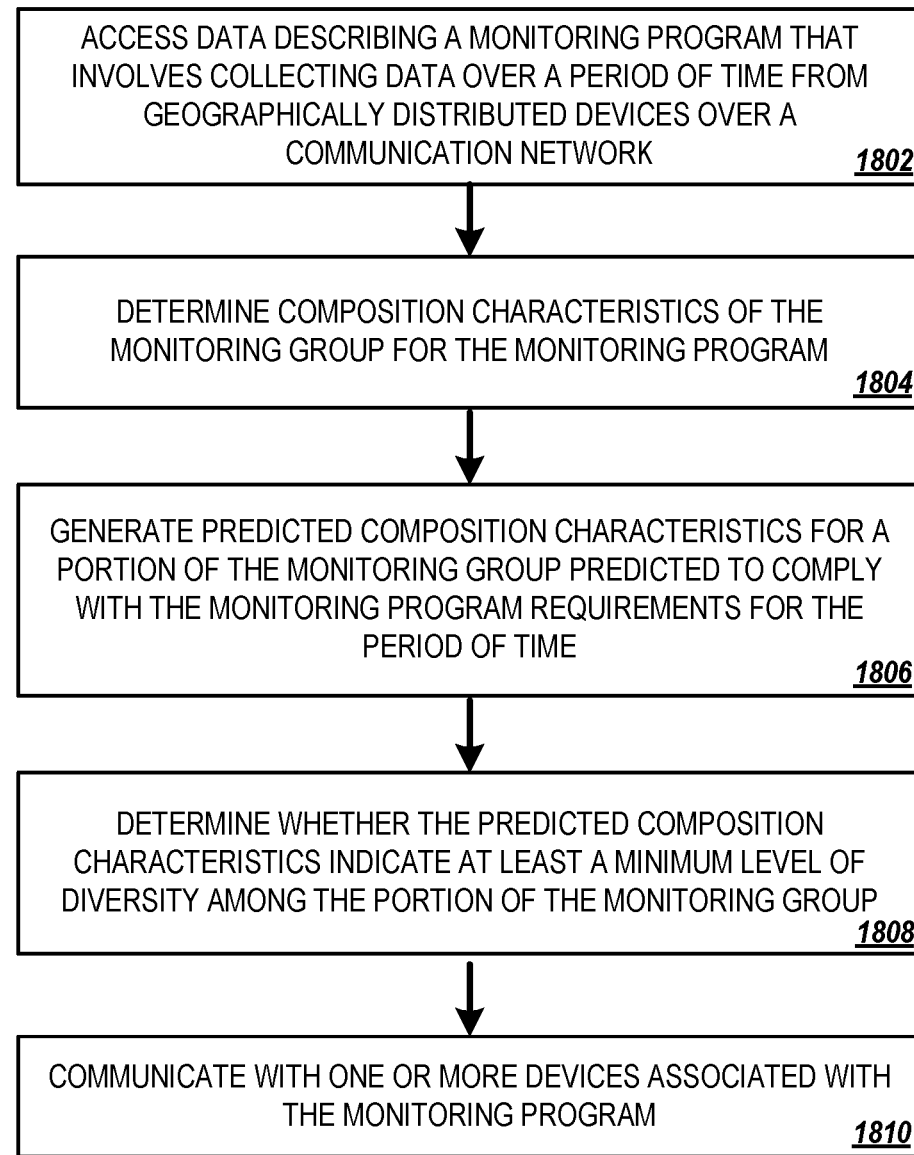
FIG. 18 is a flowchart diagram that illustrates an example process for predicting group diversity for monitoring programs.

FIG. 18 is a flowchart diagram that illustrates an example process for predicting group diversity for monitoring programs. The process 1800 can be used to monitor and improve research studies, such as clinical trials. The process 1800 enables the system 210 to generate predictions, before the end of a clinical trial, about the amount of diversity that is predicted to be present in a cohort at the end of the clinical trial, such as at a predetermined time in the future. The system 210 210 uses historical information about the rates at which individuals in different groups enroll in studies when invited, complete studies they are enrolled in, comply with study requirements, provide adequate data quality, and otherwise act in research studies. The system 210 uses this data to predict how different categories or groups within the cohort will perform during a clinical trial. In other words, the system 210 210 takes into account that cohort members with different backgrounds have different typical behavior profiles and different rates of attrition and noncompliance over the course of a clinical trial. The system 210 can use the predictions (e.g., predicted attrition levels, predicted non-compliance rates) for different groups to make predictions whether goals or requirements for the research study as whole will be satisfied. For example, the system 210 can predict characteristics of or behavior of the cohort, to estimate whether the cohort will include a sufficient number of participants that comply with research study requirements and whether the set will have needed composition characteristics (e.g., diversity or representation among various groups or categories of interest).

Different groups or categories of individuals have different preferences and propensities, so that a monitoring program or parts of it (e.g., some requirements or some types of participant actions or data collection steps) are less likely to be completed successfully by some groups than others. The system 210 can observe and determine the different trends and patterns that occur for the different groups by analyzing records of monitoring programs, such as results of prior clinical trials indicated by research literature or data for clinical trials that the system 210 manages or supports. The system 210 can determine the differential impact that different program elements have on different groups, and thus the differences in rates of expected successful completion for different groups or categories of individuals. In many cases, the rates of successful completion vary based on the attributes of the individual and the nature of the study (e.g., the specific requirements that participants need to meet). For example, people in an age range of 20-60 may be highly likely to complete surveys on a mobile phone, while individuals over 60 years old may have a lower likelihood of completing the surveys. The system 210 can determine the historical differences in compliance for people in different groups or categories (e.g., groups in which members have certain attribute values or attribute combinations). The system 210 can also train machine learning models based on examples of the different outcomes, e.g., outcomes for individuals in different categories in different studies, to predict likelihoods of compliance and/or expected rates of compliance.

The ability to achieve and maintain diversity is an important aspect of clinical research for many researchers today. In August 2020, for example, Oregon Health & Science University cancelled a large coronavirus research study called the "Key to Oregon" study primarily because minorities were underrepresented. See "OHSU ends massive coronavirus study because it underrepresented minorities, university says," The Oregonian, Aug. 27, 2020, https://www.oregonlive.com/coronavirus/2020/08/ohsu-drops-massive-coronavirus-study-because-minorities-didnt-sign-up-university-says.html The study was meant to track coronavirus symptoms for 100,000 people. However, after selecting and engaging many participants and making several million dollars of investment, the study was canceled because various racial groups were underrepresented.

The present technology can give researchers an accurate view of the diversity status of their studies, not only based on current enrollment but with accurate predictions of diversity status that will be achieved at the end of the study. This visibility gives researchers the confidence to proceed with important health research and avoid costly errors such as proceeding with studies that ultimately cannot provide the diversity needed to provide valid, generalizable results. The evaluation of diversity status and expected diversity status at study-end can be performed repeatedly, allowing the system 210 to provide early indications when conditions change and the risk of failing to meet diversity targets increases. The system 210 can quantify the likelihoods, providing metrics such as the expected composition of complying cohort members at the end of the study or a likelihood that a study when completed will achieve diversity targets. Just as important, the system 210 can identify and implement actions to improve diversity. The predictions and estimates of the system 210 enable the system 210 to pinpoint which groups are at greatest risk of being underrepresented and which requirements are likely to be most problematic for those groups. Importantly, the predictive capabilities of the system 210 raise issues early, even before problems with non-compliance or low data quality arise, allowing the system 210 to take corrective action to mitigate problems or even avoid them altogether. Thus, beyond simply identifying that a study is at risk for low diversity and quantifying the likely outcome, the system 210 can actively monitor and manage studies to maintain diversity, preemptively acting to increase compliance and other measures of success for groups that have historically had lower compliance. These features enable the system 210 to avoid study cancellation and to achieve study data collection objectives, making the overall research process faster, more efficient, and yielding results more broadly applicable to diverse populations.

Using the historical records for other research studies and the predictions of machine learning models, the system 210 can infer or predict whether a research study may later become unable to meet its goals or requirements for cohort composition or diversity. Many cohorts begin with an appropriate number of participants and a sufficient diversity, but over time attrition and non-compliance disproportionately affect some groups more than others, which can alter the composition of the set of participants who are providing usable data. Using historical data and predictive modeling, the system 210 can predict which studies are at risk of failing to collect data from a sufficiently diverse group of participants and quantify the likelihood and severity of the problem. This allows the system 210 to detect that a study has a high likelihood of failing to meet a diversity target, even if the current composition of the cohort for the study and even data collection so far or data collection trends do not indicate a problem.

For example, a study may begin with 100 participants enrolled in the cohort, with 50 men and 50 women. Targets or requirements for the final data set to be generated for the study can be set, such as collecting data with a minimum level of compliance and quality from 80 participants over a certain duration, such as three months. The targets or requirements can include requirements for diversity based on various attributes, in this example, based on sex. For example, the study may require at least 35 men and 35 women to complete the study, or for neither men nor women to make up more than 60% of the total set of complying participants.

Even though the beginning cohort composition meets the requirements, various factors could result in collecting data sets that are more heavily weighted toward one group or another. For example, differences in compliance for different groups can cause the study-end data sets collected to have diversity metrics that are very different from those of the initially selected cohort. If a larger proportion of women comply with study requirements than men, then the effective cohort composition at the end of the study (e.g., the portion of the cohort in which participants successfully met the minimum requirements of the study) may be much more heavily weighted toward women than men. The collected data may fail to meet the diversity requirements of the study, e.g., by having fewer than 35 men completing the study or having women make up more than 60% of the total that complete the study.

The system 210 can assess and predict the likelihood that a study will provide needed levels of diversity in the study-end collected data sets. The system 210 predicts how the various diversity groups (e.g., men and women in this example) are expected to perform over the duration of the study. The system 210 can determine expected rates at which successful participation is likely to occur (e.g., being retained in the study, complying with study requirements to at least a minimum acceptable level, providing data of appropriate quality, and continuing to do so for the duration of the study) for each of the diversity groups of interest. This may be done using a machine learning model trained to predict rates of successful completion for different groups or likelihoods of meeting a target composition among the study-end set of successfully-completing participants. Another technique is to use the historical outcomes for other studies to provide estimates of future completion rates, especially when using studies selected because they have similar characteristics to the current study (e.g., similar duration, similar data collection requirements, similar participant activities, etc.).

With the predictions, the system 210 can determine, even before a study begins, whether the study and cohort as designed is likely, if conducted, to meet the goals or requirements for diversity and other characteristics by the end of the study. For example, the system 210 may predict success rates that show 50% of the men will finish successfully and 80% of the women will finish successfully. From this, the system 210 can determine that the likely result would not meet the diversity requirements of the study, e.g., because data for 25 men, not the minimum of 35, would be collected successfully, and because the collected data sets would overrepresent women since they would be more than 60% (e.g., 40 out of 65 or 61%) of the total.

At any stage in the study, from before it begins up to completion, the system 210 can generate predictions about the future performance of the cohort, including determining the likely characteristics (e.g., total size, data quality level, distribution among different groups or categories, etc.) of the complying portion of the cohort and determining if those characteristics meet the goals or requirements for the study. These can be expressed in different forms, such as estimated characteristics of the complying portion of the cohort at the end of the study, estimated compliance rate or number of complying participants for each group of interest, likelihoods that different groups or the study as a whole will meet different requirements, a classification of the cohort (e.g., high, medium, or low likelihood of success in meeting diversity requirements, total number of complying participants, or other requirements), etc.

Depending on the implementation, the system 210 can use different levels of customization in generating predictions. Some implementations are generalized, while other have varying degrees of customization for the specific cohort selected or the specific elements or requirements of a monitoring program. For example, to generate an estimated compliance rate for men for a study (e.g., estimated proportion of the men that will meet the minimum compliance requirements), a generalized approach can look at overall success rates for men in various studies. A more customized approach may factor in the specific requirements of the current study, such as daily survey completion about sleep and ongoing step count tracking. The result can be more tailored and thus more accurate by being based on, or by more heavily weighting, the results for studies that include those requirements or similar types of activities. So far, these types of predictions can be made in a general sense for a cohort, without the characteristics of the specific individuals in the cohort being used. At another level of customization, the system 210 can generate predictions based on the characteristics of individuals in a cohort or set of candidates (e.g., a proposed cohort or candidate pool). For example, the system 210 can consider, for the group of men in the cohort, the distribution of attributes within the group (e.g., age, race, occupation, residence location, etc.) and account for how these factors affect compliance rates in the historical data. Thus, the predictions can use the breakdown or aggregation of characteristics that are not specifically measured for purposes of diversity requirements to more accurately predict how this group of men in the cohort will behave, rather than making a prediction about men in general. Finally, for an even more customized and accurate approach, the system 210 can use the characteristics of each individual to determine that individual's likelihood of successful completion, and from the likelihoods for individuals determine an overall expected rate. This approach may customize the prediction based on both the characteristics of individuals and the characteristics of the study itself (e.g., elements such as duration, data collection requirements, participant activities required, etc.).

The system 210 can notify researchers and administrators when predictions for a monitoring program indicate a low likelihood of success in meeting the requirements for diversity or other characteristics, e.g., when a predicted likelihood is less than a threshold or when the estimated study-end characteristics do not meet the desired levels. This provides an early warning to researchers that can save millions of dollars of investment in studies that would, if conducted, most likely fail for lack of diversity or lack of compliance with study requirements. However, beyond informing of issues, the system 210 can identify and implement changes to improve the eventual performance of the cohort and the overall set of data collected in the study. The system 210's early detection of actual, currently-present or potential, future-arising lack of diversity enables the system 210 to generate corrections and changes in the administration of the study that will improve the diversity and other composition characteristics for the collected data. As an example, the system 210 can adjust communication with remote devices of participants to change interaction settings for participants in groups that are at greatest risk of not being adequately represented, e.g., to increase reminder frequency, to change user interface layout, to change the communication channels used (e.g., text message, e-mail message, phone call, mobile device notification, etc.), change the media types used (e.g., text, image, video, audio, etc.), and so on. The system 210 can identify and change the data collection scheme applied for the study, for some or all groups within the cohort. For example, for individuals in low-compliance groups (e.g., groups predicted to have less than a certain likelihood, e.g., 80%, 60%, 50%, etc., of meeting their minimum amount of complying members through the end of the study), the system 210 can implement additional data collection redundancy. For example, rather than collect exercise data through a survey alone, the system 210 can instruct devices of users in low-compliance groups to also automatically generate step count or other exercise data. In many cases, the system 210 can identify and implement the changes automatically or can make recommendations and carry out changes after a researcher approves. Other actions that the system 210 can take, including changing device configurations and operation of remote devices used in monitoring, are discussed further below.

As another example, the system 210 can use a database having user profiles for candidates for the study and, even after the study has begun, the system 210 can identify changes to the cohort that would increase the number or percentage of complying participants in groups most likely to not meet their diversity goals. For example, if men are predicted to be underrepresented in the data set at the end of the study, the system 210 can select, from a candidate pool, additional men that meet cohort selection requirements for the study (e.g., at least a minimum age, no excluded health conditions, etc.). The system 210 can automatically score and rank the candidates, such as to choose those that have the best expected compliance based on the attributes indicated in their user profiles. The system 210 can identify a number of candidates that would be needed to increase the study-end representation of men to a desired level, given the predicted rates of attrition and non-compliance that are expected for the group of for these candidates specifically. The system 210 can then select this determined number of additional male candidates to add to the cohort, and can automatically invite them (e.g., sending, an email, a text message, a notification through an application, etc.) to enroll. The system 210 may alternatively recommend to the researchers for the study to add more men, and potentially indicate the recommended number and/or the set of individuals recommended, and can receive confirmation of the recommendation through the researcher's interaction with a user interface. Whether done automatically or in response to a researcher's confirmation or instruction, the system 210 can send messages to the remote devices of the new candidates that are invited, causing their devices to provide interactive elements (e.g., a notification, a button, a URL, an application user interface, etc.) that are selectable to initiate the process of enrolling the user (e.g., indicating consent to participate, downloading configuration data or a software module for the study to the device, configuring the device to automatically capture sensor measurements and report results to a server over a network, configuring the device to initiate user interactions with the new participant, and so on).

Before the process 1800 or as part of the process 1800, the system 210 can generate or train models based on historical data for prior monitoring programs (e.g., clinical trials) to learn how different participant attributes affect likelihoods of outcomes such as enrollment and consent, retention or study completion, compliance with different requirements, data quality levels achieved (e.g., quantity, accuracy, precision, consistency, reliability), and so on. Different types of models can be used, for example, statistical models, rule-based models, machine learning models, etc. Any of the machine learning models discussed herein may be may be, for example, a neural network, a support vector machine, a classifier, a regression model, a reinforcement learning model, a clustering model, a decision tree, a random forest model, a genetic algorithm, a Bayesian model, or a Gaussian mixture model. Combinations of multiple models can be used together, for example, in an ensemble configuration so that multiple models or even multiple models together are used to make a prediction, with outputs of the different models being combined (e.g., averaged, weighted, maximum or minimum value taken) to generate the overall output.

The training data can indicate the attributes and history of individual participants (e.g., demographic attributes, physiological attributes, behavioral attributes, health status, and more). The training data can also indicate outcomes for each individual with respect to retention, compliance, data quality, and so on. Different types of training data can be used depending on the type of model and the level of precision desired.

For example, a model may be configured to predict the likelihood of an outcome, such as compliance with a requirement, for an individual. This type of model can be configured to receive information indicating attributes of the individual (e.g., age, sex, physiological measurements, etc.) and the model would similarly would be trained using training examples that include attribute values for individuals of the same types of attributes provided as input to the model.

Other models may be generalized based on groups of individuals or for cohorts as a whole, and so may use training data sets that indicate characteristics at this more general level. Still further, some models can be trained to predict overall compliance for a group or category of participants generally, without taking into account other participant attributes. For example, groups may be defined based on race or ethnicity or other types of attributes. Training data can indicate the compliance rates achieved for the different groups for different studies, whether through information about the attributes of individuals and their outcomes or summary information about total information by group.

The models can be machine learning models, such as neural networks or reinforcement learning models, that iteratively learn through exposure to examples. For each model, a set of input feature types is defined, which sets the types of variables that the model will account for in making predictions, typically including an identification of the group of interest and/or the attribute values that distinguish one group from another. For a model that predicts future compliance by individuals with specific participant actions based on individual attribute values, the input can include (i) values for a predetermined set of attributes of an individual, (ii) an indication of the group the individual is in (e.g., a group identifier or attribute values indicating the characteristics that place the individual in the group), and (iii) one or more values indicating the requirement(s) for which compliance is being predicted (e.g., daily survey responses, wearing an activity tracker, providing heart rate data, etc.

Many variations are possible. For example, rather than provide input that would indicate the group to be predicted, different models may be generated based on examples for different groups, and the group-specific models would not need input of group-indicating information. Similarly, rather than indicate a type of action about which compliance is predicted, there can be different models for different types of actions, e.g., one model for predicting compliance in responding to a survey, another model for predicting compliance in providing heart rate data, and so on. These models, like the other discussed, can be generated to predict the rates and likelihoods of compliance for repeated action over time (e.g., performed daily, hourly, weekly, or at another frequency for a certain duration e.g., a week, a month, a year, etc.), not just to predict whether a single event occurs or not. Any of the models can be configured to generate predictions for a set of multiple individuals (e.g., a subset of a cohort that represents one diversity group) and aggregate information about the set of individuals (e.g., averages, distributions, minimum, maximum, number of individuals, etc.) can be provided instead of individual attribute values. In some cases, models can make predictions about a group or category overall, independent of the makeup in a specific cohort or candidate pool, in which case indicating only the group identifier or attributes common to the group can inform the model of the type of prediction needed.

The training data for a model have multiple training examples that include each of the types of information provided as input to the model, with additional indications of observed outcomes. During training, the system 210 can derive from each training example an input vector of feature values and a training target related to the outcome. The system 210 can then use backpropagation of error or other training techniques to iteratively adjust values of internal parameters of the model (e.g., node weights and biases of a neural network). In particular, the training target derived from the outcome of the example can be used to incrementally train the model to make a more accurate prediction (e.g., an output closer to the training target). Other model types, such as reinforcement learning models, may learn from the pattern of data or aggregate set of data, even without a specific target outcome being defined.

Various examples herein focus on measuring and predicting compliance by participants with actions or activities that participants are requested to perform as part of a study, e.g., data collection actions (e.g., responding to surveys, interacting with an application or other device, providing tracked movement data or location data, providing physiological measurements, providing other sensor data, etc.) and other patient activities (e.g., taking medication as directed, exercising as directed, sleeping as directed, etc.). Nevertheless, the analysis performed and the models trained and used can assess other outcomes, such as enrollment, retention, study completion, achieving adequate data quality, and so on. Models can additional be trained to predict combinations of these, such as overall success rate or success likelihood that an individual or group will enroll, be retained, and comply with data collection and data quality requirements consistently to the end of the study.

The process 1800 can include accessing data describing a monitoring program that involves collecting data over a period of time from geographically distributed devices over a communication network (1802). The system 210 uses this information to customize the predictions and assessments for the particular monitoring program. As discussed below, the system 210 can use these to give early warning that lack of diversity or other problems with data collection may arise in the future. The system 210 can also can preemptively make corrections and adjustments to improve the data collection for the program as a whole and to increase the likelihood that diversity and other data collection requirements are met at the conclusion of the monitoring program.

The predictions and actions of the system 210 can be based on data such as the composition of the monitoring group, the specific requirements that participants need to satisfy, and the goals or requirements for the study. With information about the monitoring program, the system 210 can predict with respect to the study's specific goals (e.g., the diversity targets specifically for that monitoring program). The system 210 also obtains high accuracy in predicting compliance and other outcomes by taking into account the how specific program elements (e.g., types of data to be collected, types of activities required, accuracy needed, duration of the program, etc.) affect the likelihoods. For example, a monitoring program with a complicated or burdensome set of requirements on participants can be predicted, based on historical evidence and/or trained models, to have lower compliance than one with simpler or fewer requirements. The information about the monitoring group can be used to assess diversity and other characteristics, as well as to determine how the different requirements of the study may have different effects on different groups or types of participants, such as with some requirements disproportionately certain categories of participants.

The system 210 can maintain a database with information about each of the various monitoring programs that are being designed or are ongoing. The information can include many items about the studies, including: selection criteria for selecting the devices or participants to monitor; enrollment data about the devices or participants in a monitoring group or candidate pool; data collection to be performed, e.g., types of data to collect (e.g., heart rate, step count, daily calories consumed, types of sensor data used), frequency of collection, mode of collection (e.g., daily survey, automatic passive sensing, phone vs. watch, in-person visit, bio-specimen, user input vs. medical device reporting), etc.; other activities that participants are requested to perform (e.g., exercise, taking medication, etc.); standards for acceptable data quality and compliance (e.g., accuracy of measurements needed, thresholds or rules for how consistently participant data must be provided to be used in the study); goals and requirements for each monitoring program (e.g., minimum size of the monitoring group, minimum level of diversity in the monitoring group, etc.); monitoring program characteristics (e.g., duration, when and whether new participants can be added, etc.). This type of information typically varies from one monitoring program to another. For clinical trials and other research studies, much of this information can be stored in or obtained from a study protocol for the study.

The system 210 can use various types of information about the monitoring program in different ways. For example, the system 210 can obtain information indicating the makeup of the monitoring group, e.g., summary information about the number of participants and/or devices in different diversity groups, or data identifying the specific participants and/or devices to be monitored. This information can be a set of individuals that are enrolled, or invited, or proposed to be invited, or even for the candidate pool overall. The information can include identifiers for specific individuals, user profile data for the individuals, or other information that the system 210 can use to determine which individuals and or devices correspond to different diversity groups, and to retrieve the attribute information for the individuals and diversity groups.

The system 210 can also obtain information about the requirements and activities involved in the monitoring program. This can include information in a study protocol that specifies items such as the methodology for a study, types of data to be collected, devices and software to be used, and more. The system 210 uses this information to determine the activities and requirements involved in the monitoring program to better estimate the likelihood of proper compliance with those requirements.

The system 210 can obtain information indicating the goals, targets, and requirements for the monitoring program as a whole. These can be constraints or requirements that need to be met in order for data collection of the monitoring program to be successful. In this sense, success of the study refers to adequately collecting the data desired to be collected, e.g., successfully collecting the needed type, amount, and quality of data, over a sufficiently long duration, from a sufficiently large and diverse monitoring group. Typically, success of a monitoring program in this sense is not based on whether the data collected in this manner proves a hypothesis or achieves a desired health outcome (e.g., whether a drug is safe or effective at managing a disease), although in some implementations, constraints and predictions for these additional factors can also be considered.

In particular, the monitoring program can have one or more diversity goals or requirements. Diversity can be measured with respect to certain attributes of interest that are specified for the monitoring program. As discussed above, diversity considerations can include but are not limited to demographic attributes such as age, sex, race, socioeconomic status, and so on, but can also encompass diversity among physical characteristics, medical histories, behavior patterns, genetic profiles, geographic locations, and many other attributes that are not demographic in nature. Some monitoring programs specify that they need diversity in sex the participants, other programs need diversity in the locations of participants, other programs need diversity across different variants of a gene, and so on.

The diversity goals or requirements can specify the attributes for which diversity is needed, as well as the amount or level of diversity needed for those attributes. In other words, the diversity goal can specify not simply that certain groups should be each be represented, but also amounts of representation needed for each group. The goals or targets can be expressed in any of various different ways, including: minimum numbers for certain groups (e.g., those including individuals with certain attribute values, attribute ranges, profiles); target proportions or relative amounts for different groups; rules or conditions that should be met; quotas for different groups; and so on. Various models trained with broad-based training data sets can be used to provide predictions of outcomes. For each monitoring program, the system 210 determines whether the predicted outcomes would meet the specific diversity goals or requirements for that monitoring program.

Other information is also collected, maintained, and accessed by the system 210, such as data collected over the course of the monitoring program. The system 210 can track, for each participant or device enrolled in a monitoring program, the data collection events that occur and those that are missed. The actual data received can be stored and analyzed, as well as context or metadata for the collection (e.g., time, location, device used, etc.). The system 210 can score the data quality of the collected data as well, to determine if the proper accuracy, precision, quantity, timing, and other parameters are provided. This enables the system 210 to determine whether individuals are meeting the requirements of the monitoring program, as well as to determine compliance rates for the groups or categories that need to be monitored to meet the diversity requirements.

In some implementations, the system 210 factors in the compliance of individuals and groups in its predictions. For example, the system 210 can adjust or determine predictions of future compliance using the history, patterns, trends, and progression over time of tracked compliance for individuals, groups within a monitoring group, as well as the monitoring group as a whole. The data can be used in various ways. One is to remove consider individuals removed from a cohort if inconsistency or lack of compliance exceeds a predetermined amount. If there are Another technique is to identify patterns or trends in monitoring data and to apply an adjustment or weight to predictions based on it. For example, as learned from examples of prior studies that a repeated week-over-week decline in compliance rate (e.g., proportion of complying participants) for a group can indicate further decline, and so compliance estimates can be reduced (e.g., by a predetermined amount, an average of the previous two declines, etc.).

In some cases, information about the observed compliance in the current study (e.g., the most recent data collection event, a recent window, or history for the entire monitoring program so far) can be provided as input to a machine learning model trained to receive this information along with other input feature values (e.g., indicating participant attributes, study requirements, etc.). The machine learning model can thus be trained to recognize not only how the attributes of an individual, diversity group, or monitoring group are predictive of future compliance, but also how current or previous compliance is predictive of future compliance. Thus the rates, patterns, and changes in compliance over time can factored in to improve the accuracy of the model. This may show that, in some cases, a cohort with low but improving compliance may have a better predicted outcome than a cohort with high but declining compliance. Models can be trained with examples that show different levels of compliance, or different patterns, trends, or progressions of compliance, including time series of collection events (e.g., daily pattern of 1, 1, 1, 0, 1, 1, 0, . . . where "1" indicates successful completion of a requirement on a day and "0" indicates failure to complete the requirement that day).

The process 1800 can include determining composition characteristics of the monitoring group for the monitoring program (1804). To evaluate the potential success of data collection in a monitoring program, the system 210 can start by assessing the current composition of the monitoring group, taking into account any attrition and non-compliance that has occurred so far. To predict the characteristics of the portion of the monitoring group that will comply through to the end of the monitoring program, the system 210 starts by assessing the current state of the monitoring group, which may be different from the characteristics at the beginning of the monitoring program. For example, some participants may have withdrawn from the monitoring program, while others may have been added. Similarly, some participants may be effectively excluded due to no longer complying with the selection criteria, or may be non-compliant to an extent that they already cannot be used in the study.

The determined composition characteristics thus provide a starting point from which predictions about future compliance and outcomes can be made. In some cases, the composition characteristics are of the same type as the requirements for the monitoring group. For example, if a minimum number of participants is set for each of different diversity groups, the system 210 can determine the number of participants in each diversity group. As noted above, the system 210 can filter out participants that have characteristics or behavior patterns that would disqualify them from the monitoring group, such as noncompliance with requirements of the monitoring program extensive enough that it cannot be corrected. Other characteristics can also be determined, such as the total number of participants, proportions of participants in different diversity groups, distribution of participants within each diversity group among different attributes or outcomes (e.g., a histogram of attribute values or compliance results so far), and so on.

The composition characteristics provide an initial reference for the analysis of the monitoring program. The system 210 can use the determined composition characteristics to verify that the monitoring program meets diversity requirements at the current time. For example, the system 210 can compare determined characteristics for each diversity group with corresponding minimums or thresholds for the diversity group. If the current number of participants for a diversity group is already less than the minimum, then the system 210 can identify that the monitoring program already fails to meet the requirements. More commonly, the number of participants in different diversity groups or proportions of the monitoring group in different diversity groups can provide a base value from which predictions about future behavior can be applied. For example, as discussed below, the numbers of participants in the diversity groups can then be discounted or adjusted using estimated rates of future compliance for the diversity groups.

The process 1800 can include generating predicted composition characteristics for a portion of the monitoring group predicted to comply with the monitoring program requirements for the period of time (1806). For example, the system 210 can predict the level of diversity that will be present, at the end of the monitoring program, among the members of the monitoring group that meet the requirements for ongoing compliance, data quality, and so on. One way that the system 210 can do this is to determine predicted outcome rates (e.g., for attrition, compliance, data quality, etc.) for different diversity groups, and apply those to the determined characteristics of the cohort.

As an example, a clinical trial may require a minimum of at least 70 participants continuing to the end of the study. The clinical trial may also have a target for diversity among three different groups or categories, group 1 ("G1"), group 2 ("G2"), and group 3 ("G3"). The groups may be defined based on one or more types of attributes, e.g., ranges or combinations values for age, sex, race, ethnicity, health status, medical history, etc. The clinical trial may require a minimum of 25 people from each group to achieve goals of the study, such as the statistical validity needed to generate results for a population. For the collected data to be valid and usable, participants need to comply with daily requirements and activities of the study. Beyond being nominally enrolled, the clinical trial may require participants to consistently provide data over a predetermined period, such as three months, for example, in the form of survey responses, automatic sensor data collection (e.g., from a phone, watch, or other mobile device), interactions with devices, and potentially other forms (e.g., in-person visits, bio-specimen samples, etc.). The clinical trial may have certain standards defined for acceptable compliance of participants, such as missing no more than two days of data collection per week and not missing more than one day in a row. Failure of participants to meet the requirements (or deviating by at least a certain amount from the requirement) may render a participant's data unreliable or unusable for the clinical trial, effectively removing the participant from the group of active, complying participants.

The system 210 may determine in step 1804 that, one month into the study after starting with an initial cohort of 100 individuals, the current numbers of participants still active in the study include 30 in G1, 32 in G2, and 27 in G3. The historical outcomes for compliance, data quality, and so on may be different for people in the different diversity groups, as evidenced by different compliance rates in prior clinical trials or other monitoring programs. The system 210 takes into account the different levels of incidence of attrition, non-compliance, low data quality, and so on for the different groups and can determine, e.g., that the success rate over the remaining two months of the study is 85% for G1, 95% for G2, and 70% for G3. As a result, the system 210 can estimate that at the end of the clinical trial, the resulting data set will provide complete data sets for roughly 25 individuals in G1, 30 individuals in G2, and 19 individuals in G3. From this, the total number of individuals is expected to successfully participate to the end of the clinical trial is above the minimum (e.g., 74 compared to a minimum of 70), and groups G2 and G2 are expected to meet their minimum targets for representation. However, with the lower expected success rate for members in G3, this category of participant is expected to be underrepresented and not meet the minimum for the category (e.g., 19 compared to a minimum of 25 needed). Thus, even if the current characteristics of the cohort meet the requirements for the clinical trial, the system 210 can determine that future characteristics of the cohort would not.

The system 210 may use any of various techniques to make the predictions about future outcomes for the monitoring group and the future characteristics of the monitoring group. One technique is to use statistical techniques to take historical data (e.g., from prior monitoring programs), identify examples of individuals that would be included the different diversity groups (e.g., G1, G2, G3), and then determine this historical success rate. For example, across the set of examples for people whose attributes would classify them into G1, the success rate can be a fraction of those meeting requirements out of the total, e.g., 1523 out of 1792 for an 85% rate. For better accuracy, the examples chosen can be selected for similarity to the context or situation of the current monitoring program. For example, rather than consider all examples of individuals that would be classified into G1, the system 210 can select a subset that were in studies that had similar requirements to that of the current study, so the examples used are more reflective of the requirements that participants of the current study would need to meet. The system 210 may optionally can determine a different prediction for success with respect to different requirements, e.g., 95% expected to provide daily survey responses, 86% expected to provide daily step count data, 85% expected to provide the appropriate level of data quality (potentially making different estimates for different aspects of data quality), and so on. The system 210 may combine the expected rates (e.g., with the combined uncertainty leading to a lower success rate than any of the individual rates) or in some cases as a simplification take the lowest expected success rate to use. As another example, the system 210 can determine examples of behavior occurring over consistent periods or may normalize measures to account for differences. For example, the system 210 can predict a attrition rate per month based on non-compliance, poor data quality, or other factors. For G1 that may be an expected attrition of 8% per month, as prior studies that have similar characteristics to those of the present study may show. Thus, over the remaining two months of the clinical trial, the total attrition would include 0.92*0.92=0.85 expected successful completion. These types of calculations can be performed for each of the different monitoring groups, to account for each different group's characteristics.

Beyond simply using examples of individuals that would be classified into the same groups, the system 210 can account for the similarities or differences between the composition of the subset the monitoring group in G1 and the examples. Within a diversity group, perhaps those in a certain age range and the same race, tendencies and preferences are not homogenous and behavior can still tend to vary according to other factors, such as whether a person is near the upper or lower ends of the age range, whether the person is male or female, the level of experience and comfort the person has with using a smart phone or other technology, the residence location of the person, and so on. Accordingly, to improve accuracy of the predicted success rates (e.g., reflecting one or more of retention, compliance, data quality, etc.), the system 210 can select or weight the data used to generate expected success rates according to similarity with the distribution of attributes present in the G1 members in the monitoring group. As a result, if the members in G1 in the monitoring group are predominantly on the younger end of the age range, then historical data for others that with those characteristics can be used. The system 210 can optionally determine subgroups for different attributes or attribute combinations (e.g., subdividing male vs female historical outcomes, outcomes for different geographical areas, etc.) to tailor the estimated rates for the subgroups even if the subgroups are defined based on attributes not related to the diversity requirements.

The use of data from prior studies enables the system 210 to make accurate predictions about future compliance, data quality, and other outcomes before a monitoring program even begins. This is a significant advantage because it can account for differing likelihoods of attrition and non-compliance among different diversity groups very early, at the stage of selecting the initial cohort or even assessing viability of creating a study, when the study and the cohort can be changed to improve the likelihood of success. Once the monitoring program does begin, and data collection and other events can be assessed, the system 210 can use the trends observed to predict future outcomes. For example, the system 210 can extrapolate behavior over the first week or month (e.g., a rate of steady participation, or declining participation, or other pattern) for future time periods. However, this may not account for non-linear effects, such certain fractions of participants failing to ever begin participation (e.g., skewing metrics for an initial period) or for fatigue or disinterest to set in later for some participants (e.g., for some consistent participants to reduce engagement after 2 months), or for these effects to be more less pronounced for different types of participant requirements. As a result, in addition to or instead of simply extrapolating the trend of behavior or outcomes observed, the system 210 can match patterns or progressions of compliance that have occurred with similar patterns observed in historical data. For example, although participation has stayed high for the first month, given that other studies with similar participant requirements experienced a drop in participation in the second and third months, the system 210 can predict that a similar drop will occur based on the similarity to other patterns, even if the data received so far and the current compliance trend do not yet show any decline.

The system 210 can also use trained machine learning models to predict the future outcomes. One example is a model that predicts a success rate (e.g., either overall or for specific factors such as compliance, data quality, etc.) for a group based on the group's characteristics and the characteristics of monitoring program. For example, the input vector can include values indicating the characteristics shared by the members of the group (e.g., attributes that, when present, cause a participant to be classified into G1). If G1 represents Hispanic males, then values indicating those characteristics can be input. In some cases, instead of indicating attributes that define the group, certain groups may be pre-defined before or during training of the model so that the model associates the group with a particular identifier. In that case, an identifier for the group (e.g., a G1 identifier) can be provided instead of the characteristics of the group. The input vector can also include values indicating characteristics of the study (e.g., remaining duration of the study, which types of data are collected, which types of devices or software are used by participants, frequency of data collection needed, level of precision needed, medication adherence required, etc.). In particular, data values indicating participant actions required or data quality characteristics required can be provided. Training of the model is based on the data for many different studies, including many different examples of how people that fit the profile of G1 and other groups respectively have behaved, across a variety of different participant requirements and study characteristics, including for different combinations of them. This allows the model to learn how different factors for study To allow the model to provide even more accurate predictions, the model may be configured to receive and be trained to use additional information about the distribution of attributes in a diversity group. For example, regardless of the attributes to define G1, the input vector for G1 may indicate a mean or median age of those in G1 in the monitoring group, a percentage of those in G1 in the monitoring group that are male or female, and so on. The model can be trained with these attribute values being input also, so the model learns how different characteristics of a group of individuals affect the ultimate success rates for different studies.

Other types of models can similarly be trained and used. For example, different models can be determined for different diversity groups, e.g., a model for G1 trained based on G1 examples, a model for G2 trained based on G2 examples, and so on, so that the characteristics of the group need not be input. Similarly, models for specific requirements can be determined, e.g., one model for predicting compliance with daily surveys, another model for prediction of compliance with sensor data collection for exercise data, etc. so that input of the requirement(s) for which compliance is predicted need not be input for each prediction.

As another example, a model may be configured to predict the likelihood that an individual reaches an outcome, such as compliance with one or more requirements. This type of model can be configured to receive information indicating (i) attributes of the individual (e.g., age, sex, residence location, physiological measurements, etc.) and (ii) an indication of one or more study characteristics or requirements for which a likelihood is predicted (e.g., data quality requirements, participant activities, participant data collection activities, study duration, etc.). The model would similarly would be trained using training examples that include attribute values for individuals and study characteristics or requirements of the same types of attributes provided as input to the model. The input may include group identifiers or indications of the attributes that cause individuals to be classified into the diversity groups of interest. Because the training data examples additionally indicate the observed outcomes for many different individuals facing various different requirements, the model can learn how different participant attributes and different study characteristics and requirements affect outcomes for compliance, data quality, and so on.

With a model that predicts individual likelihoods of success, the system 210 can determine the overall predicted compliance rate for a group by aggregating the individual probabilities for different members of a group. For example, G1 for the clinical trial may include various individuals that have likelihoods of compliance to the end of the study of 0.45, 0.80, 0.70, and so on. To determine the expected rate of compliance for the cohort, as a simple technique, the system 210 may determine an arithmetic mean of the different probabilities for the individuals. This average can serve as an expected proportion of the group that would comply with the requirements of the study. Other forms of combining predictions for individuals may also be used.

Optionally, the models can be configured to receive and use information about historical performance of a diversity group or an individual about which prediction is being performed. For example, for predicting the likelihood of an individual completing study requirements, the percentage of compliance or even a binary value whether the individual has completed one or more different requirements so far can be provided to the model. The model can use this recent context to provide a more accurate prediction. During training, information about longitudinal performance of individuals can be broken into segments. For example, information about an individual over three months can be broken into three training examples each covering one month of participation and using data from the previous month(s) as context when available.

So far, the example with G1, G2, and G3 assumes that the diversity groups are mutually exclusive, so no individual is part of multiple diversity groups. However, that is not a requirement and diversity predictions can be made using the same techniques. Nevertheless, with overlap in group membership, predictions for the total monitoring group may be done separately from the group analysis, rather than aggregating results for different groups, to avoid potentially double counting individuals.

The process 1800 can include determining whether the predicted composition characteristics indicate at least a minimum level of diversity among the portion of the monitoring group predicted to comply with the monitoring program requirements (1808). Using the data retrieved for the monitoring program, the system 210 determines whether the diversity goals, targets, or requirements are likely to be met, e.g., to be met a future time such as at the end of the study. The predicted composition characteristics can be obtained as discussed above by applying the predictions about future success rates (e.g., based on compliance, data quality and other factors) to the current monitoring group characteristics, showing how the numbers and proportions for different diversity groups are expected to change. The system 210 can then compare the predicted composition characteristics with the diversity requirements.

In the example discussed above, the system 210 estimates that at the end of the clinical trial, the resulting data set will provide complete data sets for roughly 25 individuals in G1, 30 individuals in G2, and 19 individuals in G3. Because a minimum of 25 individuals is needed for each of the three groups, this indicates that the group G2 is solidly above the minimum, G1 may meet the target but is at risk for falling below the minimum, and G3 is expected to not meet the minimum. The system 210 can compare the expected numbers and proportions of study-end complying individuals for different groups with the requirements for the study, however they are defined (e.g., as quotas, ranges, minimums, proportions, relative measures for one group relative to another or to the total, etc.).

As shown above, the system 210 can determine whether the expected value or estimated characteristics that are most likely will meet the diversity requirements. The system 210 can additionally or alternatively generate values indicating a confidence score or likelihood that the monitoring group as a whole will meet all diversity requirements, and/or a confidence score or likelihood for each group whether it will meet its requirement. For example, the calculated probabilities that G1, G2, and G3 will meet their requirements may be 50%, 85%, and 10%, respectively. The probabilities can be determined by aggregating probabilities for the success and compliance of the various individuals within the groups, e.g., determining the probability that at least the minimum of 25 participants remain engaged and successful based on the independent probabilities calculated for the different individuals. The likelihood for the entire study meeting all diversity goals being about 4% (e.g., 0.5*0.85*0.1=0.0425). In this case, the result indicates that the clinical trial currently has a very low likelihood of succeeding with all of the diversity goals, and that various changes to the clinical trial, the cohort, and outreach to the participants be needed to improve the likelihood of achieving the needed representation in G1 and G3.

The process 1800 can include communicating with one or more devices associated with the monitoring program based on results of the determination whether the predicted composition characteristics indicate at least the minimum level of diversity (1810). This can involve communicating with devices of researchers and administrators as well as with remote devices of participants used for data collection. The system can provide various types of information to a researcher about the current and predicted future diversity status. This information can be provided over a communication network for a user interface of an application, a web application, a web page, etc., or in another kind of message (e.g., text message, e-mail, mobile device notification, etc.). In some cases, the data is provided for display in a user interface such as a dashboard for monitoring study progress or a workspace for designing a study. Thus, the system 210 can provide data that informs or alerts a researcher to the effects of current trends or even changes that the researcher makes (e.g., changes by adding or removing requirements for data collection or other participant actions, adding or removing cohort members, etc.)

The system 210 can provide indications of the predicted future composition characteristics, e.g., providing the expected outcomes of 25, 30, and 19 complying participants for G1, G2, and G3, respectively. These can be provided with information indicating the corresponding minimums, e.g., 25 participants each, for display also. The system 210 can also indicate the likelihoods of the different groups or the study as a whole meeting the corresponding diversity targets, e.g., probabilities of 50%, 85%, 10%, and 4% respectively.

In some implementations, the system 210 recalculates the expected future diversity status periodically or in response to certain triggers. This check can be done repeatedly as a monitoring program proceeds to detect when data collection results or other factors cause predicted diversity to decline. For example, each time a researcher loads an interface, or when additional data is collected, or daily, the system 210 can perform the process 1800 with updated data. The system 210 can have certain thresholds or criteria for initiating notifications and corrective actions. For example, the system 210 may have a threshold to notify researchers when the probability that a study will meet its diversity goals falls below 80%. This can trigger notifications on a user interface when a user logs in, notifications pushed to a device or sent through email or text message, or other forms.

In addition, the system 210 can identify various preemptive actions to improve the likelihood of successful completion of the monitoring program with the needed diversity characteristics. One example is changing the communication with different groups of subjects (e.g., changing the timing, content, and quantity of reminders and data collection requests to better suit different groups). Another example is changing the composition of the monitoring group (e.g., identifying, inviting, and enrolling additional participants that would be in groups that are predicted to not have the minimum amount of retained, complying participants with appropriate quantity and quality of collected data). Another example is to change elements of the monitoring program, such as to add supportive elements (e.g., educational media and user interfaces, reminders, travel benefits such as taxi credits) targeted for participants in groups at greatest risk of not meeting their minimums, and so on. Another example is to provide software or configuration data over network to add redundancy or increase the frequency of data collection attempts. All of these are informed by the analysis of the different groups, so that changes are made for and intensity of support and interaction can be increased for participants and devices corresponding to the groups (e.g., G3 and G1) most in need of improvement to reach a desired confidence or probability of reaching their corresponding targets.

In some implementations, the system 210 uses the indication of low likelihood of meeting diversity requirements as a trigger to select different digital health technologies for individual users or for a diversity group (e.g., G3) as a whole. The system 210 can use any of the techniques discussed in U.S. patent application Ser. No. 16/877,162, filed on May 18, 2020, which is incorporated herein by reference. This can include predicting compliance for different technology items and identifying, recommending, and implementing use of substitutes or complementary technology items that are expected to produce better compliance.

Another type of change that the system 210 can make or recommend is to change the monitoring group. The system 210 can identify, based on user profiles for candidates indicated in the database, additional members that would meet the criteria for the groups that have higher than desired probabilities of being underrepresented, e.g., G1 and G3, and which also meet the cohort selection criteria. Optionally, the system 210 can evaluate the new candidates identified for these different groups and predict the likely compliance of each. From these the system 210 can score or rank candidates to select those in the groups where more representation is needed that are most likely to comply and succeed in meeting study requirements. Alternatively new candidates can be randomly or pseudo-randomly selected. The system 210 can identify a number of candidates that would be needed to increase likelihood of reaching the target representation (for the group or for the study as a whole) at study end to the desired level, such as 80%. This can be done by simulating additions, predicting the changes, and then iteratively adding until the likelihood threshold is met or exceeded. The system 210 can then select this determined number of additional candidates in G1 and G3 to add to the cohort, and can automatically invite them (e.g., sending, an email, a text message, a notification through an application, etc.) to enroll. Researchers can be recommended which individuals to add or which groups in which to add individuals, and may be given the opportunity to confirm or approve first.

The changes that the system 210 identifies to improve compliance and diversity can be made by the system automatically, e.g., to preemptively increase survey reminders to members of G3 when the system 210 determines that the predicted survey response compliance rate is low. In some implementations, changes can be recommended to a researcher or other administrator and performed in response to receiving confirmation. For example, a user interface for the researcher can be populated with user interface controls, based on data sent by the system 210, that the researcher can select to initiate the various actions identified for improving diversity.

In some cases, the system 210 is used to assist in initial selection of a cohort or to assess whether a study is viable with a certain pool of candidates. The cohort for the study may be generated by selecting individuals whose profiles meet the selection criteria for the clinical trial. For example, an administrator may select candidates to invite to participate in the clinical trial or the system can select candidates using user profiles in a database. Even before the clinical trial begins, the system can use historical outcomes and/or predictions to assess the likelihood that the set of candidates to invite will yield a cohort that will provide the needed compliance among a sufficiently large and diverse set of participants. For example, an administrator may select a group of 120 candidates, with 40 candidates in each of groups G1, G2, and G3.

The system 210 can determine, for each group, an estimated rate of conversion, e.g., a proportion of those that enroll out of the total invited. This rate can be determined based on records for previous clinical trials indicating invitations made, enrollment outcomes (e.g., which individuals enrolled and which did not), and user profiles for the users (e.g., to determine which groups the individuals would correspond to). The system 210 may use statistics for the groups directly (e.g., use the historical rates calculated for the groups), use a trained machine learning model to predict the rates, or generate a more complex rate based on likelihood of enrollment for each individual (e.g., using a trained machine learning model to predict an enrollment outcome for each candidate and using the likelihoods to generate an overall predicted rate for the candidates in a group).

As the system 210 receives data collection results from remote devices, the system 210 uses the results to update and continue training the various models. In addition, as the system 210 recommends and makes changes to improve outcomes and future diversity status, the system 210 tracks the results achieved for the different interventions it performs. As a result, the system 210 can learn which interventions are most effective for different diversity groups and for different situations, allowing the system 210 to select and perform more effective preemptive and corrective actions in the future for the same or different monitoring programs.

The process 1800 can include causing each of one or more remote devices to carry out monitoring using one or more changed parameters or software modules selected to provide better compliance or data quality. This can include distributing configuration data corresponding to one or more programs identified for the one or more remote devices using the adapted scoring process. Distributing the configuration data can include transmitting, to each of the one or more devices, configuration data configured to adjust operation of the remote devices to set or change sensor parameters used by the remote device to conduct sensor measurements using one or more sensors, including changing at least one of a set of sensors used, a type of property measured, a timing of the sensor measurements, a frequency of the sensor measurements, a level of accuracy or precision for the sensor measurements, rules for evaluating validity or quality of the sensor measurements, sets of events or conditions that trigger initiation of the sensor measurements, software settings for an application or operating system in order to enable the sensor measurements, or a set of post-measurement processing steps to perform for data collected by the sensor measurements.

Distributing the configuration data can include transmitting, to each of the one or more devices, configuration data configured to adjust operation of the remote devices to set or change data storage parameters used by the remote device to format or store data acquired for the program to a server system over a computer network, the data storage parameters specifying at least one of: a format for a message, data stream, or data package to provide the data from the sensor measurements; an aggregation operation for aggregating measurements of the sensor data; a filtering operation for filtering or smoothing results of the sensor measurements; or an accuracy or precision setting for storing results of the sensor measurements.

Distributing the configuration data can include transmitting, to each of the one or more devices, configuration data configured to adjust operation of the remote devices to set or change network communication parameters used by the remote device to report data acquired for the program to a server system over a computer network, the network communication parameters comprising at least one of a server or network address to which acquired data is transmitted, a network protocol or encryption scheme to use in transmitting acquired data, one or more events or conditions that trigger transmission of acquired data, or one or more ranges or thresholds that trigger transmission of acquired data.

The configuration data can cause remote devices to perform various changes or configuration actions, often without requiring user action once the user enrolls in the program. The actions can include: enabling or disabling a sensor of the remote device or a device communicatively coupled to the remote device; setting or changing sensor parameters used by the remote device to conduct sensor measurements using one or more sensors, including changing at least one of a set of sensors used, a type of property measured, a timing of the sensor measurements, a frequency of the sensor measurements, a level of accuracy or precision for the sensor measurements, rules for evaluating validity or quality of the sensor measurements, sets of events or conditions that trigger initiation of the sensor measurements, software settings for an application or operating system in order to enable the sensor measurements, or a set of post-measurement processing steps to perform for data collected by the sensor measurements; setting or changing data storage parameters used by the remote device to format or store data acquired for the program to a server system over a computer network, the data storage parameters specifying at least one of: a format for a message, data stream, or data package to provide the data from the sensor measurements; an aggregation operation for aggregating measurements of the sensor data; a filtering operation for filtering or smoothing results of the sensor measurements; or an accuracy or precision setting for storing results of the sensor measurements; setting or changing network communication parameters used by the remote device to report data acquired for the program to a server system over a computer network, the network communication parameters comprising at least one of a server or network address to which acquired data is transmitted, a network protocol or encryption scheme to use in transmitting acquired data, one or more events or conditions that trigger transmission of acquired data, or one or more ranges or thresholds that trigger transmission of acquired data; setting or changing power usage parameters of the remote device, including changing a device power state or sleep setting of the remote device; altering a user interface of an application installed at the remote device, including changing a set of interactive user input controls presented in the user interface; setting or changing interactive content to be presented by the remote device as part of the program, the interactive content including at least one survey, prompt, or electronic form; or setting or changing parameters for presenting the interactive content that includes at least one of timing, frequency, format, triggers, or contexts for providing the interactive content.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a cathode ray tube or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
   accessing, by the one or more computers, data describing a monitoring program that involves collecting data over a period of time from geographically distributed devices over a communication network, wherein collecting the data includes collecting data about participants in a set of participants in the monitoring program who are users of the devices, the accessed data indicating monitoring program requirements for participants in the monitoring program;
   determining, by the one or more computers, composition characteristics indicating characteristics of the set of participants in the monitoring program;
   based on the monitoring program requirements and the determined composition characteristics, generating, by the one or more computers, predicted composition characteristics indicating characteristics of a portion of the set of participants predicted to comply with the monitoring program requirements for the period of time, the predicted composition characteristics being generated by the one or more computers based on previous compliance, by other participants of one or more prior monitoring programs, with requirements of the one or more prior monitoring programs;
   determining, by the one or more computers, whether the predicted composition characteristics indicate that at least a minimum level of diversity of participants is present among the portion of the set of participants predicted to comply with the monitoring program requirements; and
   communicating, by the one or more computers, with one or more devices associated with the monitoring program based on results of the determination whether the predicted composition characteristics indicate at least the minimum level of diversity.

2. The method of claim 1, wherein:
   determining whether the predicted composition characteristics indicate that at least the minimum level of diversity of participants is present comprises determining that the predicted composition characteristics indicate that there is at least the minimum level of diversity among the portion of the set of participants predicted to comply with the monitoring program requirements; and
   communicating with the one or more devices associated with the monitoring program comprises providing a notification that includes an indication that there is at least the minimum level of diversity among the portion of the set of participants predicted to comply with the monitoring program requirements.

3. The method of claim 2, wherein providing the notification comprises providing a notification that includes an indication of a difference between (i) a predicted future level of diversity among the portion of the portion of the set of participants predicted to comply with the monitoring program requirements and (ii) the minimum level of diversity.

4. The method of claim 3, comprising determining, by the one or more computers, one or more actions that the one or more computers predict will increase the level of diversity of the portion of the set of participants predicted to comply with the monitoring program requirements for the period of time,
   wherein the one or more actions are determined based on the difference between the predicted future level of diversity and minimum level of diversity.

5. The method of claim 1, wherein:
   determining whether the predicted composition characteristics indicate that at least the minimum level of diversity of participants is present comprises determining that the predicted composition characteristics indicate that there is less than the minimum level of diversity among the portion of the set of participants predicted to comply with the monitoring program requirements; and
   communicating with the one or more devices associated with the monitoring program comprises providing a notification that includes an indication that there is less than the minimum level of diversity among the portion of the set of participants predicted to comply with the monitoring program requirements.

6. The method of claim 5, comprising:
   in response to determining that the predicted composition characteristics indicate that there is less than the minimum level of diversity, determining, by the one or more computers, one or more actions that the one or more computers predict will increase the level of diversity of the portion of the set of participants predicted to comply with the monitoring program requirements for the period of time; and
   performing, by the one or more computers, at least one of the one or more actions.

7. The method of claim 6, wherein determining the one or more actions comprises determining one or more actions to adjust settings for administering the monitoring program.

8. The method of claim 7, wherein determining the one or more actions to adjust the settings for administering the monitoring program comprises at least one of the following:
   determining one or more actions to adjust a type of data requested from the one or more devices or a subset of the one or more devices;
   determining one or more actions to adjust a type of data provided to the one or more devices or a subset of the one or more devices;
   determining one or more actions to adjust a frequency of communication with the one or more devices or a subset of the one or more devices;
   determining one or more actions to adjust communication attributes when communicating with the one or more devices or a subset of the one or more devices;
   determining one or more actions to adjust a user interface of the one or more devices or a subset of the one or more devices; or
   determining one or more actions to change software for the monitoring program or a software version for the monitoring program used on (i) the one or more devices or (ii) a subset of the one or more devices.

9. The method of claim 6, wherein determining the one or more actions comprises:
   determining, by the one or more computers, one or more individuals to add to the set of participants; and
   inviting, by the one or more computers, the one or more individuals to participate in the monitoring program.

10. The method of claim 6, wherein determining the one or more actions comprises:
    determining, by the one or more computers, one or more changes to the monitoring program requirements to be made for at least a particular portion of the set of participants; and
    making, by the one or more computers, the one or more changes to the monitoring program requirements for at least the particular portion of the set of participants.

11. The method of claim 6, wherein determining the one or more actions comprises:
  identifying, by the one or more computers, one or more of the monitoring program requirements to remove for at least a particular portion of the set of participants; and
  removing, by the one or more computers, the one or more monitoring program requirements for at least the particular portion of the set of participants.

12. The method of claim 1, wherein generating the predicted composition characteristics for the portion of the set of participants comprises:
  identifying similarities between the monitoring program requirements and requirements of the one or more prior monitoring programs;
  obtaining compliance outcomes for the one or more prior monitoring programs; and
  applying the compliance outcomes to the determined compostion characteristics for the monitoring program to generate the predicted composition characteristics.

13. The method of claim 12, wherein generating the predicted composition characteristics for the portion of the set of participants comprises:
  providing the determined composition characteristics and the monitoring program requirements as input to a machine learning model that has been trained based on the compliance outcomes for the one or more prior monitoring programs; and
  receiving an output of the machine learning model, wherein the output provides the predicted composition characteristics or the output is used by the one or more computers to determine the predicted composition characteristics.

14. A system comprising:
  a database storing at least one of (i) data sets for each of multiple users and (ii) monitoring data for past monitoring programs, wherein the data sets comprise information received from one or more remote devices;
  a network interface to receive monitoring data from the remote devices over a communication network; and
  a server system configured to manage or assess monitoring performed using the remote devices, the server system being configured to perform operations comprising:
    accessing data describing a monitoring program that involves collecting data over a period of time from geographically distributed devices over a communication network, wherein collecting the data includes collecting data about participants in a set of participants in the monitoring program who are users of the devices, the accessed data indicating monitoring program requirements for participants in the monitoring program;
    determining composition characteristics indicating characteristics of the set of participants in the monitoring program;
    based on the monitoring program requirements and the determined composition characteristics, generating predicted composition characteristics indicating characteristics of a portion of the set of participants predicted to comply with the monitoring program requirements for the period of time, the predicted composition characteristics being generated by the server system based on previous compliance, by other participants of one or more prior monitoring programs, with requirements of the one or more prior monitoring programs;
    determining whether the predicted composition characteristics indicate that at least a minimum level of diversity of participants is present among the portion of the set of participants predicted to comply with the monitoring program requirements; and
    communicating with one or more devices associated with the monitoring program based on results of the determination whether the predicted composition characteristics indicate at least the minimum level of diversity.

15. One or more non-transitory computer-readable media storing instructions that are operable, when executed by the one or more computers, cause the one or more computers to perform operations comprising:
  accessing, by the one or more computers, data describing a monitoring program that involves collecting data over a period of time from geographically distributed devices over a communication network, wherein collecting the data includes collecting data about participants in a set of participants in the monitoring program who are users of the devices, the accessed data indicating monitoring program requirements for participants in the monitoring program;
  determining, by the one or more computers, composition characteristics indicating characteristics of the set of participants in the monitoring program;
  based on the monitoring program requirements and the determined composition characteristics, generating, by the one or more computers, predicted composition characteristics indicating characteristics of a portion of the set of participants predicted to comply with the monitoring program requirements for the period of time, the predicted composition characteristics being generated by the one or more computers based on previous compliance, by other participants of one or more prior monitoring programs, with requirements of the one or more prior monitoring programs;
  determining, by the one or more computers, whether the predicted composition characteristics indicate that at least a minimum level of diversity of participants is present among the portion of the set of participants predicted to comply with the monitoring program requirements; and
  communicating, by the one or more computers, with one or more devices associated with the monitoring program based on results of the determination whether the predicted composition characteristics indicate at least the minimum level of diversity.

16. The method of claim 1, wherein the monitoring program is a health research study, the set of participants is a cohort of participants in the health research study, and wherein collecting data about the participants comprises collecting health data for the participants in the cohort.

17. The method of claim 16, wherein determining the composition characteristics comprises determining, for the cohort, an amount or proportion of participants in the cohort in each of multiple different categories of participants, wherein the different categories correspond to different attributes or combinations of attributes;
  wherein determining the predicted composition characteristics comprises determining, for the portion of the set of participants predicted to comply with the monitoring program requirements for the period of time, amounts or proportions of participants in the multiple different categories of participants; and wherein the minimum level of diversity comprises minimum amounts or minimum proportions for one or more of the multiple different categories of participants.

18. The method of claim 16, wherein the period of time is a predetermined duration of the health research study;
   wherein the monitoring program requirements include data collection requirements from a study protocol for the health research study that indicate types of data to collect from participants in the health research study; and
   wherein the predicted composition characteristics comprise predicted characteristics of the portion of the cohort predicted to satisfy the data collection requirements with at least a minimum level of completeness until the end of the predetermined duration of the health research study.

19. The method of claim 1, wherein communicating with the one or more devices associated with the monitoring program comprises providing, to one or more remote devices of the geographically distributed devices configured to collect data about the participants, configuration data configured to adjust collection of sensor data by the one or more remote devices.

20. The method of claim 1, further comprising training a machine learning model to predict likelihoods that individuals or groups of individuals will satisfy requirements of monitoring programs, the machine learning model being trained to make predictions of likelihoods for specific individuals or groups with respect to specific monitoring programs based on input indicating (i) attributes of an individual or group and (ii) requirements of a specific monitoring program, wherein the machine learning model is trained based on a data set that indicates requirements for data collection from participants in prior health research studies, attributes of respective participants in the prior health research studies, and compliance results describing how well the participants in prior health research studies complied with the requirements for data collection in the prior health research studies;
   wherein the predicted composition characteristics are generated using predicted likelihoods obtained as output of the trained machine learning model.

* * * * *

UNITED STATES PATENT AND TRADEMARK OFFICE
CERTIFICATE OF CORRECTION

PATENT NO. : 11,316,941 B1
APPLICATION NO. : 17/324098
DATED : April 26, 2022
INVENTOR(S) : Praduman Jain, Josh Schilling and Dave Klein Page 1 of 1

It is certified that error appears in the above-identified patent and that said Letters Patent is hereby corrected as shown below:

On the Title Page

Item (54) at Column 1, Lines 1-3 (Title), delete "REMOTELY MANAGING AND ADAPTING MONITORING PROGRAMS USING MACHINE LEARNING PREDICTIONS" and insert -- MACHINE LEARNING PREDICTIONS FOR COHORT DIVERSITY AND RETENTION IN DIGITAL HEALTH RESEARCH --.

In the Specification

At Column 1, Lines 1-3 (approx.), delete "REMOTELY MANAGING AND ADAPTING MONITORING PROGRAMS USING MACHINE LEARNING PREDICTIONS" and insert -- MACHINE LEARNING PREDICTIONS FOR COHORT DIVERSITY AND RETENTION IN DIGITAL HEALTH RESEARCH --.

In the Claims

At Column 157, Line 19, in Claim 12, delete "compostion" and insert -- composition --.

Signed and Sealed this
Twenty-eighth Day of June, 2022

Katherine Kelly Vidal
*Director of the United States Patent and Trademark Office*